(12) United States Patent
Gieseke et al.

(10) Patent No.: US 10,758,859 B2
(45) Date of Patent: Sep. 1, 2020

(54) FILTER CARTRIDGES; AIR CLEANER ASSEMBLIES; HOUSINGS; FEATURES; COMPONENTS; AND, METHODS

(71) Applicant: Donaldson Company, Inc., Minneapolis, MN (US)

(72) Inventors: Steven S. Gieseke, Richfield, MN (US); Thomas D. Lage, Apple Valley, MN (US); Gaozhi Jiang, Minneapolis, MN (US); Gert Proost, Kessel-lo (BE); Johnny Craessaerts, Huldenberg (BE); Mathijs Verstraete, Tienen (BE); Bart Catoor, Kessel-lo (BE)

(73) Assignee: Donaldson Company, Inc., Minneapolis, MN (US)

( * ) Notice: Subject to any disclaimer, the term of this patent is extended or adjusted under 35 U.S.C. 154(b) by 204 days.

(21) Appl. No.: 16/058,472

(22) Filed: Aug. 8, 2018

(65) Prior Publication Data

US 2019/0046915 A1 Feb. 14, 2019

Related U.S. Application Data

(60) Provisional application No. 62/543,090, filed on Aug. 9, 2017.

(51) Int. Cl.
*B01D 46/52* (2006.01)
*B01D 46/00* (2006.01)
(Continued)

(52) U.S. Cl.
CPC ....... *B01D 46/527* (2013.01); *B01D 46/0005* (2013.01); *B01D 46/009* (2013.01);
(Continued)

(58) Field of Classification Search
CPC ............ B01D 2271/027; B01D 46/527; B01D 46/0005; B01D 46/0084; B01D 46/009;
(Continued)

(56) References Cited

U.S. PATENT DOCUMENTS

| 4,410,427 A | 10/1983 | Wydeven |
| 4,589,983 A | 5/1986 | Wydevan |

(Continued)

FOREIGN PATENT DOCUMENTS

| DE | 199 35 297 | 2/2001 |
| EP | 1 106 232 | 6/2001 |

(Continued)

OTHER PUBLICATIONS

U.S. Appl. No. 14/518,102, filed Oct. 20, 2014.
(Continued)

*Primary Examiner* — Robert Clemente
(74) *Attorney, Agent, or Firm* — Merchant & Gould P.C.

(57) ABSTRACT

According to the present disclosure, air cleaner assemblies, housings, serviceable filter cartridges and features, components, and methods, relating thereto are disclosed. In general, the features relate to systems that are configured to aid in inhibiting an improper cartridge from being installed in an air cleaner housing, during servicing. A variety of features are characterized, and in many examples, the cartridge includes a seal arrangement having radially directed seal surface with at least a first non-wavy or non-projection/recess section and a second wavy or projection/recess section. Examples are shown and described in detail.

20 Claims, 86 Drawing Sheets

(51) Int. Cl.
  *B01D 46/24* (2006.01)
  *B01D 46/42* (2006.01)
  *F02M 35/02* (2006.01)
  *F02M 35/024* (2006.01)

(52) U.S. Cl.
  CPC ...... *B01D 46/0084* (2013.01); *B01D 46/2411* (2013.01); *B01D 46/4227* (2013.01); *B01D 46/525* (2013.01); *F02M 35/0201* (2013.01); *F02M 35/02416* (2013.01); *F02M 35/02483* (2013.01); *B01D 2265/026* (2013.01); *B01D 2271/027* (2013.01); *B01D 2275/208* (2013.01); *B01D 2279/60* (2013.01); *F02M 35/0245* (2013.01); *F02M 35/02408* (2013.01)

(58) Field of Classification Search
  CPC ............ B01D 46/2411; B01D 46/4227; B01D 46/525; B01D 2265/026; B01D 2275/208; B01D 2279/60; F02M 35/0201; F02M 35/02416; F02M 35/02408; F02M 35/0245
  See application file for complete search history.

(56) References Cited

U.S. PATENT DOCUMENTS

| | | |
|---|---|---|
| 4,720,292 A | 1/1988 | Engel et al. |
| D326,706 S | 6/1992 | Karlsson |
| 5,487,767 A | 1/1996 | Brown |
| 5,613,992 A | 3/1997 | Engel et al. |
| 5,730,769 A | 3/1998 | Dungs et al. |
| 5,772,883 A | 6/1998 | Rothman et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,893,937 A | 4/1999 | Moessinger |
| 5,895,574 A | 4/1999 | Friedmann et al. |
| 5,902,364 A | 5/1999 | Tokar et al. |
| D417,268 S | 11/1999 | Gillingham et al. |
| 6,039,778 A | 3/2000 | Coulonvaux et al. |
| D425,189 S | 5/2000 | Gillingham et al. |
| D428,128 S | 7/2000 | Gillingham et al. |
| 6,179,890 B1 | 1/2001 | Ramos et al. |
| D437,401 S | 2/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar et al. |
| 6,221,122 B1 | 4/2001 | Gieseke et al. |
| 6,235,195 B1 | 5/2001 | Tokar |
| D444,219 S | 6/2001 | Gieseke et al. |
| D447,549 S | 9/2001 | Gieseke et al. |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,350,296 B1 | 2/2002 | Warner |
| 6,368,374 B1 | 4/2002 | Tokar et al. |
| 6,387,162 B1 | 5/2002 | Kosmider et al. |
| D460,169 S | 7/2002 | Anderson et al. |
| D461,003 S | 7/2002 | Gieseke et al. |
| 6,416,605 B1 | 7/2002 | Golden |
| D464,129 S | 10/2002 | Xu et al. |
| 6,482,247 B2 | 11/2002 | Jaroszczyk et al. |
| 6,517,598 B2 | 2/2003 | Anderson et al. |
| D471,623 S | 3/2003 | Gieseke et al. |
| D473,637 S | 4/2003 | Golden |
| 6,572,667 B1 | 6/2003 | Grief et al. |
| D477,659 S | 7/2003 | Gieseke et al. |
| 6,599,342 B2 | 7/2003 | Andress et al. |
| 6,610,126 B2 | 8/2003 | Xu et al. |
| D481,101 S | 10/2003 | Gieseke et al. |
| 6,638,332 B1 | 10/2003 | Schmitz et al. |
| 6,652,614 B2 | 11/2003 | Gieseke et al. |
| D483,459 S | 12/2003 | Dewit et al. |
| D484,584 S | 12/2003 | Anderson et al. |
| 6,673,136 B2 | 1/2004 | Gillingham et al. |
| 6,706,087 B1 | 3/2004 | Gebler et al. |
| 6,743,317 B2 | 6/2004 | Wydeven |
| D497,202 S | 10/2004 | Stavos et al. |
| 6,852,141 B2 | 2/2005 | Bishop et al. |
| D506,539 S | 6/2005 | Bishop et al. |
| 6,936,084 B2 | 8/2005 | Schlensker et al. |
| 6,966,940 B2 | 11/2005 | Krisko et al. |
| 7,004,986 B2 | 2/2006 | Kopec et al. |
| D520,619 S | 5/2006 | Kuempel et al. |
| 7,070,642 B2 | 7/2006 | Scott et al. |
| 7,090,708 B2 | 8/2006 | Winter |
| 7,115,156 B2 | 10/2006 | Schaerlund et al. |
| 7,282,075 B2 | 10/2007 | Spone et al. |
| 7,329,326 B2 | 2/2008 | Wagner et al. |
| 7,351,270 B2 | 4/2008 | Olson et al. |
| 7,364,601 B2 | 4/2008 | Xu et al. |
| 7,396,376 B2 | 4/2008 | Schrage et al. |
| 7,396,375 B2 | 7/2008 | Kuempel et al. |
| 7,488,365 B2 | 2/2009 | Golden et al. |
| 7,520,913 B2 | 4/2009 | Mills et al. |
| 7,524,349 B2 | 4/2009 | Schrage et al. |
| 7,537,631 B2 | 5/2009 | Scott et al. |
| 7,569,090 B2 | 8/2009 | Nelson |
| D600,790 S | 9/2009 | Nelson et al. |
| 7,625,419 B2 | 12/2009 | Nelson et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,713,321 B2 | 5/2010 | Kuempel et al. |
| RE42,174 E | 3/2011 | Gunderson et al. |
| D635,233 S | 3/2011 | Nelson |
| 7,905,936 B2 | 3/2011 | Olson et al. |
| 7,967,886 B2 | 6/2011 | Schrage et al. |
| 7,972,404 B2 | 7/2011 | Kuempel et al. |
| 7,972,405 B2 | 7/2011 | Engelland et al. |
| 7,981,183 B2 | 7/2011 | Nepsund et al. |
| 7,997,425 B2 | 8/2011 | Golden et al. |
| 8,016,903 B2 | 9/2011 | Nelson et al. |
| 8,034,145 B2 | 10/2011 | Boehrs et al. |
| 8,038,756 B2 | 10/2011 | Iddings et al. |
| 8,048,188 B2 | 11/2011 | Engelland et al. |
| 8,066,791 B2 | 11/2011 | Baseotto et al. |
| 8,128,724 B2 | 3/2012 | Mills et al. |
| 8,142,533 B2 | 3/2012 | Gillenberg et al. |
| 8,147,576 B2 | 4/2012 | Gillenberg et al. |
| 8,152,876 B2 | 4/2012 | Gillenberg et al. |
| 8,163,056 B2 | 4/2012 | Coulonvaux et al. |
| 8,167,142 B2 | 5/2012 | Hacker |
| 8,182,569 B2 | 5/2012 | Casey et al. |
| 8,216,334 B2 | 7/2012 | Nelson et al. |
| 8,216,335 B2 | 7/2012 | Scott et al. |
| 8,226,786 B2 | 7/2012 | Schrage et al. |
| 8,273,143 B2 | 9/2012 | Coulonvaux et al. |
| 8,277,532 B2 | 10/2012 | Reichter et al. |
| 8,287,612 B2 | 10/2012 | Gillenberg et al. |
| 8,292,983 B2 | 10/2012 | Reichter et al. |
| 8,292,984 B2 | 10/2012 | Baseotto et al. |
| 8,328,897 B2 | 12/2012 | Nelson et al. |
| 8,357,219 B2 | 1/2013 | Boehrs et al. |
| 8,382,876 B2 | 2/2013 | Engelland et al. |
| 8,404,029 B2 | 3/2013 | Lundgren et al. |
| 8,414,675 B2 | 4/2013 | Iddings et al. |
| 8,361,181 B2 | 6/2013 | Osendorf et al. |
| 8,493,723 B2 | 7/2013 | Reichter et al. |
| 8,499,749 B2 | 8/2013 | Mosset et al. |
| 8,557,007 B2 | 10/2013 | Read |
| 8,591,621 B2 | 11/2013 | Ruhland et al. |
| 8,663,355 B2 | 3/2014 | Nelson et al. |
| 8,714,142 B2 | 5/2014 | Jacob et al. |
| 8,741,017 B2 | 6/2014 | Nelson |
| 8,747,512 B2 | 6/2014 | Mills et al. |
| 8,758,467 B2 | 6/2014 | Lundgren et al. |
| 8,808,417 B2 | 8/2014 | Engelland et al. |
| 8,814,973 B2 | 8/2014 | Baseotto et al. |
| 8,840,699 B2 | 9/2014 | Bruce et al. |

(56) References Cited

U.S. PATENT DOCUMENTS

| | | |
|---|---|---|
| 8,864,866 B2 | 10/2014 | Osendorf et al. |
| 8,906,128 B2 | 12/2014 | Reichter et al. |
| 8,920,530 B2 | 12/2014 | Ruhland et al. |
| 8,945,268 B2 | 2/2015 | Nelson et al. |
| 9,120,047 B2 | 9/2015 | Boehrs et al. |
| 9,180,399 B2 | 11/2015 | Reichter et al. |
| 9,217,399 B2 | 12/2015 | Engelland et al. |
| 9,254,457 B2 | 2/2016 | Kaufmann et al. |
| 9,308,482 B2 | 4/2016 | Kaiser |
| 9,399,972 B2 | 4/2016 | Boehrs et al. |
| 9,387,425 B2 | 7/2016 | Osendorf et al. |
| 9,446,339 B2 | 9/2016 | Rieger et al. |
| 9,463,404 B2 | 10/2016 | Rieger |
| 9,527,023 B2 | 12/2016 | Reichter et al. |
| 9,579,596 B2 | 2/2017 | Rieger et al. |
| 9,610,529 B2 | 4/2017 | Mills et al. |
| 9,636,615 B2 | 5/2017 | Osendorf et al. |
| 9,718,019 B2 | 8/2017 | Baseotto et al. |
| 2002/0096247 A1 | 7/2002 | Wydeven et al. |
| 2003/0146149 A1 | 8/2003 | Binder et al. |
| 2004/0035097 A1 | 2/2004 | Schlensker et al. |
| 2005/0166561 A1 | 8/2005 | Schrage et al. |
| 2005/0252848 A1 | 11/2005 | Miller |
| 2007/0039296 A1 | 2/2007 | Schrage et al. |
| 2007/0235384 A1 | 10/2007 | Oku et al. |
| 2008/0041026 A1 | 2/2008 | Engel et al. |
| 2008/0110142 A1 | 5/2008 | Nelson et al. |
| 2008/0115758 A1 | 5/2008 | Engelland et al. |
| 2008/0190082 A1 | 8/2008 | Scott et al. |
| 2008/0307759 A1 | 12/2008 | Reichter et al. |
| 2009/0064646 A1 | 3/2009 | Reichter et al. |
| 2009/0094951 A1 | 4/2009 | Baseotto et al. |
| 2009/0100813 A1 | 4/2009 | Iddings et al. |
| 2009/0151311 A1 | 6/2009 | Reichter et al. |
| 2009/0211450 A1 | 8/2009 | Mosset et al. |
| 2009/0217632 A1 | 9/2009 | Coulonvaux et al. |
| 2009/0301045 A1 | 12/2009 | Nelson et al. |
| 2010/0032365 A1 | 2/2010 | Moe et al. |
| 2010/0043366 A1 | 2/2010 | Boehrs et al. |
| 2010/0044295 A1 | 2/2010 | Campbell |
| 2010/0064646 A1 | 3/2010 | Smith |
| 2010/0146917 A1 | 6/2010 | Coulonvaux et al. |
| 2010/0146919 A1 | 6/2010 | Nelson |
| 2010/0146920 A1 | 6/2010 | Iddings et al. |
| 2010/0293906 A1 | 11/2010 | Flagstad et al. |
| 2011/0017657 A1 | 1/2011 | Jokschas et al. |
| 2011/0094197 A1 | 4/2011 | Ruhland et al. |
| 2011/0173937 A1 | 7/2011 | Nelson |
| 2011/0232244 A1 | 9/2011 | Schrage et al. |
| 2011/0247582 A1 | 10/2011 | Blossey et al. |
| 2011/0308212 A1 | 12/2011 | Ruhland et al. |
| 2013/0263744 A1 | 10/2013 | Osendorf et al. |
| 2014/0102058 A1 | 4/2014 | Kaufmann et al. |
| 2014/0208702 A1 | 7/2014 | Lundgren et al. |
| 2014/0215982 A1 | 8/2014 | Wood et al. |
| 2014/0260143 A1 | 9/2014 | Kaiser |
| 2014/0318090 A1* | 10/2014 | Rieger ............... B01D 46/0001 55/502 |
| 2014/0318092 A1 | 10/2014 | Rieger |
| 2015/0101299 A1 | 4/2015 | Osendorf et al. |
| 2017/0001134 A1 | 1/2017 | Rieger et al. |
| 2019/0063380 A1* | 2/2019 | Dirnberger ....... F02M 35/02441 |

FOREIGN PATENT DOCUMENTS

| | | |
|---|---|---|
| EP | 2 742 986 | 12/2013 |
| FR | 2 214 505 | 1/1973 |
| JP | 2004-136203 | 5/2004 |
| WO | WO 2004/071616 | 8/2004 |
| WO | WO 2005/079954 | 9/2005 |
| WO | WO 2006/084094 | 8/2006 |
| WO | WO 2007/044677 | 4/2007 |
| WO | WO 2013/063497 | 5/2013 |
| WO | WO 2013/210541 | 12/2014 |
| WO | WO 2014/194275 | 12/2014 |
| WO | WO 2017/139673 | 8/2017 |

OTHER PUBLICATIONS

U.S. Appl. No. 61/551,741, filed Oct. 2011.
U.S. Appl. No. 61/565,114, filed Nov. 2011.
U.S. Appl. No. 61/712,454, filed Oct. 2012.
Search Report and Written Opinion corresponding to PCT/US2018/045819 dated Jan. 2, 2019.

* cited by examiner

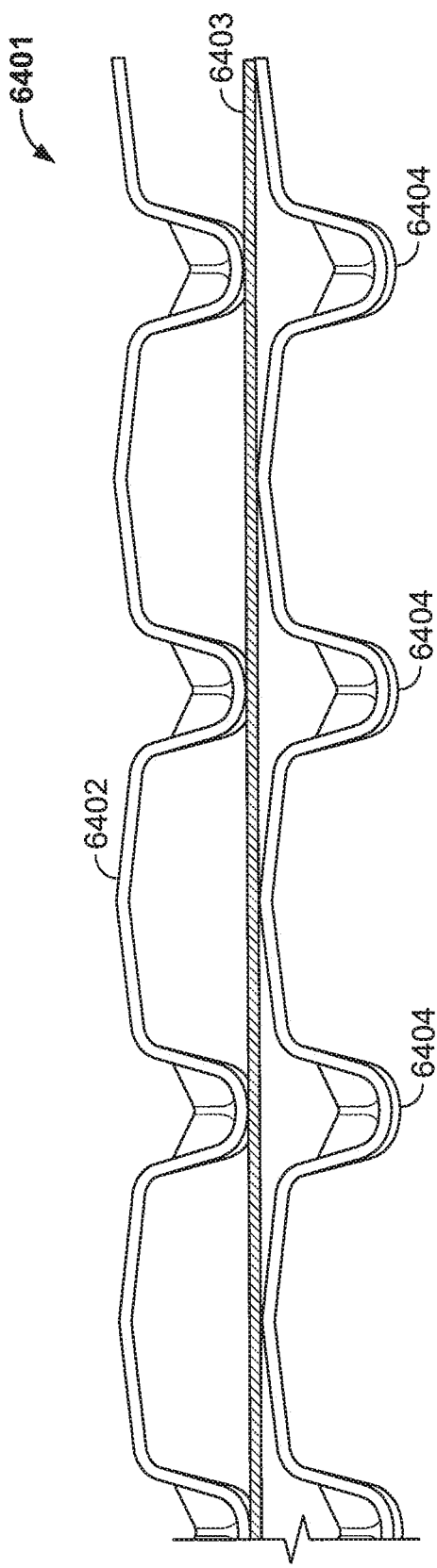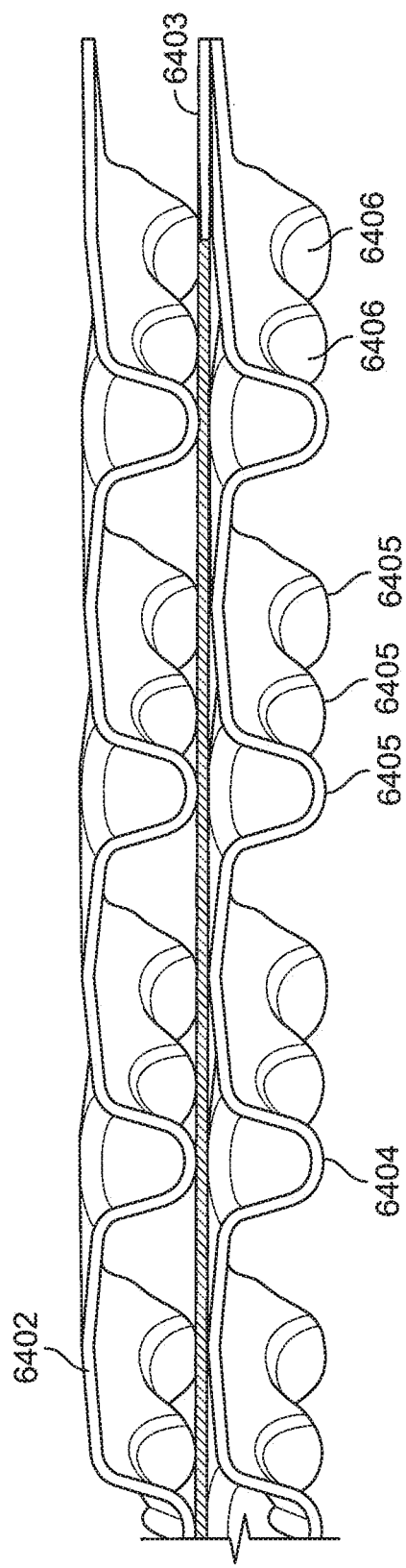
FIG. 12A
FIG. 12B

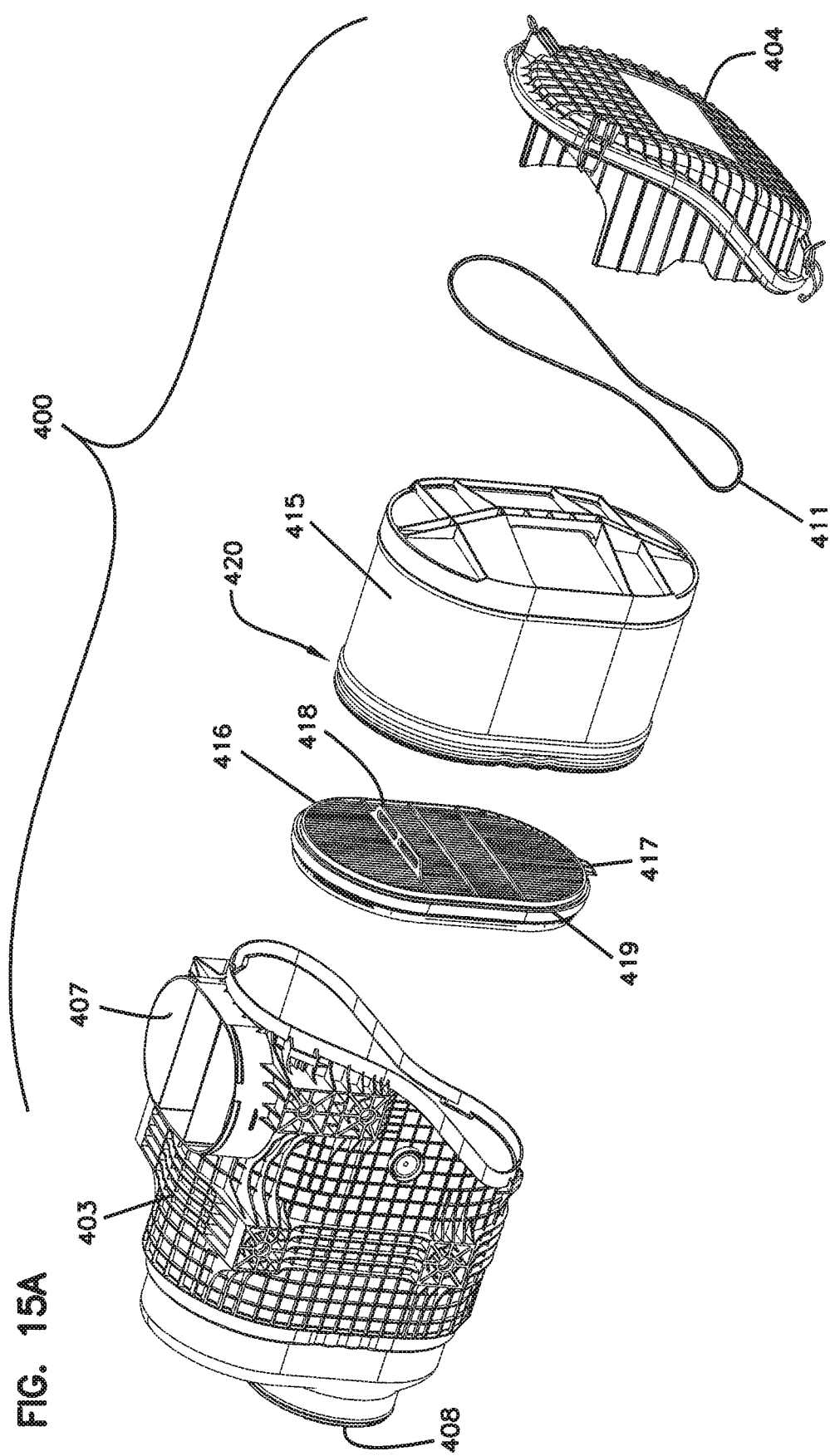

FIG. 45
FIG. 46
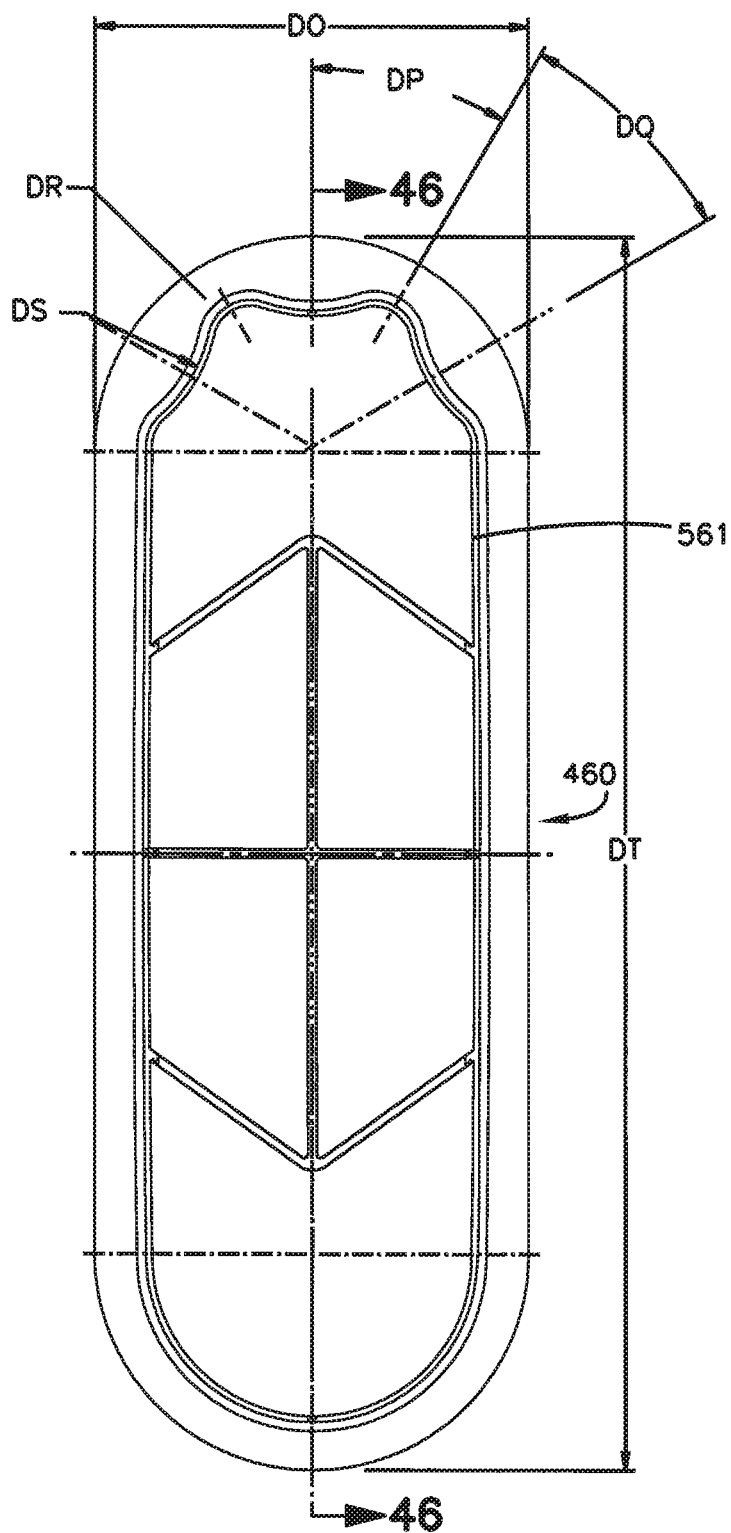
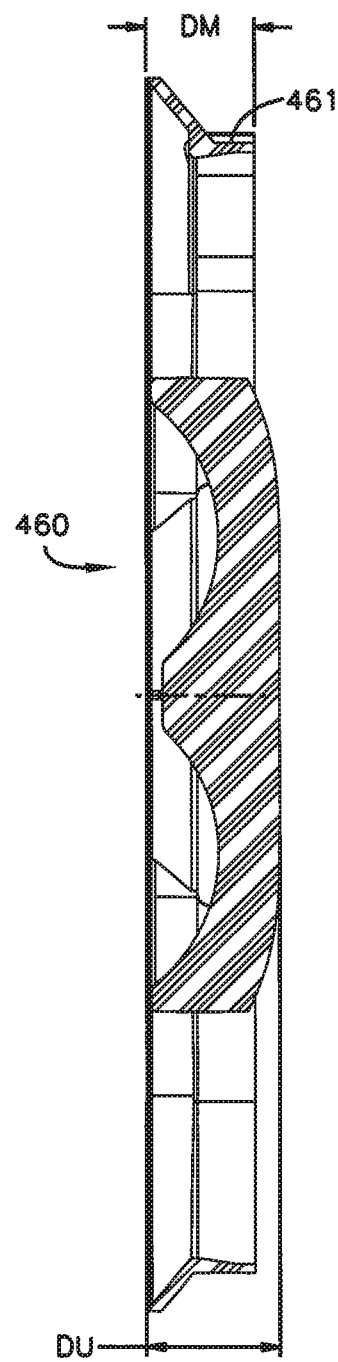

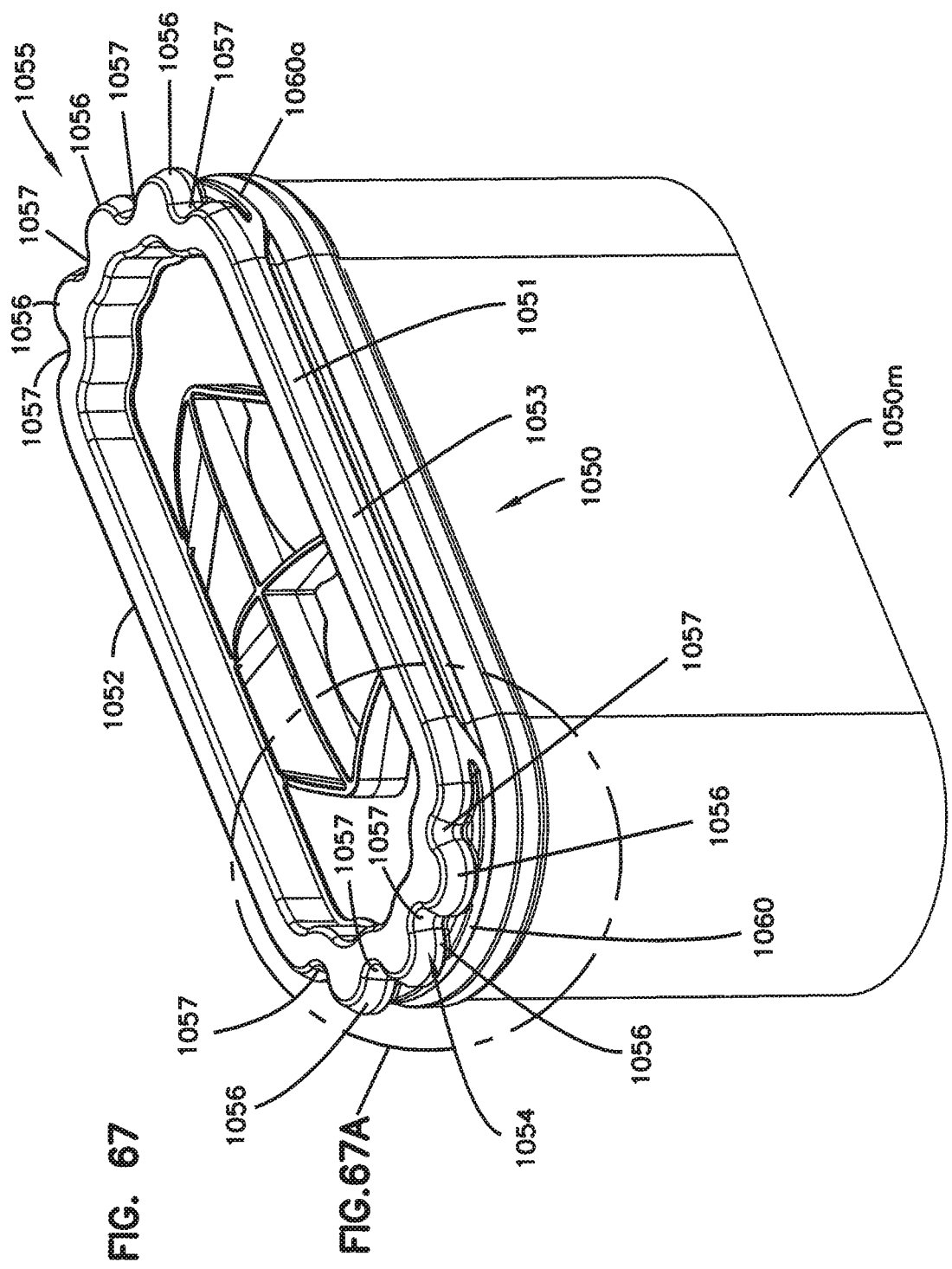

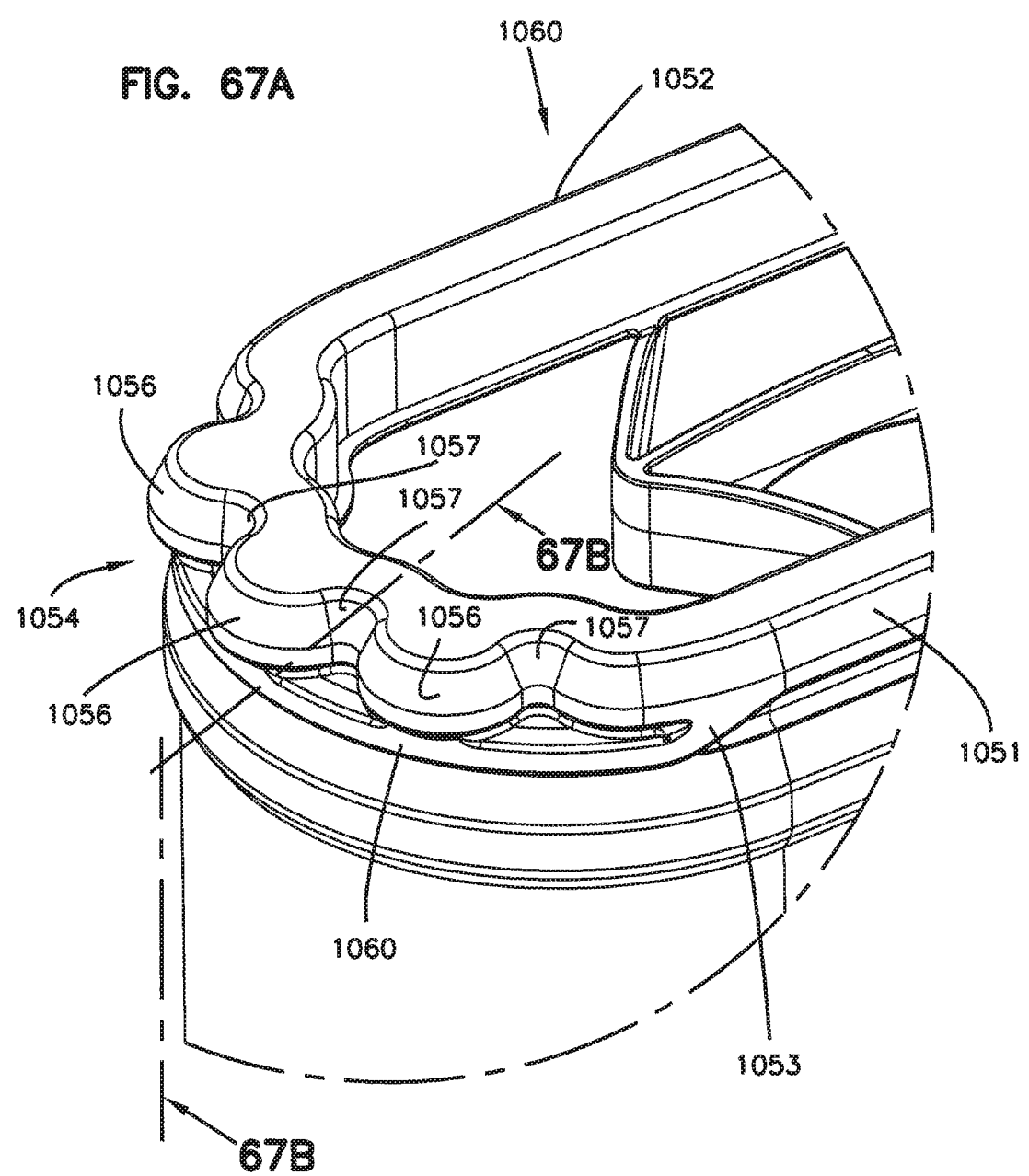

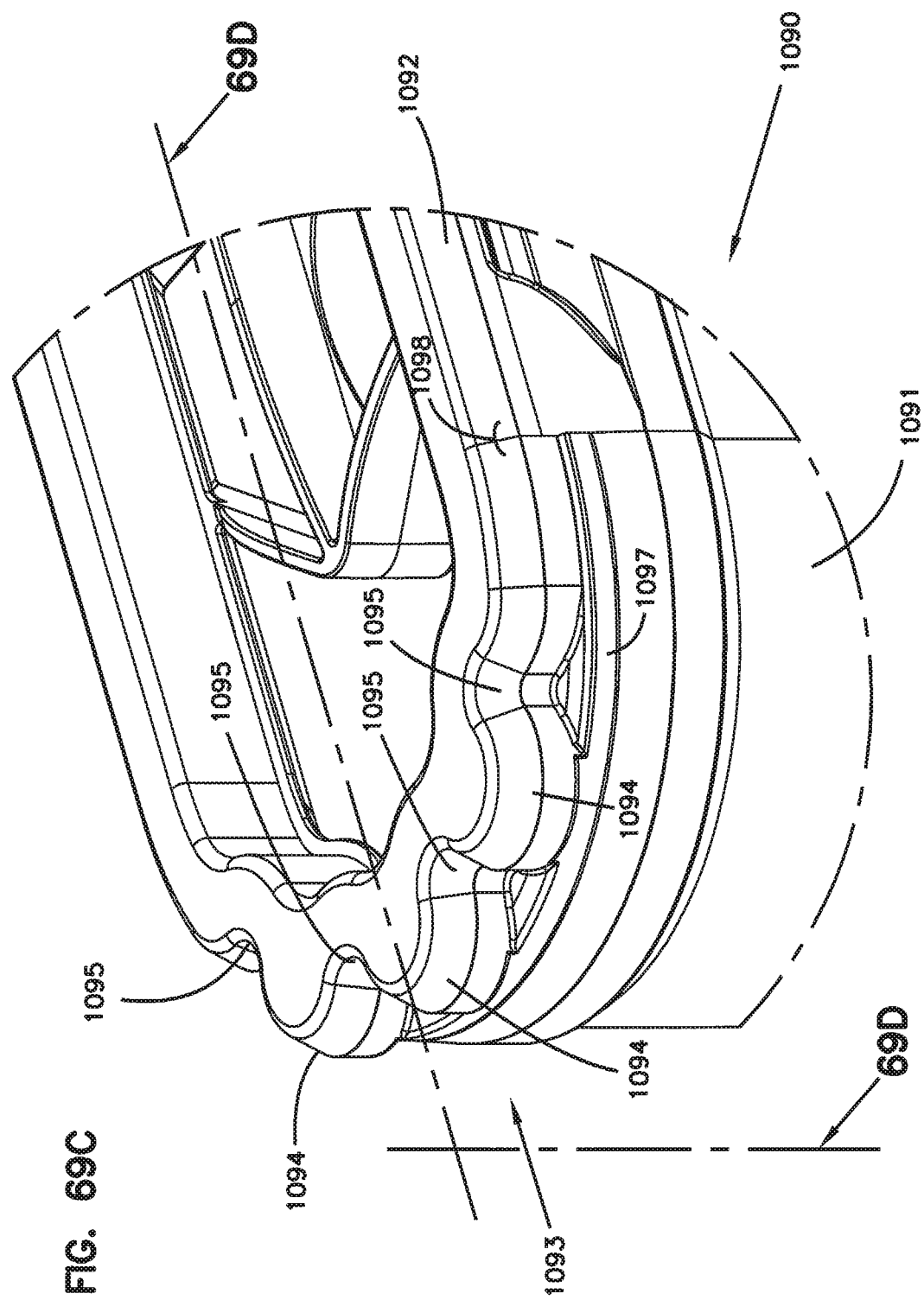

FILTER CARTRIDGES; AIR CLEANER ASSEMBLIES; HOUSINGS; FEATURES; COMPONENTS; AND, METHODS

CROSS-REFERENCE TO RELATED APPLICATION

The present disclosure includes, with edits, the disclosure of U.S. provisional 62/543,090 filed Aug. 9, 2017. A claim of priority is made to U.S. provisional 62/543,090 to the extent appropriate; and, the complete disclosure of U.S. provisional 62/543,090 is incorporated herein by reference.

FIELD OF THE DISCLOSURE

The present disclosure relates to filter arrangements, typically for use in filtering air; such as intake air for internal combustion engines. In certain selected examples, the disclosure particularly relates to filter arrangements that use serviceable cartridges having opposite flow ends; however other applications are described. Air cleaner arrangements, features, and, methods of assembly and use, are also described.

BACKGROUND

Air streams can carry contaminant material such as dust and liquid particulate therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air. A variety of air filter arrangements have been developed for contaminant removal. Improvements are sought.

SUMMARY

According to the present disclosure, air cleaner assemblies, housings, serviceable filter cartridges and features, components, and methods, relating thereto are disclosed. In general, the features relate to systems that are configured to aid in inhibiting an improper cartridge from being installed in an air cleaner housing, during servicing. A variety of approaches are described herein, that can be used independently or together to achieve a desired result.

BRIEF DESCRIPTION OF THE DRAWINGS

FIG. 12A is a schematic depiction of another usable fluted sheet/facing sheet combination in accord with the present disclosure.

FIG. 12B is a perspective view of a portion of the usable fluted sheet/facing sheet combination depicted in FIG. 64.

FIG. 15A is a schematic exploded, perspective view of the assembly of FIG. 14.

FIG. 45 is a schematic interior plan view of the preform of FIG. 43.

FIG. 46 is a schematic cross-sectional view taken generally along line 46-46, FIG. 45.

FIG. 63 also depicting portions of an alternate hypothetical standard-geometric shape seal perimeter definition.

FIG. 67 is a schematic perspective view of a filter cartridge including seal arrangement; a first perimeter seal surface having at least one portion with a projection/recess contour; and, having a non-projection recess second seal perimeter section operably positioned thereon.

FIG. 67A is a schematic enlarged, fragmentary view of an identified portion of FIG. 67.

FIG. 69C is an enlarged fragmentary schematic view of a second alternate seal arrangement configuration to that shown in FIGS. 69D-69D.

FIG. 83A is a schematic depiction of the alternate form of the seal surface depicted in FIG. 83.

DETAILED DESCRIPTION

I. Example Media Configurations, Generally

Figure 1:
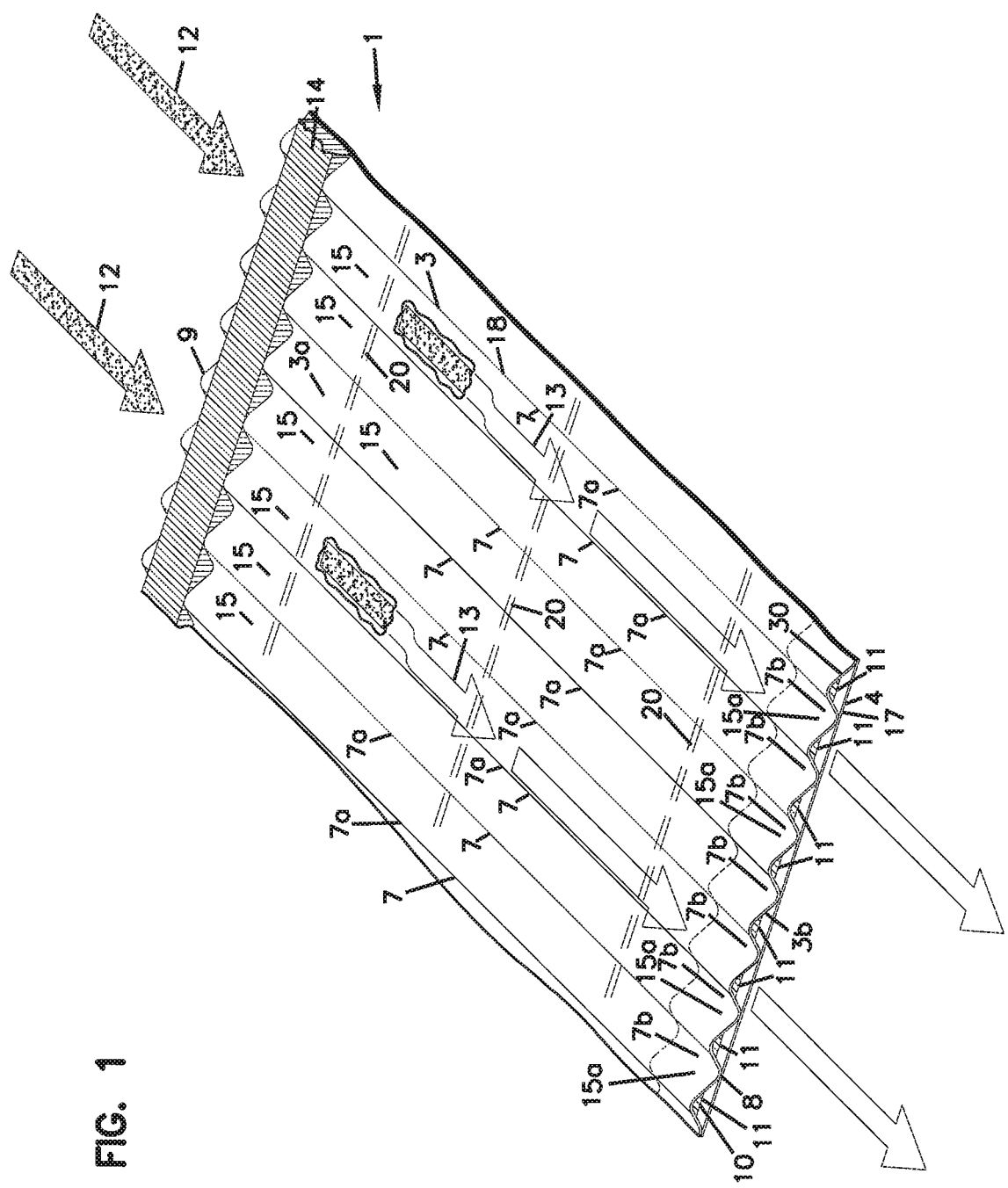
FIG. 1 is a fragmentary, schematic, perspective view of a first example media type useable in arrangements according to the present disclosure.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges having relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/ air cleaner interaction features characterized herein.

A. Media Pack Arrangements Using Filter Media Having Media Ridges (Flutes) Secured to Facing Media Fluted filter media (media having media ridges) can be used to provide fluid filter constructions in a variety of manners. One well known manner is characterized herein as a z-filter construction. The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,291; 6,179,890; 6,235,195; Des. 399,944; Des. 428, 128; Des. 396,098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media construction is shown. The media 1 is formed from a fluted, in this instance corrugated, sheet 3 and a facing sheet 4. A construction such as media 1 is referred to herein as a single facer or single faced strip.

Sometimes, the corrugated fluted or ridged sheet 3, FIG. 1, is of a type generally characterized herein as having a regular, curved, wave pattern of flutes, ridges or corrugations 7. The term "wave pattern" in this context, is meant to refer to a flute, ridge or corrugated pattern of alternating troughs 7*b* and ridges 7*a*. The term "regular" in this context is meant to refer to the fact that the pairs of troughs and ridges (7*b*, 7*a*) alternate with generally the same repeating corrugation (flute or ridge) shape and size. (Also, typically in a regular configuration each trough 7*b* is substantially an inverse ridge for each ridge 7*a*.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7*a* and seven complete troughs 7*b*.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, in certain instances the corrugation pattern is not the result of a folded or creased shape provided to the media, but rather the apex 7*a* of each ridge and the bottom 7*b* of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations, ridges or flutes are generally straight, although alternatives are possible. By "straight" in this context, it is meant that through at least 70%, typically at least 80% of the length, the ridges 7a and troughs (or inverted ridges) 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end or face for the media pack and edge 8 an outlet end or face, although an opposite orientation is possible.

In the example depicted, the various flutes 7 extend completely between the opposite edges 8, 9, but alternatives are possible. For example, they can extend to a location adjacent or near the edges, but not completely therethrough. Also, they can be stopped and started partway through the media, as for example in the media of US 2014/0208705 A1, incorporated herein by reference.

When the media is as depicted in FIG. 1, adjacent edge 8 can provided a sealant bead 10, sealing the corrugated sheet 3 and the facing sheet 4 together. Bead 10 will sometimes be referred to as a "single facer" or "single face" bead, or by variants, since it is a bead between the corrugated sheet 3 and facing sheet 4, which forms the single facer (single faced) media strip 1. Sealant bead 10 seals closed individual flutes 11 adjacent edge 8, to passage of air therefrom (or thereto in an opposite flow).

In the media depicted in FIG. 1, adjacent edge 9 is provided seal bead 14. Seal bead 14 generally closes flutes 15 to passage of unfiltered fluid therefrom (or flow therein in an opposite flow), adjacent edge 9. Bead 14 would typically be applied as media 1 is configured into a media pack. If the media pack is made from a stack of strips 1, bead 14 will form a seal between a backside 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from a long strip of media 1, it may be referenced as a "winding bead.").

In alternate types of through-flow media, seal material can be located differently, and added sealant or adhesive can even be avoided. For example, in some instances, the media can be folded to form an end or edge seam; or, the media can be sealed closed by alternate techniques such as ultrasound application, etc. Further, even when sealant material is used, it need not be adjacent opposite ends.

Referring to FIG. 1, once the filter media 1 is incorporated into a media pack, for example by stacking or coiling, it can be operated as follows. First, air in the direction of arrows 12, would enter open flutes 11 adjacent end 9. Due to the closure at end 8, by bead 10, the air would pass through the filter media 1, for example as shown by arrows 13. It could then exit the media or media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown. Also, flutes, which are modified in shape to include various ridges, are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated (fluted) sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Figure 2:
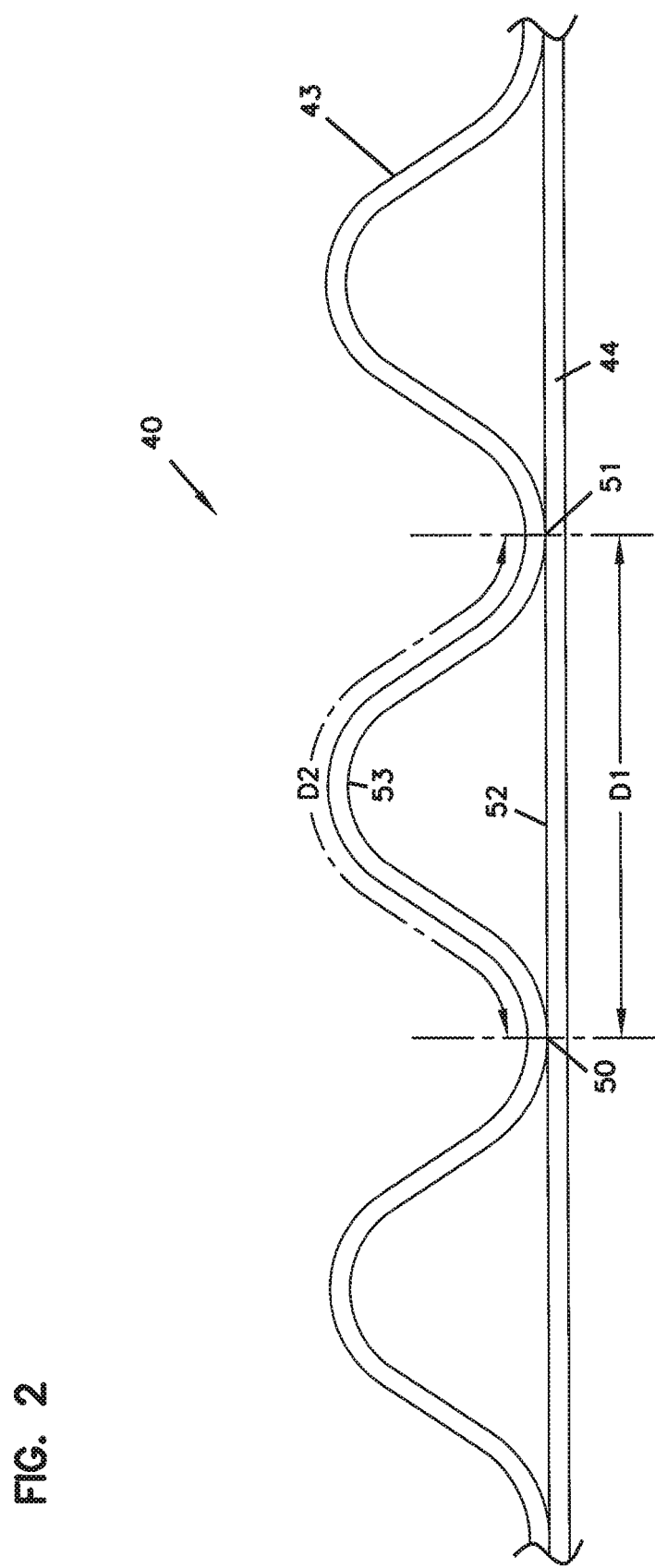
FIG. 2 is an enlarged, schematic, cross-sectional view of a portion of the media type depicted in FIG. 1.

Attention is now directed to FIG. 2, in which z-filter media; i.e., a z-filter media construction 40, utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
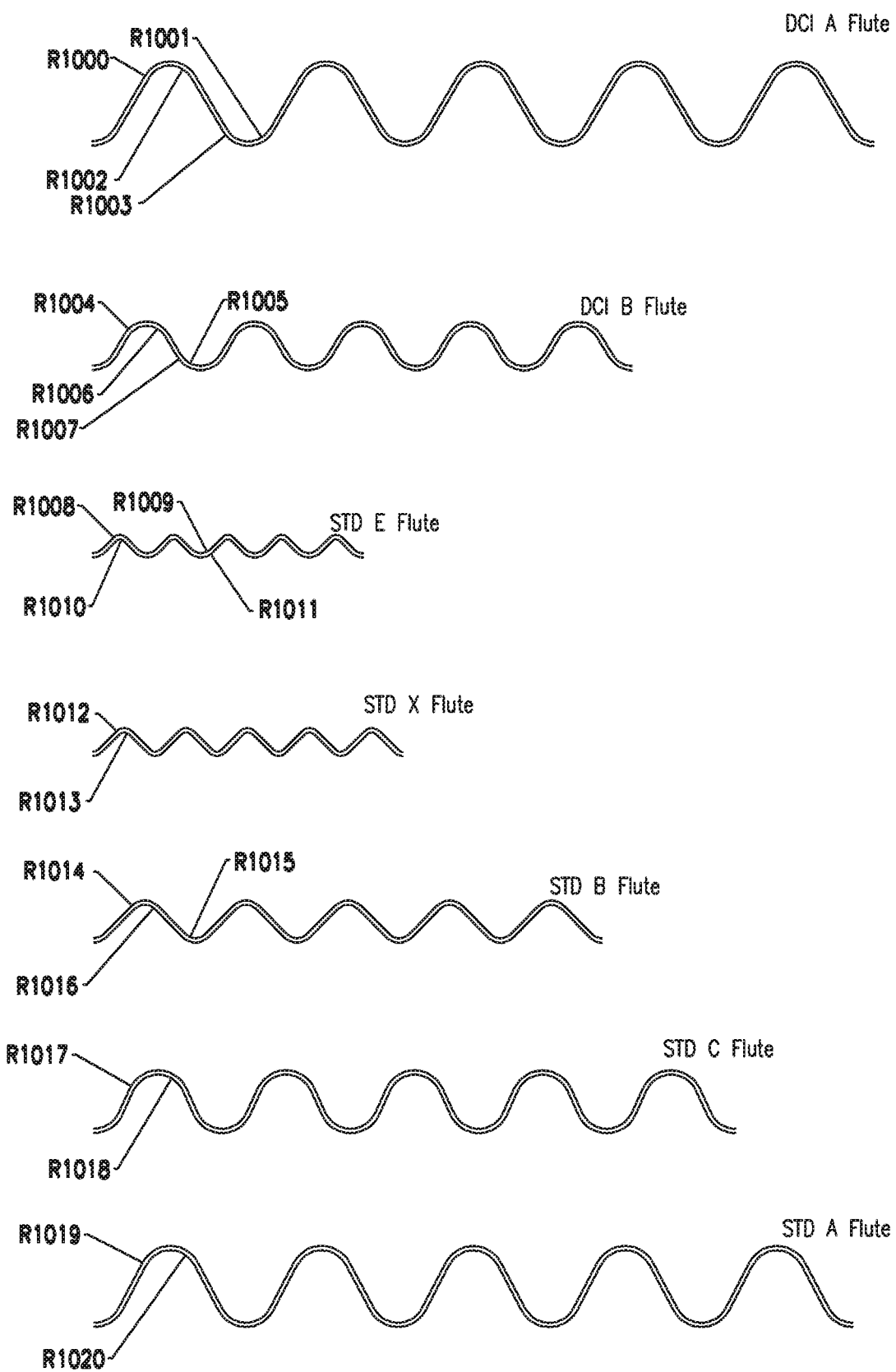
FIG. 3 includes schematic views of examples of various fluted media definitions, for media of the type of FIGS. 1 and 2.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

DCI A Flute: Flute/flat = 1.52:1; The Radii (R) are as follows:
　R1000 = .0675 inch (1.715 mm); R1001 = .0581 inch (1.476 mm);
　R1002 = .0575 inch (1.461 mm); R1003 = .0681 inch (1.730 mm);
DCI B Flute: Flute/flat = 1.32:1; The Radii (R) are as follows:
　R1004 = .0600 inch (1.524 mm); R1005 = .0520 inch (1.321 mm);
　R1006 = .0500 inch (1.270 mm); R1007 = .0620 inch (1.575 mm);
Std. E Flute: Flute/flat = 1.24:1; The Radii (R) are as follows:
　R1008 = .0200 inch (.508 mm); R1009 = .0300 inch (.762 mm);
　R1010 = .0100 inch (.254 mm); R1011 = .0400 inch (1.016 mm);
Std. X Flute: Flute/flat = 1.29:1; The Radii (R) are as follows:
　R1012 = .0250 inch (.635 mm); R1013 = .0150 inch (.381 mm);
Std. B Flute: Flute/flat = 1.29:1; The Radii (R) are as follows:
　R1014 = .0410 inch (1.041 mm); R1015 = .0310 inch (.7874 mm);
　R1016 = .0310 inch (.7874 mm);
Std. C Flute: Flute/flat = 1.46:1; The Radii (R) are as follows:
　R1017 = .0720 inch (1.829 mm); R1018 = .0620 inch (1.575 mm);
Std. A Flute: Flute/flat = 1.53:1; The Radii (R) are as follows:
　R1019 = .0720 inch (1.829 mm); R1020 = .0620 inch (1.575 mm).

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890; and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Another media variation comprising fluted media with facing media secured thereto, can be used in arrangements according to the present disclosure, in either a stacked or coiled form, is described in US 2014/0208705 A1, owned by Baldwin Filters, Inc., published Jul. 31, 2014, and incorporated herein by reference.

B. Manufacture of Media Pack Configurations Including the Media of FIGS. 1-3, See FIGS. 4-7

Figure 4:
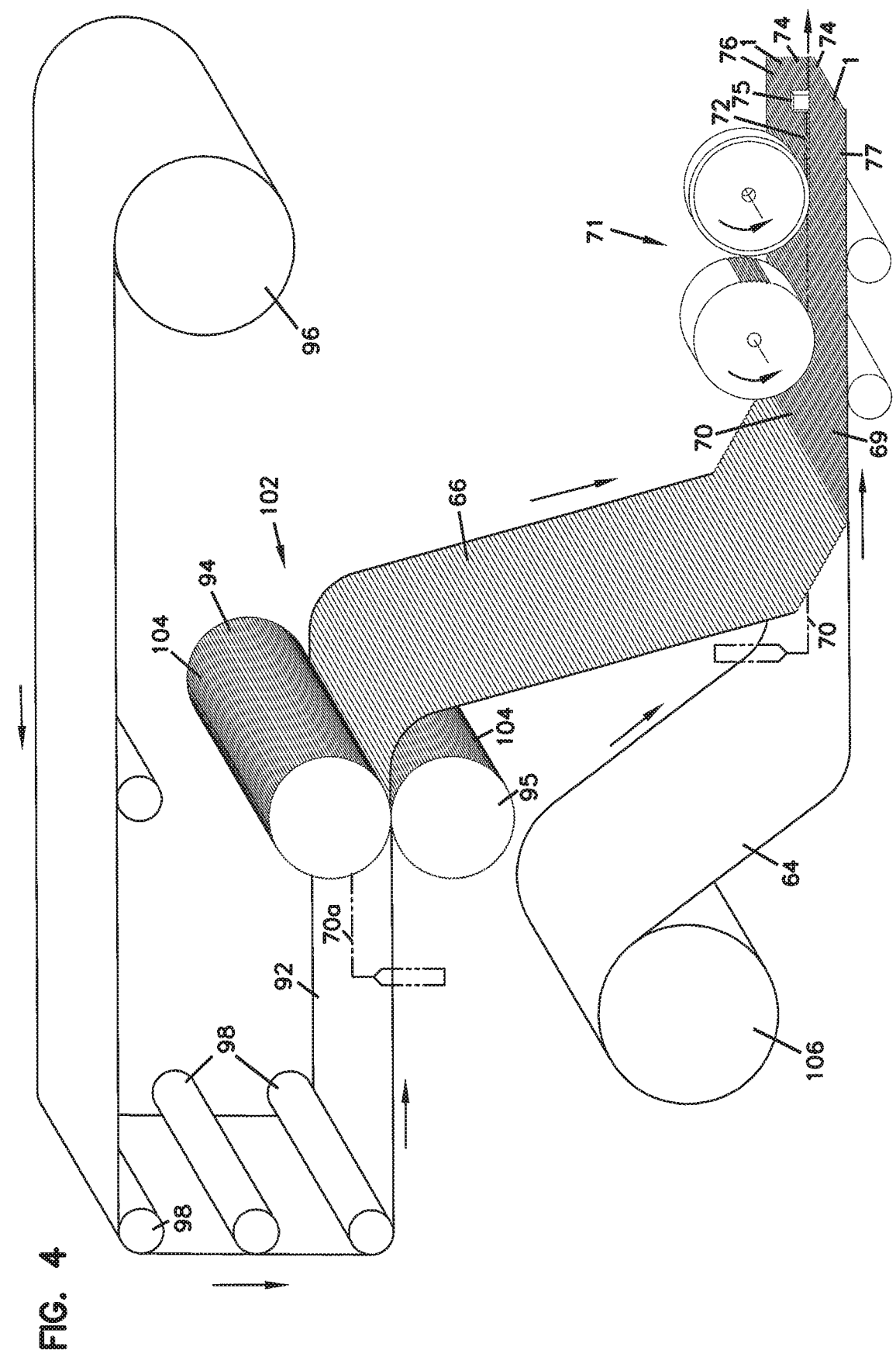
FIG. 4 is a schematic view of an example process for manufacturing media of the type of FIGS. 1-3.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces or strips 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of filter media 92 through a pair of corrugation rollers 94, 95. In the schematic shown in FIG. 4, the sheet of filter media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70*a*. If the sealant is applied at 70*a*, it may be desirable to put a gap in the corrugation roller 95, and possibly in both corrugation rollers 94, 95, to accommodate the bead 70*a*.

Of course the equipment of FIG. 4 can be modified to provide for the tack beads 20, FIG. 1, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25–1.35×D1, although alternatives are possible. In some instances the techniques may be applied with curved wave patterns that are not "regular," including, for example, ones that do not use straight flutes. Also, variations from the curved wave patterns shown, are possible.

Figure 5:
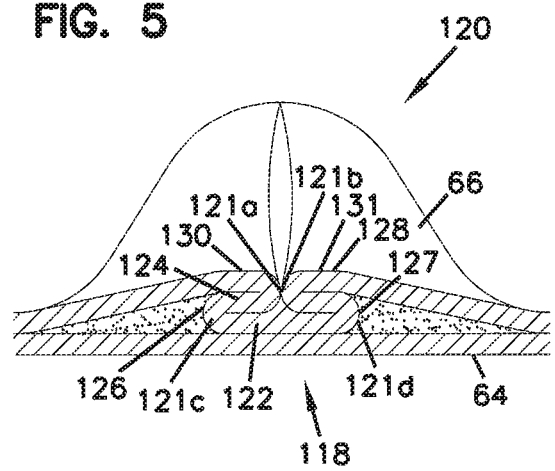
FIG. 5 is a schematic cross-sectional view of an optional end dart for media flutes of the type of FIGS. 1-4.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121*a*, 121*b*, 121*c*, 121*d*. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121*a*, 121*b* will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121*a*, 121*b*, is directed toward the other.

In FIG. 5, creases 121*c*, 121*d*, will generally be referred to herein as "lower, outwardly directed" creases. The term "lower" in this context refers to the fact that the creases 121*c*, 121*d* are not located on the top as are creases 121*a*, 121*b*, in the orientation of FIG. 5. The term "outwardly directed" is meant to indicate that the fold lines of the creases 121*c*, 121*d* are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
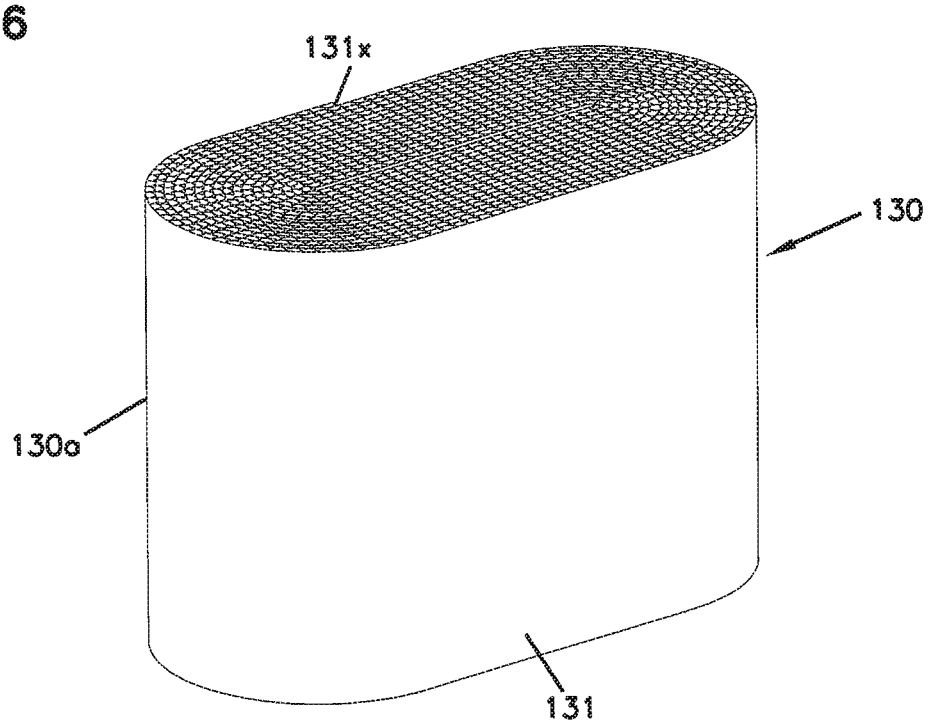
FIG. 6 is a schematic perspective view of a coiled filter arrangement usable in a filter cartridge having features in accord with the present disclosure, and made with a strip of media for example in accord with FIG. 1.

In FIG. 6, a coiled media pack (or coiled media) 130 constructed by coiling a single strip of single faced media is depicted, generally. The particular coiled media pack depicted is an oval media pack 130*a*, specifically a racetrack shaped media pack 131. The tail end of the media, at the outside of the media pack 130 is shown at 131*x*. It will be typical to terminate that tail end along straight section of the media pack 130 for convenience and sealing. Typically, a hot melt seal bead or seal bead is positioned along that tail end to ensure sealing. In the media pack 130, the opposite flow (end) faces are designated at 132, 133. One would be an inlet flow face, the other an outlet flow face.

Figure 7:
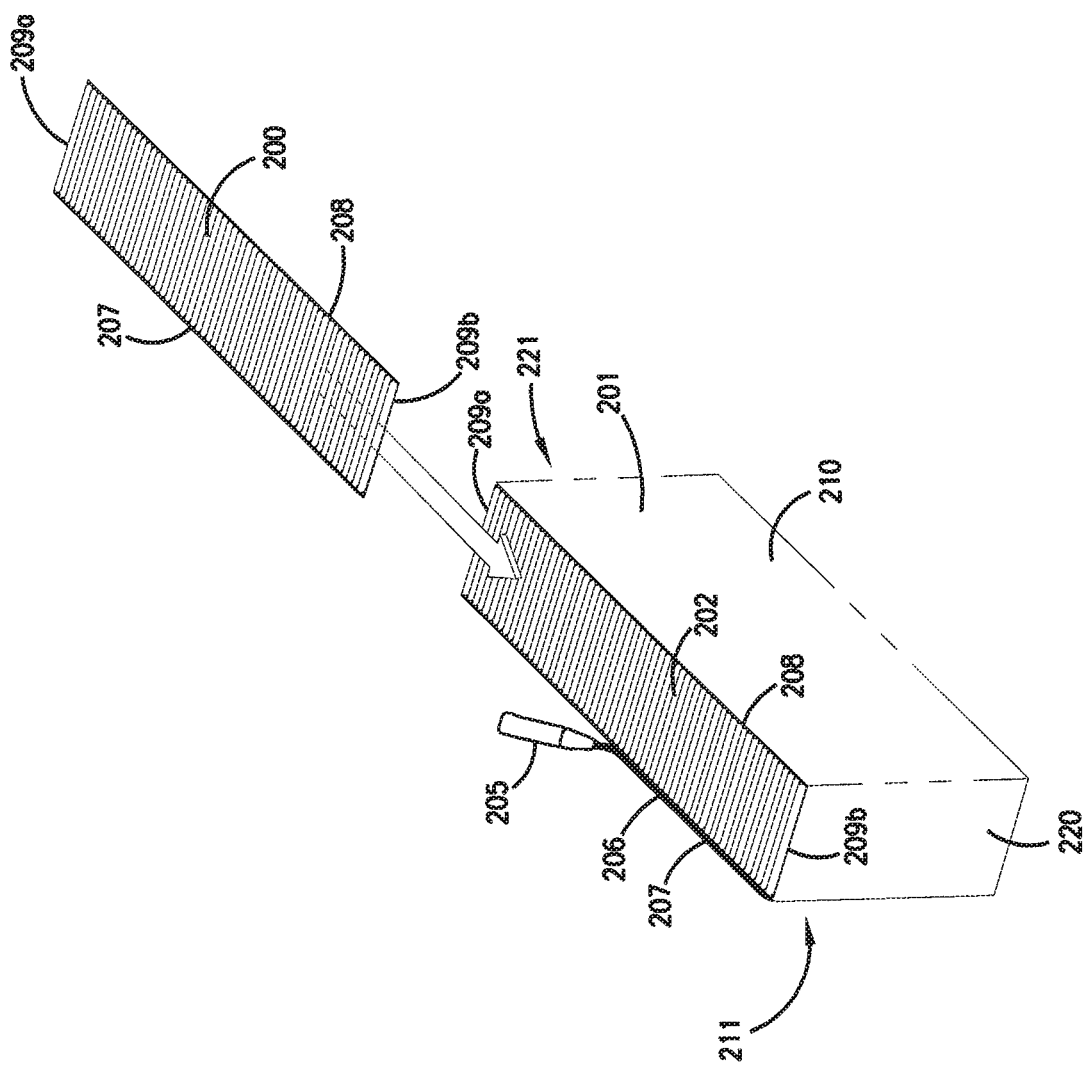
FIG. 7 is a schematic perspective view of a stacked media pack arrangement usable in a filter arrangement having selected features in accord with the present disclosure and made from a strip of media for example in accord with FIG. 1.

In FIG. 7, there is (schematically) shown a step of forming stacked z-filter media (or media pack) from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731,504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 8:
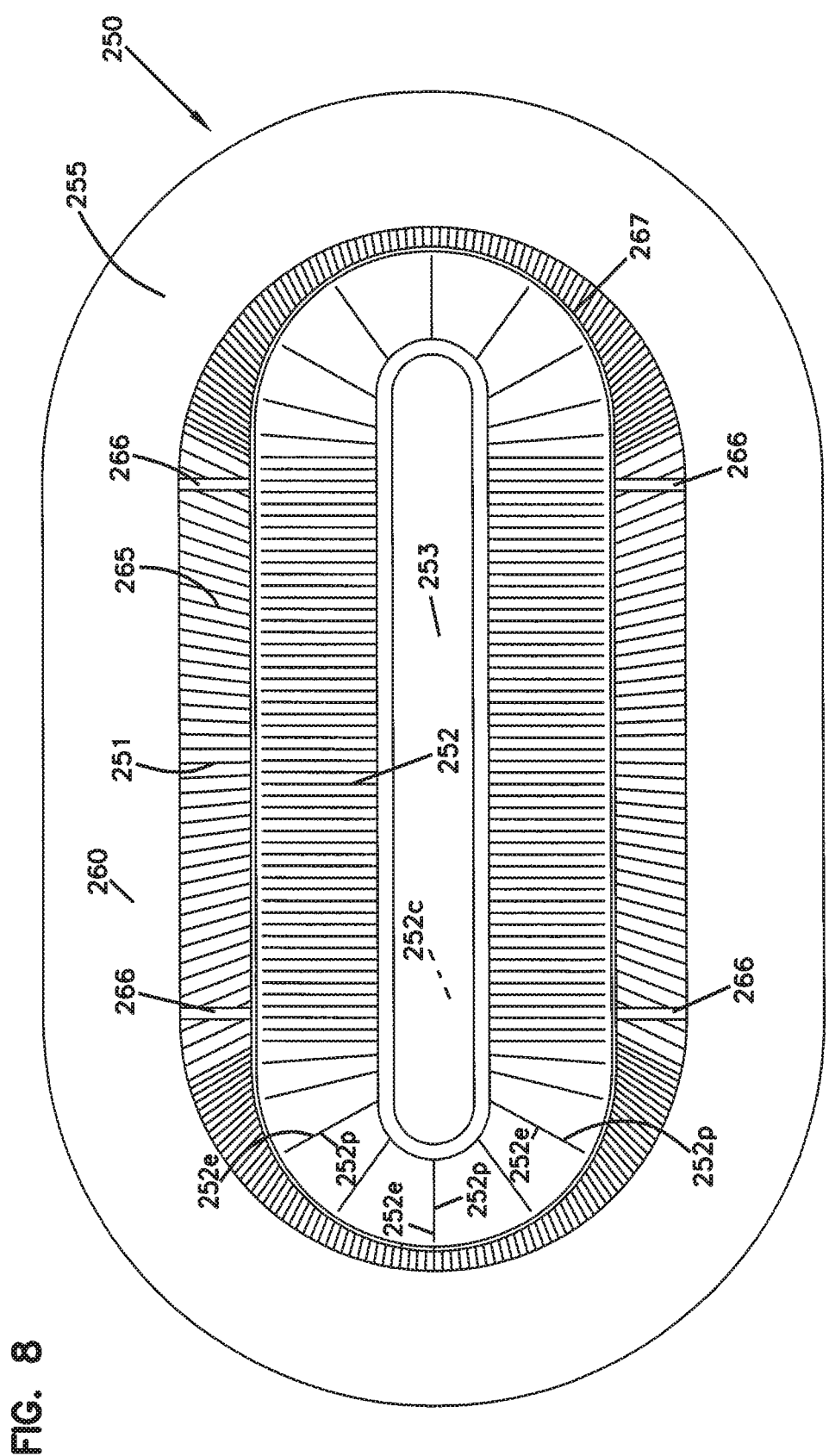
FIG. 8 is a schematic flow end view of a filter media pack using an alternate media to the media of FIG. 1, and alternately usable in selected filter cartridges in accord with the present disclosure.

C. Selected Media or Media Pack Arrangements Comprising Multiple Spaced Coils of Fluted Media; FIGS. 8-8B Alternate types of media arrangements or packs that involve flutes between opposite ends extending between can be used with selected principles according to the present disclosure. An example of such alternate media arrangement or pack is depicted in FIGS. 8-8B. The media of FIGS. 8-8B is analogous to one depicted and described in DE 20 2008 017 059 U1; and as can sometimes found in arrangements available under the mark "IQORON" from Mann & Hummel.

Referring to FIG. 8, the media or media pack is indicated generally at 250. The media or media pack 250 comprises a first outer pleated (ridged) media loop 251 and a second, inner, pleated (ridged) media loop 252, each with pleat tips (or ridges) extending between opposite flow ends. The view of FIG. 8 is toward a media pack (flow) end 255. The end 255 depicted, can be an inlet (flow) end or an outlet (flow) end, depending on selected flow direction. For many arrangements using principles characterized having the media pack 250 would be configured in a filter cartridge such that end 255 is an inlet flow end.

Still referring to FIG. 8, the outer pleated (ridged) media loop 251 is configured in an oval shape, though alternatives are possible. At 260, a pleat end closure, for example molded in place, is depicted closing ends of the pleats or ridges 251 at media pack end 255.

Pleats, or ridges 252 (and the related pleat tips) are positioned surrounded by and spaced from loop 251, and thus pleated media loop 252 is also depicted in a somewhat oval configuration. In this instance, ends 252e of individual pleats or ridges 252p in a loop 252 are sealed closed. Also, loop 252 surrounds the center 252c that is closed by a center strip 253 of material, typically molded-in-place.

During filtering, when end 255 is an inlet flow end, air enters gap 265 between the two loops of media 251, 252. The air then flows either through loop 251 or loop 252, as it moves through the media pack 250, with filtering.

In the example depicted, loop 251 is configured slanting inwardly toward loop 252, in extension away from end 255. Also spacers 266 are shown supporting a centering ring 267 that surrounds an end of the loop 252, for structural integrity.

Figure 8A:
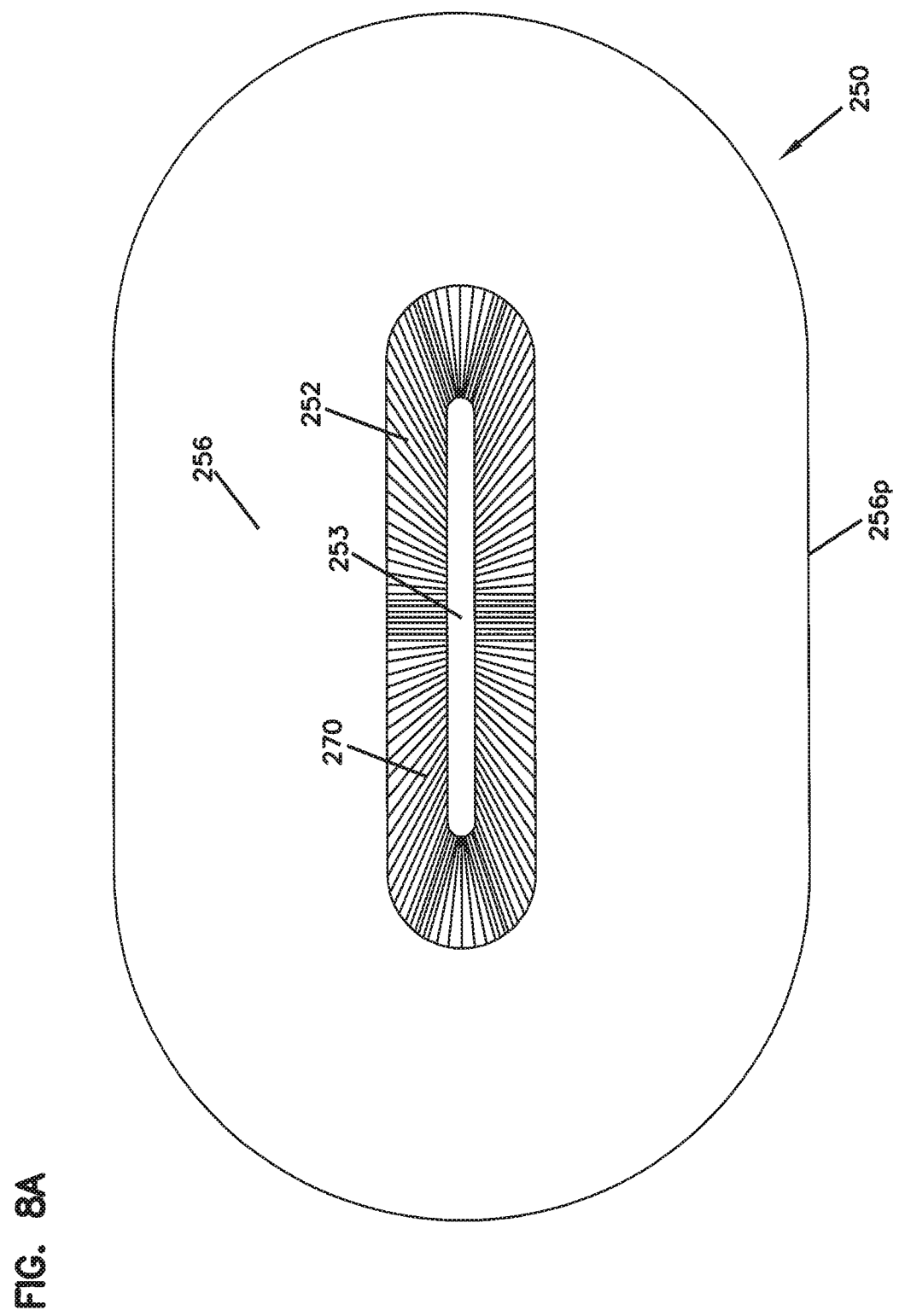
FIG. 8A is a schematic opposite flow end view to the view of FIG. 8.
Figure 8B:
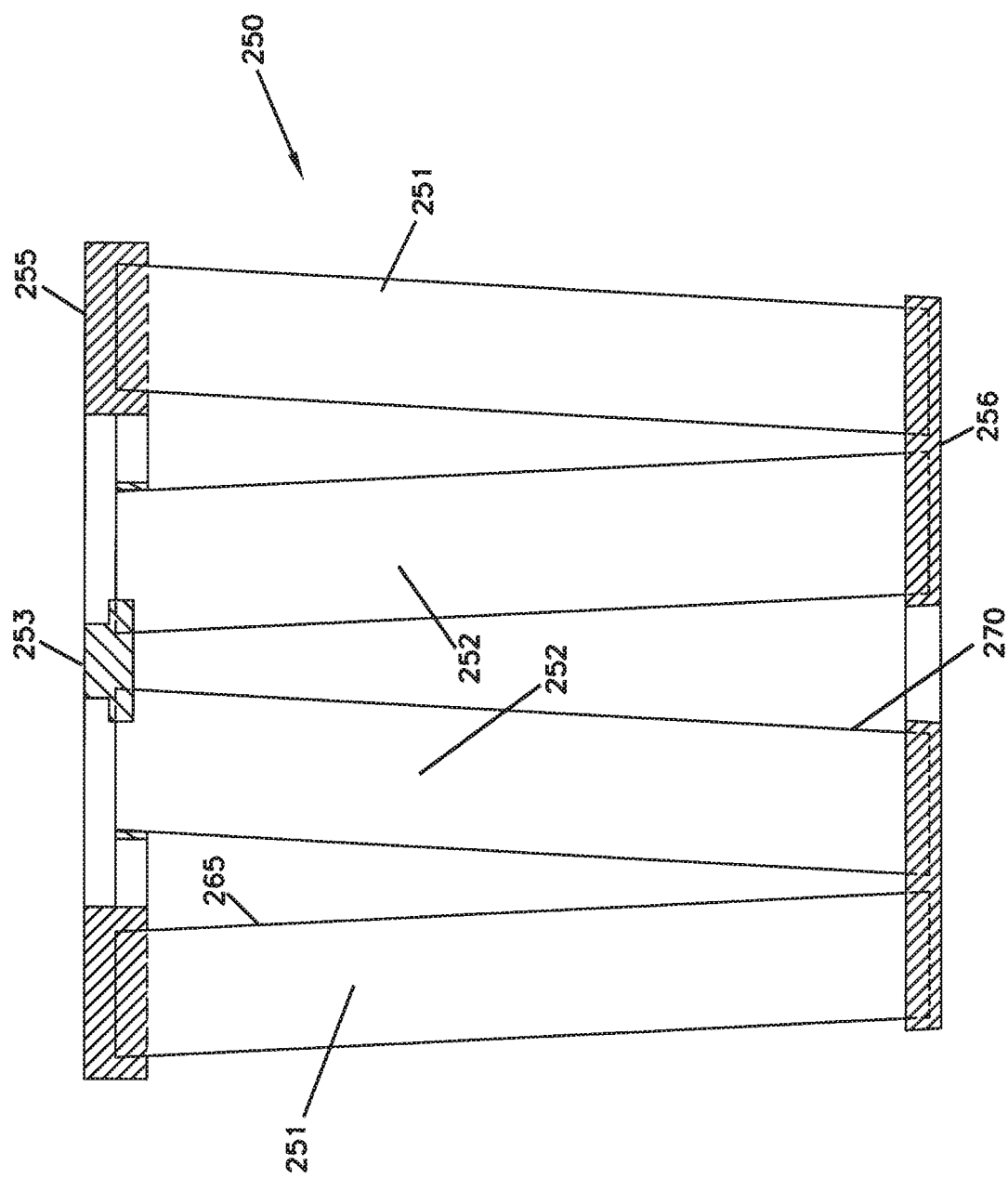
FIG. 8B is a schematic cross-sectional view of the media pack of FIGS. 8 and 8A.

In FIG. 8A, an end 256 of the cartridge 250, opposite end 255 is viewable. Here, an interior of loop 252 can be seen, surrounding an open gas flow region 270. When air is directed through cartridge 250 in a general direction toward end 256 and away from end 255, the portion of the air that passes through loop 252 will enter central region 270 and exit therefrom at end 256. Of course air that has entered media loop 251, FIG. 8, during filtering would generally pass around (over) an outer perimeter 256p of end 256.

In FIG. 8B a schematic cross sectional view of cartridge 250 is provided. Selected identified and described features are indicated by like reference numerals It will be understood from a review of FIGS. 8-8B, the above description, that the cartridge 250 described, is generally a cartridge which has media tips extending in a longitudinal direction between opposite flow ends 255, 256.

In the arrangement of FIGS. 8-8B, the media pack 250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

D. Other Media Variations, FIGS. 9-12

Herein, in FIGS. 9-12, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. In general, each of the arrangements of FIGS. 9-12 represents a media type that can be stacked or coiled into an arrangement that has opposite inlet and outlet flow ends (or faces), with straight through flow.

Figure 9:
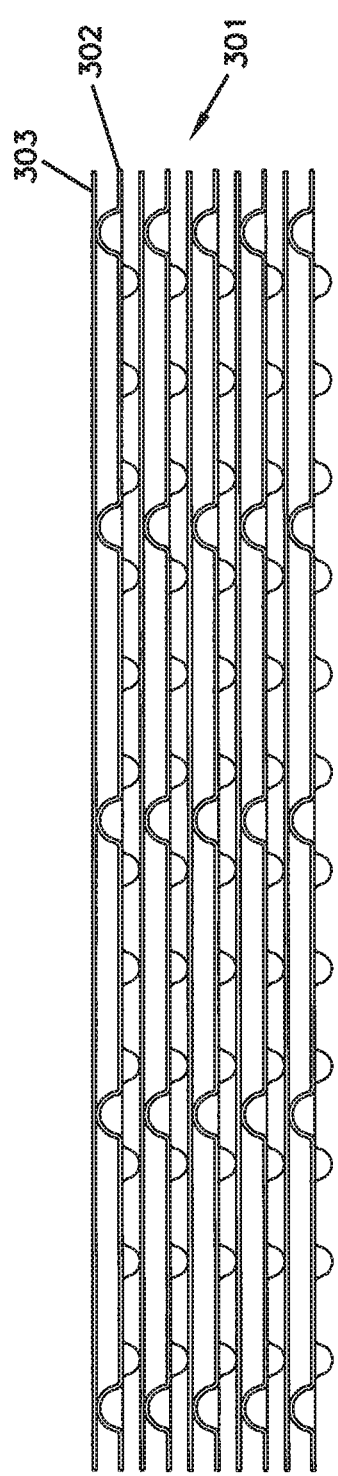
FIG. 9 is a schematic, fragmentary, cross-sectional view of a further alternate media type usable in a media pack of a filter cartridge having features in accord with the present disclosure.

In FIG. 9, an example media arrangement 301 from U.S. Ser. No. 62/077,749 (2658) is depicted, in which an embossed sheet 302 is secured to a non-embossed sheet 303, then stacked and coiled into a media pack, with seals along opposite edges of the type previously described for FIG. 1 herein.

Figure 10:
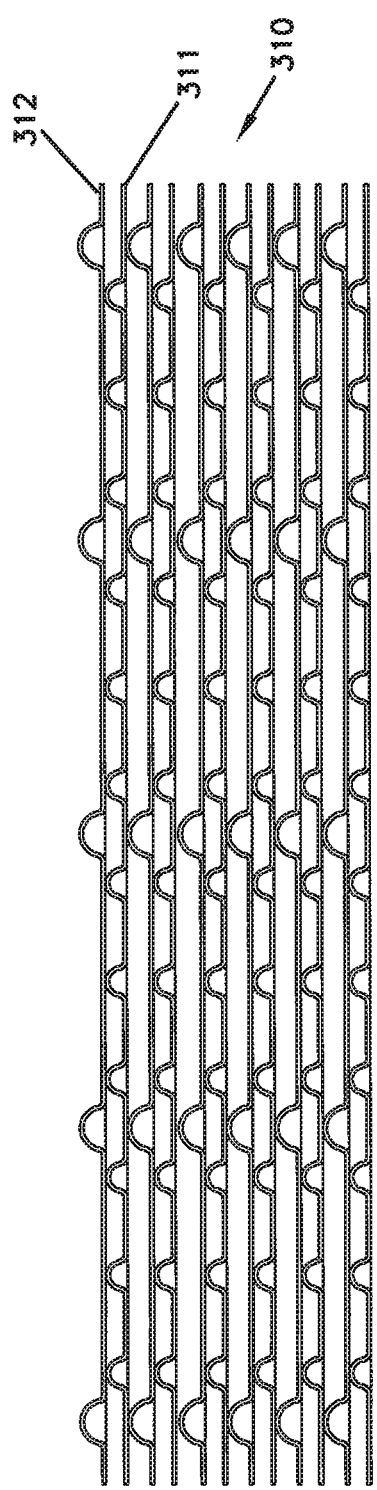
FIG. 10 is a schematic, fragmentary cross-sectional view, of a first variation of the media type of FIG. 9.

In FIG. 10, an alternate example media pack 310 from U.S. Ser. No. 62/077,749 is depicted, in which a first embossed sheet 311 is secured to a second embossed sheet 312 and then formed into a stacked or coiled media pack arrangement, having edge seals generally in accord with FIG. 1 herein.

In FIG. 11, a third example media arrangement 320 from U.S. Ser. No. 62/077,749 is depicted, in which a sheet 321, which is embossed on both sides, is secured to another layer 322 of a similar media, but inverted, and stacked or coiled into a media pack 320, with edge seals somewhat analogous to FIG. 1.

Edge seals can be conducted in either the upstream end or the downstream end, or in some instances both. Especially when the media is likely to encounter chemical material during filtering, it may be desirable to avoid a typical adhesive or sealant.

Figure 11A:
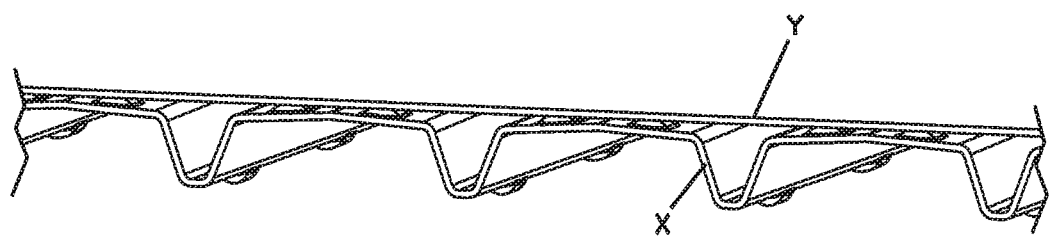
FIG. 11A is a schematic fragmentary depiction of another usable fluted sheet/facing sheet combination in accord with the present disclosure.

In FIG. 11A, a cross-section is depicted in which the fluted sheet X has various embossments on it for engagement with the facing sheet Y. Again these can be separate, or sections of the same media sheet.

Figure 11B:
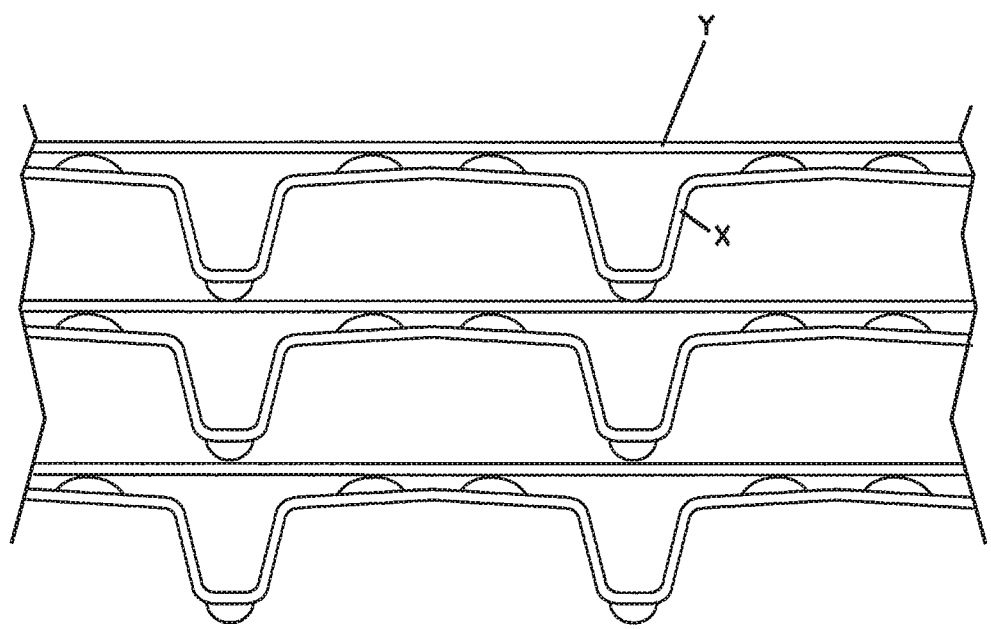
FIG. 11B is a fragmentary second schematic view of the type of media in FIG. 11A shown in a media pack.

In FIG. 11B, a schematic depiction of such an arrangement between the fluted sheet X and facing sheet Y is also shown.

Figure 11C:
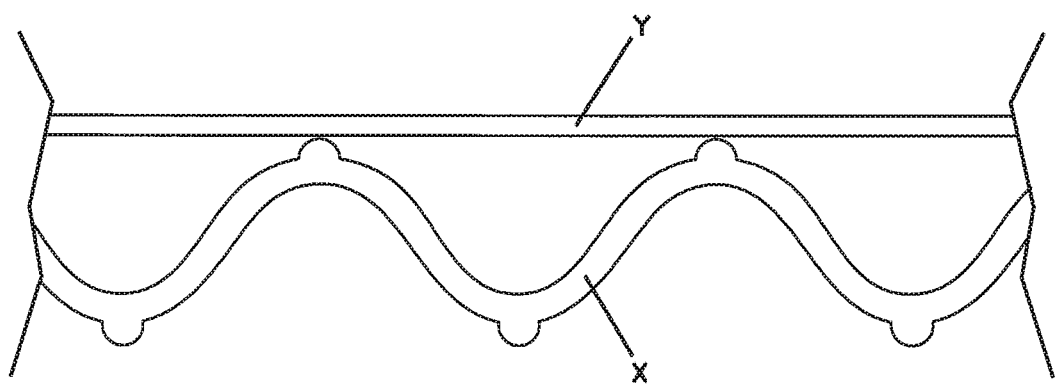
FIG. 11C is a schematic, fragmentary, plan view of still another media variation usable in arrangements according to the present disclosure.

In FIG. 11C, a still further variation of such a principle is shown between a fluted sheet X and a facing sheet Y. These are meant to help understand how a wide variety of approaches are possible.

Figure 12:
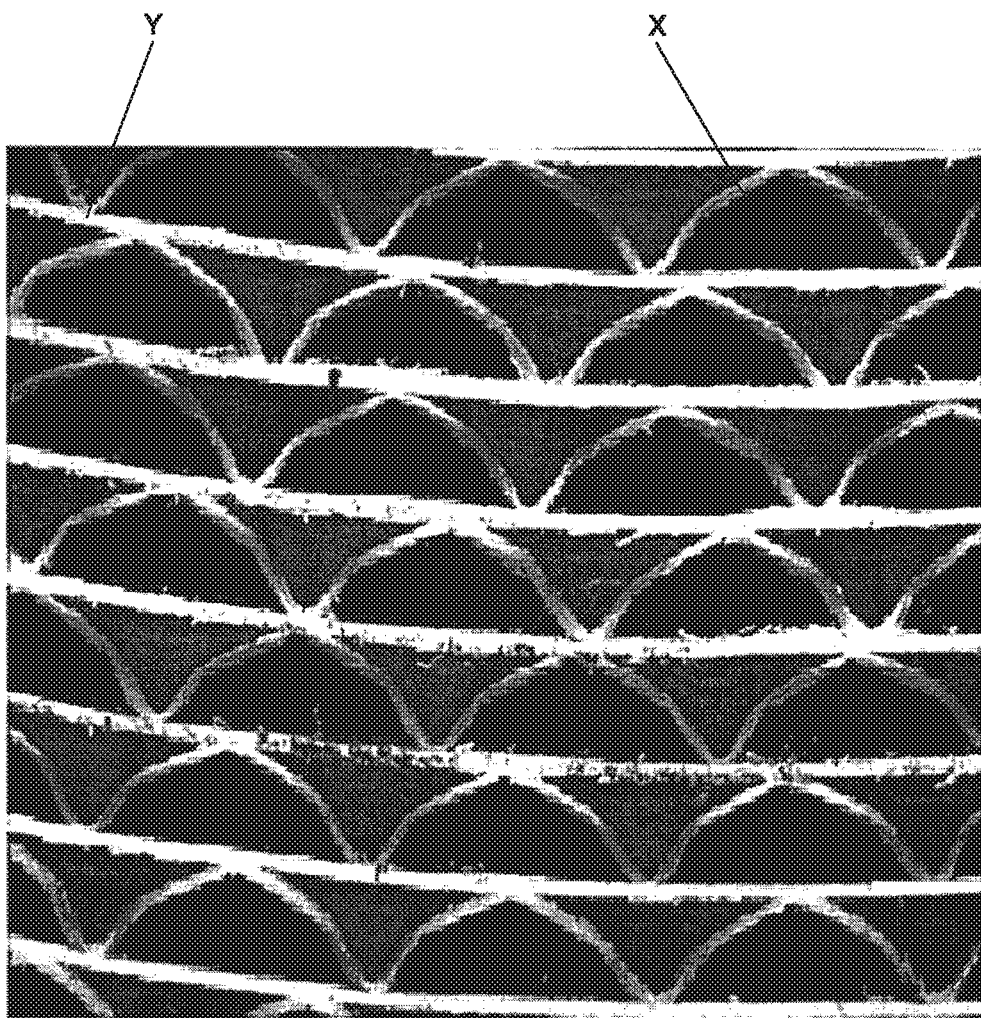
FIG. 12 is a schematic view of another variation of usable media in accord with the present disclosure.

In FIG. 12, still another possible variation in fluted sheet X and facing sheet Y is shown.

In FIGS. 12A and 12B, an example media arrangement 6401 is depicted, in which a fluted sheet 6402 is secured to a facing sheet 6403. The facing sheet 6403 may be a flat sheet. The media arrangement 6401 can then be stacked or coiled into a media pack, with seals along opposite edges of the type previously described for FIG. 1 herein. In the embodiment shown, the flutes 6404 of fluted sheet 6402 have an undulating ridgeline including a series of peaks 6405 and saddles 6406. The peaks 6405 of adjacent flutes 6404 can be either aligned as shown in FIGS. 12A and 12B or offset. Further the peak height and/or density can increase, decrease, or remain constant along the length of the flutes 6404. The ratio of the peak flute height to saddle flute height can vary from about 1.5, typically from 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

A variety of materials can be used. For example, the fluted sheet section or the facing sheet section can include a cellulose material, synthetic material, or a mixture thereof. In some embodiments, one of the fluted sheet section and the facing sheet section includes a cellulose material and the other of the fluted sheet section and facing sheet section includes a synthetic material.

Synthetic material(s) can include polymeric fibers, such as polyolefin, polyamide, polyester, polyvinyl chloride, polyvinyl alcohol (of various degrees of hydrolysis), and polyvinyl acetate fibers. Suitable synthetic fibers include, for example, polyethylene terephthalate, polyethylene, polypropylene, nylon, and rayon fibers. Other suitable synthetic fibers include those made from thermoplastic polymers, cellulosic and other fibers coated with thermoplastic polymers, and multi-component fibers in which at least one of the components includes a thermoplastic polymer. Single and multi-component fibers can be manufactured from polyester, polyethylene, polypropylene, and other conventional thermoplastic fibrous materials.

The examples of FIGS. 9-12B, are meant to indicate generally that a variety alternate media packs can be used in accord with the principles herein. Attention is also directed to U.S. Ser. No. 62/077,749 incorporated herein by reference, with respect to the general principles of construction and application of some alternates media types.

E. Still Further Media Types

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

It is also noted that while the techniques described herein were typically developed for advantageous application and arrangements involving media packs with straight through flow configurations, the techniques can be applied to advantage in other systems. For example, the techniques can be applied when the cartridge comprises media surrounding a central interior, in which the cartridge has an open end. Such arrangements can involve "forward flow" in which air to be filtered enters the central open interior by passage through the media, and the exits through the open end; or, with reverse flow in which air to be filtered enters the open end and then turns and passes through the media. A variety of such arrangements are possible, including pleated media and alternate types of media. Configurations usable would include cylindrical and conical, among others.

II. Some General Issues Relating to Air Cleaner Design and Servicing

A. An Equipment System Using an Air Cleaner Assembly, Generally, FIG. 13

Figure 13:
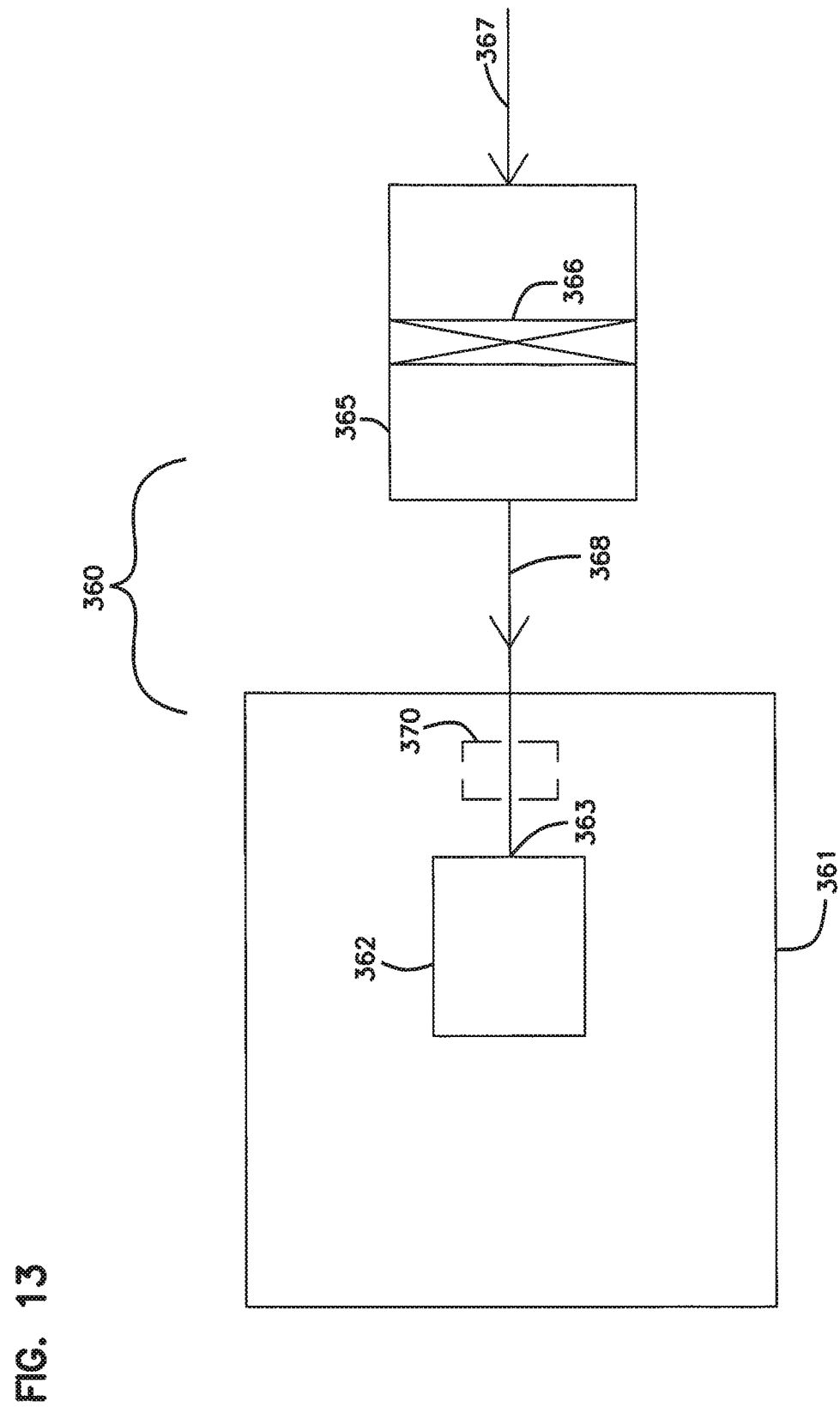
FIG. 13 is a schematic depiction of an equipment assembly including an air cleaner according to the present disclosure.

In FIG. 13, a schematic depiction of an engine equipment arrangement 360 is depicted. The equipment system 360, in the example, comprises a vehicle or other equipment 361 having an internal combustion engine arrangement 362 with a combustion air intake 363. The equipment arrangement 360 includes an air cleaner system 365 having a filter arrangement 366 therein, typically comprising a serviceable (i.e. removable and replaceable) filter cartridge. Intake air to the system is shown at 367 directed into the air cleaner assembly 365 before filtering of unfiltered air through media of the filter cartridge arrangement 366. At 368, filtered air is shown being directed into the equipment air intake 363. At 370, optional equipment such as turbo system is shown.

Of course, alternate equipment systems can be represented by arrangements analogous to those of FIG. 13. The equipment system can be for example, an industrial air filter, an air cleaner arrangement used in association with a turbine, etc. The use in association with an internal combustion engine is typical, but not specifically required for many of the principles characterized herein.

B. Ensuring that a Cartridge Installable in the Air Cleaner is an Appropriate One for the Air Cleaner of Concern In general, air cleaners such as used to filter equipment intake air, comprise housings having positioned therein at least a main filter cartridge, and sometimes, a safety. The main filter cartridge generally is constructed to collect particulate contaminant as it flows into the air intake stream for the equipment. This protects the equipment against damage. Such filter cartridges are generally configured to be removed and replaced, i.e. they are service parts. At various defined service intervals, and/or as increase in restriction (from dust load) becomes an issue, the cartridges are removed from the air cleaner and are refurbished or replaced.

In many instances, the cartridges are specifically designed to match the equipment manufacturers' requirements for operation. It is important to ensure that the cartridge, which is replaced in the field, is a proper one for the equipment involved, and, thus fits and seals properly.

In general, a primary interface between the filter cartridge and the air cleaner is along a housing seal. This interface has sometimes been used to help ensure that a cartridge that fits is also a proper one for the system of interest. Examples are provided by the descriptions of U.S. Pat. No. 8,864,866, the disclosure of which is incorporated herein by reference. In that particular reference, seal surface variations through projections and/or recesses are described, in general terms. Those general principles are applied herein, with improvements and variations for certain applications.

Herein, the principles described are characterized as implemented specifically in arrangements in which a housing seal positioned on the filter cartridge, is a "radial" or "radially directed" seal. By this, reference is meant to a seal that is used to apply compressive seal forces directed either: generally toward a surrounding portion of a housing; or, alternately, with seal forces directed toward a portion of housing surrounded by the seal, for the sealing during use. With filter cartridges of the type characterized herein, a radial seal will generally be a seal that surrounds a flow passageway, with primary compressive direction (when installed) being toward or away from that flow passageway. An outwardly or radially outwardly directed seal will be one which has a seal surface on the seal arrangement (of the cartridge) that sealingly engages a surrounding structure in use. A radially inwardly directed seal, is a seal arrangement in which the seal surface of the cartridge surrounds the structure to which it sealed during use.

C. Observations Concerning Issues with Installation of Cartridges in Systems in which the Housing Radial Seal of Interest is Deeply Recessed in the Housing; and/or, when Side-Load is Involved In many instances, the seal surface to be engaged by a seal on the cartridge is deeply recessed within a housing, and out of view of the service provider. In addition, it can be difficult, if not impossible, to manually reach the seal surface as the cartridge is being installed, due to the size of the housing, and a blocking effect of the cartridge. An issue with using cartridges having seals which are not merely of simple or uniform geometric shape, such as circular or oval is that it, can be difficult, depending on the design, to orient the cartridge appropriately for the sealing to properly occur during installation. Certain of the techniques characterized herein are useful to facilitate this, in application, as will be understood from the further detailed descriptions below.

The problem can sometimes be exacerbated, when the cartridge is configured for side load. By side load, reference is meant to the portion of the housing through which the cartridge is installed in use. In particular, and in some instances, a straight through flow cartridge is loaded through the side of a housing and then pushed sideways into a sealing positioned. It can be difficult to manipulate and leverage the cartridge appropriately to get good sealing. Examples of advantageous side load arrangements with useful features to facilitate loading are described, for example in U.S. Pat. Nos. 7,396,375; 7,655,074; 7,905,936; 7,713,321 and 7,972,404, incorporated herein by reference.

The arrangements of the references identified in the previous paragraph, generally use oval shaped seals, typically racetrack shaped ovals. (shapes with straight sides separated by semi-circular curved ends in the seal surface). When the desire is to introduce a variation in the seal surface, it can sometimes be difficult, depending on how implemented, to get good, convenient, installation in a side load application. Some principles described herein are characterized to be particularly useful in such situations, to facilitate loading.

III. A First Example Assembly, FIGS. 14-22

A. General Features of the Assembly, FIGS. 14-15A

Selected principles according to the present disclosure can be understood from reference to FIGS. 14-22. The example depicted, as will be understood from the following, is an air cleaner assembly with a main filter cartridge removably installed therein. Further, the assembly is configured as "end load", meaning that that the housing access cover is located at an opposite end of the cartridge from an air flow outlet. The principles can be applied in alternate housing configurations.

Figure 14:
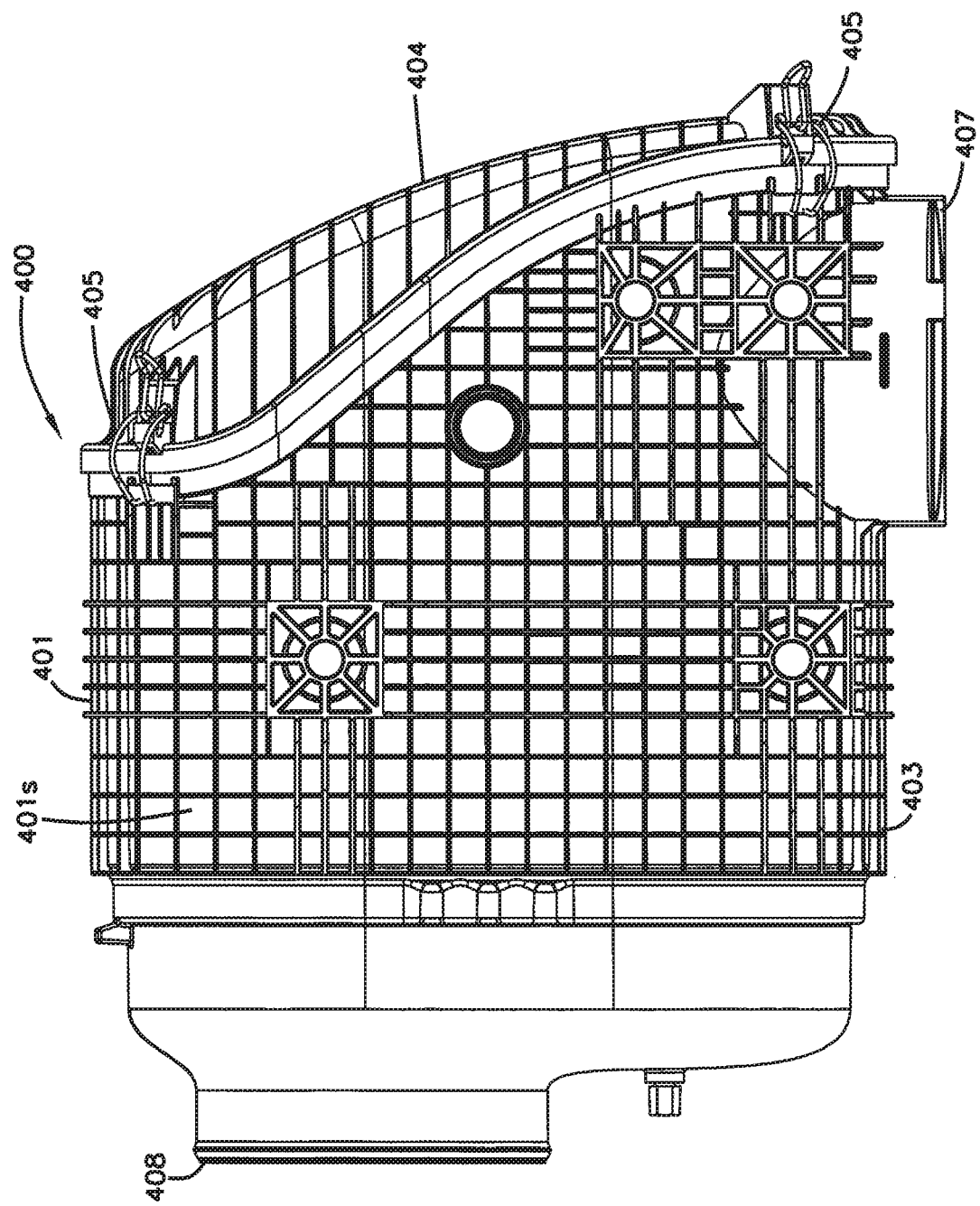
FIG. 14 is a schematic side view of an example air cleaner assembly incorporating principles according to the present disclosure.

Referring now to FIG. 14, reference numeral 400, generally indicates an air cleaner assembly in accord with selected principles according to the present disclosure. The air cleaner assembly 400 comprises a housing 401. The housing 401 generally includes a main body 403 and an access cover 404, in this instance secured in place by latches 405. In the example depicted, the access cover 404 is fully removable from the housing body 403, but the principles can be applied in alternate arrangements.

The housing 401 generally defines an air flow inlet arrangement 407 and an air flow outlet arrangement 408. Air to be filtered enters the housing 401 through inlet 407 passes through an internally positioned filter arrangement, with filtered air exiting through outlet arrangement 408. In the example depicted, inlet flow through inlet arrangement 407 is generally perpendicular to air flow through a cartridge installed in the housing, and air flow through outlet arrangement 408 is generally in alignment with a direction of air flow through an installed filter cartridge, in use, but the principles can be practiced in alternate arrangements.

In FIG. 14, no specific effort is made to indicate an orientation within equipment for use. The assembly 400 can be oriented for use, with one of the sides, for example, the side facing the viewer in FIG. 14, directed upwardly, directly downwardly, or oriented laterally. The principles described herein can be applied in a variety of such arrangements and no specific orientation is required. Indeed, this can be an advantage of arrangements according to the present disclosure.

Figure 14A:
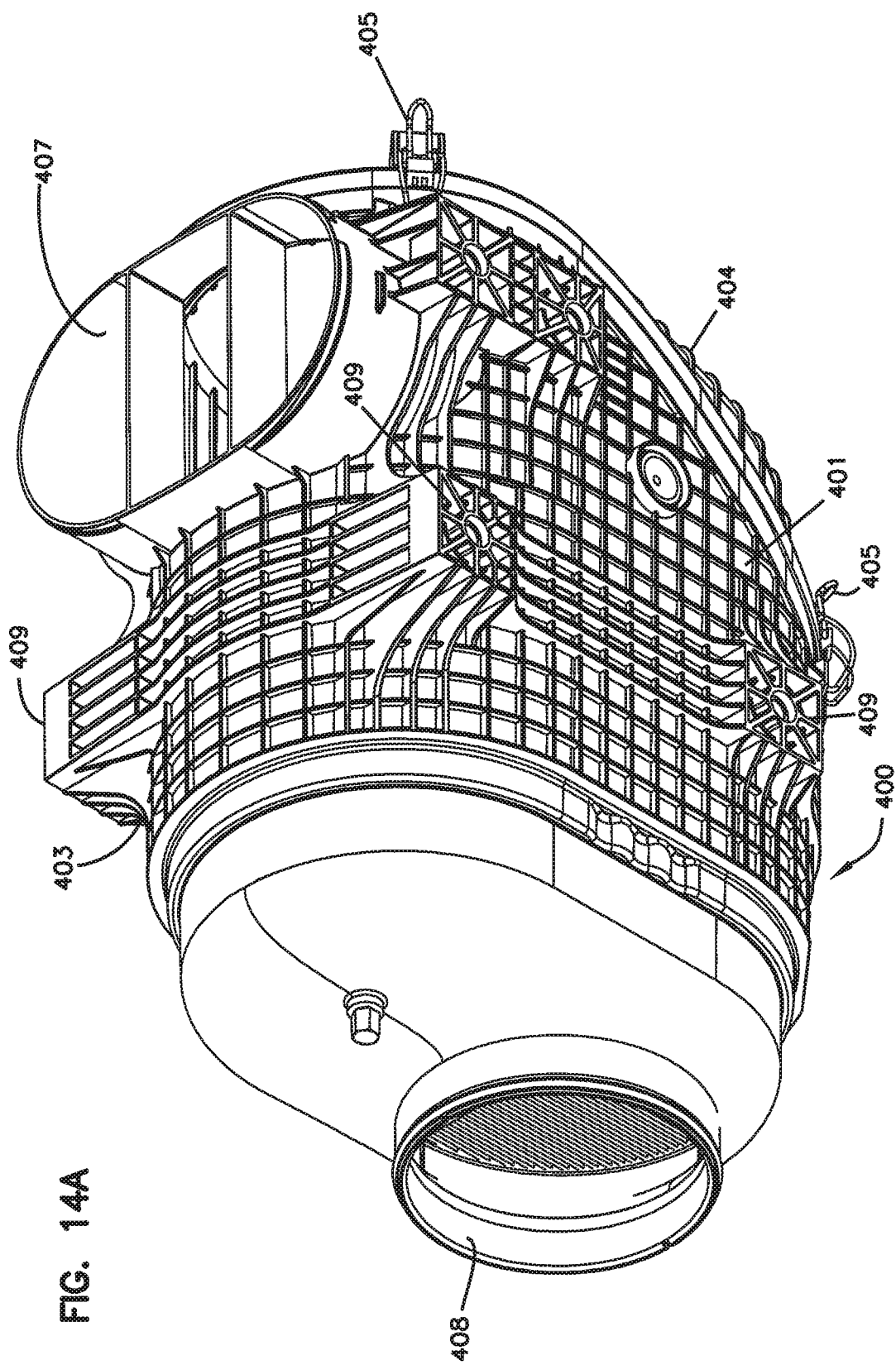
FIG. 14A is an outlet end perspective view of the air cleaner assembly of FIG. 14.

In FIG. 14A, a selected perspective view of the assembly 400 is depicted. Like features to those already identified are indicated by similar reference numerals. The housing 401 depicted optionally includes various mounting pads 409 thereon by which it can be secured to equipment.

Figure 15:
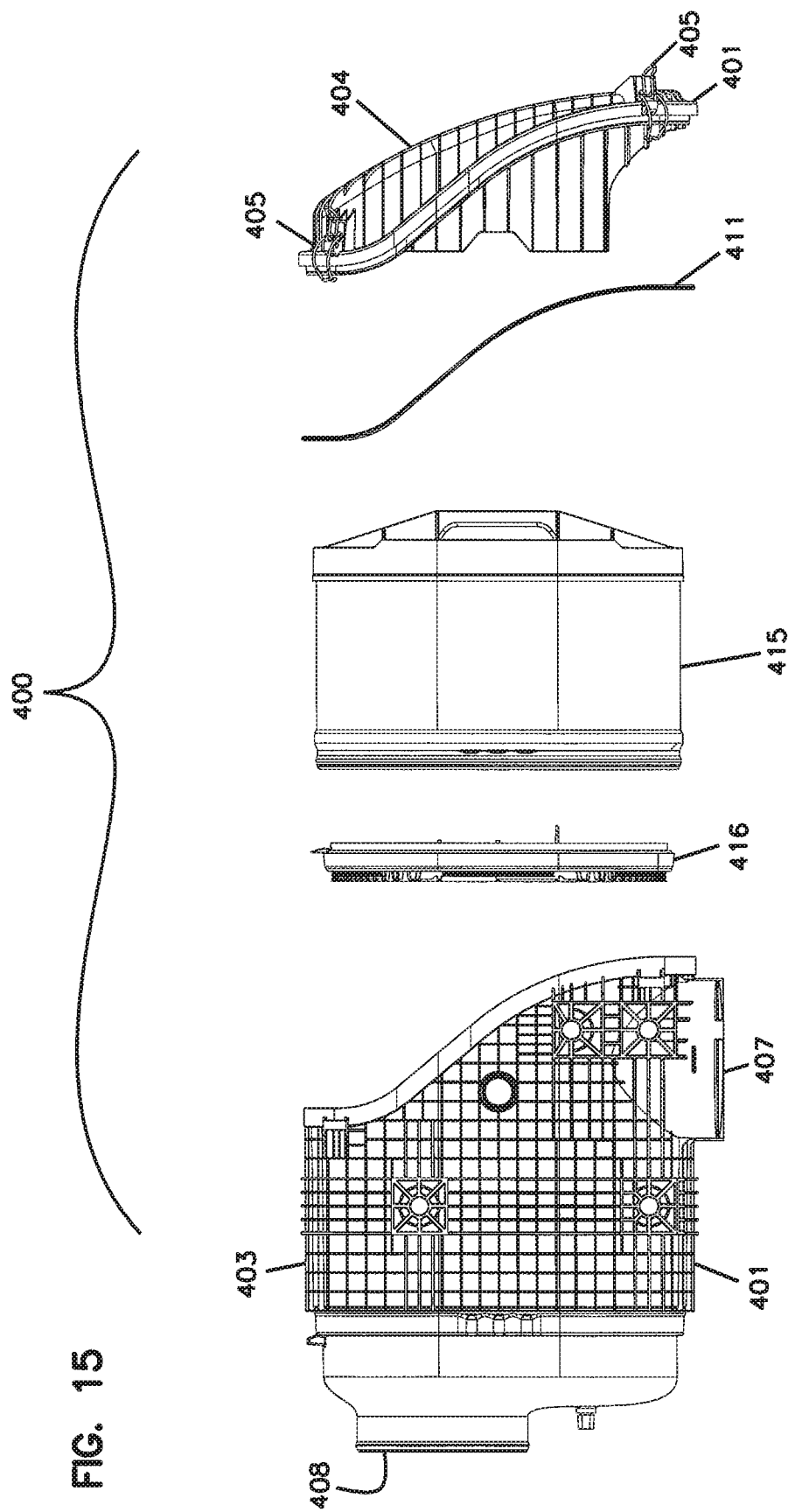
FIG. 15 is a schematic exploded view of the air cleaner assembly of FIG. 14.

In FIG. 15, an exploded elevational view of the air cleaner assembly 400 is depicted. Here, access cover 404 is shown removed from body 403, for access to interior features. Optional weather gasket 411 is depicted. It can be secured to one or the other of the access cover 404 in body 403 if desired, or it can be a separate item. The weather gasket 411 is a gasket that will help provide a weather seal between the access cover 404 and body 403 when installed, for example to inhibit migration of water (for example, from rain) from entering the interior of the housing 401.

In the example of FIG. 15, both the inlet arrangement 407 and outlet arrangement 405 are shown depicted on the main body 403; alternatives are possible. Also, as indicated previously, the inlet and outlet arrangements 407/408 can be alternately located or directed.

Still referring to FIG. 15, the air cleaner assembly 400 includes an interiorly received, removable and replaceable (i.e. serviceable) main filter cartridge 415. The assembly 400 is also depicted having an optional safety filter cartridge 416. In the example assembly, the safety filter cartridge 416 is positioned downstream of the main filter cartridge 415 in use.

The main filter cartridge 415 is the cartridge responsible for collection of the majority of particulate material separated from the air flow stream, during use. The safety filter cartridge 416 provides a variety of functions. It can be left in place when the main filter cartridge 415 is removed and serviced, thus protecting the outlet for clean air from dust being knocked off inside the housing and grating thereto. The filter cartridge safety 416 can also collect some dust should there be a failure in the media or seal of the main filter cartridge 415. These are well known uses of safety filter cartridges. The particular safety filter cartridge 416 depicted, is generally of a type known, see for example, U.S. Pat. No. 7,905,936 incorporated herein by reference.

In FIG. 15A, an exploded perspective view of the assembly 400 is depicted, allowing further review of general components previously discussed. Attention is directed to the safety filter cartridge 416, and, in particular, to installation projection 417 and handle or handle arrangement 418. Such features are described, for example in U.S. Pat. No. 7,905,936, referenced above, and incorporate herein by reference. During installation of the safety filer cartridge 416, typically the service provider would push the safety filter cartridge 416 into the housing body 403, engaging the projection 417 with a receiver appropriately positioned in body 403. In this manner, the user can leverage the safety filter cartridge 416 into position, using the handle 418. The particular safety filer cartridge 416 depicted uses a peripheral seal 419 that will engage (as a radial seal) a surrounding portion of the housing, when the safety 416 is properly installed. Thus, the safety 416 uses an outwardly directed radial seal in the terms characterized herein above.

From a review of FIGS. 15 and 15A, it can be understood that the assembly 400 depicted is one in which the main filter cartridge 415 is installed through an end load, in accord with the characterizations of such terms above. In the example, the main cartridge 415 is pushed into the housing body 403 during installation, and toward an outlet end or outlet arrangement 408. Referring to FIGS. 15 and 15A, it can be seen that the main filter cartridge 415 includes a seal arrangement 420 on an end of the cartridge 415 that is recessed most deeply in the housing body 403 during installation. In the example depicted, this is a downstream air flow outlet end at the cartridge 415.

B. General Features of the Main Filter Cartridge 415, FIGS. 16-19

Selected features of the main filter cartridge 415 can be understood from reviewing FIGS. 16-19.

Figure 16:
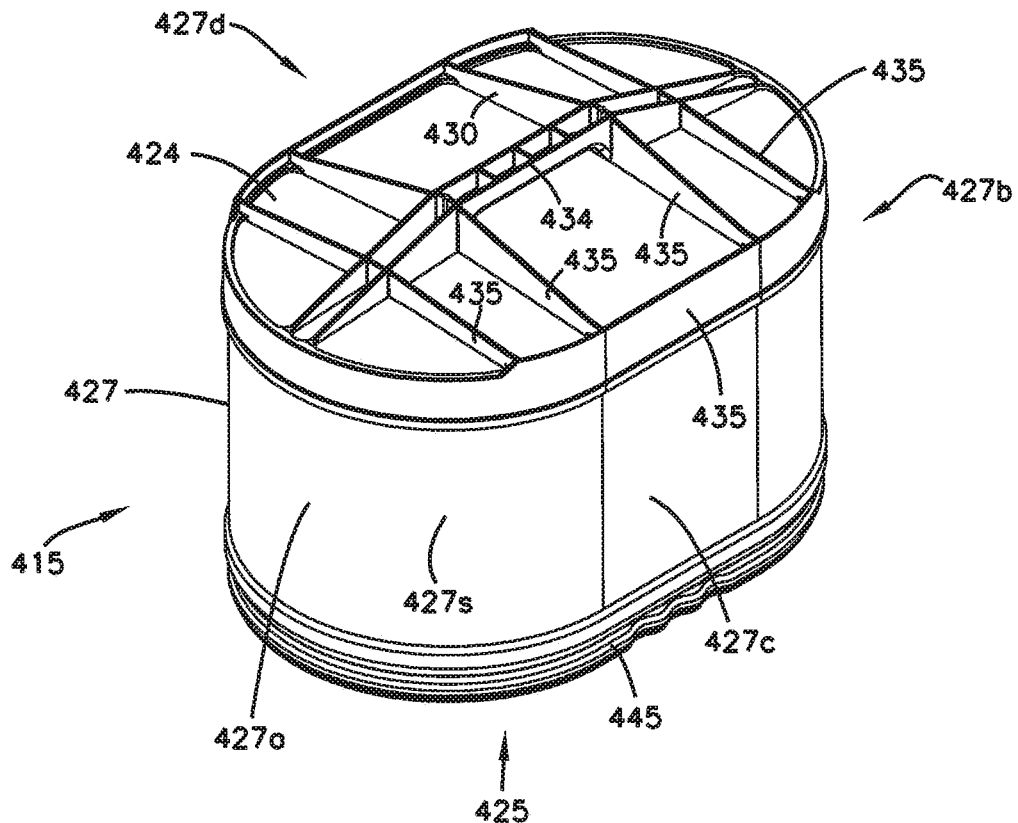
FIG. 16 is a schematic inlet end perspective view of a main filter cartridge of the assembly of FIGS. 14-15.

Referring first to FIG. 16, the main filter cartridge 415 generally comprises a media pack configured for straight through flow having opposite flow ends 424, 425. Herein, the term "flow end" when used in characterizing the media pack 427, or filter cartridge 415, reference is meant to an end face or region into which (or from which) air flows during use. Typically, the flow ends are planar, but alternatives are possible. Generally, one of the ends will be an inlet flow end, and an opposite end will be an outlet flow end. For the particular filter cartridge 415 depicted, flow end 424 is an inlet flow end and flow end 425 is an outlet flow end. The media pack 427 generally comprises air filtration media that is closed to passage of inlet air entering the cartridge at inlet end 424 from exiting outlet flow 425 without filtering passage through the media.

The filter cartridge 415 generally comprises media pack 427. The media pack comprises media appropriate for the filtration operation to be conducted, generally with an air flow through the opposite ends. The media characterized above in connection with FIGS. 1-12B can be used. The particular example media pack 429 depicted has a generally oval shape, with opposite curved ends 427a, 427b, typically approximately semi-circular, and with relatively straight (opposite) first and second side sections 427c, 427d extending therebetween. Such a media pack can be made from a coiled strip of corrugated media secured to facing media in accord with descriptions above, but alternatives are possible.

The particular media pack 427 depicted would typically be constructed without a center core, for example in accord with the techniques of U.S. Pat. No. 8,226,786, but alternatives, including ones in which a center core is provided, are possible. The media pack 427 may include an outer sheath, shield or protective coating surrounding it. However, in many applications, the outer surface 427s of the media pack 427 along much of the exposed length of the media pack will comprise facing media with no outer protective coating other than, perhaps, a label.

In many instances, including the example of FIGS. 16-19, main filter cartridges according to the present disclosure, will include one or more optional "preforms" thereon. By the term "preform" and variants thereof in this context, reference is meant to a structural piece that is typically premade, for example molded from plastic, and is then secured to the media pack the filter cartridge using adhesive or sealant material or other material that is cured or set. Preforms, generally, are well known, see for example U.S. Pat. Nos. 7,905,936; 7,713,321 and 7,972,404.

The particular cartridge 415 of FIGS. 16-19, includes two such optional preforms, indicated generally at 430, 431. The preform 430 is positioned adjacent end 424. It includes an installation handle arrangement 434, in the example depicted, in axial overlap with flow end 424; and, a perimeter arrangement 435 that surrounds media pack 427. The preform 430 can be positioned in place and be secured by an adhesive if desired, or with seal material. However, since preform 430 is positioned upstream of housing seal arrangement 420, a seal between preform 430 and the media pack 427 is not critical. Referring to FIG. 16, preform 430 also includes an optional end grid arrangement 435 in axial alignment with end 424 of the media. The end grid 435 can provide strength, structure and integrity to both the preform 430 and to the media of media pack 427.

Figure 17:
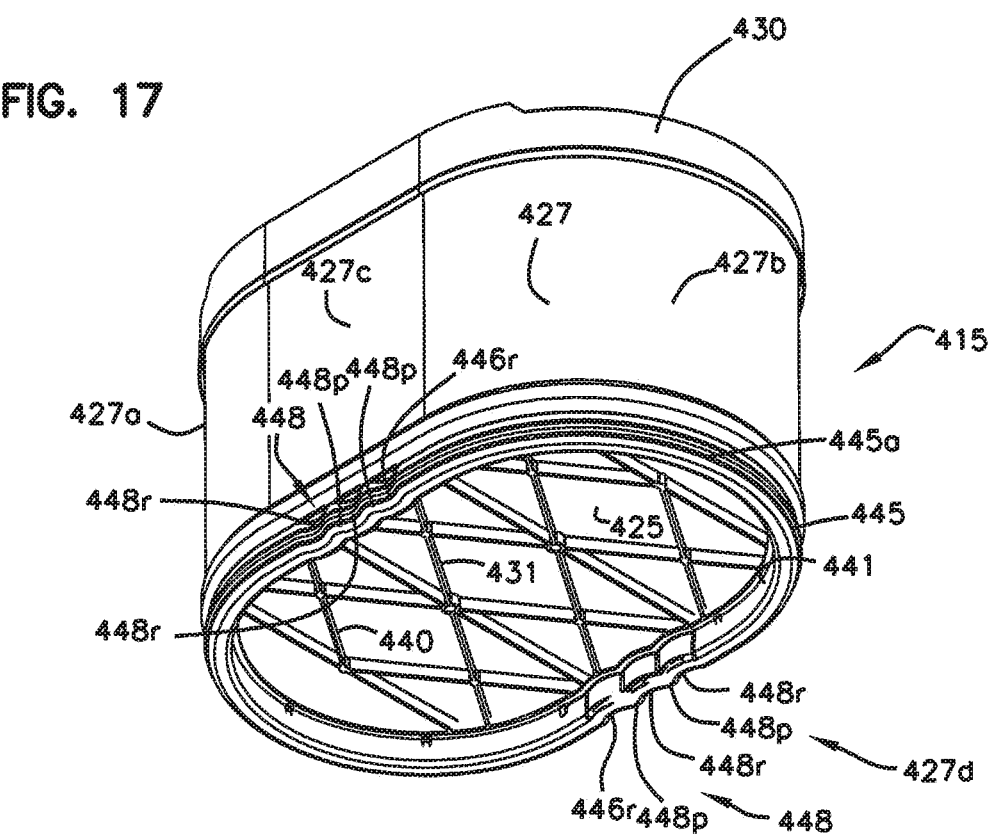
FIG. 17 is a schematic outlet end perspective view of the filter cartridge of FIG. 16.

Referring to FIG. 17, preform 431 is positioned adjacent flow end 425. Preform 431 is a seal support preform and includes an optional grid 440 thereon to stabilize the media end 425 against distortion. As a seal support preform 431, preform 431 includes a seal support 441 thereon, discussed below, and positioned to support sealing pressure against seal material 445 of the seal arrangement 420 in use.

A variety of seal arrangements 420 can be used. The particular arrangement depicted uses a seal arrangement in which seal material is molded-in-place to secure preform 431 in position and to also form a seal surface 445a of seal material 445. Techniques such as those described in U.S. Pat. Nos. 7,396,376 and 8,409,316 can be used, but alternatives are possible.

Figure 18:
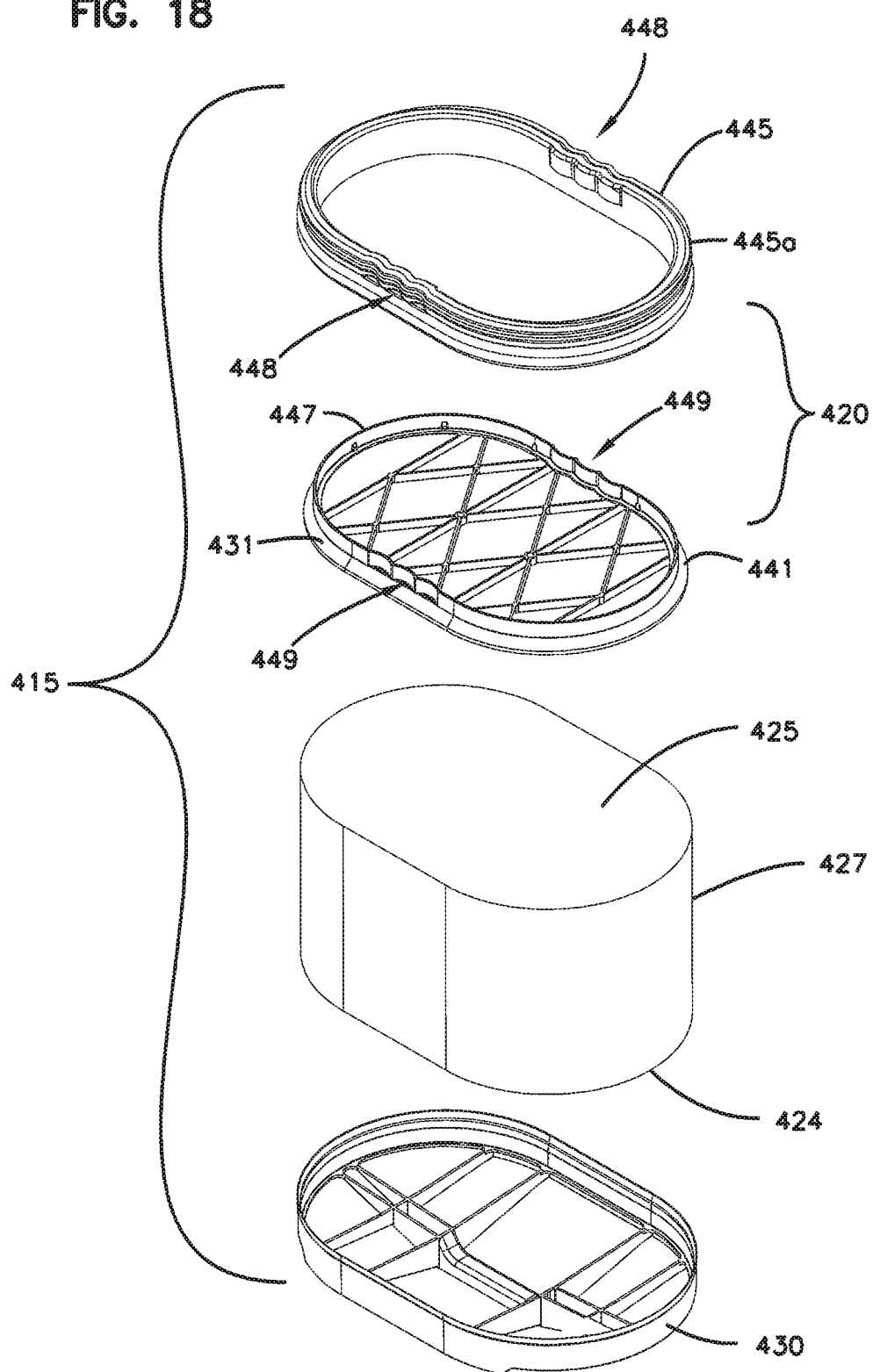
FIG. 18 is a schematic exploded outlet end perspective view of the filter cartridge of FIGS. 16 and 17.

Attention is directed to FIG. 18, an exploded perspective view of the filter cartridge 415. The various features previously identified can be readily viewed. Referring to the preform 431, attention is directed to seal support flange 447, which, it will be understood, projects to appropriate portions of the seal arrangement 420 to support the seal material 445 during sealing.

Figure 19:
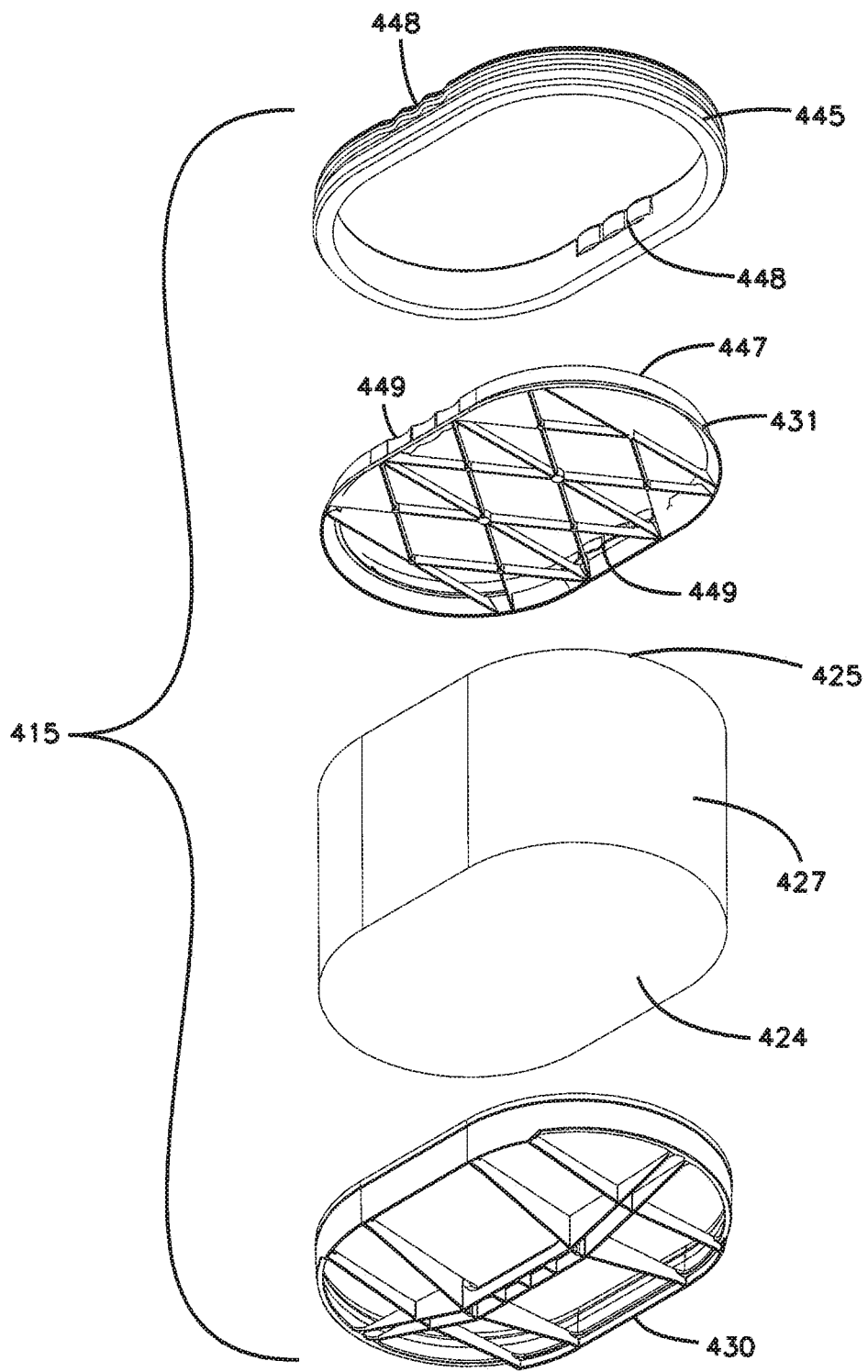
FIG. 19 is a schematic exploded inlet end perspective view of the filter cartridge of FIGS. 16-18.

In FIG. 19, an alternate exploded perspective view is shown, taken generally toward flow end 424 of the cartridge 415.

Still referring to FIGS. 16-19, it will be understood that the particular seal arrangement 420 is depicted with a seal surface 445a that is configured to form an outwardly directed radial seal. That is, it is positioned in the cartridge 415 at a location to form a seal, during installation, with a surrounding portion (housing structure) of an air cleaner (typically an internal housing portion). In alternatives, the seal surface 445a can be configured to surround a portion of the air cleaner (typically an internal housing portion) during installation, and thus from a radially inwardly directed seal.

In addition, the radial seal depicted is a "supported seal" in that the support flange 447 of the preform 431 is positioned to support the seal material 445 during installation, such that the material 445 is, at least in part, compressed between the support flange 431 and a housing surface, during use. Seal supports that operate in this general manner are well known.

The particular seal surface 445 of the example arrangement 415 depicted uses an optional modified oval shape. In particular, it is not simply an oval shape in which straight or oppositely arcuate seal sections are positioned between two opposite curved (for example semi-circular) ends, as would be the case with oval racetrack shaped seals of arrangements such as U.S. Pat. No. 7,905,936. It rather uses a specific arrangement of positioned variations in that surface, to achieve advantage. Such variations can be of the type related to those generally described in U.S. Pat. No. 8,864,866 incorporated herein by reference. However, specific selected configurations and variations can include features discussed herein, to advantage. In general terms, and referring to FIG. 17, the advantageous non-straight sections of the seal surface are indicated generally at 448 as comprising alternating projection sections 448p and recess sections 448r, discussed further below. Referring to FIGS. 18 and 19, it is noted that the support flange 447 includes similar projection/recess sections at 449 to provide support to the seal arrangement in the related seal sections.

C. The Safety Filter, FIG. 20

Figure 20:
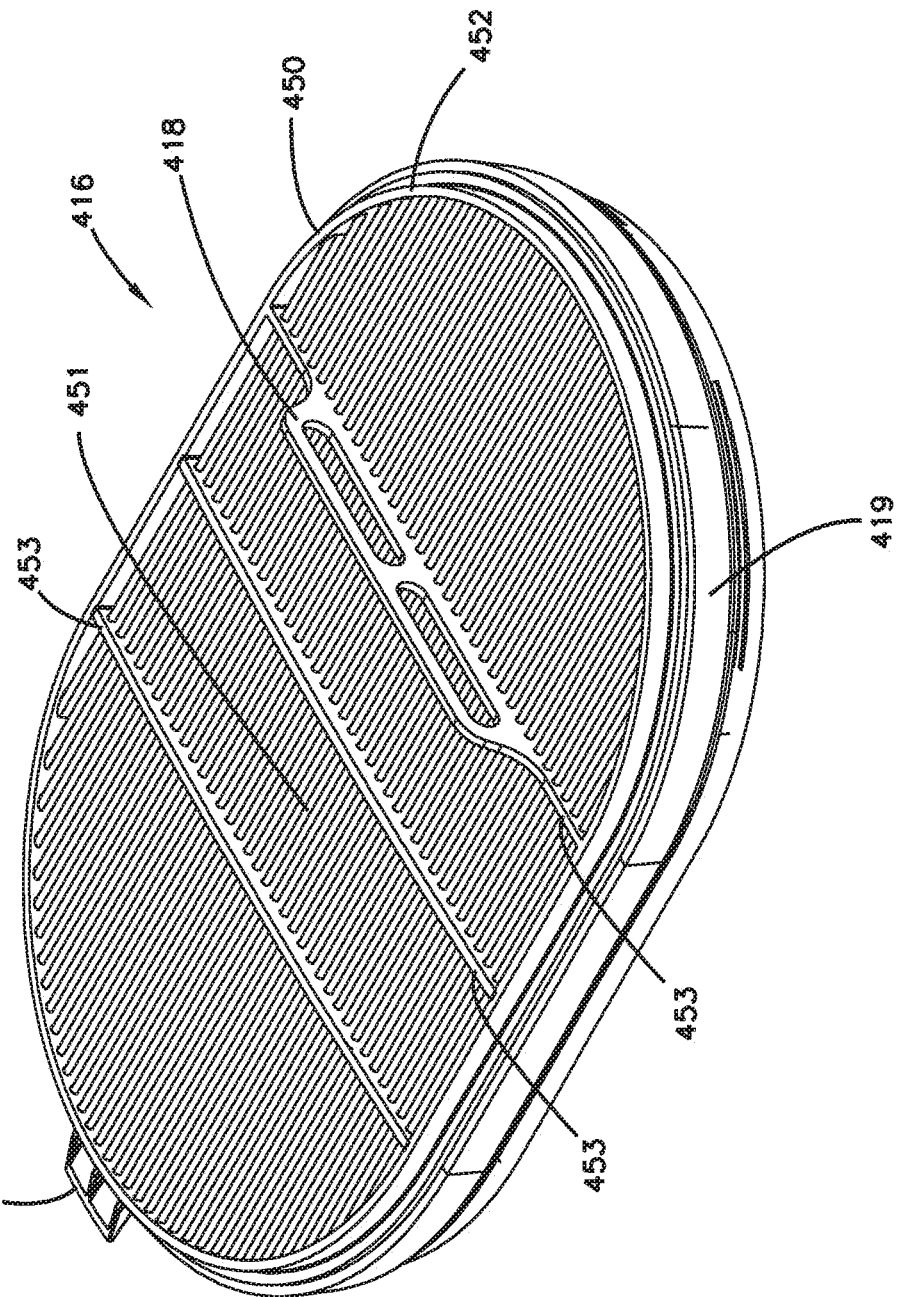
FIG. 20 is a schematic perspective view of an optional safety filter cartridge depicted as used in the assembly of FIGS. 14 and 15.

In FIG. 20, optional safety filter 416 is depicted. The safety filter 416 comprises a preform 450 having media, typically pleated media 451, positioned therein. The preform 450 has an outer perimeter rim 452 including projection 417 previously discussed. Pleat spacers are indicated in the preform at 453. Handle arrangement 418 is shown, for managing the safety. Positioned on the preform 450, and surrounding the media 451, is seal member 419 secured in place, typically by an adhesive. Alternates are possible.

D. Example Main Filter Cartridge Seal Engagement with the Housing, FIGS. 21-22

As indicated above, the seal configuration of the main filter cartridge 415 is selected to have a configuration that can be unique to the system of concern, if desired, to prevent installation of alternate arrangements, and also to be of a type that can be safely and securely established and released. The particular arrangement depicted has a general oval perimeter with two opposite curved (semi-circular) ends, engaged by opposite sections of the seal arrangement that are not straight. Herein, the particular configuration depicted for the not straight section, may sometimes be referred to as a "wavy section" as discussed in more detail below. It is generally a section having a projection/recess contour as described below. Engagement of such arrangements for sealing can be understood by reference to FIGS. 21, 21A and 22.

Figure 21:
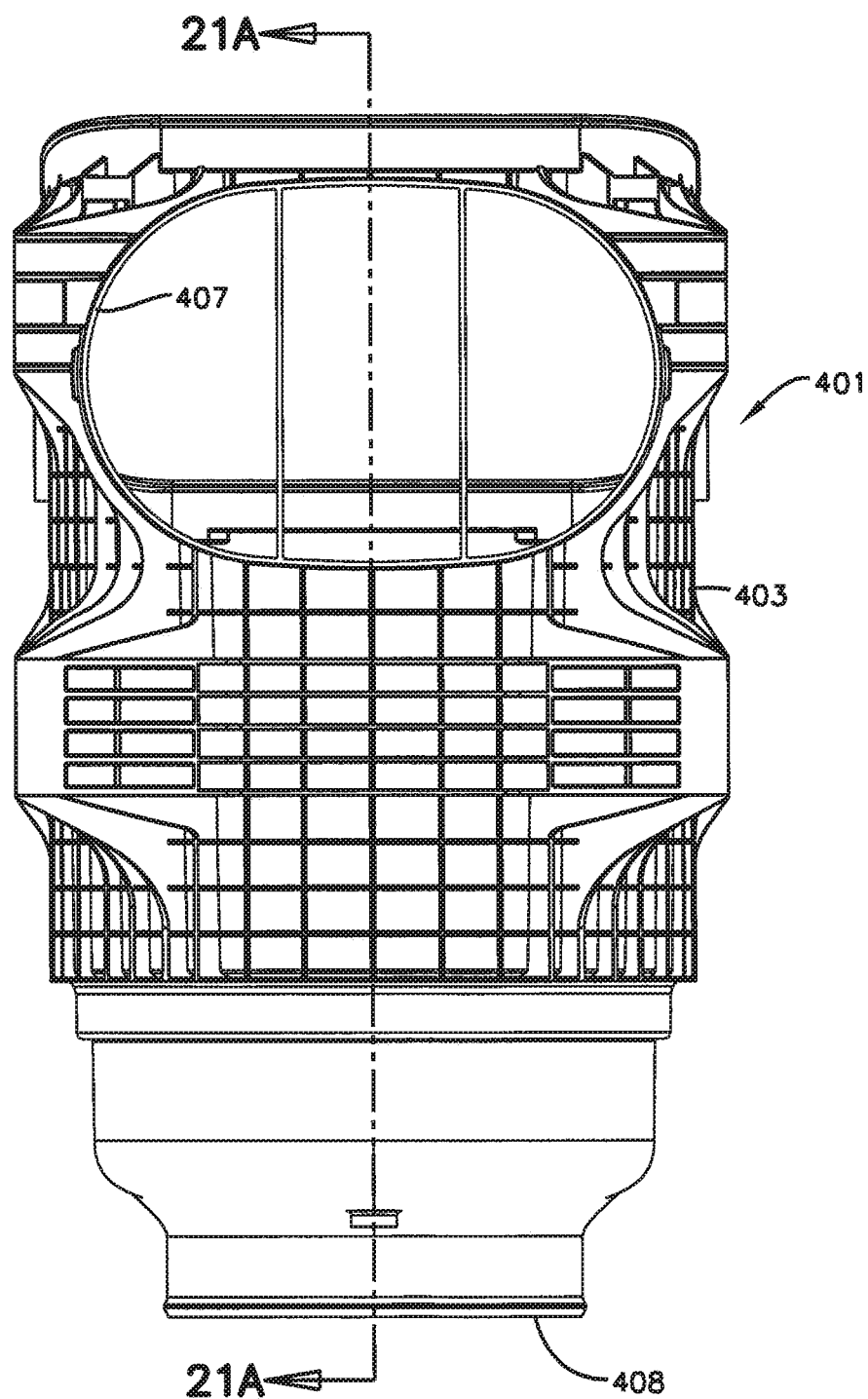
FIG. 21 is a schematic inlet side plan view of a housing component of the air cleaner of FIGS. 14 and 15.

FIG. 21, a plan view of the housing 401 taken toward the inlet 407 is depicted. In this view, no cartridge is positioned in the housing. FIG. 21 can be seen as providing the orientation for FIG. 21A.

Figure 21A:
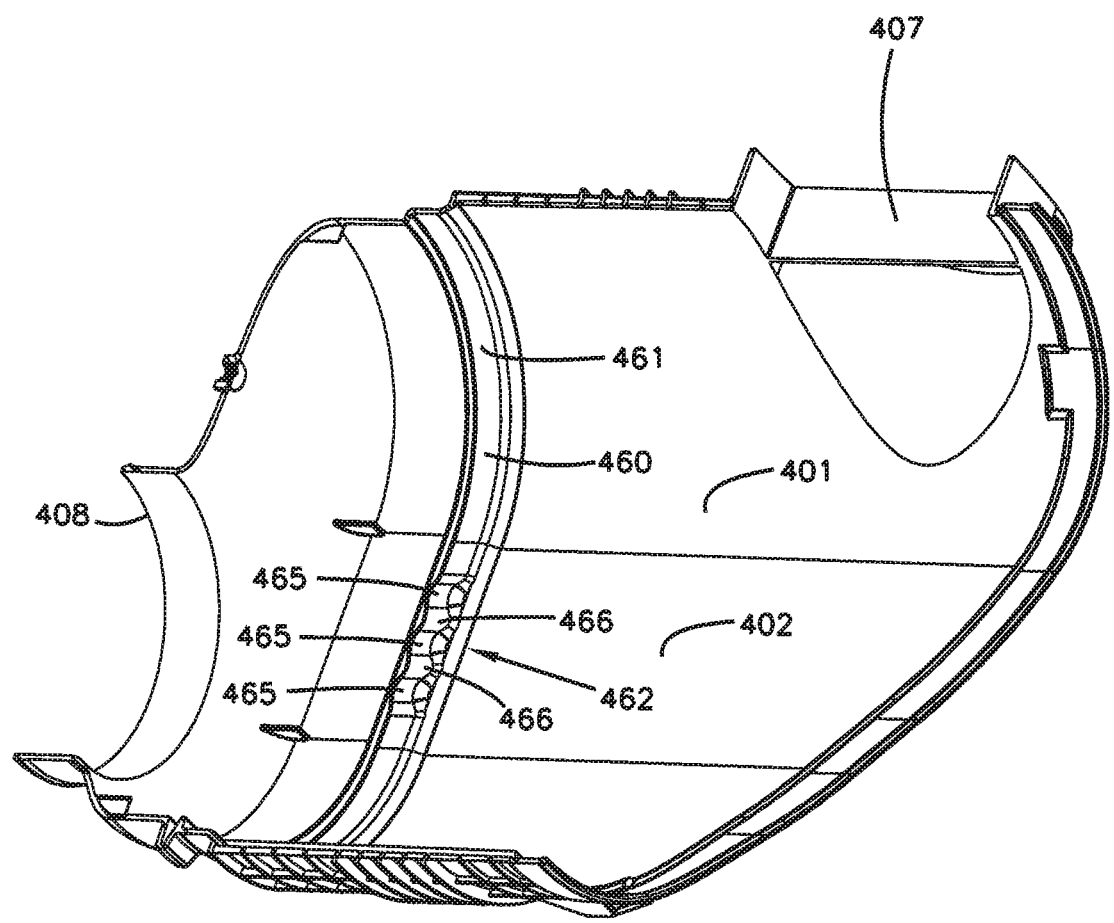
FIG. 21A is a schematic, fragmentary, cross-sectional view taken generally along line 21A-21A, FIG. 21.

FIG. 21A is a cross-sectional view taken generally along line 21A-21A, FIG. 21. It is noted that there is a housing seal surface (or structure) 460 positioned within the housing, in this instance which will surround the cartridge seal arrangement 420 when installed, and against which the seal arrangement 420 and thus the cartridge 415 will seal when installed. The seal surface 460 and the arrangement depicted, which uses an outwardly directed radial seal, is a seal surface that surrounds the seal arrangement 420 in use, and against which the seal surface 445a is pressed during use. The seal surface 460 depicted includes smooth (non-wavy) sections 461 and wavy or projection/recess sections 462. The wavy or projection/recess sections 462 are sections of surface 460 which comprise an alternating projection/recess configuration for sealing engagement with one or more of mating wavy surfaces 448, FIG. 18, in the cartridge 415. The particular cross-section depicted in FIG. 21A shows approximately half the overall surface 460, the opposite half of surface 460 typically being a mirror image. As a result, one could understand there would be two wavy (or projection/recess) sections 462, in the example each comprising three inwardly directed projections 465 with two outwardly projecting sections 466 therebetween. The sections can be characterized as "inwardly facing convex" for sections 465; and, inwardly facing concave" for sections 466, if desired. Alternatives are possible.

From an examination of FIGS. 21 and 21A, it can be understood that housing seal surfaces 460 of the type usable in an arrangement involving principles described herein generally (and specifically as would be used in connection with the example cartridge 415) can be features molded as a portion of a molded housing, if desired.

Figure 22:
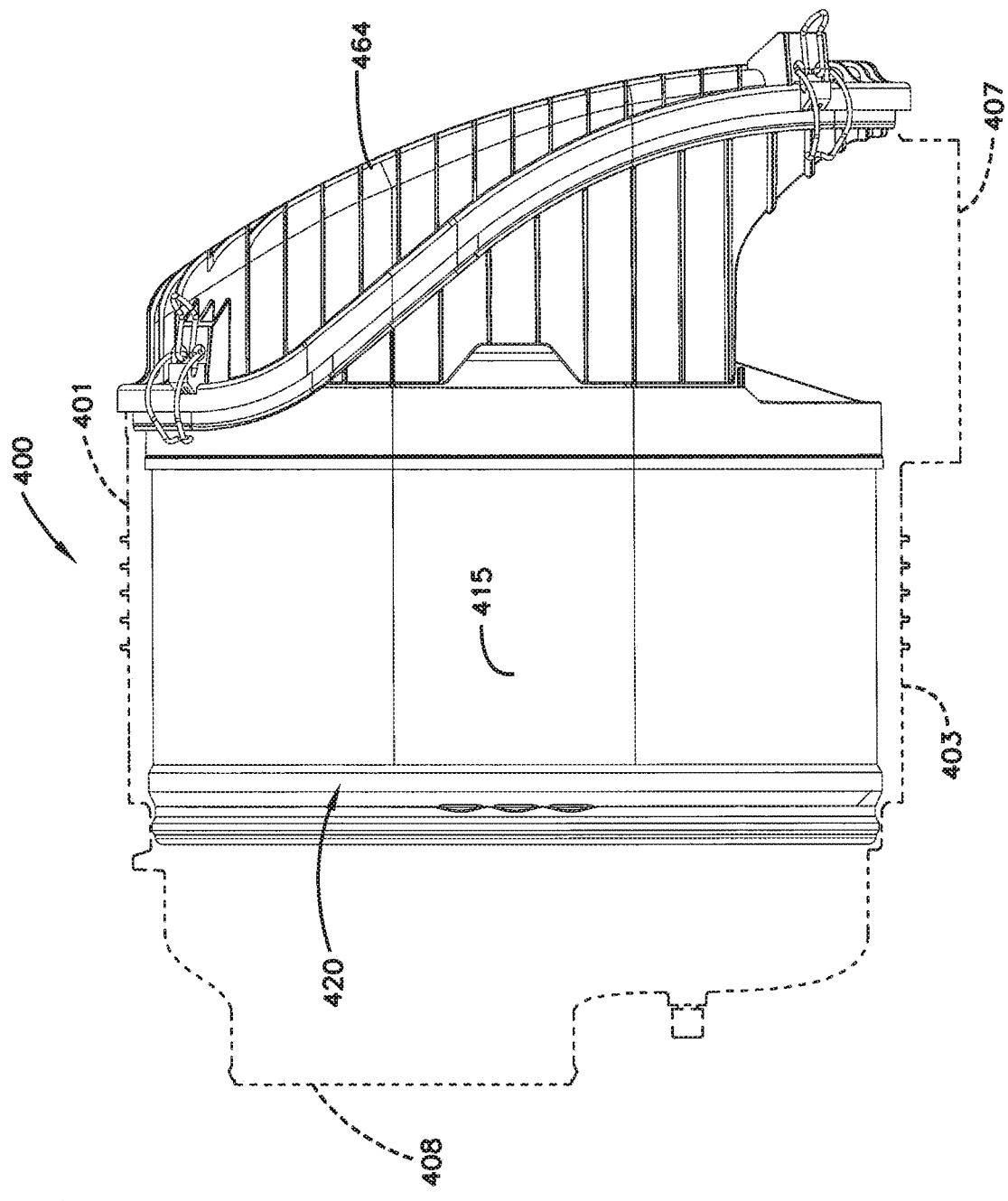
FIG. 22 is a schematic side view of an air cleaner assembly in accord with FIG. 14, with portions shown in phantom view to show internal detail relating to the positioning of a main air filter cartridge.

In FIG. 22, a schematic depiction is provided of the housing 401 with cartridge 405 positioned therein.

E. Some Selected Variations

FIGS. 14-22 are intended to show an example arrangement using selected principles according to the present disclosure. The features can be implemented in a wide variety of variations with respect to housing features, cartridge features, and indeed, with respect to specific seal configurations. As to seal configurations, general principles are provided herein after additional embodiments and examples are shown.

It should be understood that the principles can be applied with non-straight "alternating" projections/recess versions of the seal surface that vary from these specific examples depicted in the cartridge 415 of FIGS. 16-19. For example, the number of alternating projections and recesses in any one of the areas can be varied. Also, the total number of areas that comprise such alternating projection/recess regions can be varied, as well as the location in the seal surface. Also, variations in shape, size, location and spacing are possible. Some principles with respect to these are characterized further below.

Still referring to FIGS. 14-22, it is noted that the cartridge depicted (in FIG. 16) includes an installation handle 434 as previously characterized. It can be seen by reference to the various figures, that the handle 434 is positioned in overlap with an inlet flow end of the media pack, and can be used to push the cartridge into position or pull the cartridge from sealing, during servicing. This type of handle 434 will sometimes be referred to as an "installation handle" characterized for an axial direction of installation and removal.

IV. Additional Embodiments and Variations

In FIGS. 23-34, a first example variation from the cartridge 415 is depicted. The particular depicted cartridge and cartridge components and these features, vary from the cartridge 415 in two primary ways: the absence of the preform at and end of the cartridge opposite the seal arrangement; and, variation in the preform arrangement at the seal end of the cartridge. It will be noted, however, that a preform such as preform 430, FIG. 19, could be used in arrangements in accord with FIGS. 23-34, if desired.

Figure 23:
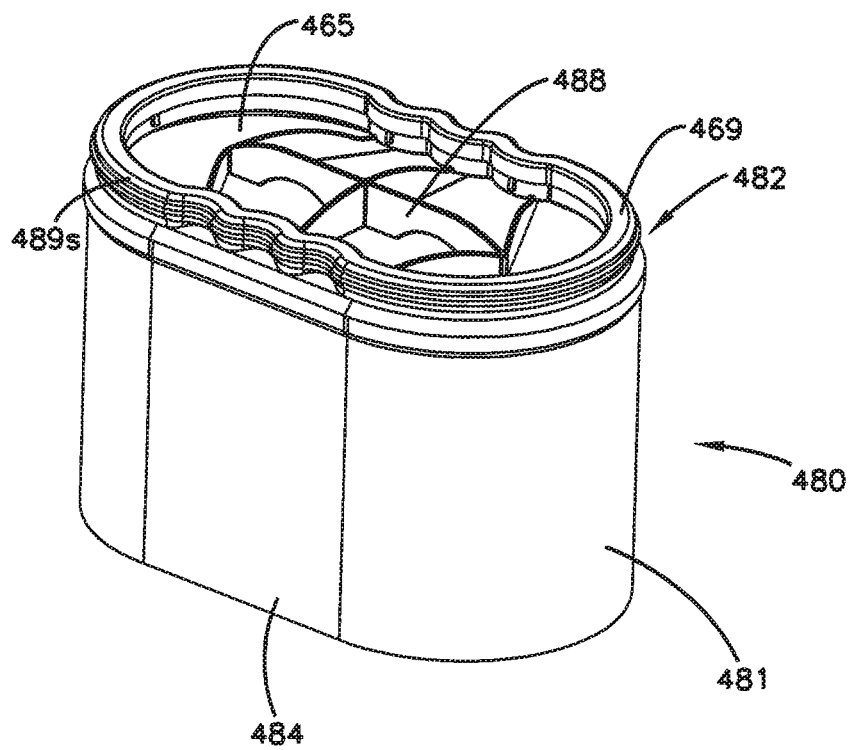
FIG. 23 is a schematic seal end perspective view of a first alternate filter cartridge, usable with general air cleaner assembly features described.

Referring to FIG. 23, cartridge 480 generally comprises a media pack 481 and seal arrangement 482. The media pack 481 may generally be constructed in accord with principles described herein above, and indeed, may be generally in accord with media pack 427, FIG. 16-19.

The cartridge 480 includes opposite flow ends 484, 485. The seal arrangement 482 is positioned at flow end 485. While alternatives are possible, in a typical application, it is expected that 484 would be an inlet flow end and 485 would be an outlet flow end, for the media pack 481.

It is noted that although there is no preform or handle arrangement at end 484, there is a handle arrangement 488 at end 485, the same end at which the seal arrangement 482 is depicted. The handle arrangement 488 may be configured as a portion of the same preform as is used in the seal arrangement 482, as discussed below, although alternatives are possible.

The absence of a handle arrangement adjacent flow end 484 is not meant to indicate that the cartridge 480 is not pushed in (and removed) by grasping that end. Rather, it is meant to indicate that in some instances, the cartridge 480 and assembly can be configured such that one can grasp and manipulate the cartridge into and out of sealing orientation without the need for a handle arrangement at an end opposite from the housing seal arrangement.

It is noted, referring to FIG. 23, that seal arrangement 482 generally comprises a seal member 489 molded-in-place. The seal member 489 includes a seal surface 489s. The seal surface 489s depicted is an outwardly directed surface, configured to form an outwardly directed radial seal in accord with the principles described above. Alternatives are possible.

It is noted that the seal surface 489s has a shape similar, in overall feature, to the surface 448s, FIGS. 16 and 17.

The configuration used in the arrangement of FIG. 23 could be applied in the arrangement of FIG. 16; and, the configuration used in the arrangement of FIG. 16 could be used in accord with the features of FIG. 23.

Figure 24:
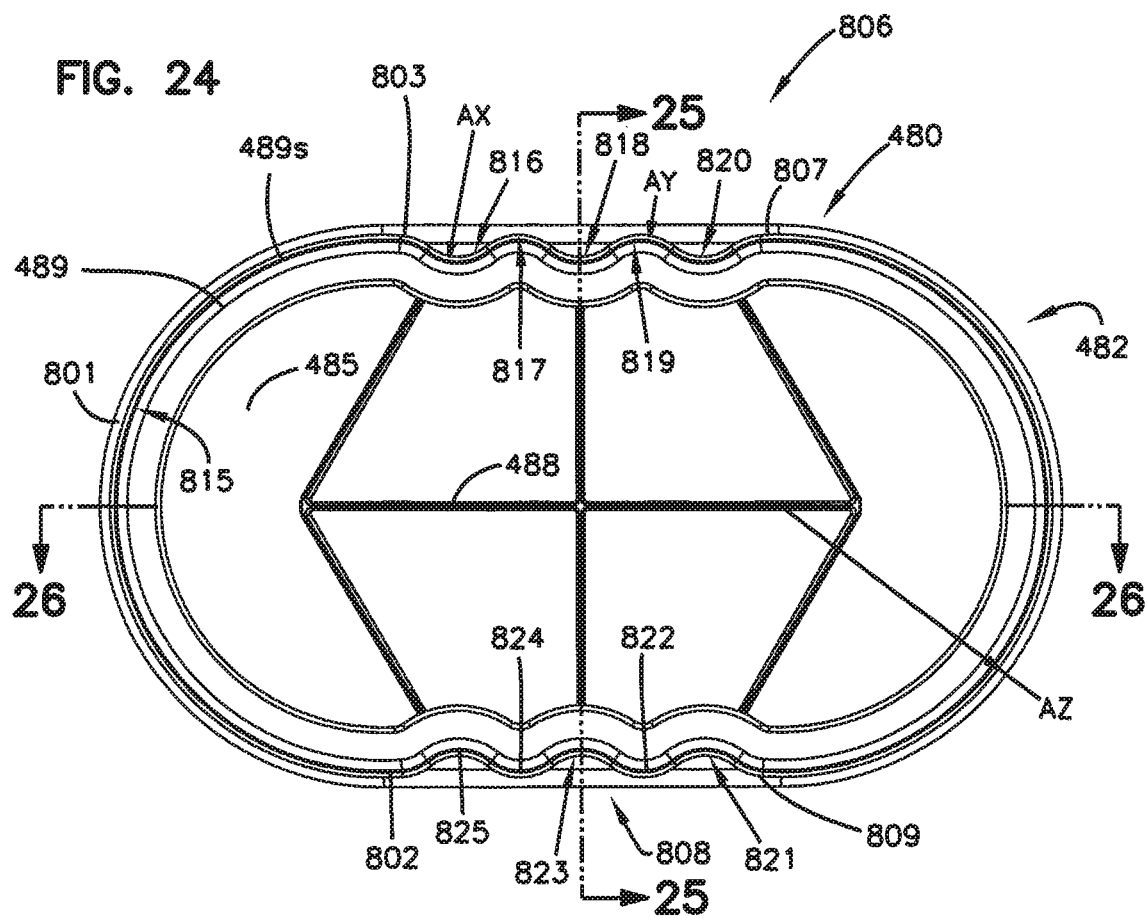
FIG. 24 is a schematic seal end plan view of the filter cartridge of FIG. 23.
Figure 25:
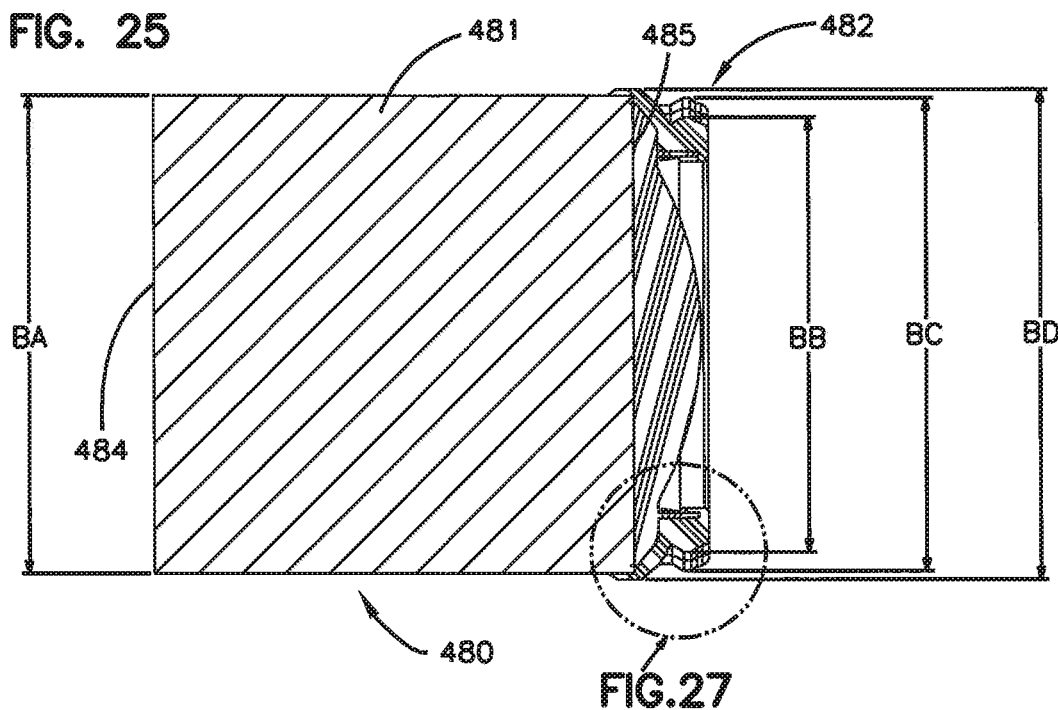
FIG. 25 is a schematic cross-sectional view of the filter cartridge of FIGS. 23, 24, taken generally along line 25-25, FIG. 24.
Figure 26:
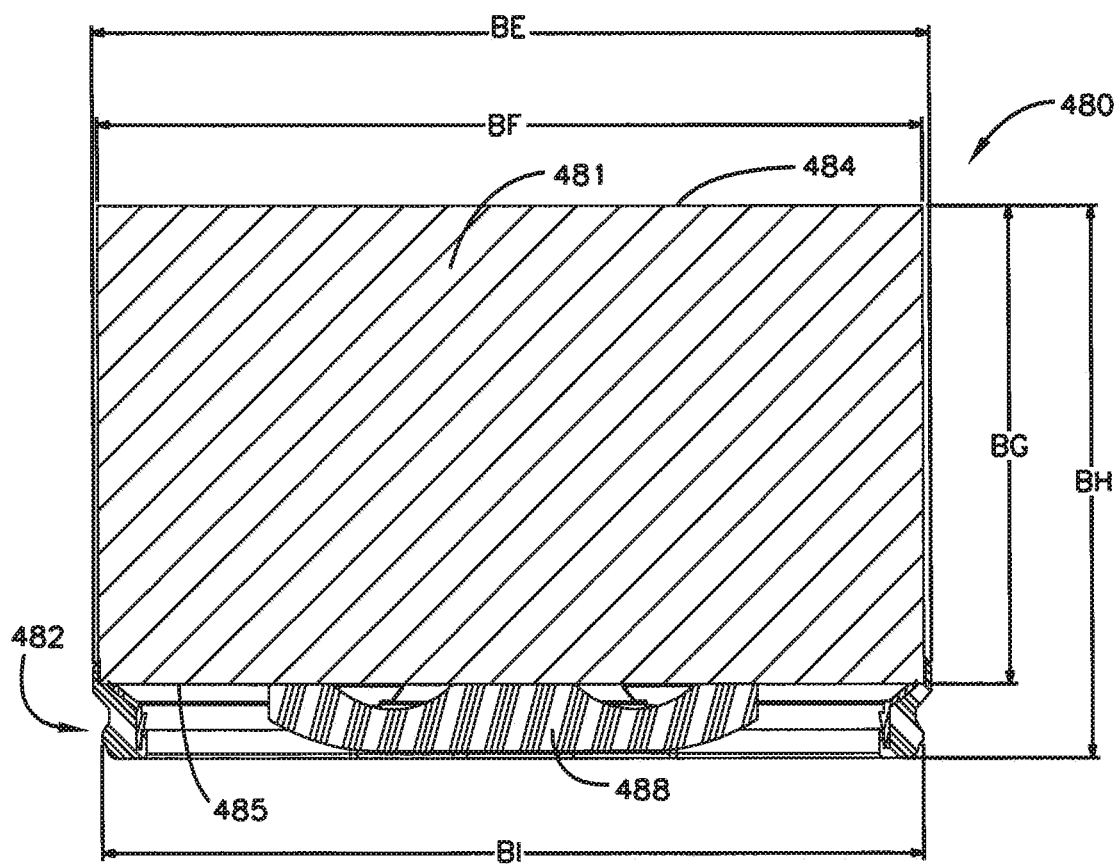
FIG. 26 is a schematic cross-sectional view of the filter cartridge of FIGS. 23 and 24, taken generally along line 26-26, FIG. 24.
Figure 27:
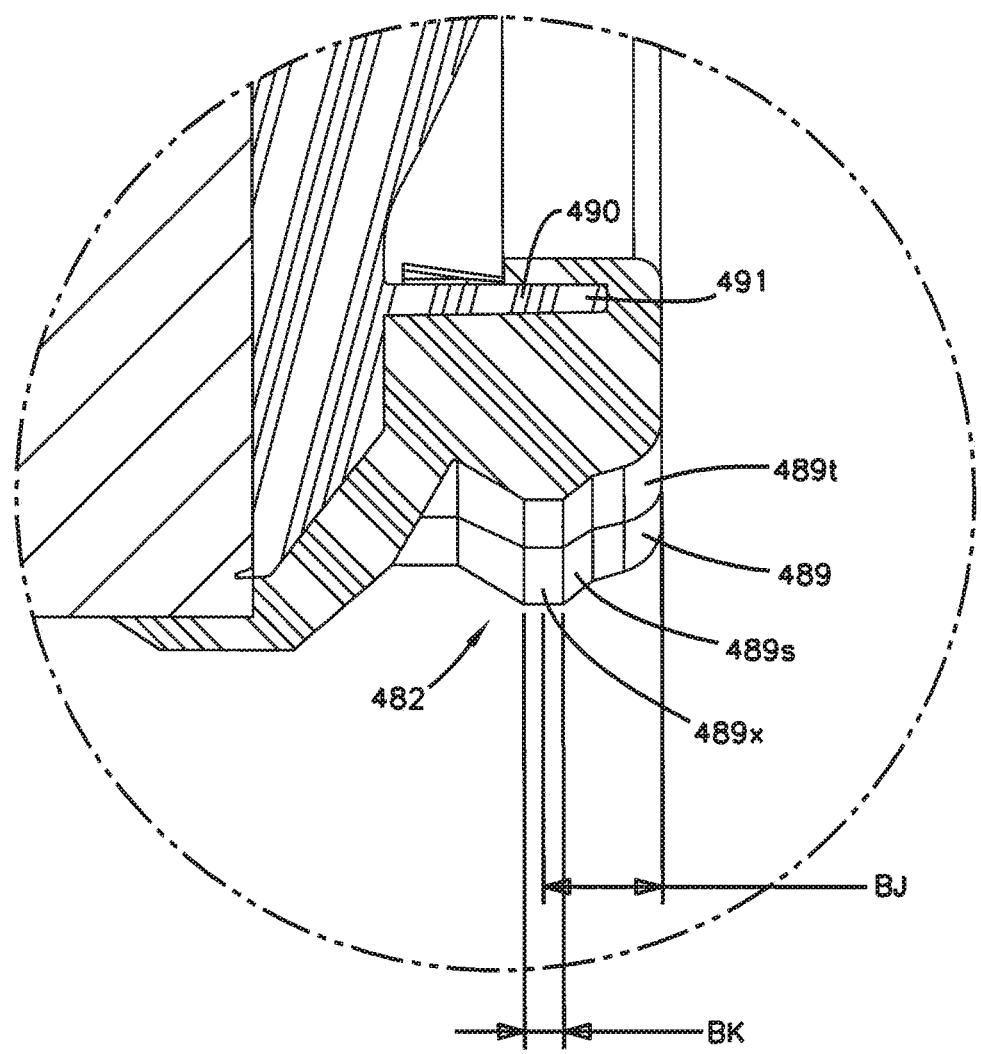
FIG. 27 is an enlarged fragmentary view of an identified portion of FIG. 25.

In FIG. 24, a plan view of the cartridge 480 is depicted, taken toward surface 485 and seal arrangement 482. Cross-sectional views are indicated generally at FIGS. 25 and 26. In FIG. 27, an enlarged fragmentary view of the portion of FIG. 25 is shown.

From a review of these figures, it can be understood that the seal arrangement 482 depicted comprises a molded-in-place seal portion 489 and a seal support preform 490. The preform 490 depicted includes a seal support flange 491 thereon.

Referring to FIG. 27, a cross-sectional view through seal surface 490s is shown. It can be seen that the seal surface 490s generally has a shape which tapers from a largest diameter portion 489x toward an insertion tip 490t. The particular taper depicted is a stepped arrangement. However, straight chamfer arrangements are possible. This facilitates installation and is well known for a wide variety of radial seal types, see for example U.S. Pat. Nos. 7,396,376 and 8,409,316.

Figure 28:
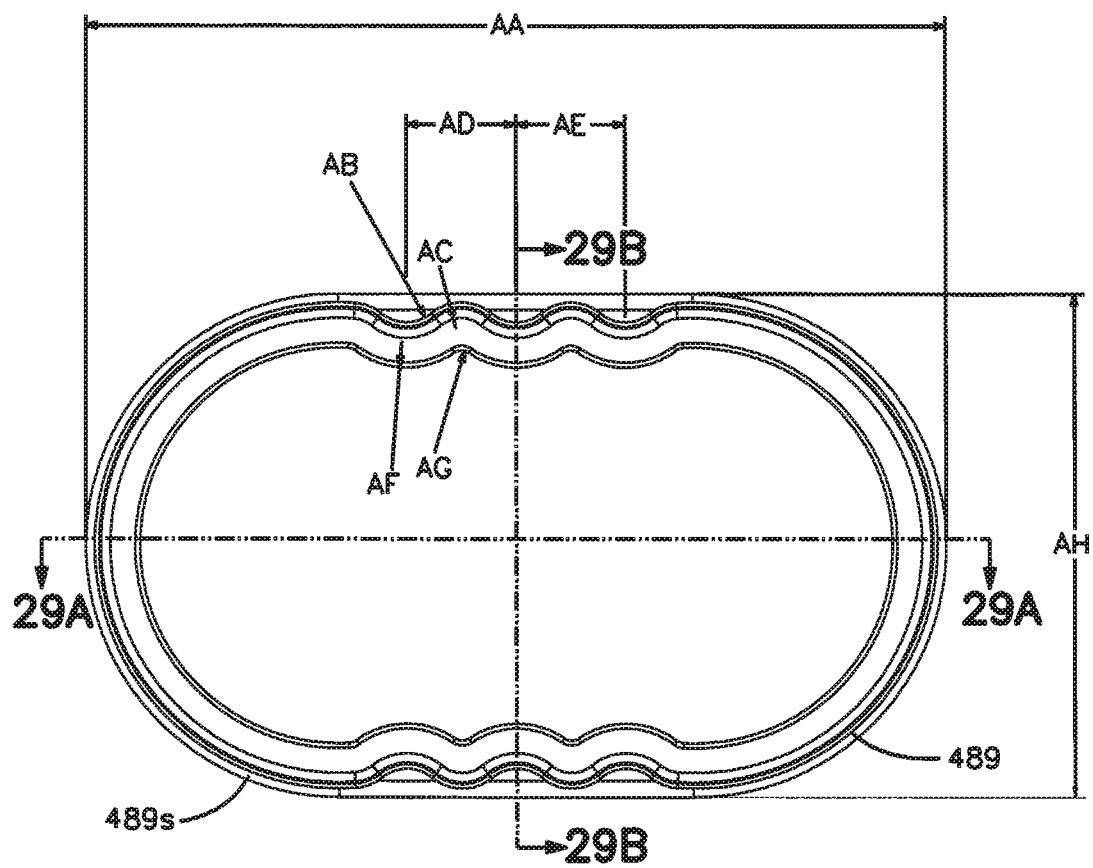
FIG. 28 is a schematic plan view of a molded seal portion of a filter cartridge of FIGS. 23 and 24.
Figure 29:
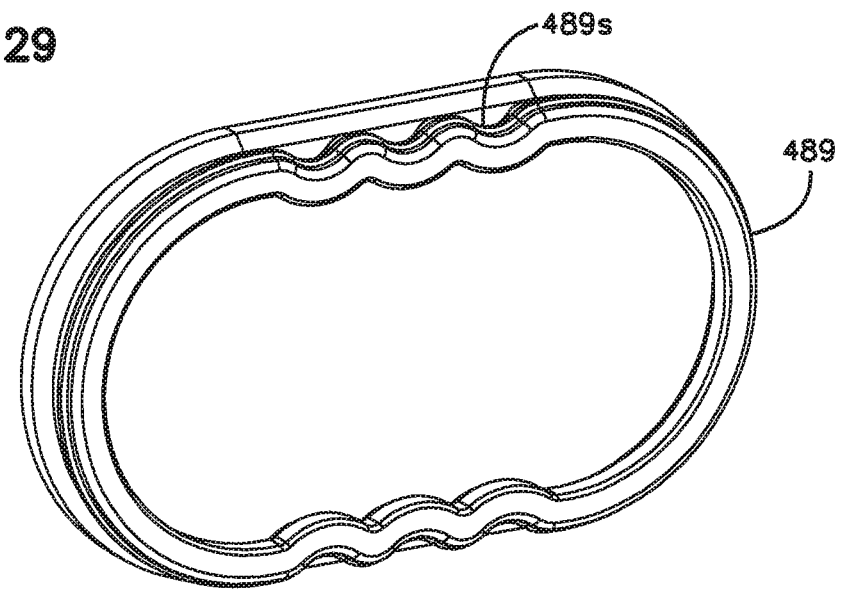
FIG. 29 is a schematic perspective view of the mold seal portion of FIG. 28.
Figure 29A:
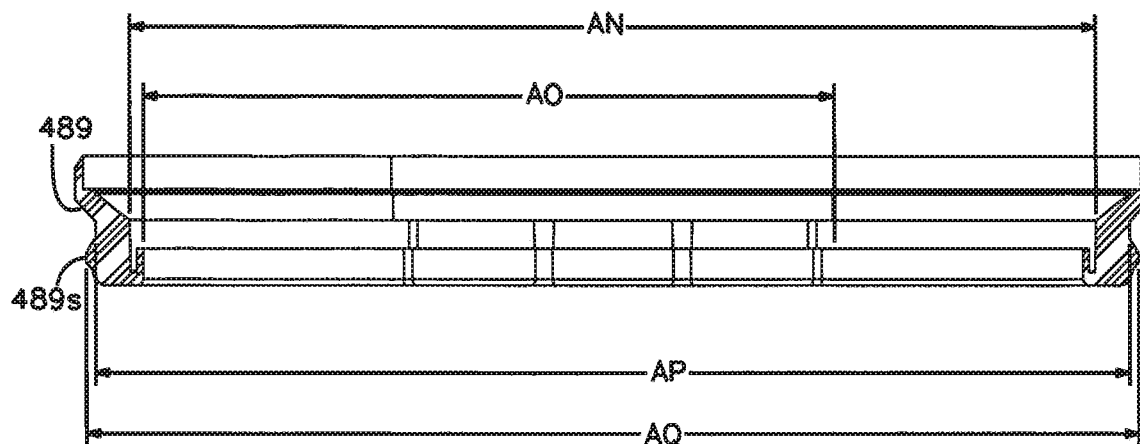
FIG. 29A is a schematic cross-sectional view taken along line 29A-29A, FIG. 28.
Figure 29B:
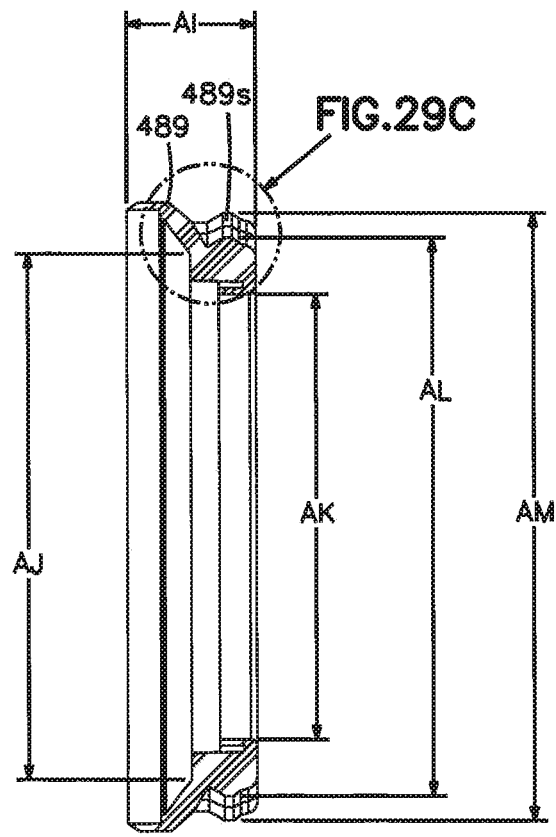
FIG. 29B is a schematic cross-sectional view taken along line 29B-29B, FIG. 28.
Figure 29C:
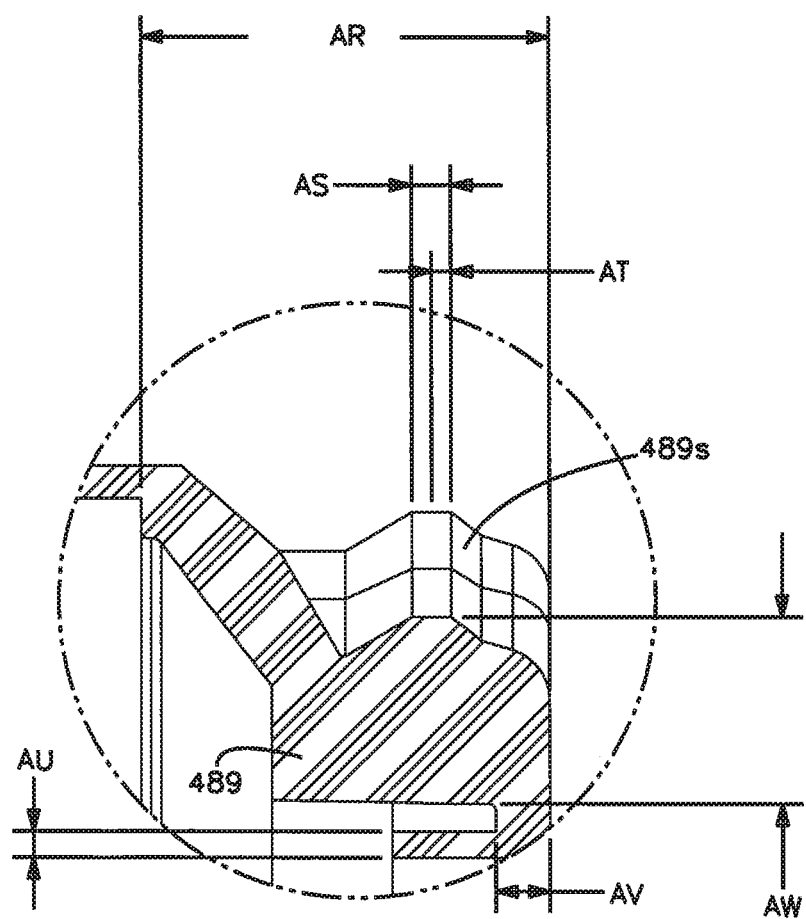
FIG. 29C is an enlarged schematic, fragmentary view of an identified portion of FIG. 29B.

In FIGS. 28-29C, the molded seal portion 489 is shown separate from the cartridge and preform. FIG. 28 is a plan view taken from an orientation analogous to FIG. 24. FIG. 29 is a perspective view, and FIGS. 29A, 29B, and, 29C are cross-sectional views.

Figure 30:
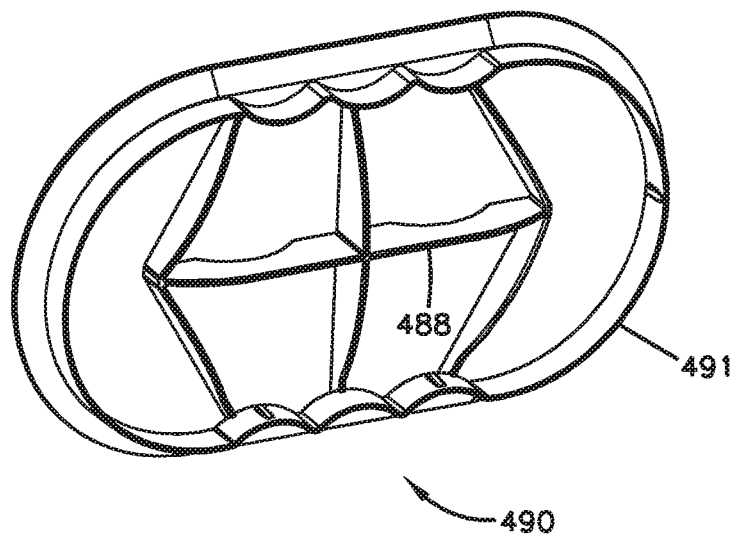
FIG. 30 is a schematic perspective view of a preform seal support component of the filter cartridge of FIGS. 23 and 24.
Figure 31:
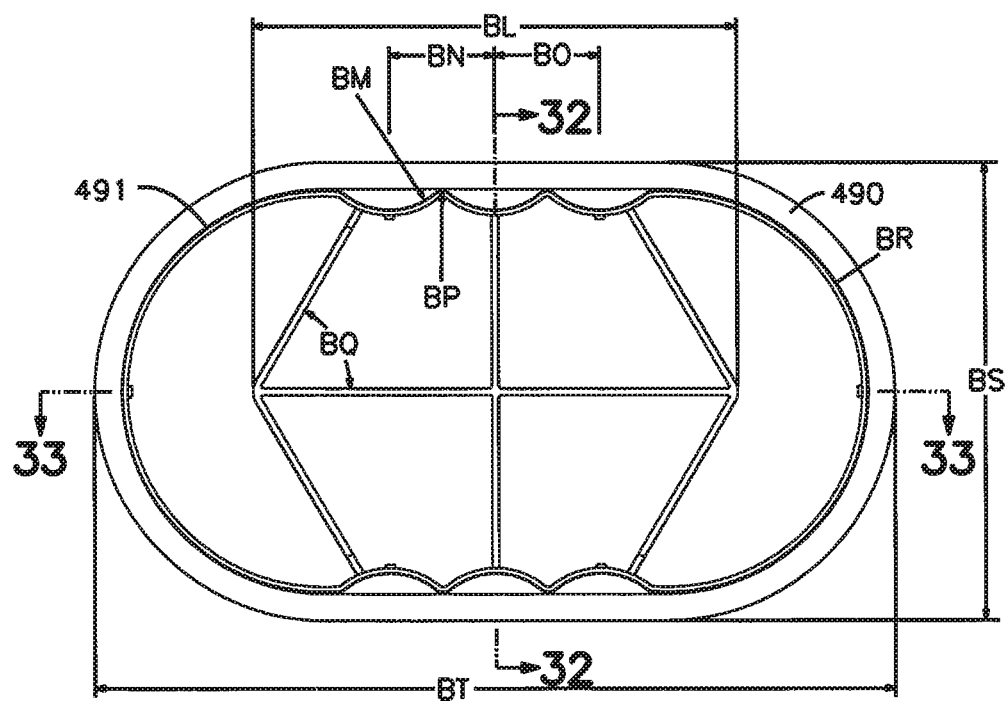
FIG. 31 is a schematic support flange side plan view of the preform seal support of FIG. 30.
Figure 32:
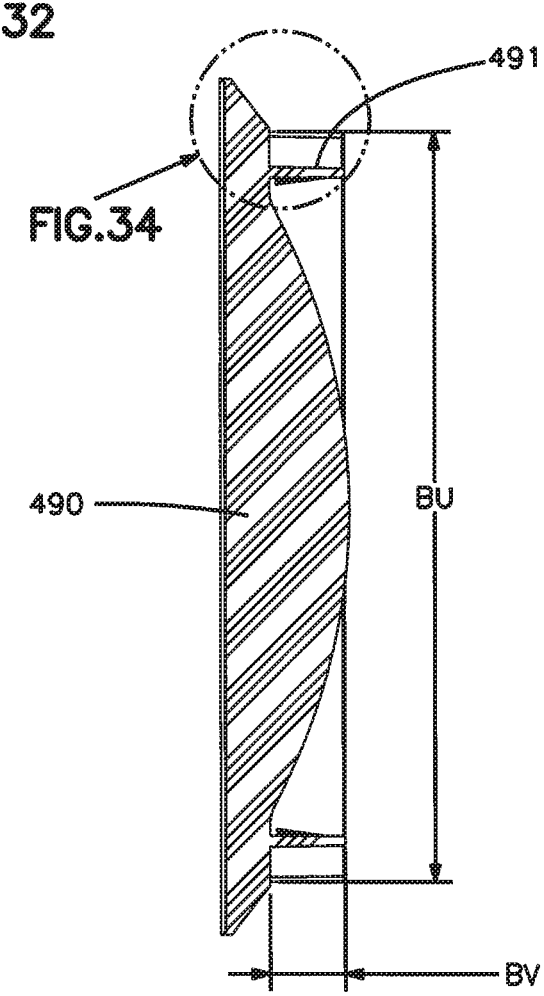
FIG. 32 is a schematic cross-sectional view taken along line 32-32, FIG. 31.
Figure 33:
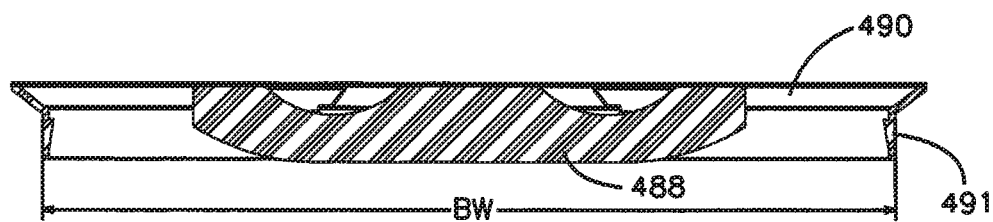
FIG. 33 is a schematic cross-sectional view of the preform frame support portion of FIG. 30, taken generally along line 33-33, FIG. 31.
Figure 34:
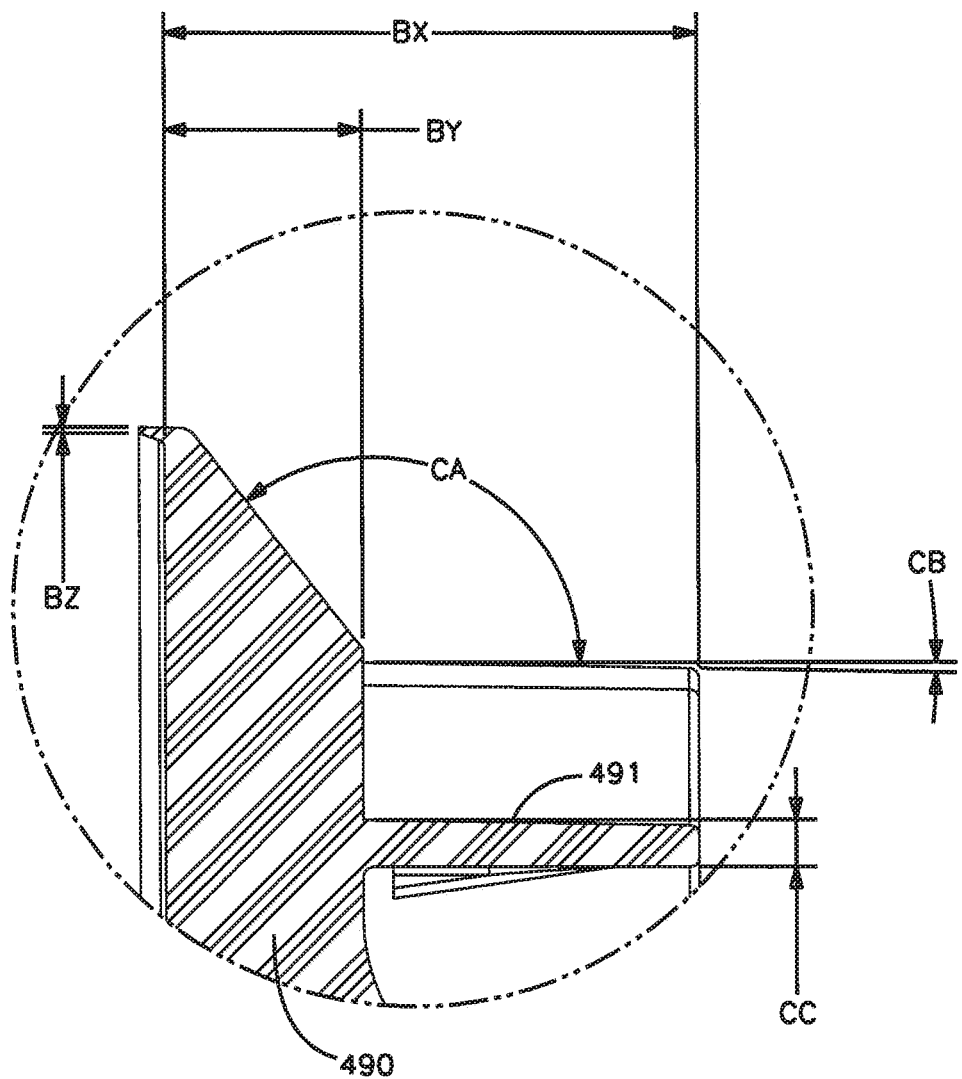
FIG. 34 is a schematic enlarged, fragmentary view of an identified portion of FIG. 32.

In FIGS. 30-34, the seal support preform 490 is depicted. In FIG. 30, a perspective view is taken toward handle 488 is shown. In FIG. 31, a plan view taken toward handle 488 is shown. In FIGS. 32, 33 and 34, cross-sectional views are shown.

In the arrangements of FIGS. 23-34, some example dimensions are provided. These are intended to indicate a workable arrangement using principles according to the present disclosure. Variations in the dimensions are possible. The example dimensions are as follows: AX=16 mm radius; AY=19 mm radius; and, AZ=99 mm radius; in FIG. 25, BA=200 mm; BB=182 mm; BC=198 mm; and, BD=205 mm; in FIG. 26, BE=349 mm; BF=344 mm; BG=200 mm; BH=231 mm; and, BI=342 mm; in FIG. 27, BJ=9 mm; and, BK=3 mm; in FIG. 28, AA=349 mm; AB=16 mm radius; AC=19 mm radius; AD=44.5 mm; AE=44.5 mm; AF=34.4 mm radius; AG=5 mm radius; and, AH=205 mm; in FIG. 29A, AN=313.9 mm; AO=224.6 mm; AP=336 mm; and, AQ=342 mm; in FIG. 29B, AI=41.9 mm; AJ=171.4 mm; AK=145.2 mm; AL=182 mm; and, AM=198 mm; in FIG. 29C; AR=31.1 mm; AS=3 mm; AT=1.5 mm; AU=2 mm; AV=4.1 mm; and, AW=14.3 mm.

In FIG. 31, BL=203.4 mm; BM=33 mm radius; BN=44.5 mm; BO=44.5 mm; BP=5 mm radius; BQ=60°; BR=85.4 mm radius; BS=193.9 mm; and, BT=336.9 mm; In FIG. 32, BU=170 mm; and, BV=17 mm; in FIG. 33, BW=314 mm; and, in FIG. 34, BX=27 mm; BY=10 mm; BZ=0.3 mm; CA=127.9'; CB=1'; and, CC=2.4 mm.

Typically, a maximum thickness of the molded-in-place seal section (between seal surface and support) in alignment with the seal support is at least 10 mm and usually not greater than 20 mm (often 12-16 mm) although alternatives are possible.

Some analogous dimensions can be used for analogous features and the previously described embodiment of FIGS. 16-19, if desired.

Positioning of a handle adjacent the seal end can provide some advantage. For example, when such a cartridge is handled, typically a service provider will handle the cartridge from the handle end and set it down with the cartridge directed upwardly. This will help keep the seal material 489 from being in contact with work surfaces, etc. during handling.

It may be desirable to also have some form of handle arrangement, but configured so the cartridge cannot be stood on that arrangement at the opposite flow end 488, FIG. 23. If so, one can be added. However, if the cartridge is of a size and use that can be handled by grasping the media pack adjacent this end without a preform, one may not be desired.

V. Example Arrangements in which a Wavy Seal Portion is Located Adjacent an End of a Modified Oval Shape, FIGS. 35-56

A. General

In the example arrangements of FIGS. 16-19 and 23-34, the seal surfaces were configured with two semi-circular curved ends, having opposite sections extending therebetween, defining a general oval shape, modified to include one or more wavy or projection/recess sections in what would have otherwise have been straight sections in the (respective) oval shape. It is possible to implement principles of the present disclosure in alternate arrangements including at least one wavy or projection/recess section in an otherwise end curve of the oval shape, either as an alternative, or in addition to features discussed. Some examples are described in this section and the recited figures.

B. A First Example, FIGS. 35-38

Figure 35:
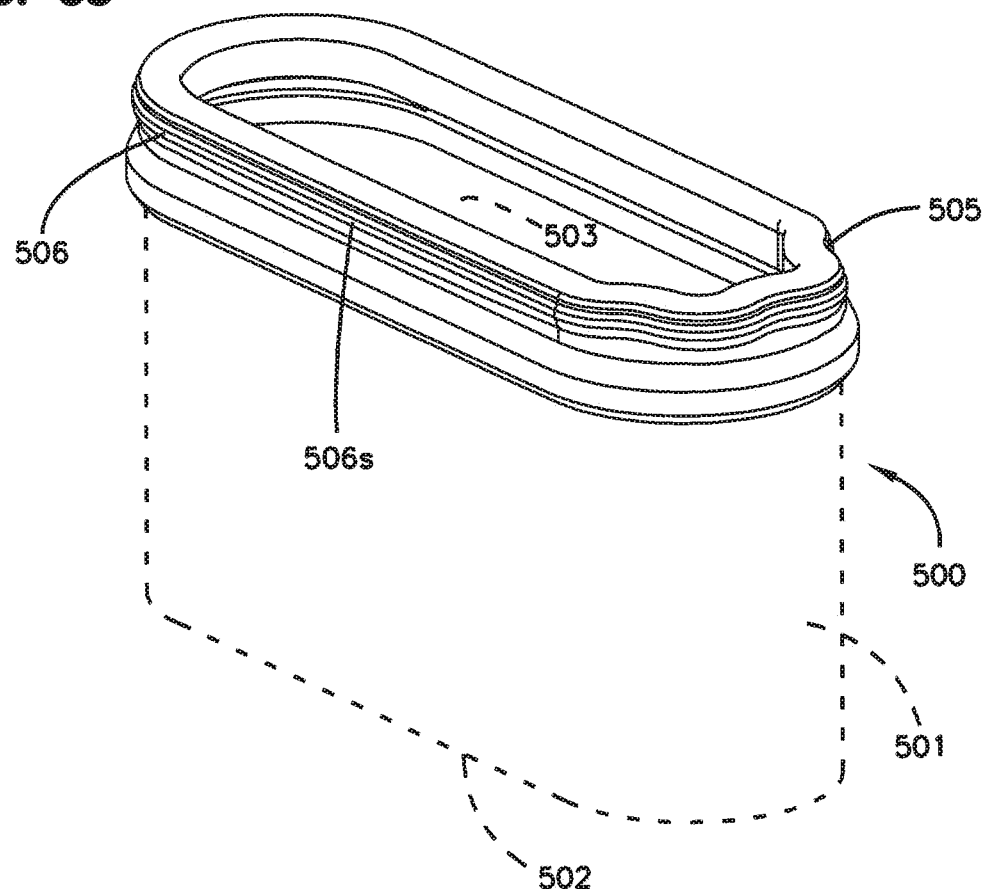
FIG. 35 is a schematic perspective view of a third filter cartridge incorporating principles in accord with the present discloser.

In FIGS. 35-38, a first example filter cartridge and features therefore, are schematically depicted, having a wavy (or projection/recess) section in an arcuate "end" of the seal arrangement in accord with the principles described herein. In FIG. 35, a schematic perspective view of such a cartridge is shown at 500. The cartridge 500 would include a media pack 501 (shown in phantom) with opposite flow ends 502, 503. It is noted that the media pack 501 is depicted in phantom, but may be similar to the configurations of previously described media packs herein, and using media in accord with discussions above.

In the particular example depicted, at flow end 502, no preform is shown. However one could be positioned at this location, if desired.

At end 503, a seal arrangement 505 is depicted. The seal arrangement 505 includes a seal member 506 configured with a seal surface 506s. Although alternatives are possible, the particular seal member 506 depicted is configured using molded-in-place material as previously discussed, and positioned with surface 506s configured as an outwardly directed radial seal, i.e. to seal against a surrounding portion of a housing in use, alternatives are possible.

Figure 36:
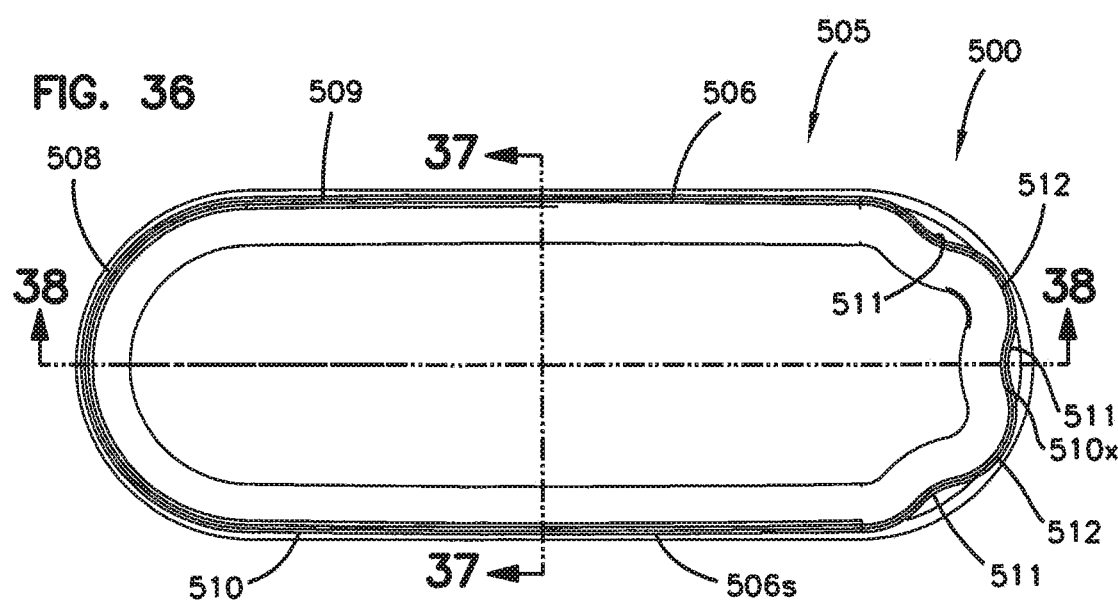
FIG. 36 is a schematic seal end plan view of the filter cartridge of FIG. 35.

In FIG. 36, a plan view of cartridge 500 is depicted, taken towards seal arrangement 505. Seal ring 506 comprising seal surface 506s is shown depicting the perimeter shape thereof. Referring to FIG. 36, surface 506s can be seen as having a first end portion 508, opposite side portions 509, 510 and end portion 510x, opposite portion 508. The perimeter shape is generally oval, except for modifications at end 510 as discussed below. Thus, in the example depicted, end 508 is arcuate (in the example generally semi-circular) in perimeter shape, and opposite sections 509, 510 are generally straight and parallel to one another. Alternatives are possible.

Still referring to FIG. 36, end 510x can be seen extending around a 180° arc, but having a surface region configured with a wavy or projection/recess shape, comprising alternating recess sections 511 and projection sections 512. In the example depicted, there are three recess sections 511 and two projections 512, although alternatives are possible.

Figure 37:
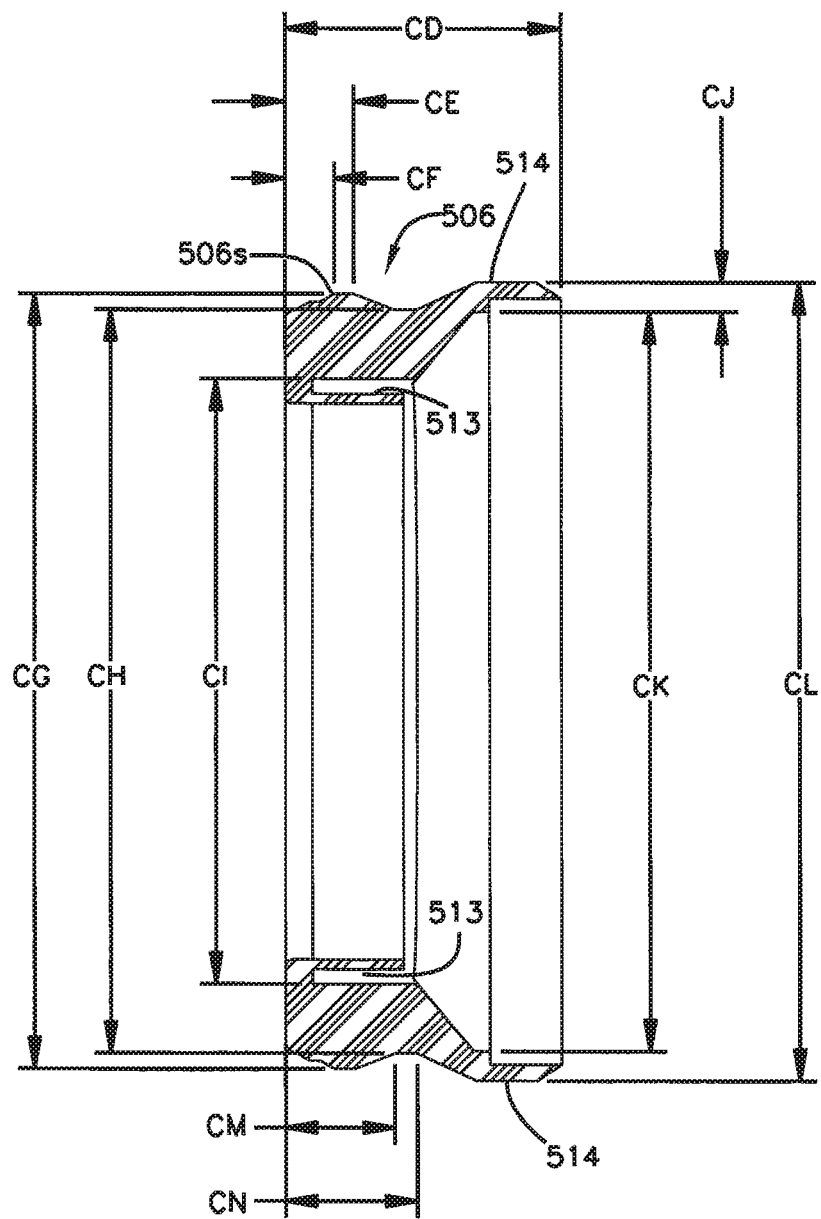
FIG. 37 is an enlarged fragmentary cross-sectional view of a seal portion of the filter cartridge of FIGS. 35 and 36, taken generally along line 37-37, FIG. 36.

In FIG. 37, a cross-sectional view of molded-in-place seal material 505 of seal arrangement 505 taken along line 37-37, FIG. 36 is depicted. Regions 513 show where the molded-in-place portion would receive a support projection on a preform. Regions 514 show over molded portions to secure the seal the seal material (and preform) to the media pack.

Figure 38:
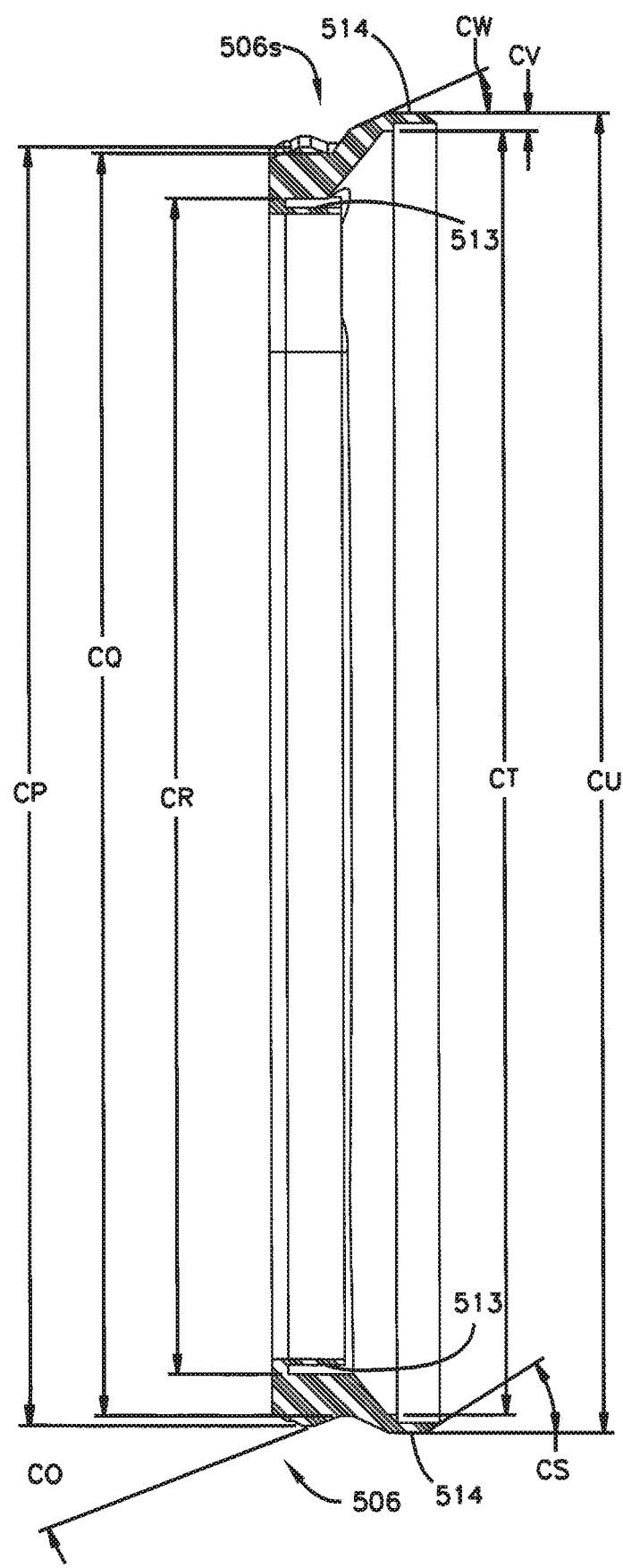
FIG. 38 is an enlarged, schematic, cross-sectional view of a seal portion of FIG. 37, but taken generally along line 38-38, FIG. 36.

In FIG. 38, a cross-sectional view taken generally along line 38-38, FIG. 37 is shown.

In the example of FIGS. 35-38, usable dimensions are indicated as follows: In FIG. 37, CD=41.9 mm; CE=10.5 mm; CF=7.5 mm; CG=118.4 mm; CH=113.6 mm; CI=92.5 mm CJ=4.5 m; CK=113 mm; CL=122 mm; CJ=118.4 mm; CM=16.7 mm; and, CN=20.1 mm. In FIG. 38, CO=21.2°; CP=321.7 mm; CQ=317.6 mm; CR=295.7 mm; CS=32.4°; CT=322.9 mm; CU=332 mm; CW=24.2°; and, CV=4.5°.

Of course alternatives are possible using the principles according to the present disclosure. Some general variations usable are discussed further herein below.

C. A Second Variation, FIGS. 39-45

Principles characterized in connection with the embodiment of FIGS. 35-38 can be applied in an arrangement in which a seal support preform arrangement includes a handle thereon, at the same end of the cartridge as the seal arrangement. An example is provided in FIGS. 39-46 as follows.

Figure 39:
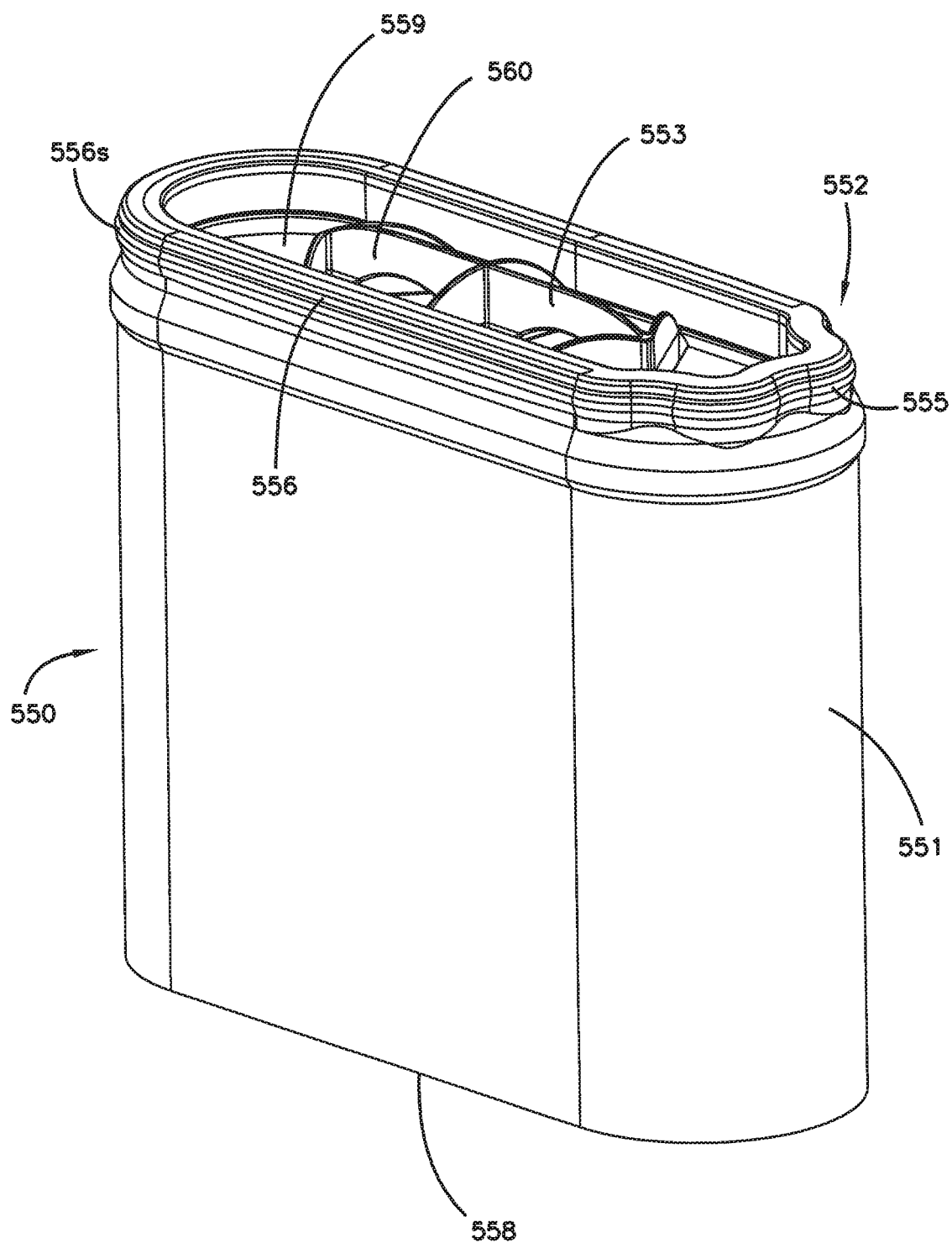
FIG. 39 is a schematic seal end perspective view of a fourth example filter cartridge including features in accord with the principles of the present disclosure.

In FIG. 39, an example cartridge 550 is depicted, comprising media pack 551 and seal arrangement 552. These may be generally in accord with the arrangement of FIGS. 35-38 except for the presence of a handle arrangement 553, in overlap with an end 555 of media 551.

As with the arrangement of FIGS. 35-38, the seal arrangement 551 comprises a molded-in-place region 555 of material including a region 556 having seal surface 556s.

The media pack 550 may generally be as previously described having opposite flow ends 558, 559.

Figure 40:
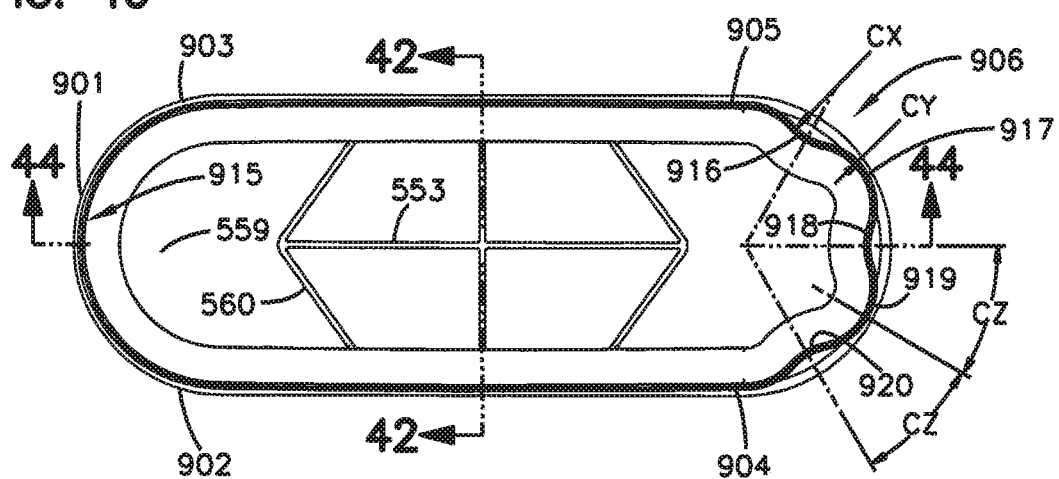
FIG. 40 is a schematic seal end plan view of the filter cartridge of FIG. 39.
Figure 41:
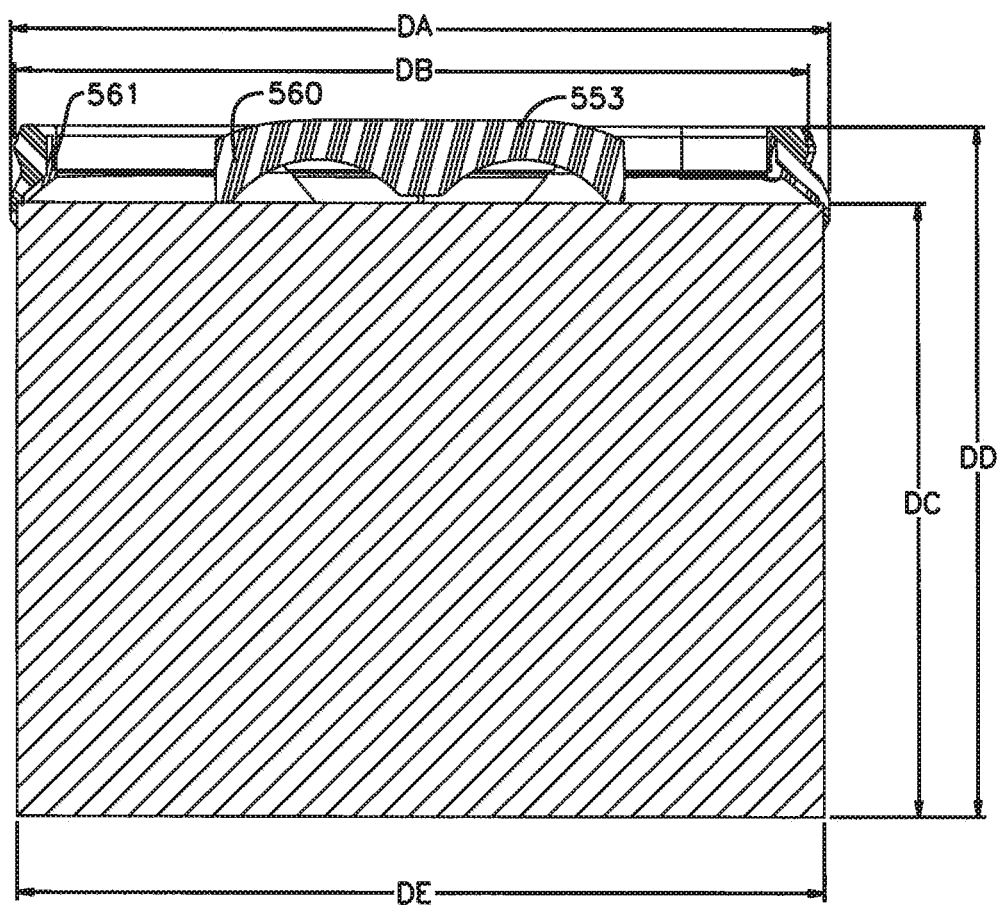
FIG. 41 is a schematic cross-sectional view taken along line 41-41, FIG. 40.
Figure 42:
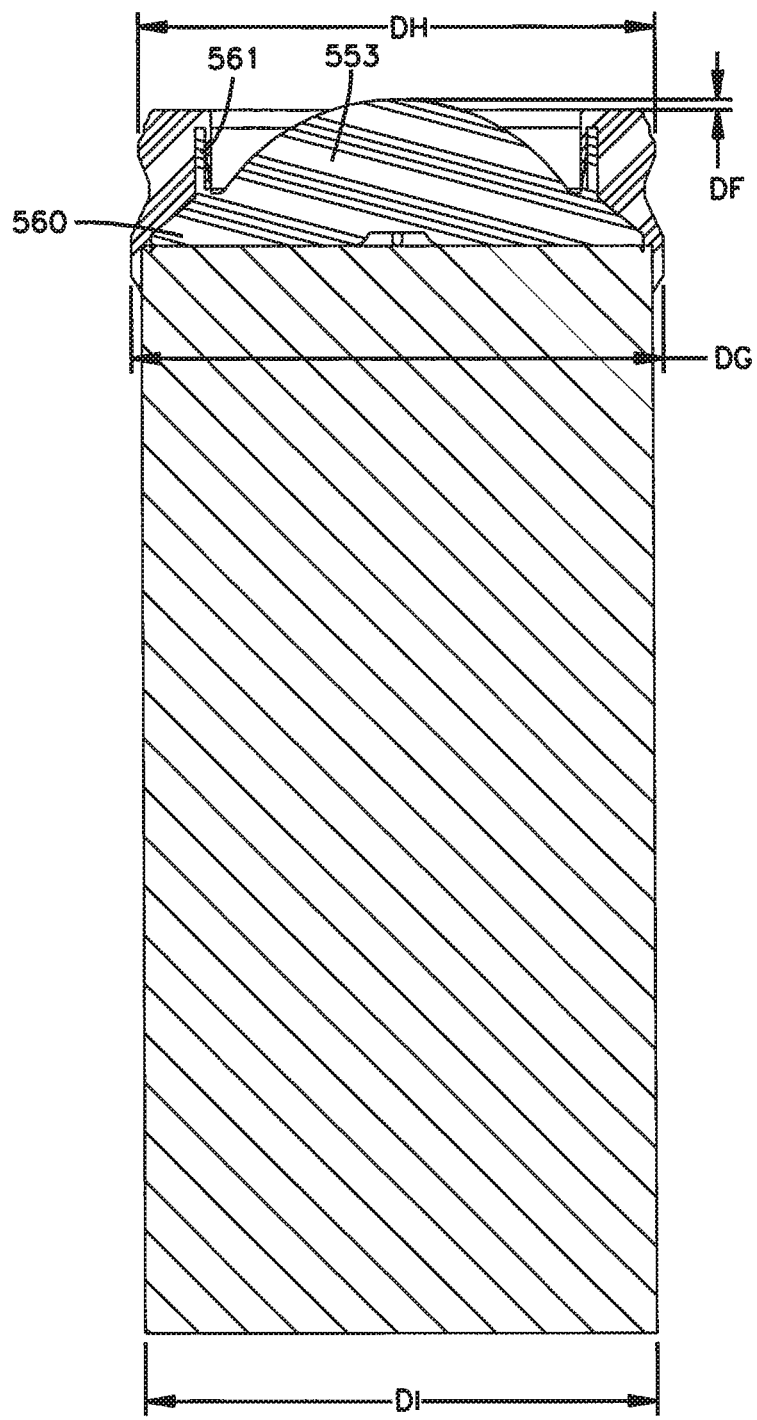
FIG. 42 is a schematic cross-sectional view taken generally along line 42-42, FIG. 40.

In FIG. 40, a plan view taken toward flow end 559 is depicted. In FIG. 41, a cross-sectional view taken along line 41-41, FIG. 40 is shown. In FIG. 42, a cross-sectional view taken along line 42-42, FIG. 40 is shown. In these figs, preform 560 can be seen with seal support 561

Figure 43:
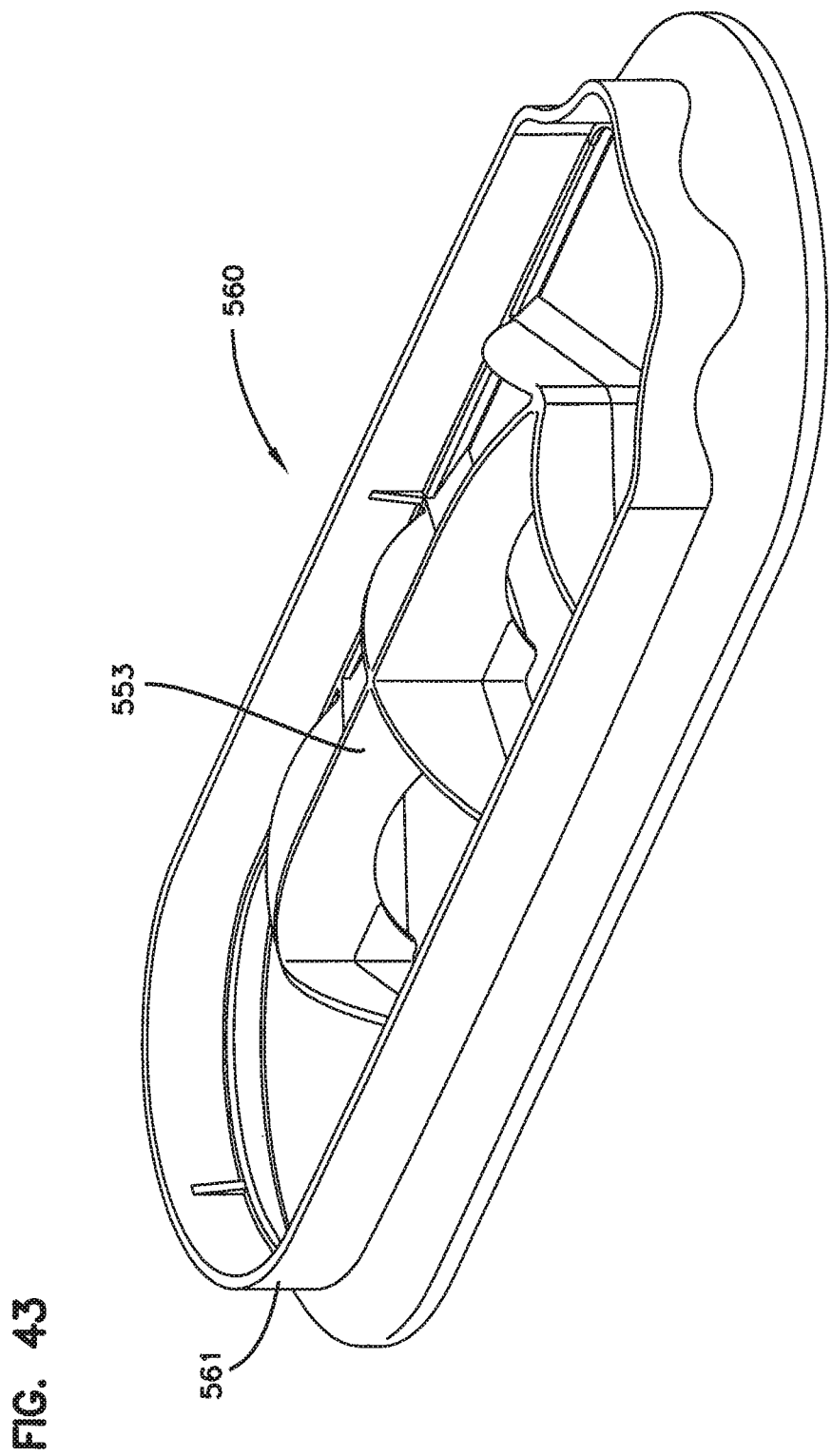
FIG. 43 is a schematic perspective view of a preform seal support component of the filter cartridge of FIG. 39.
Figure 44:
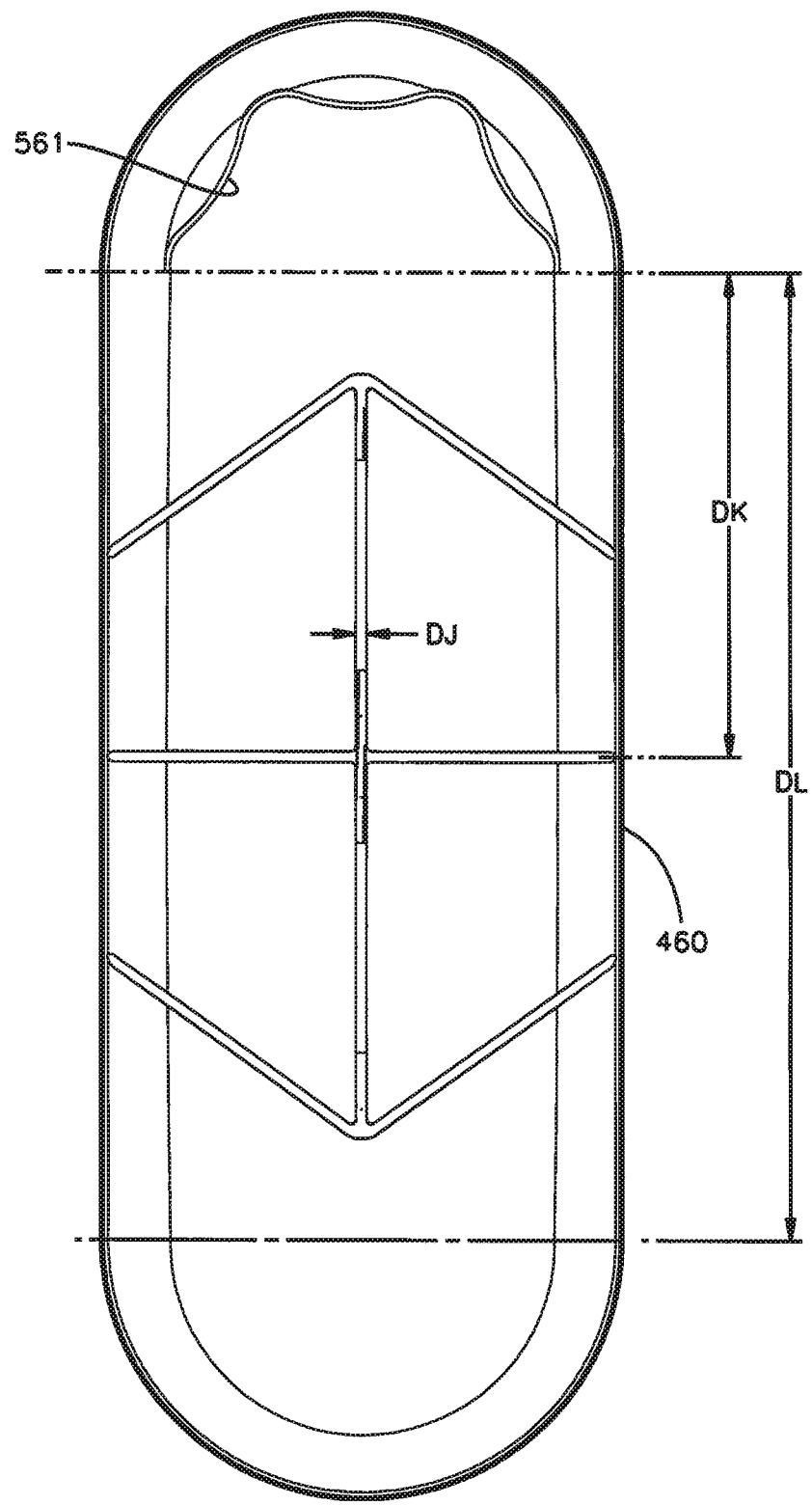
FIG. 44 is a schematic plan view of the preform of FIG. 43.

In FIG. 43, the preform 560 is shown in perspective. In FIG. 44, a plan view is shown taken toward an end opposite flange 561. In FIG. 45, an opposite plan view, toward flange 461, is shown. In FIG. 46, a cross-sectional view taken along line 46-46, FIG. 45 is shown.

In the drawings of the example of FIGS. 43-46, some dimensions are indicated. These are meant to be examples and would correspond to the following. In FIG. 40, CX=23.6 mm radius; CY=26.4 mm radius; CZ=30°; and, CRC=50 mm radius; in FIG. 41, DA=332 mm; DB=321.7 mm; DC=250 mm; DD=281.1 mm; and, DE=327 mm; in FIG. 42, DH=118.4 mm; DF=2.4 mm; DG=122 mm; and, DI=117 mm; in FIG. 44, DJ=2.4 mm DK=105 mm; and, DL=210 mm; in FIG. 45, DO=112.9 mm; DP=30°; DQ=30°; DR=11.1 mm radius; and, DS=38.9 mm radius; and DT=322.9 mm; and, in FIG. 46, DM=28.3 mm; and, DU=34.8 mm.

Of course alternatives are possible, using principles in accord with the techniques described.

D. An Example Air Cleaner Assembly, FIGS. 47-56

In FIGS. 47-56, an example air cleaner assembly is depicted, usable with the main filter cartridge having seal characteristics similar to those described above in the embodiments of FIGS. 35-38 and/or FIGS. 39-45.

Figure 47:
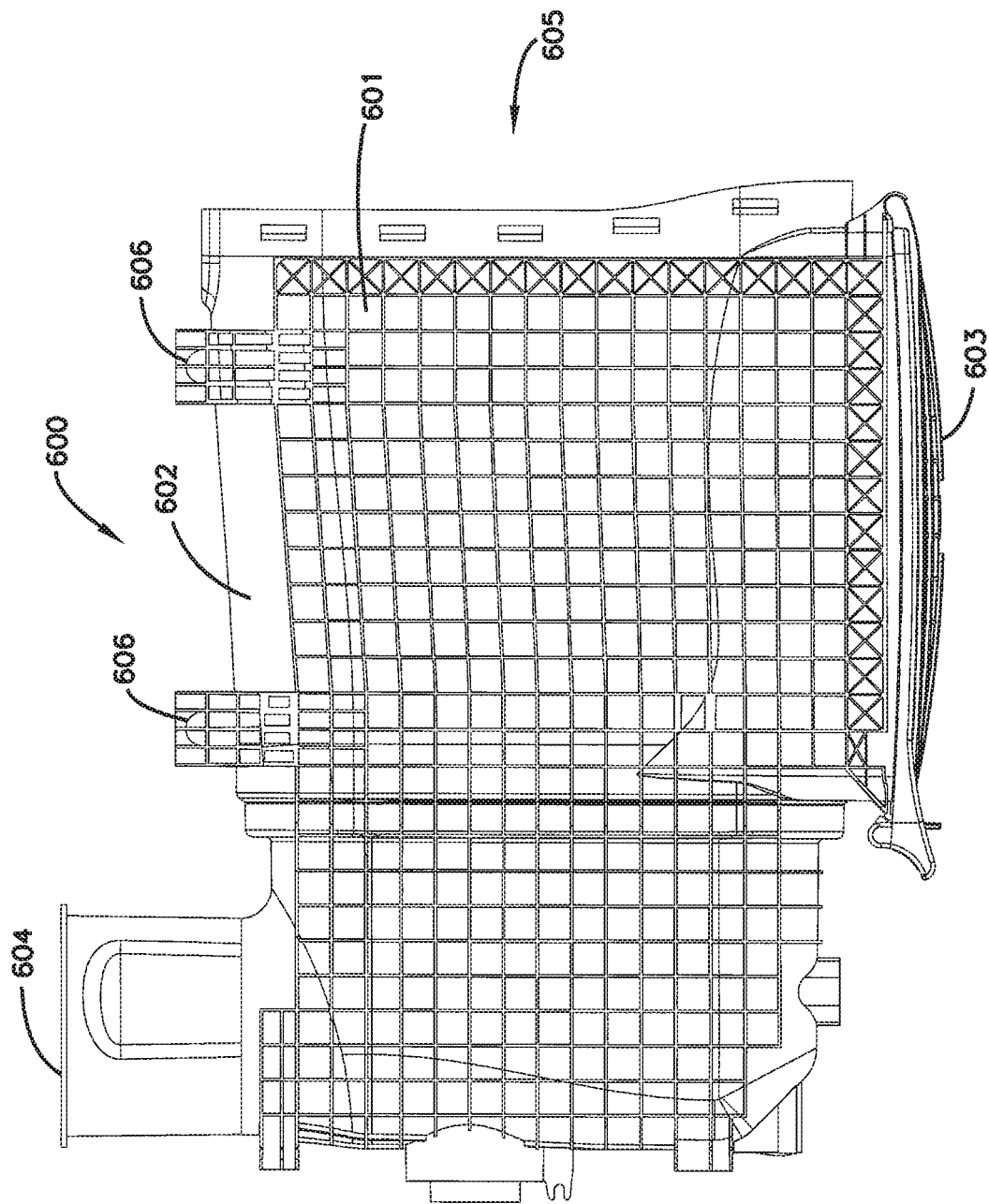
FIG. 47 is a schematic side elevational view of an air cleaner assembly including a filter cartridge and having features in accord with the present disclosure.

Referring to FIG. 47, an air cleaner assembly in accord with this portion of the disclosure is indicated generally at 600. The air cleaner assembly 600 comprises a housing 601 including a housing body 602, and service access cover 603.

In the example of air cleaner assembly 600 depicted, as will be understood from discussion below, a variation from a previously described housing 401 (FIG. 14) is shown in the access cover 603 is not removed from the housing body 602, when the access cover 603 is opened. Rather, it remains secured to the housing body. Alternatives are possible; and, the variation can be used with the assembly 400, FIG. 14.

Still referring to FIG. 47, other features viewable include a filtered air flow outlet arrangement 604, by which filtered air leaves the housing to be directed downstream equipment. Air to be filtered would generally enter the housing through an inlet at end 605. At 606, optional mounting pads are shown to facilitate mounting to equipment in use. The pads 606 can be located in a variety of locations, to facilitate securement.

From the orientation depicted in FIG. 47, no specific characterization is meant with respect to how the whole housing 601 and overall assembly 600 will be oriented in use. The assembly 600 could be positioned with the side view facing the view in FIG. 47 directed upwardly or downwardly. However, it could also be oriented with outlet 604 directed upwardly or downwardly.

Figure 48:
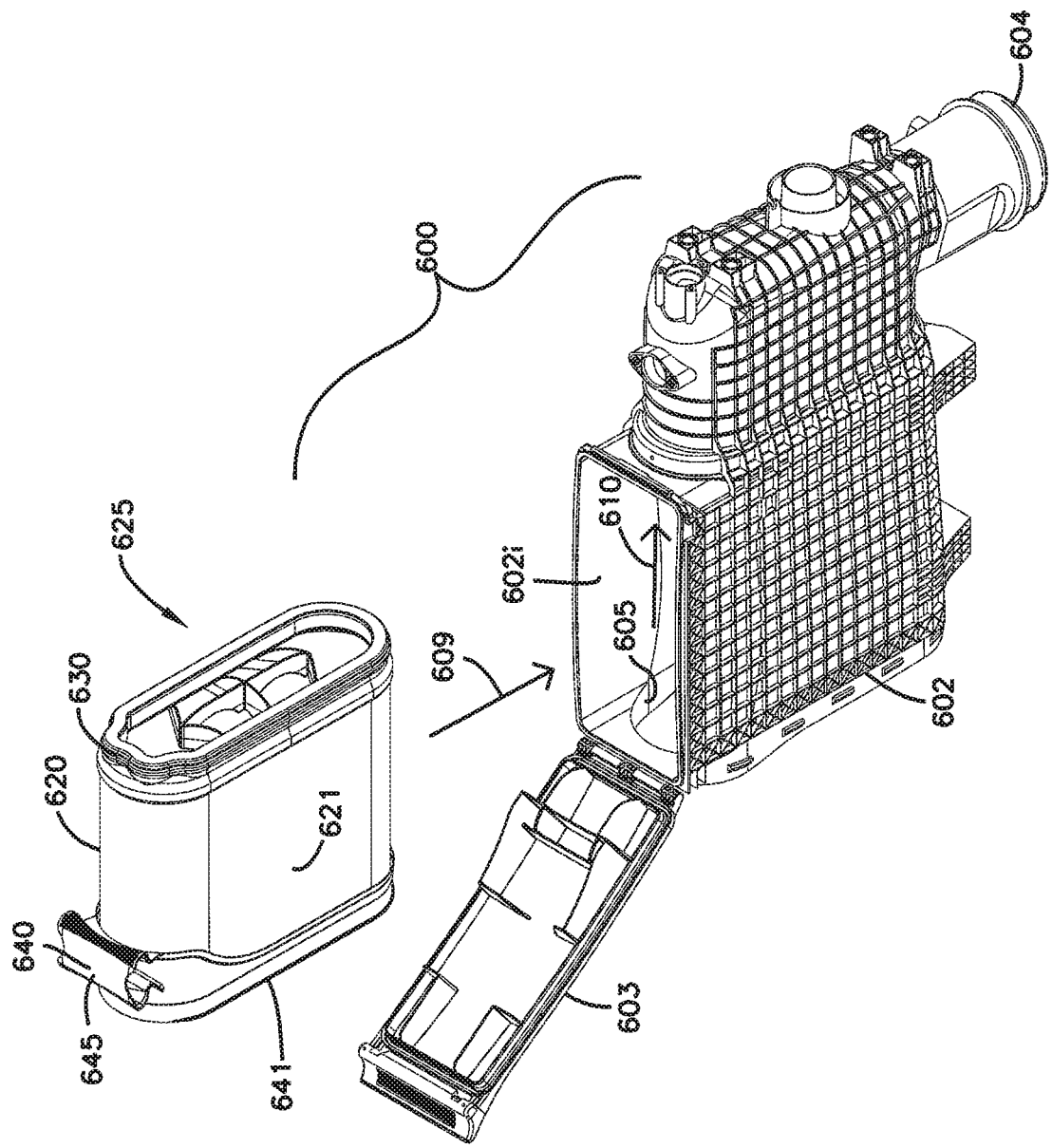
FIG. 48 is a schematic, exploded, perspective view of the air cleaner assembly of FIG. 47.

In FIG. 48, an exploded view of air cleaner assembly 600 is depicted with the access cover 603 pivoted open. An internally received cartridge 620 is shown exploded from interior 602*i* of body 602. From a review of FIG. 48, it can be understood that the example air cleaner assembly 600 depicted is a "side load" assembly that term is used herein. That is, the cartridge 620 is inserted into and removed from the housing body 602 through a side thereof, in between inlet 605 and outlet 604. This means, generally, that two types of movements to the cartridge 620 are needed during installation. In a first, see arrow 609, direction generally perpendicular to air flow through the cartridge 620, the cartridge 620 is inserted into the housing body 602. In a second, see arrow 610, the cartridge is pushed into a direction of flow therethrough in a sealing orientation with the housing. This type of side load is described in principle in connection with U.S. Pat. Nos. 7,396,375 ; 7,655,074; 7,905,936; 7,713,321 and 7,972,404, incorporated herein by reference.

Figure 50:
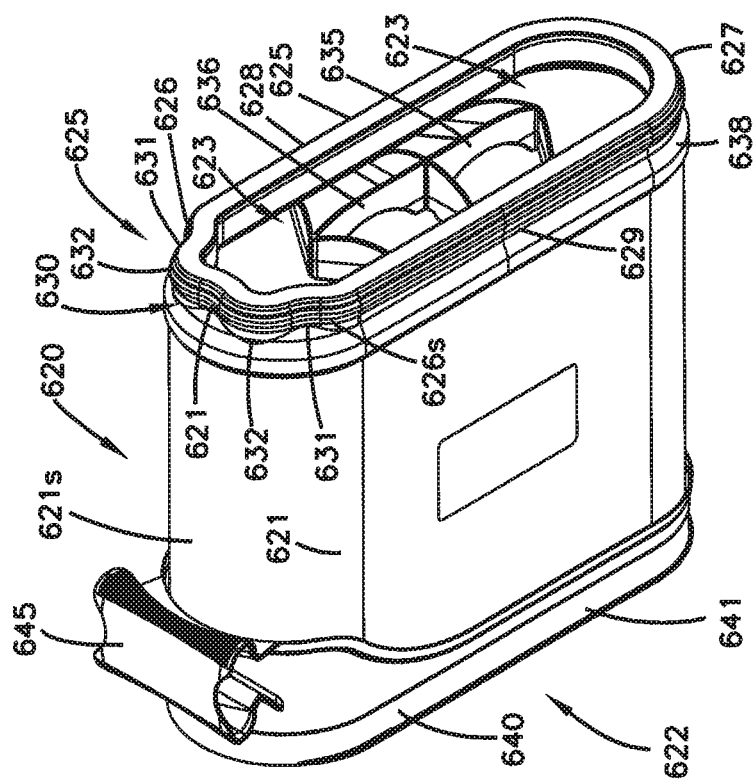
FIG. 50 is a seal end perspective view of the filter cartridge of FIG. 49.
Figure 49:
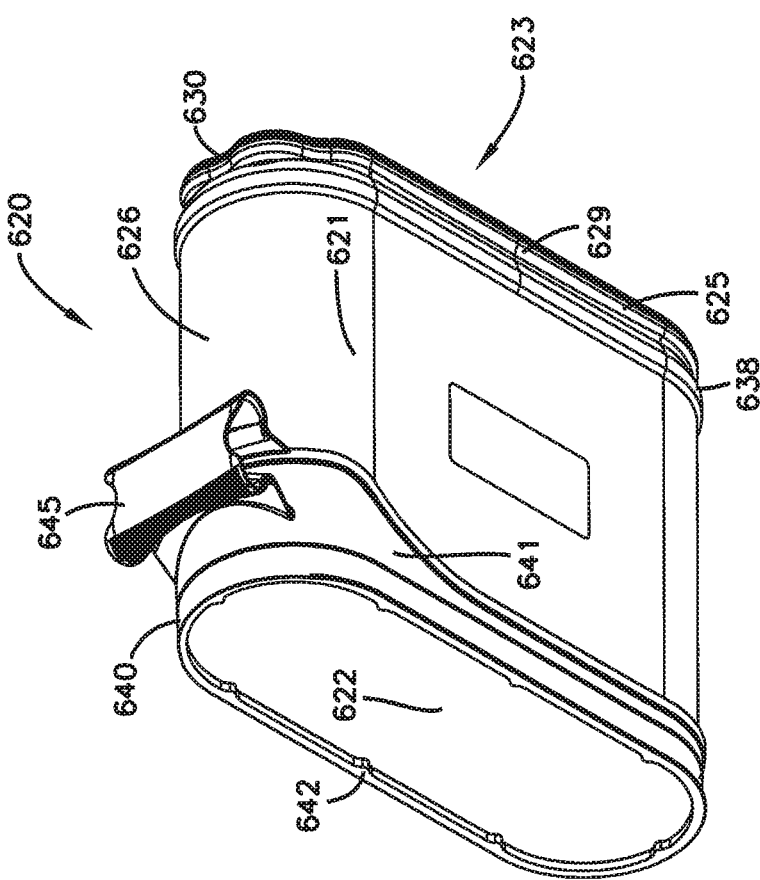
FIG. 49 is an inlet end perspective view of the filter cartridge of FIG. 48.

In FIGS. 49 and 50, perspective views of the cartridge 620 are shown. The cartridge 620 can be seen as comprising a media pack 621 having opposite flow ends 622, 623.

At flow end 623, a seal arrangement 625 is depicted. The seal arrangement 625 can be generally in accord with seal arrangement 552, FIGS. 39-40, although variations can be used. Thus, it includes a seal member 626 forming a seal surface 626*s* configured to form an outwardly directed radial seal; the seal surface 626*s* having a perimeter shape with an arcuate, semi-circular, curved end 627; opposite straight side sections 628, 629; and, a curved end, opposite end 627, at 630. End 630 comprises a wavy or projection/recess configuration having three recess sections 631 and two projection sections 632. At end 623, a seal support preform 635 including a handle portion 636 and a support region 637 (FIG. 53) to support the seal, is shown.

The seal arrangement 625 can be secured in place by an over mold at 638, FIG. 49, of a type similar to those described above.

Referring to FIGS. 49 and 50, at flow end 622, a second preform 640 is depicted having: a band portion 641 surrounding the media 620; an end rim portion 642 extending over a portion of end 622; and, an installation handle arrangement 645. The particular handle arrangement 625 is positioned in overlap with a curved end 621*a* of the oval media pack 621.

It is noted that in the particular example arrangement depicted, the handle arrangement 645 is aligned with the same curved end 621*a* of the media pack 621 as is the wavy (projection/recess) end section 630 of the seal surface 626*s* discussed previously. Advantages from this are discussed below, although alternatives are possible.

Figure 51:
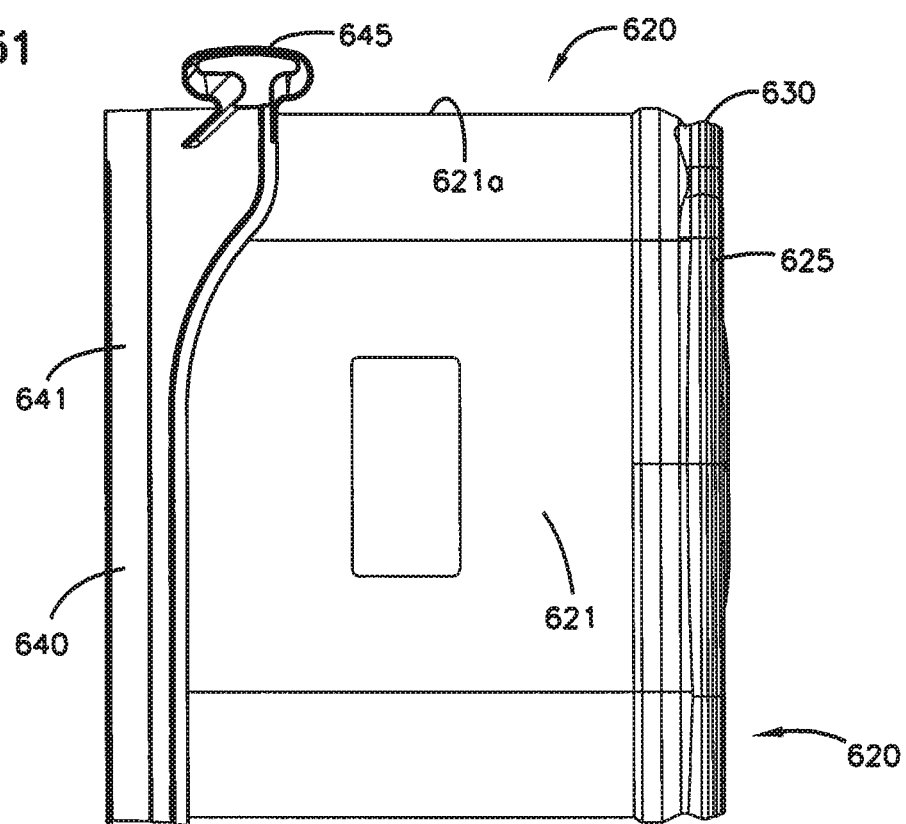
FIG. 51 is a schematic side view of the filter cartridge of FIG. 49.
Figure 52:
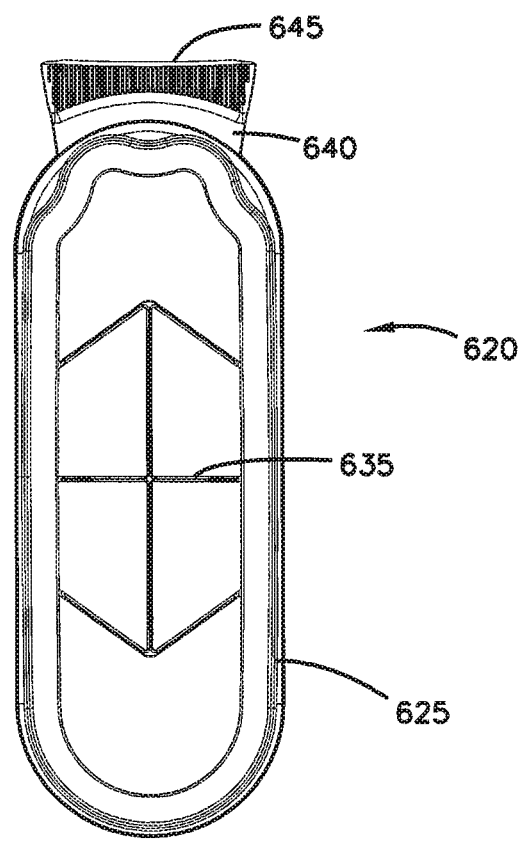
FIG. 52 is a schematic outlet end elevational view of the filter cartridge of FIG. 49.

In FIG. 51, a side elevational view of filter cartridge 620 provided with features as described is indicated. In FIG. 52, and end view taken toward end 623 is shown, with features discussed as indicated.

Figure 53:
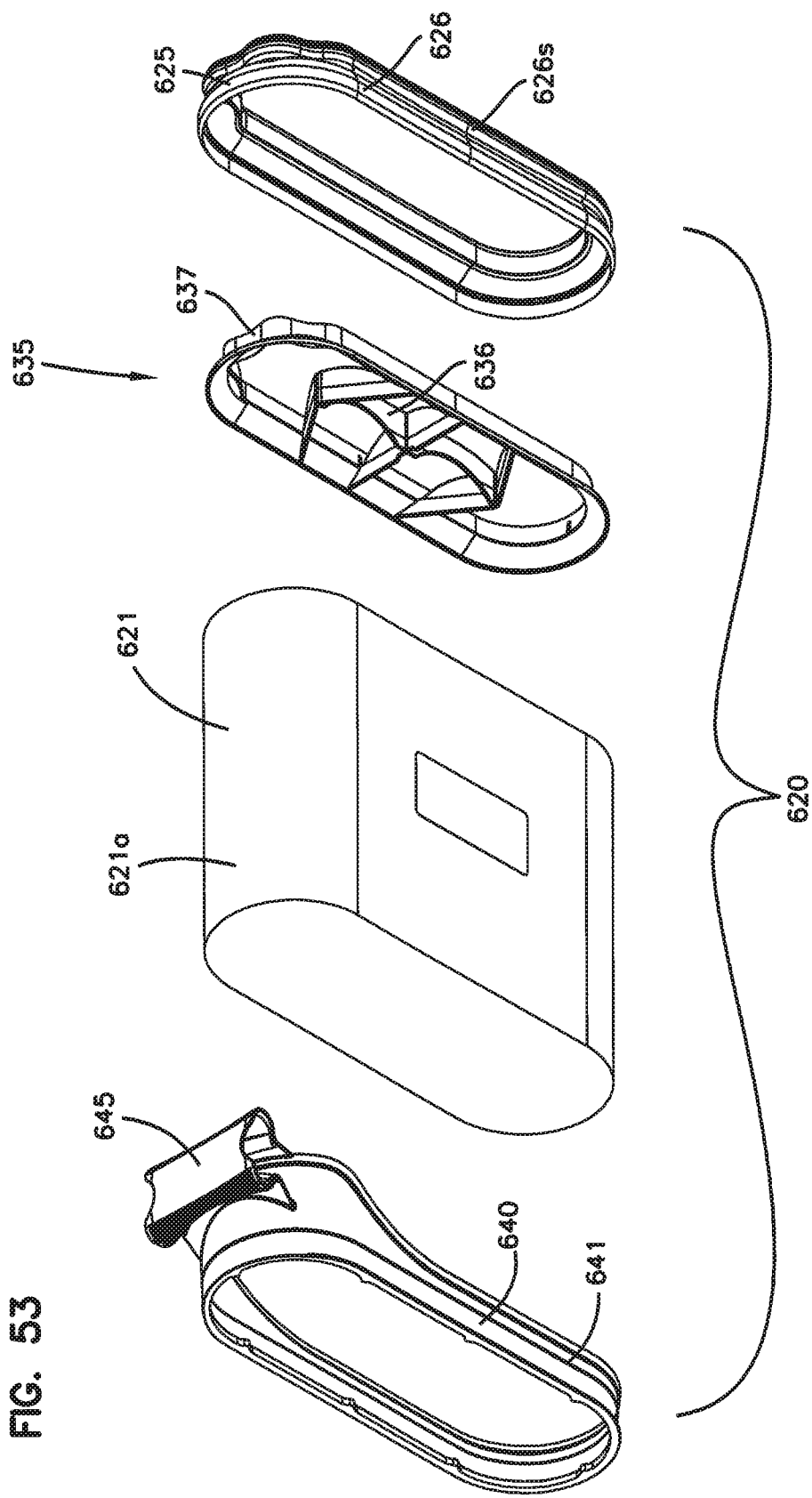
FIG. 53 is a schematic exploded inlet end perspective view of the filter cartridge of FIG. 49.
Figure 54:
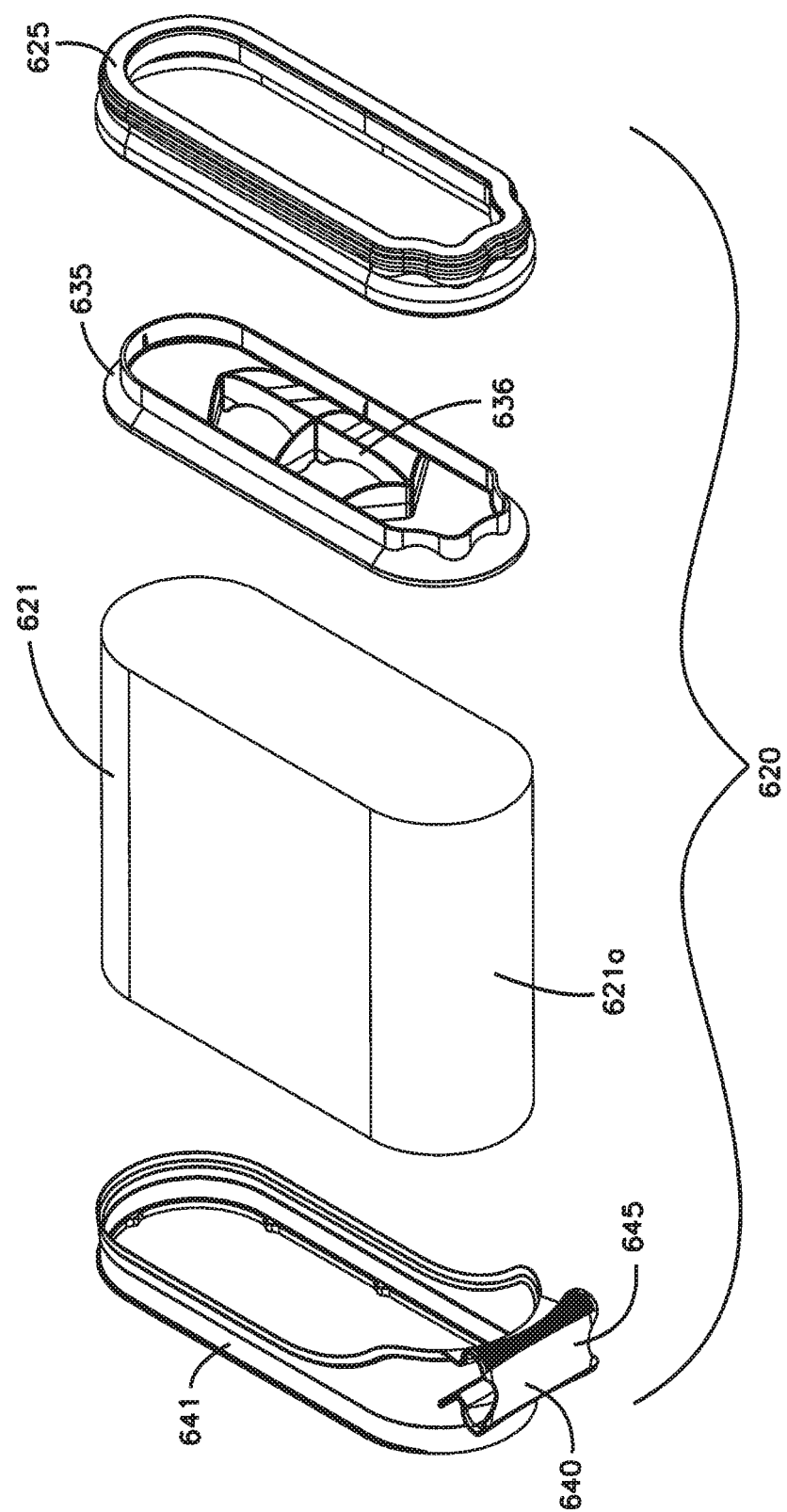
FIG. 54 is a schematic outlet end exploded perspective view of the filter cartridge of FIG. 49.

In FIG. 53, an exploded view is shown, with features as indicated. In FIG. 54, an alternate schematic exploded perspective view analogous to FIG. 53 is shown.

As will be understood from a review of FIG. 48, the handle arrangement 645 is positioned to facilitate installation when oriented adjacent the same curved end 621*a* of the media pack 621 as is the wavy section 630. This is because during a side installation, the end arcuate section 627 of the seal arrangement opposite the arcuate wavy (projection/recess) section 630 can be first nested, or partially nested, with the user then manipulating the handle 645 to fully engage the seal, and complete the installation. In this type of operation, the non-wavy arcuate section 627 of the seal opposite the wavy section 630 facilitates installation.

Figure 55:
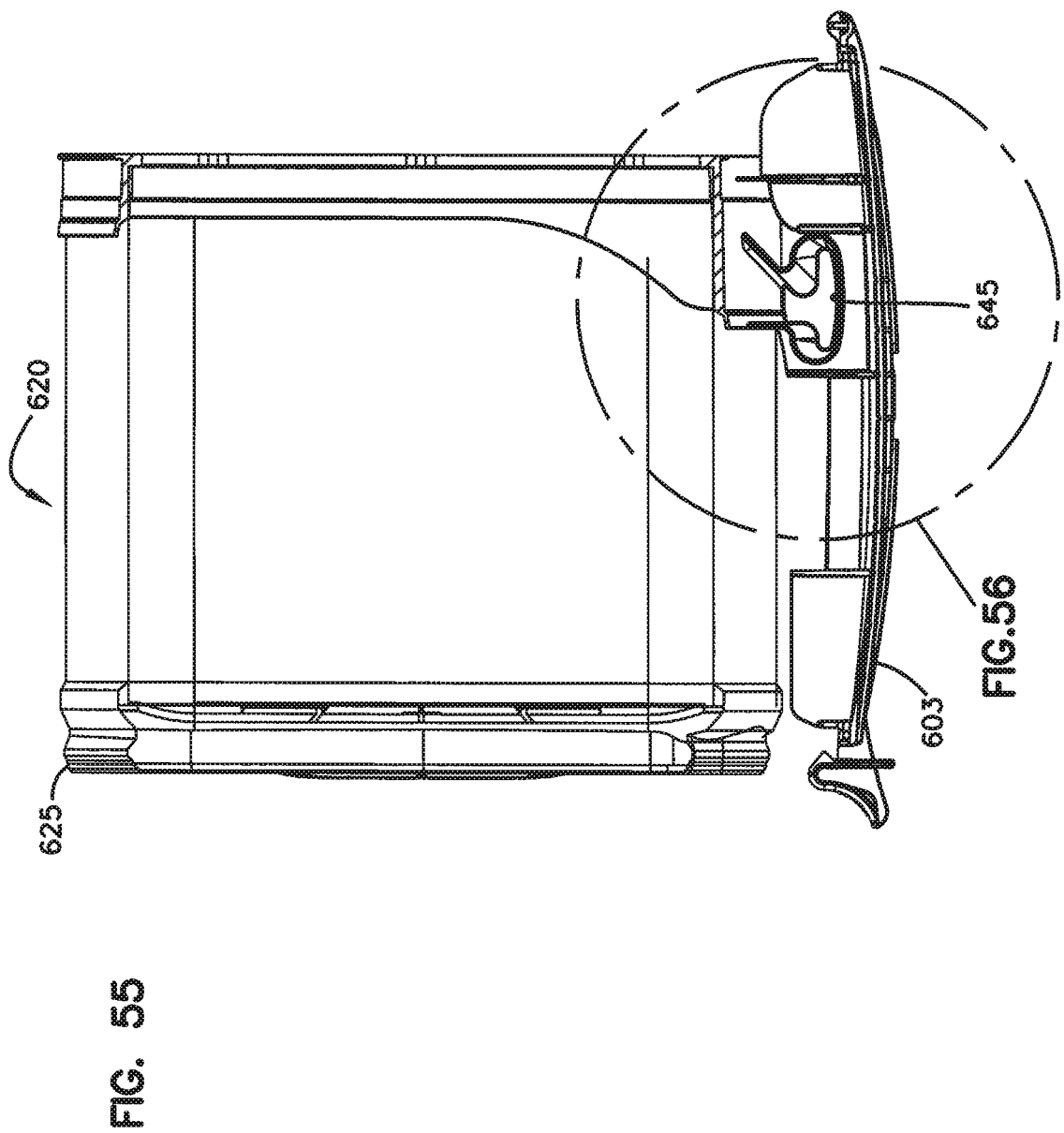
FIG. 55 is a schematic fragmentary partial cross-sectional view depicting selected internal detail of the air cleaner assembly of FIG. 47.
Figure 56:
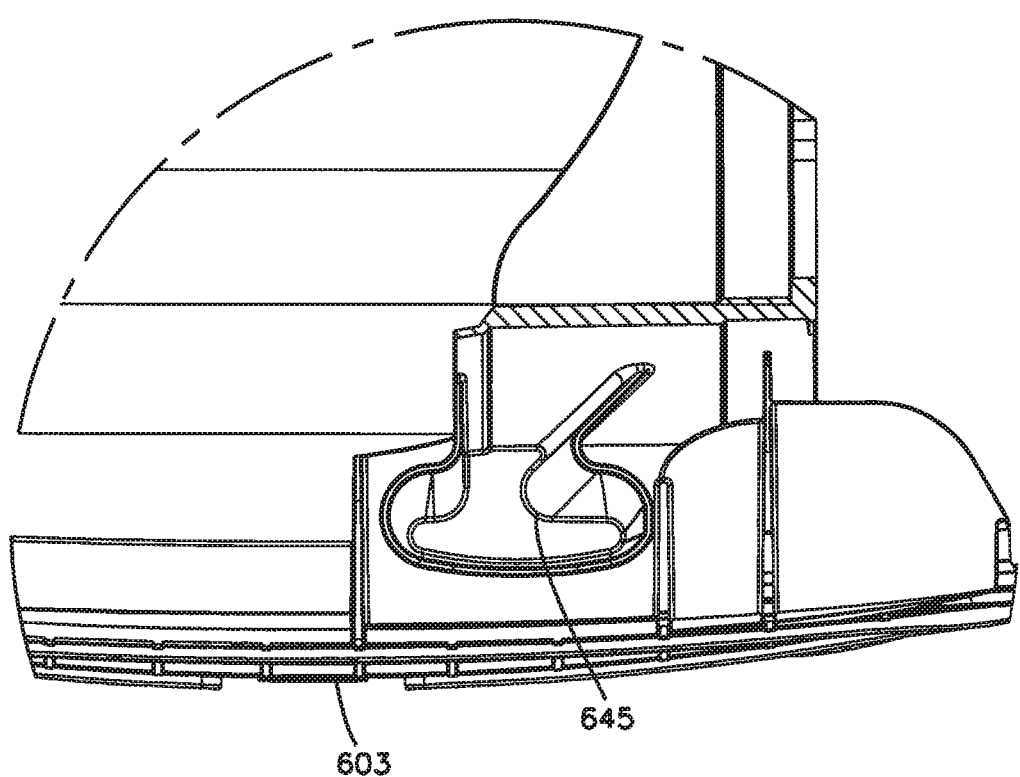
FIG. 56 is an enlarged fragmentary view of an identified portion of FIG. 55.

It is noted that the handle arrangement 645 can also be used as a part of a projection arrangement to be engaged by the access cover 603 securing the cartridge in position. An example of this is shown in FIGS. 55-56. The access cover 603 can, thus, have a variety of features that help support the cartridge 620 against undesired movement during installation.

E. Some Useful Variations and Alternatives, FIGS. 57-59

The principles described herein in connection with the various embodiments of the previous Figs. can be applied alternatively. For example, as indicated, outwardly directed radial seals as shown can be used. Alternately, as indicated, inwardly directed radial seals can be used. Indeed, in some instances, both types of seals can be used.

In the examples depicted, the seal arrangements shown are of a type that engage a surrounding portion of housing structure. The seals can be formed through installation into a trough or other receiving arrangement in a housing, in use.

Figure 57:
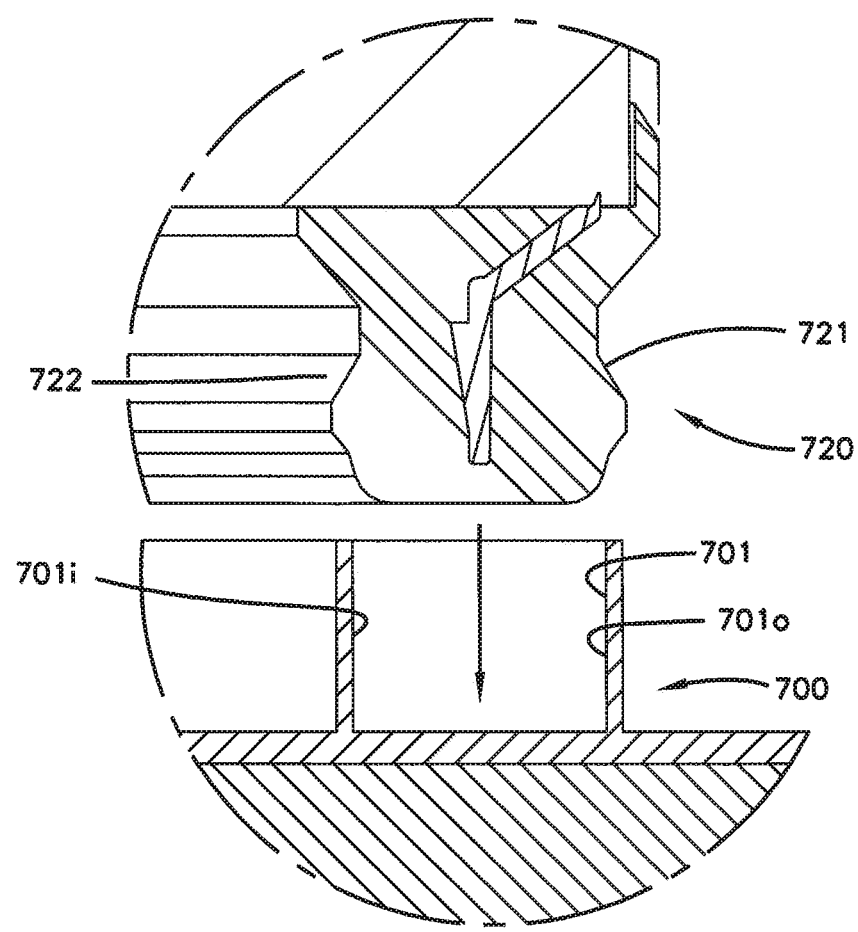
FIG. 57 is an enlarged, exploded, fragmentary view depicting a variation in a seal arrangement using principles according to the present disclosure, engaging a variation in a housing seal structure using principles in accord with the present disclosure.

The above principles can be understood, for example, from the fragmentary, schematic view of FIG. 57. The housing structure arrangement 700 is depicted, comprising a receiving trough 701 for a seal arrangement during use. In FIG. 57, a seal arrangement 720 is shown insertable into the trough 701. The seal arrangement 720 may comprise a radially outwardly directed seal member or surface 721 as shown, for engagement with an outer flange 701o on the trough 701. Alternatively, or in addition, the seal arrangement 720 can comprise a radially inwardly directed seal surface 722 oriented and configured to engage an inner surface or flange 701i of trough 701 in use.

Thus, from a review of FIG. 57, it can be understood that either or both of an outwardly directed radial seal or an inwardly directed radial seal can be used with a trough 701. It is noted that if only one is used, an opposite side of the seal arrangement can still be configured to engage a relevant surface in the trough 701, but not necessarily the seal, to provide stability.

Figure 58:
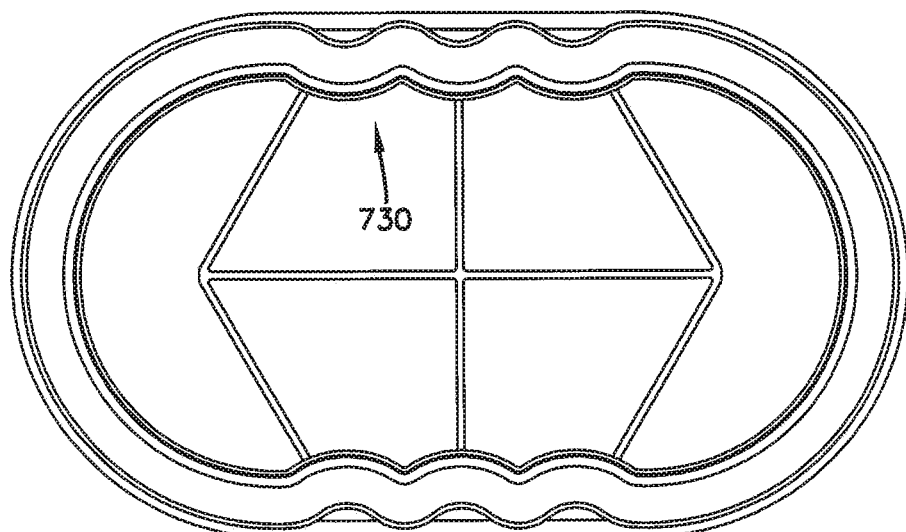
FIG. 58 is a schematic plan view of an alternate seal arrangement using principles in accord with the present disclosure.

In FIG. 58, a seal arrangement having an inwardly directed radial seal at 730 is shown.

Figure 59:
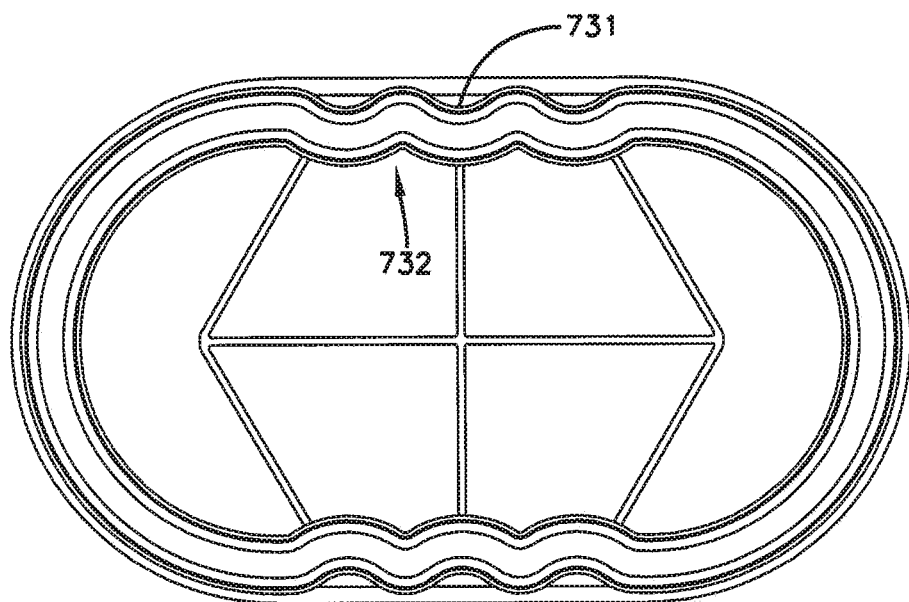
FIG. 59 is a schematic plan view of a further alternate seal arrangement using principles according to the present disclosure.

In FIG. 59, a seal arrangement having both an outwardly directed seal arrangement 731 and an inwardly directed seal arrangement 732 is shown.

The variations discussed in this section can be implemented with any of a variety of specific features, and in any of the embodiments characterized previously.

VI. Some General Principles, Comments and Observations Relating to FIGS. 14-61

Figure 60:
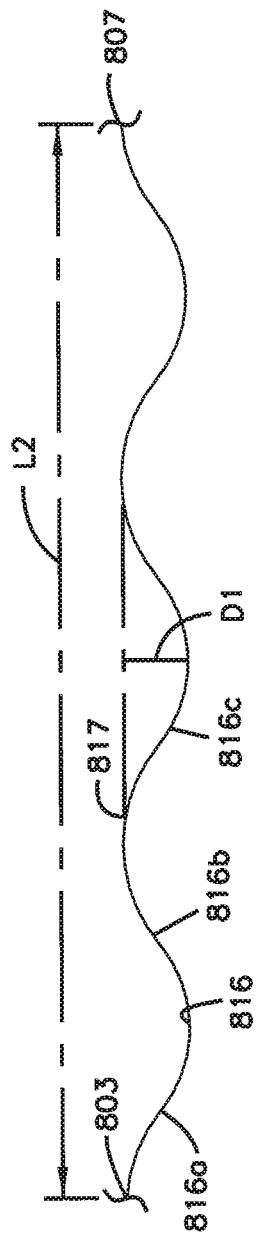
FIG. 60 is a schematic depiction of a wavy seal surface section definition of a cartridge in accord with FIG. 24.
Figure 61:
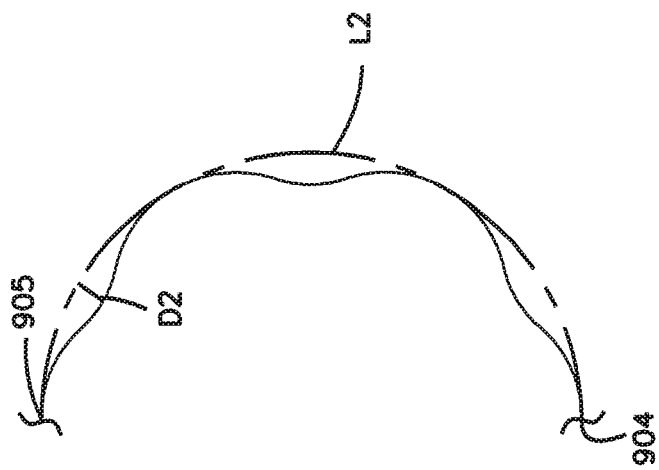
FIG. 61 is a schematic, arcuate, wavy seal surface section of a cartridge in general accord with the principles described above herein in connection with FIG. 40.

A. General; FIGS. 60 and 61

The examples characterized above in connection with FIGS. 41-59 show that the general principles characterized herein can be applied in a variety of forms of filter cartridges and air cleaner housings. In this section some general observations of typical and preferred arrangements are characterized.

FIG. 60 is a schematic representation of a (non-arcuate) but wavy (projection/recess) seal surface section usable in selected arrangements according to the present disclosure. FIG. 60 can be viewed as a schematic representation of a perimeter portion of a wavy seal surface section of the example of FIG. 24.

FIG. 61 is of an arcuate wavy (projection/recess) surface section usable in selected arrangements according to the presented disclosure. FIG. 61 is generally analogous to FIG. 60; and, it can be viewed as an indication of a perimeter portion of the wavy seal surface section of the example of FIG. 40.

B. Selected General Features of Example Embodiments Described Thus Far and/or Shown in U.S. Provisional 62/543,090, Incorporated Herein by Reference In a typical application of the techniques characterized, with straight through flow configurations, an air filter cartridge can be provided that includes a media pack comprising filter media and having first and second, opposite flow ends. A first of the first and the second opposite flow ends can comprise an outlet flow end, with the opposite end being an inlet flow end. The media pack will be configured with the media oriented to filter air flowing into the inlet flow end prior to that air exiting the opposite outlet flow end. A variety of types of media are characterized and a variety of shapes and configurations can be used. Such cartridges (for example) are included in the cartridge depictions of FIGS. 15, 16, 23, 39, and 48.

A housing seal arrangement is positioned on the media pack. The housing seal arrangement will typically be positioned on (or at) one of the two flow ends. In many instances it will be at the outlet flow end; but alternatives are possible. Examples of cartridges with the seal arrangement on a flow end are included in the depictions of FIGS. 15, 16, 23, 39, and 48.

The housing seal arrangement generally comprises a radially directed seal member defining a radial seal surface oriented to releasably, sealingly, engage air cleaner structure in use. The housing seal arrangements are typically configured to define an air flow passageway in overlap with a media flow pack, and the radial seal surface extends around the air flow passageway. Examples of such cartridges are included in the depictions of FIGS. 15, 16, 23, 39, and 48.

The radial seal surface may face the flow passageway, if the seal is an inwardly directed radial seal; or, it may face away from the air flow passageway if the seal is a radially outwardly directed seal, in the terms used herein. Arrangements with 2-sided seals (both radially outwardly and radially inwardly) are also possible, as described above.

The radial seal surface will generally be characterized as defining a perimeter-direction in extension around the flow passageway. The term "perimeter-direction" is meant to refer to the extension of the seal surface as it goes around the inner or outer perimeter of the seal surface material and the air flow passageway, in a perimeter direction, (depending on whether the surface is inwardly or outwardly directed).

In many applications, a typical seal surface includes at least a first arcuate seal section preferably configured to "radially sealingly engage non-wavy (a non-projection/recess) air cleaner structure", although alternatives are possible. By this, and similar terms, it is meant that the seal surface is configured in this region so that if installed in an air cleaner, it will seal to a non-wavy (or non-projection/recess) surface of a corresponding housing region (structure). This does not necessarily mean that the seal surface (on the cartridge) in the first arcuate seal surface (on the cartridge) section is completely devoid of any one or all localized projections or recesses therein. Rather, it is meant that if it does have any such features, on the seal surface of the cartridge, they are preferably sufficiently small so as not to interfere with sealing, when the housing structural region seal against which sealing occurs, does not itself have wavy sections (projections and/or recesses), in the corresponding region. Example cartridges with such first arcuate sections are shown in FIG. 24 (see section 801) and in FIG. 40 (see section 901).

Although alternatives are possible, in certain examples, the first arcuate seal surface section extends over an internal arc (between opposite arc ends) of at least 130°, usually not greater than 270°, and typically extends over an arc: within the range of 150°-210°, inclusive; often within the range of 160°-200°, inclusive, and typically an arc of 170°-190°, inclusive. Often the first arcuate seal surface will extend over an arc (between arc ends) of 180°.

It is noted, however, that non-wavy (non-projection/recess) sections in arc can extend over relatively short arcs, for example arcs that extend at least 20°, typically at least 30°, often at least 40°, and often no more than 110°, in some instances, not more than 180°. Examples of these are suggested by descriptions herein below, relating to later figures.

In the example of FIG. 24, arcuate ends, of the first arcuate section 801, are indicated at 802, 803; and the first arcuate section 801 extends over an arc of 180°. In the example of FIG. 40, the first arcuate end 901 extends over an arc between the ends 902, 903 and can be characterized as a 180° arc. It is noted that, in accord with terminology used thus far, the arcuate section 901 in FIG. 40 would not be considered to extend over an arc between end points 904, 905, with the arc still being characterized as 180°, but having straight sections therein. This is because, although a first arcuate section can include straight sections therein, in some instances, the arc ends will typically be considered to be the final end points where various curve sections (within the first arcuate section) end, in the overall length extension of the arc. Thus it is, the end points 902, 903 that are at opposite ends of the first arcuate section as defined by one or more curved sections therein.

In the cartridge of FIG. 24, a first wavy (projection/recess) seal section can be understood as identified by either section 806, between end points 803, 807; or, as wavy seal (projection/recess) section 808 between end points 802, 809 (the other indicated wavy seal section being a second wavy (projection/recess) seal section). In the example of FIG. 40, the first wavy (projection/recess) seal section can comprise section 906 extending between end points 904, 905. In FIG. 60, a schematic representation corresponding to section 806, FIG. 24 is shown; and, in FIG. 61, a schematic representation of a wavy (projection/recess) section in accord with section 906, FIG. 40 is shown.

When the term "first arcuate seal surface" is used in this context, it is not meant to be implied or suggested that the arcuate seal surface defines a circular arc, unless it is otherwise stated, for example, by characterizing it as "circular" or as having a radius of some amount. (Even then, very minor variations from circular are intended to be included within the term unless otherwise stated).

Typically, in arrangement described thus far, the seal surface includes at least a first wavy (projection/recess) seal surface section including a radially directed portion comprising an alternating radial projection/recess configuration; that is a configuration having alternating radial projections and radial recesses therein. Typically, variations are possible and some of these are characterized below.

Herein, the term "radial projection/recess configuration" and variants is meant to generally characterize a "wavy" construction of alternating recesses and projections in a region. The term is not meant to indicate (in extension from an end of the section), which occurs first, a projection or recess. Thus, the term "projection/recess" configuration herein has the same meaning as "recess/projection" configuration. The term "wavy" in this context is meant to indicate alternating projections and recesses without specific additional characterization of the nature of the shape of those recesses and projections; and, is not meant to indicate whether all recesses are of the same shape (or size) and whether all projections are of the same shape (or size), unless otherwise stated. In the example of FIG. 40, a radius of the first arcuate section 901 is indicated generally by dimension 915. Radii of the various alternating recess and projection sections of the wavy section 906 are indicated by 916, 917, 918, 919 and 920.

The first arcuate seal surface, in many arrangements according to the present disclosure, is typically an arcuate seal surface section that has a non-wavy (non-projection/recess) configuration in complete perimeter-direction extension around the corresponding internal arc, see for example, FIGS. 24 and 40. In some instances, if it does have any small projections or recesses therein, typically and preferably such recesses or projections do not cause a variant in the curve of the arc, relative to opposite sides of the variation, of more than about 2 mm, and typically no more than about 1 mm. By this, it is meant to be understood that even a non-wavy (non-projection/recess) section of seal surface can have some small projections, recesses, or projection/recess configuration to it, as long as such is sufficiently small so as not to interfere with radially sealing to a non-wavy (non-projection/recess) housing section.

Herein, the term "perimeter-direction seal surface length" is mean to refer to a length dimension in the perimeter-direction, of the radial seal surface, or some identified section of the radial seal surface. That is, the reference is meant to a direction of extension to the seal surface around the air flow passageway that is surrounded by the seal member.

Although alternatives are possible, and as for the arrangements depicted and described above, typically, the first arcuate seal surface section has a first total perimeter seal direction surface length of at least 5% of a total perimeter-direction seal surface length of the entire radial seal surface; often it is at least 10% of that distance, and usually at least 15% of that distance, see for example, FIG. 24. Also, typically and preferably, the first arcuate seal surface has a first total perimeter-direction seal surface length of no more than 90% of a total perimeter-direction seal surface length and often is no more 80% of that length. Examples of this are provided by at least the cartridges of FIGS. 24 and 40.

Although alternatives are possible, typically, the first wavy (projection/recess) seal section has a first total perimeter-direction seal surface length of at least 5% of a total perimeter-direction seal surface length of the radial seal surface, typically at least 10%, and often at least 15%; and, typically no more than 90%, often no more than 80% thereof, see the example of FIG. 24 and the variation of FIG. 40.

Typically, the first arcuate seal surface section can be characterized as having a first open perimeter-direction surface length X1. This is meant to reference a distance of extension of the seal surface, in the perimeter-direction between end points of the first arcuate seal surface section. The first wavy seal section can be characterized as having a first total perimeter-direction seal surface length of X2. In many applications according to the present disclosure, a ratio of X1 to X2 will be at least 0.8, often at least 1.0, and usually at least 1.50. In many instances the ratio of X1 to X2 will be no greater than 6.0, often no greater than 4.0, and in many instances within the range of 1.0 to 3.0, although alternatives are possible. In the example cartridge of FIG. 24, the first arcuate section perimeter-direction length X1 will be the seal surface length between end points 802, 803 of the first seal surface section 801. In the same example of FIG. 24, X2 would be the distance between end points 803, 807 over the first corresponding wavy seal section 806, 808. In the example of FIG. 40, X1 would correspond to the distance between end points 902, 903 over the first arcuate seal surface section 901; and, X2 would correspond to a length between the end points 905, 906 of the first wavy seal section 906. Herein, the terms "distance", "length", and variants thereof, in this context, is meant to reference a seal surface distance, including contours (i.e. not necessarily a direct, shortest, line distance).

Herein, it is not necessarily meant that the projections or recesses in the projection/recess configuration are curved, unless it is so stated. Also, it is not meant that they are curved to a circular definition, unless it is so stated or suggested by a definition of a radius of curvature. Thus, when the term "radius of curvature" is used, it is meant that the shape is substantially circular, and thus it may be mathematically circular or varied therefrom only slightly.

Typically, for arrangements such as those previously described, at least one of a projection section and recess section, in the wavy (projection/recess) section, has a radius of curvature R2, and, the first arcuate seal surface section has a radius of curvature R1. Typically, the ratio R1/R2 is at least 1.5, usually at least 2.0 and often at least 4.0. Variations are possible. This characterization can be understood, for example, by reference to the example of FIG. 24 and alternatively, to the example of FIG. 40. Referring first to FIG. 24, a radius of curvature R1, of the first arcuate seal surface section is indicated generally at 815; and, individual radii R2 of various projection sections and recess sections of the first wave seal section 806 (or 808) are indicated by the various dimensions 816, 817, 818, 819, 820 (or 821, 822, 823, 824, 825). What is meant by the characterizations of this paragraph, is the relationship between R1 and R2, for at least a selected one of a projection section and a recess section. It is not meant to indicate that all recess sections and projection sections have the same radius as the others, etc. In the example of FIG. 24, R1 would correspond to a radius 815 of the first arcuate seal section 801; and, R2 would correspond to a radius of a selected one of the various projection recess sections (816-820; or 821-825) in the first wavy seal surface section (either 806 or 808 respectively).

Typically, each projection section and each recess section in the curved projection/curved recess section configuration, of the first wavy (projection/recess) seal surface section has a radius of curvature R2 such the ratio of R1/R2 for each is at least 1.5, usually at least 2.0, and often at least 4.0. By this, it is not meant that the radius of curvature of each recess and each projection is necessarily the same. Thus R2 may be different for various ones of the projections and recesses, as long as the identified ratio remains as stated.

In spite of the observations in the previous paragraph, it is expected that in some typical instances, each curved recess in the first wavy (projection/recess) seal surface section when curved to a circular curvature, will have the same radius of curvature as each other recess in the same wavy (projection/recess) seal surface section; and, each curved projection section, when curved to a circular curvature, in the first wavy (projection/recess) seal surface section will have the same radius of curvature as each other curved projection in the same wavy seal surface section, see FIGS. 24 and 40. However, alternatives are depicted in certain figures described below.

Although alternatives are possible, in some instances, each projection section in a given wavy surface section will have a larger radius of curvature than each recess section in the same wavy seal surface section, see FIGS. 24 and 40, as characterized by example dimensions provided herein above.

In some examples, each projection section will have a radius of curvature of no more than 12 mm larger than each recess section in the same wavy (projection/recess) seal surface section; often no more than 6 mm larger, and in many instances, no more than 4 mm larger.

Usually, each projection section will have a radius of curvature at least 0.4 mm larger, usually at least 0.5 mm, and in many instances at least 2 mm larger, than each recess section.

Referring to with FIGS. 60 and 61, the wavy (projection/recess) seal surface section can be characterized as having a "projection/recess depth." In general, the term "projection/recess depth dimension" and variants thereof, is meant to refer to a radial distance between a maximum recess and maximum projection. In the schematic of FIG. 60, this projection/recess depth is represented by dimension D1. In the example of FIG. 61, it is represented by D2.

Typically, the projection/recess depth D1 (or D2) is such that the largest projection/recess depth within the first wavy seal (projection/recess) surface section is no greater than 70 mm, often no greater than 50 mm, and usually no greater than 30 mm. However, typically the largest projection recess depth D1 (or D2) is at least 5 mm, usually at least 10 mm, and often at least 15 mm. Alternatives are possible.

As indicated above, it is not required that the first arcuate seal surface section itself be a non-wavy (non-projection/recess) section. However, if it does include any projections or recesses therein, typically, each is preferably no greater than 2 mm maximum relief (usually no more than 1 mm maximum relief) from adjacent portions of the surface, if sealing to a non-wavy (non-projection/recess housing surface). In some examples depicted and described thus far, the first arcuate seal section is a non-wavy section, as shown in the examples of FIGS. 24 and 40.

In some example and preferred arrangements, including those of FIGS. 24 and 40, within the first wavy (projection/recess) seal section, each recess and each projection is configured to a circular arc of a given radius (except at transitions (or inflections) where, along the perimeter dimension, each recess merges into each projection. By this, it is not meant that the circular definition (if present) of each is necessarily the same. When each projection section and each recess section, within a wavy section, is to a generally circular arc, preferably that arcuate extension is no more than semi-circular (180°), typically it is less, usually no more than 170°, and preferably no more than 150°. However, typically and preferably, each does extend over an arc of at least 45°, often at least 60°, and in many instances, at least 90°. Referring to FIG. 60, a radial arc, for example, in recess section 816 is shown between approximate end points 816*a* and 816*b*. An example arc for projection section 817 is shown between end points 816*b* and 816*c*.

It will be understood from this, that a recess section or projection section end point is generally a point where curved transition from recess to projection (concave to convex) occurred. The reference to the arc is meant to indicate, again, that the given recess section of projection section generally does not extend over an arc that is as great as semi-circular, with preferences as indicated. This generally means that individual waves (represented by adjacent recesses and projections within a wavy section) will typically (in may applications) be relatively wide and shallow, in overall configuration. In this context, the amount of radial arc is merely meant to refer to the portion of a perimeter of a circle defined by the radius over which the arc of the projection section and recess section extends.

As characterized above, the first wavy (projection/recess) seal surface section can be characterized as having first and second, opposite, end termini sections. Referring to FIG. 60, the end termini sections of the wavy (projection/recess) seal surface section are identified at 803 and 807; in the example of FIG. 61, they are identified at 904 and 905. Typically, the wavy (projection/recess) seal sections will be configured, especially when an outwardly directed radial seal is involved, with end termini sections comprising recesses (i.e. concave shapes), such as shown in FIGS. 60 and 61. However, in alternate applications, a wavy seal surface section can be configured with a first and second, opposite, end termini comprising projection (convex) sections, or with one terminus of each.

Herein, a wavy (projection/recess) seal section may sometimes be characterized as "arcuate" or, alternatively, as "non-arcuate." In this context, the terminology is meant to reference an extension between end points of the referenced wavy (projection/recess) seal section. For example, in the schematic of FIG. 60, the wavy (projection/recess) seal section depicted is not non-arcuate, i.e. arcuate between the end points 803, 807. On the other hand, in the schematic example of FIG. 61, the wavy (projection/recess) seal section is arcuate in extension between the end points 804, 805 (in the example, extending over a 180° semi-circular arc). The terminology in this context is not meant to reference the individual waves or projection/recess definition, but merely along the perimeter of the radial seal, the perimeter-direction path directly between the two end points (i.e. as a straight or arcuate).

As indicated above in connection with the examples of FIG. 24, the first wavy (projection/recess) seal surface section can be a non-arcuate wavy (projection/recess) seal surface section, i.e. be positioned in an otherwise straight portion of a seal definition. However, it can be an arcuate wavy (projection/recess) seal surface section, for example, extending over an arc between two opposite ends of the section, as shown in the example of FIG. 40.

The amount of "waviness" in the seal surface section can, in some instances, be understood by comparing: a length of the wavy (projection/recess) seal surface section in the perimeter direction between end points and over the contour; to a direct length between end termini of the wavy (projection/recess) seal surface section. The length over the contour section will sometimes be characterized here as the "contoured first perimeter-direction length L1" of the first wavy (projection/recess) seal surface section. A length between end termini of the first wavy (projection/recess) seal surface section will sometimes be reference as a "non-contoured first perimeter-direction length L2." In the example schematic of FIG. 60, the contoured first perimeter-direction length L1 will be the length between end points 803, 807 following the contour of the wavy section; the length L2 would be the straight length dimension between the end points 803 and 807, represented by a length of line L2.

In FIG. 61, an arcuate wavy (projection/recess) surface section is shown, and thus L1 would be a length between the end points 904, 905, following the contour of the wavy (projection/recess) section; and, L2 would be a length of an arc (non-wavy or non-projection/recess) indicated by line L2, extending between the same two end points.

It is noted that, in some applications, when the wavy (projection/recess) seal section is a straight or non-arcuate seal section (FIG. 60), typically a length of the contoured length L1 to the non-contoured length L2 will be fairly large. However, in an arcuate wavy (projection/recess) seal section, shown in FIG. 61, the contoured arcuate length may be relatively close to the corresponding non-contoured arcuate length, with a ratio of L1/L2 reflecting this.

Often, in wavy (projection/recess) sections, a ratio of L1 to L2 will be no greater than 2.5, usually no greater than 2, often no greater than 1.6. However, the ratio of L1 to L2 will be no less than 1.0, usually no less than 1.01, and, for example, no less 1.03, and sometimes no less than 1.1. Alternatives are possible.

In extension between the end termini, typically and preferably a wavy (projection/recess) seal section does not have a substantial length of extension that is straight, i.e. not curved. Indeed, in many instances, a recessed section will transition into a projection section with the curved section at each mating at a transition point, but with no significant straight (non-curved) section. However, in some instances, straight sections can be included. Typically, the first wavy (projection/recess) seal surface section, between the end termini, has no non-curved sub-section therein, (i.e. no straight section therein) of greater than 10 mm in perimeter-direction length, preferably no more than 5 mm in perimeter-direction length, usually no greater than 3 mm in length and often has no non-curved surface perimeter-direction subsection at all.

Although alternatives are possible, in many applications, the first wavy (projection/recess) seal surface section will include at least three recesses therein, and usually no more than 8 (often no more than 5) recesses therein. Also, in many instances, the first wavy (projection/recess) seal surface section will include at least 2 projections therein, and often no more than 7 projections (typically no more than 5) therein. Alternatives are possible. Examples of three recesses and two projections are shown in the wavy (projection/recess) seal sections of FIGS. 60 and 61.

Many of the techniques characterized herein are particularly well adapted to be practiced with cartridges that have relatively large seal perimeter size. Often, the first arcuate seal surface section will have a perimeter-direction seal surface length of at least 150 mm, usually at least 200 mm, often at least 250 mm. It is noted that the first arcuate seal section surface can, in some instances, be characterized as a "single projection section" in the seal surface, in extension between end points of the arc, see the examples of FIG. 21 at 861 and, FIG. 40, at 901 (with example dimensions as characterized above).

Consistent with typical and preferred applications in relatively large cartridges, the first wavy (projection/recess) seal surface section can be characterized as having a typically relatively large perimeter-direction seal surface length, typically at least 50 mm, often at least 80 mm, and in many instances, at least 100 mm. Examples are shown in the arrangements of FIGS. 24 and 40 (with example dimensions as characterized above).

As indicated previously, the radial seal surface can be a radially outwardly directed seal surface, a radially inwardly directed seal surface; or, the seal arrangement can be characterized as having both a radially inwardly directed radial seal surface and a radially outwardly directed radial seal surface.

In many applications of the techniques described herein, the overall radial surface will be one that can be characterized as having a modified oval perimeter shape, or modified oval shape. In this context, an "oval shape" would generally comprise a shape with no wavy (projection/recess) section therein, and having two, opposite, curved ends with side sections extending therebetween. When the two curved sections are semi-circular, in the regions extending between the two arcuate curved ends are straight, the oval seal surface can be characterized as "racetrack" or, as a racetrack version of an oval shape. Herein, the term "modified" is meant to refer to at least one section of the otherwise oval (or racetrack) seal surface having a wavy (projection/recess) seal surface definition in accord with the characterizations herein. The examples of FIGS. 24 and 40 can be characterized as "modified oval shape" seals, and in each case, the modification would be a modified racetrack oval shape.

Referring to FIGS. 60 and 61, in the examples depicted, each projection section extends to a point tangential with an unmodified, straight, or unmodified curved section of the "oval perimeter shape." This will be typical in many applications, but is not required. Alternatives are discussed below.

In an example arrangement having a modified oval perimeter shape, the seal surface has a perimeter-direction shape with: the first arcuate seal surface section extending over a semi-circular arc; the second arcuate seal surface section opposite the first arcuate seal surface section; a first side seal surface section extending between first and second arcuate seal sections; the first side seal surface section comprising the first wavy (projection/recess) seal surface section; and, a second side seal surface section extending between a first arcuate seal surface section and the second arcuate seal surface section, the second side seal surface section being opposite the first side seal surface section. The example of FIG. 24 corresponds to this, with the second arcuate seal surface section being a non-wavy (non-projection/recess) section and with a second side seal section being a wavy (projection/recess) seal surface section also.

In many instances, of the type of example 24, the second side seal surface section will be a mirror image of the first side seal surface section.

In arrangements of the type of example 24, typically the radial seal surface has no straight perimeter-direction section therein of greater than 15 mm, usually none greater than 10 mm, and often none greater than 5 mm. Indeed, in many applications, they have no straight perimeter-direction seal surface section in there at all.

However, in some applications, such as the arrangement in FIG. 40, the seal surface does have straight perimeter-direction seal surface sections therein. Indeed, the arrangement of FIG. 40 can be characterized as one having a modified oval perimeter shape with: a first arcuate seal surface section extending over a semi-circular arc; a second arcuate seal surface section opposite the first arcuate seal surface section and comprising a first wavy (projection/recess) seal surface section; a first side seal surface section extending between the first and second arcuate seal surface sections; and, a second side seal surface section extending between the first arcuate seal surface on the section and the second surface section; the second side surface section being opposite the first side seal surface section. In the example of FIG. 40, the first side seal surface section is a first non-wavy (non-projection/recess) side seal surface section; the second side seal surface section is a mirror image of the first side seal surface section; and, the first and second side seal surface sections are each straight and parallel to one another in perimeter direction. Alternatives are possible.

In some examples characterized herein, the cartridge can include a seal support preform positioned with a seal support flange embedded in (or otherwise engaging) the seal material which defines the radial seal surface. The seal support preform can be secured in place on the media pack, for example, by molded-in-place material that also includes integral therewith, the region of seal material itself. The seal support can be continuous and solid in extension, or it can be provided with slots, slits or apertures therein. In the examples described thus far, the support flange defines a size that is sufficiently small to overlap an end of an engaged media pack.

Typically, the seal support flange has a perimeter in a perimeter-direction, in radial shape alignment with a radial seal. Thus, the seal support flange has non-wavy (non-projection/recess) section(s) in overlap (alignment) with non-wavy (non-projection/recess) sections of the seal surface; and, the seal support has wavy (projection/recess) section(s) in radial overlap or alignment with wavy section(s) of the seal surface. This will help the seal support provide the desirable level of compression, in a controlled manner, to the seal in complete perimeter extension.

It is noted that the seal support preform can be characterized as defining or surrounding the air flow passageway around which the radial seal extends.

Often the seal support preform will include an optional media pack grid arrangement extending thereacross. This can provide rigidity in the seal support as well support to the media pack against distortion.

The seal support preform can be provided with a handle bridge thereon, for example, in overlap with an end of the media pack. Examples are showing in connection with FIGS. 23 and 39.

The seal support preform will typically be positioned in an outlet flow end of the media pack, although alternatives are possible. A reason for this is that it is often desirable to separate the clean air volume from the dirty air volume at a location adjacent the outlet end of the media pack, when design parameters allow.

Typically, the housing seal arrangement will include a molded-in-place portion securing the seal support preform to the media pack and surrounding the media pack, as indicated. Typically, that molded-in-place portion also includes, integral therewith, a radial seal. Typically and preferably, the molded-in-place material has an as "molded density" of no greater than 0.45 kg/cu. cm., typically no greater than 0.295 kg/cu. cm. Typically it is molded to "as molded" hardness, Shore A, of no greater than 30, typically no greater than 24, often no greater than 20, and often at least 10. Often foamed polymeric materials will be desired. Well known materials useable for such situations are foamed polyurethane, that increase in volume during use, such as for example described in such references as U.S. Pat. No. 9,457,310 incorporated herein by reference.

The cartridge may include an end preform spaced from, and separate from, the seal support preform. Examples are shown in FIG. 16 at 430; and, in FIG. 49 at 610. This end preform can include a portion or rim surrounding the media pack, and if desired, an installation handle member. An installation handle member is a handle member oriented to be grasped to help install or remove the cartridge from a housing. If the seal support arrangement is positioned in a most deeply recessed end of the cartridge during installation, it will be understood that the preform with the installation handle member will typically be positioned at or near an opposite end of the media pack from the seal support preform. The installation handle member can be positioned in axial overlap with a flow end of the media pack (see FIG. 16); or, it can be in overlap with a side of the media pack, see FIG. 49. The term "installation handle" member and variants thereof, is meant to refer to a handle member that can be grasped and used to help either install or remove the cartridge.

The features and techniques characterized herein were particularly developed for use with media packs that themselves have an oval perimeter shape, although the techniques can be applied in other applications. Typically when the media pack is an oval perimeter shape, it has a racetrack or approximately racetrack shape perimeter with: opposite curved ends and straight sides extending therebetween.

With such a media pack, typically if a preform is provided that has a handle member in alignment with a curved end of the media pack, it is a handle arrangement that is in alignment with a selected curved end of the media pack that also, has in alignment therewith, an arcuate wavy seal surface section at an opposite end of the media pack.

It is noted that there is no specific requirement that an air filter cartridge, component, or air cleaner assembly include all of the features characterized herein, in order to obtain some advantage according to the present disclosure. Further, features characterized with respect to each embodiment, for example, characterization to be implemented in alternate cartridges to the specific example, and without necessarily all of the other characterizations, if desired.

It is noted that in the examples, media packs depicted are generally of an oval shape, for example, as might result from the various techniques characterized above for media definition. Typically such arrangements would comprise coiled arrangements of media, but alternatives are possible. The techniques can even be used in connection with arrangements of stacked media, such as shown in FIG. 7. What would be typical in such instances is use of a preform that engages the media pack appropriately, which then supports the seal configuration of the type desired and characterized.

It is noted that in the figures described thus far, some specific depicted examples are shown. The general features depicted, however, can be selected for aesthetic (design appearance) reasons and be consistent with the variables characterized herein for specific features in use. That is, the specific designs depicted are meant to also reflect aesthetic characteristics with variations possible in accord with the descriptions herein.

C. Example Characterizations from the Disclosure of U.S. Provisional 62/543,090, Incorporated Herein by Reference 1. An air filter cartridge comprising: (a) a media pack comprising filter media and having first and second, opposite, flow ends; (i) the first one of the opposite flow ends comprising an inlet flow end; (ii) the second one of the opposite flow ends comprising an outlet flow end; and, (iii) the media pack being configured to filter air flowing into the inlet flow end prior to the air exiting the outlet flow end; and, (b) housing seal arrangement positioned on the media pack; (i) the housing seal arrangement defining an air flow passageway; (ii) the housing seal arrangement comprising a radially directed seal member defining a radial seal surface oriented to releasably, sealingly, engage an air cleaner in use; (iii) the radial seal surface defining a perimeter-direction in extension around the flow passageway; and, (iv) the seal surface including: (A) a least a first arcuate seal surface section configured: to fully, radially, sealingly, engage a section of non-wavy air cleaner structure; and, extending over an internal arc of at least 130° between arc ends; and, (B) at least a first wavy seal surface section including a radially directed portion comprising an alternating radial projection/recess configuration.

2. An air filter cartridge according to the characterization of 1 wherein: (a) the first arcuate seal surface section extends over an internal arc of no greater than 270°.

3. An air filter cartridge according to any one of the characterizations of 1 and 2 wherein: (a) the first arcuate seal surface section extends over an internal arc within the range of 150°-210°, inclusive.

4. An air filter cartridge according to any one of the characterizations of 1 and 2 wherein: (a) the first arcuate seal surface section extends over an internal arc within the range of 160°-200°, inclusive.

5. An air filter cartridge according to any one of the characterizations of 1-4 wherein (a) the first arcuate seal surface section extends over an internal arc of no greater than 130°.

6. An air filter cartridge according to any one of the characterizations of 1-5 wherein: (a) the first arcuate seal surface section extends over an internal arc of 180°.

7. An air filter cartridge according to any one of the characterizations of 1-6 wherein: (a) the first arcuate seal surface section has a non-wavy configuration in complete perimeter-direction extension around the corresponding internal arc.

8. An air filter cartridge according to any one of the characterizations of 1-7 wherein: (a) the first arcuate seal surface section has a first total perimeter-direction seal surface length of at least 5% of a total perimeter-direction seal surface length of the radial seal.

9. An air filter cartridge according to any one of the characterizations of 1-8 wherein: (a) the first arcuate seal surface section has a first total perimeter-direction seal surface length of at least 10% of a total perimeter-direction seal surface length of the radial seal surface.

10. An air filter cartridge according to any one of the characterizations of 1-8 wherein: (a) the first arcuate seal surface section has a first total perimeter-direction seal surface length of at least 15% of a total perimeter-direction seal surface length of the radial seal surface.

11. An air filter cartridge according to any one of the characterizations of 1-10 wherein: (a) the first arcuate seal surface section has a first total perimeter-direction seal surface length of no more than 90% of a total perimeter-direction seal surface length of the radial seal surface.

12. An air filter cartridge according to any one of the characterizations of 1-11 wherein: (a) the first arcuate seal surface section has a first total perimeter-direction seal surface length of no more than 80% of a total perimeter-direction seal surface length of the radial seal surface.

13. An air filter cartridge according to any one of the characterizations of 1-12 wherein: (a) the first wavy seal surface section has a first total perimeter-direction seal surface length of at least 5% of a total perimeter-direction seal surface length of the radial seal surface.

14. An air filter cartridge according to any one of the characterizations of 1-13 wherein: (a) the first wavy seal surface section has a first total perimeter-direction seal surface length of at least 10% of a total perimeter-direction seal surface length of the radial seal surface.

15. An air filter cartridge according to any one of the characterizations of 1-14 wherein: (a) the first wavy seal surface section has a first total perimeter-direction seal surface length of at least 15% of a total perimeter-direction seal surface length of the radial seal surface.

16. An air filter cartridge according to any one of the characterizations of 1-15 wherein: (a) the first wavy seal surface section has a first total perimeter-direction seal surface length of no more than 90% of a total perimeter-direction seal surface length of the radial seal surface.

17. An air filter cartridge according to any one of the characterizations of 1-16 wherein: (a) the first wavy seal surface section has a first total perimeter-direction seal surface length of no more than 80% of a total perimeter-direction seal surface length of the radial seal surface.

18. An air filter cartridge according to any one of the characterizations of 1-17 wherein: (a) the first arcuate seal surface section has a first total perimeter-direction seal surface length of X1; and, (b) the first wavy seal section has a first total perimeter-direction seal surface length of X2; (i) a ratio of X1 to X2 being at least 0.8

19. An air filter cartridge according to the characterization of 18 wherein: (a) a ratio of X1 to X2 is at least 1.0.

20. An air filter cartridge according to any one of the characterizations of 18 and 19 wherein: (a) a ratio of X1 to X2 is at least 1.5

21. An air filter cartridge according to any one of the characterizations of 18-20 wherein: (a) a ratio of X1 to X2 is no greater than 6.

22. An air filter cartridge according to any one of the characterizations of 18-21 wherein: (a) a ratio of X1 to X2 is no greater than 4.0.

23. An air filter cartridge according to any one of the characterizations of 18-22 wherein: (a) the ratio of X1 to X2 is within the range of 1.0 to 3.0.

24. An air filter cartridge according to any one of the characterizations of 1-23 wherein: (a) the first arcuate seal surface section extends over an arc of 160°-200°, inclusive, and has a radius of curvature of R1; and, (b) the first wavy section comprises a curved projection/curved recess configuration having at least multiple recess sections; (i) at least a selected one of a projection section and a recess section, in the curved projection section/curved recess section configuration having a radius of curvature R2 such that a ratio R1/R2 is at least 1.5.

25. An air filter cartridge according to the characterization of 24 wherein: (a) the ratio R1/R2 is at least 2.0

26. An air filter cartridge according to any one of the characterizations of 24 and 25 wherein: (a) the ratio R1/R2 is at least 4.0

27. An air filter cartridge according to any one of the characterizations of 1-26 wherein: (a) the first arcuate seal surface sections has a radius of curvature of R1; (b) the first wavy section comprises curved projection/curved recess configuration having at least multiple recess sections and multiple projection sections; (i) each projection section and each recess section, in the curved projection section/curved recess section configuration of the first wavy seal surface section having a radius of curvature R2 such that a ratio of R1/R2 for each is at least 1.5.

28. An air filter cartridge according to any one of the characterizations of 1-27 wherein: (a) the first wavy section comprises a curved projection/curved recess configuration having at least multiple recess sections and multiple projection sections; (i) each projection section and each recess section, in the curved projection section/curved recess section configuration of the first wavy seal surface section having a radius of curvature R2 such that a ratio of R1/R2 for each is at least 2.0.

29. An air filter cartridge according to any one of the characterizations of 1-28 wherein: (a) the first wavy section comprises curved projection/curved recess configuration having at least multiple recess sections and multiple projection sections; (i) each projection section and each recess section, in the curved projection section/curved recess section configuration of the first wavy section having a radius of curvature R2 such that a ratio of R1/R2 for each is at least 4.0.

30. An air filter cartridge according to any one of the characterizations of 26-28 wherein: (a) each curved projection section in the first wavy seal surface section has the same radius of curvature of each other curved projection section in the first wavy seal surface section; and, (b) each curved recess section in the first wavy seal surface section has the same radius of curvature, of each other curved recess section in the first wavy seal surface section.

31. An air filter cartridge according to any one of the characterizations of 1-30 wherein: (a) each projection section in the first wavy seal surface section has a larger radius of curvature than each recess section in the first wavy seal surface section.

32. An air filter cartridge according to the characterizations of 30 wherein: (a) each projection section in the first wavy seal surface section has a radius of curvature of no more than 12 mm larger than each recess section in the first wavy seal surface section.

33. An air filter cartridge according to any one of the characterizations of 31 and 32 wherein: (a) each projection section in the first wavy seal surface section has a radius of curvature of no more than 6 mm larger than each recess section in the same first wavy seal surface section.

34. An air filter cartridge according to any one of the characterizations of 31-33 wherein: (a) each projection section in the first wavy seal surface section has a radius of curvature of no more than 4 mm larger than each recess section in the same first wavy seal surface section.

35. An air filter cartridge according to any one of the characterizations of 30-34 wherein: (a) each projection section in the first wavy seal surface section has a radius of curvature of at least 0.4 mm larger than each recess section in the same first wavy seal surface section.

36. An air filter cartridge according to any one of the characterizations of 30-35 wherein: (a) each projection section in the first wavy seal surface section has a radius of curvature of at least 0.5 mm larger than each recess section in the same first wavy seal surface section.

37. An air filter cartridge according to any one of the characterization of 30-36 wherein: (a) each projection section in the first wavy seal surface section has a radius of curvature of at least 2.0 mm larger than each recess section in the same first wavy seal surface section.

38. An air filter cartridge according to any one of the characterizations of 1-37 wherein: (a) the first wavy seal surface section has a largest projection/recess depth dimension of no greater than 70 mm.

39. An air filter cartridge according to any one of the characterizations of 1-38 wherein: (a) the first wavy seal surface section has a largest projection/recess depth dimension of no greater than 50 mm.

40. An air filter cartridge according to any one of the characterizations of 1-39 wherein: (a) the first wavy seal surface section has a largest projection/recess depth dimension of no greater than 30 mm.

41. An air filter cartridge according to any one of the characterizations of 1-40 wherein: (a) the first wavy seal surface section has a largest projection/recess depth dimension of at least 5 mm.

42. An air filter cartridge according to any one of the characterizations of 1-41 wherein: (a) the first wavy seal surface section has a largest projection/recess depth dimension of at least 10 mm.

43. An air filter cartridge according to any one of the characterizations of 1-42 wherein: (a) the first wavy seal surface section has a largest projection/recess depth dimension of at least 15 mm.

44. An air filter cartridge according to any one of the characterizations of 1-43 wherein: (a) the first arcuate seal surface section has no sub-projection therein of greater than 2 mm maximum relief 45. An air filter cartridge according to any one of the characterizations of 1-44 wherein: (a) the first arcuate seal surface section has no sub-recess therein of greater than 2 mm maximum relief 46. An air filter cartridge according to any one the characterizations of 1-45 wherein: (a) the first arcuate seal surface section is a non-wavy section.

47. An air filter cartridge according to any one of the characterizations of 1-46 wherein: (a) each recess section in the first wavy seal surface section, extends over a radial arc of no more than 180°.

48. An air filter cartridge according to any one of the characterizations of 1-47 wherein: (a) each recess section in the first wavy seal surface section, extends over a radial arc of no more than 170°.

49. An air filter cartridge according to any one of the characterizations of 1-48 wherein: (a) each recess section in the first wavy seal surface section, extends over a radial arc of no more than 150°.

50. An air filter cartridge according to any one of the characterizations of 1-49 wherein: (a) each recess section in the first wavy seal surface section, extends over a radial arc of at least 60°.
51. An air filter cartridge according to any one of the characterizations of 1-50 wherein: (a) each recess section in the first wavy seal surface section, extends over a radial arc of at least 90°.
52. An air filter cartridge according to any one of the characterizations of 1-51 wherein: (a) each recess section in the first wavy seal surface section, extends over a radial arc of at least 110°.
53. An air filter cartridge according to any one of the characterizations of 1-52 wherein: (a) each projection section in the first wavy seal surface section, extends over a radial arc of no more than 180°.
54. An air filter cartridge according to any one of the characterizations of 1-53 wherein: (a) each projection section in the first wavy seal surface section, extends over a radial arc of no more than 170°.
55. An air filter cartridge according to any one of the characterizations of 1-54 wherein: (a) each projection section in the first wavy seal surface section, extends over a radial arc of no more than 150°.
56. An air filter cartridge according to any one of the characterizations of 1-55 wherein: (a) each projection section in the first wavy seal surface section, extends over a radial arc of at least 60°.
57. An air filter cartridge according to any one of the characterizations of 1-56 wherein: (a) each projection section in the first wavy seal surface section, extends over a radial arc of at least 90°.
58. An air filter cartridge according to any one of the characterizations of 1-57 wherein: (a) each projection section in the first wavy seal surface section, extends over a radial arc of at least 110°.
59. An air filter cartridge according to any one of the characterizations of 1-58 wherein: (a) the first wavy seal surface section includes first and second, opposite, end terminii recess sections.
60. An air filter cartridge according to any one of the characterizations of 1-58 wherein: (a) the first wavy seal surface section includes first and second, opposite, end terminii projection sections.
61. An air filter cartridge according to any one of the characterizations of 1-60 wherein: (a) the first wavy seal surface section is a non-arcuate wavy seal surface section.
62. An air filter cartridge according to any one of the characterizations of 1-60 wherein: (a) the first wavy seal surface section is an arcuate wavy seal surface section.
63. An air filter cartridge according to any one of the characterizations of 1-62 wherein: (a) the first wavy seal surface section has contoured first perimeter-direction length L1; (b) the first wavy seal surface section has a non-contoured first perimeter-direction length dimension of L2; (i) the ratio of L1 to L2 being no greater than 2.5.
64. An air filter cartridge according to the characterizations of 63 wherein: (a) the ratio of L1 to L2 is no greater than 2.0.
65. An air filter cartridge according to any one of the characterizations of 63 and 64 wherein: (a) the ratio of L1 to L2 is no greater than 1.6.
66. An air filter cartridge according to any one of the characterizations of 63-65 wherein: (a) the ratio of L1 to L2 is no less than 1.01.
67. An air filter cartridge according to any one of the characterization of 63-66 wherein: (a) the ratio of L1 to L2 is no less than 1.03.
68. An air filter cartridge according to any one of the characterizations of 63-67 wherein: (a) the ratio of L1 to L2 is no less than 1.1.
69. An air filter cartridge according to any one of the characterizations of 1-68 wherein: (a) the first wavy seal surface section has no non-curved surface sub-section therein of greater than 5 mm in perimeter-direction length.
70. An air filter cartridge according to any one of the characterizations of 1-69 wherein: (a) the first wavy seal surface section has no non-curved surface sub-section therein of greater than 3 mm in perimeter-direction length.
71. An air filter cartridge according to any one of the characterizations of 1-70 wherein: (a) the first wavy seal surface section has no non-curved surface perimeter-direction sub-section therein.
72. An air filter cartridge according to any one of the characterizations of 1-70 wherein: (a) the first wavy seal surface section includes at least 3 recesses therein.
73. An air filter cartridge according to any one of the characterizations of 1-72 wherein: (a) the first wavy seal surface section includes no more than 8 recesses therein.
74. An air filter cartridge according to any one of the characterizations of 1-73 wherein: (a) the first wavy seal surface section includes at least 2 projections therein.
75. An air filter cartridge according to any one of the characterizations of 1-74 wherein: (a) the first wavy seal surface section includes no more than 7 projections therein.
76. An air filter cartridge according to any one of the characterizations of 1-75 wherein: (a) the first arcuate seal surface section has a projection-direction seal surface length of at least 150 mm.
77. An air filter cartridge according to any one of the characterizations of 1-76 wherein: (a) the first arcuate seal surface section has a projection-direction seal surface length of at least 200 mm.
78. An air filter cartridge according to any one of the characterizations of 1-77 wherein: (a) the first arcuate seal surface section has a projection-direction seal surface length of at least 250 mm.
79. An air filter cartridge according to any one of the characterizations of 1-78 wherein: (a) the first wavy seal surface section has a perimeter-direction seal surface length of at least 50 mm.
80. An air filter cartridge according to any one of the characterizations of 1-79 wherein: (a) the first wavy seal surface section has a perimeter-direction seal surface length of at least 80 mm.
81. An air filter cartridge according to any one of the characterizations of 1-80 wherein: (a) the first wavy seal surface section has a perimeter-direction seal surface length of at least 100 mm.
82. An air filter cartridge according to any one of the characterizations of 1-80 wherein: (a) the radial seal surface is a radially outwardly directed radial seal surface.
83. An air filter cartridge according to any one of the characterizations of 1-81 wherein: (a) the radial seal surface is a radially inwardly directed radial seal surface.
84. An air filter cartridge according to any one of the characterizations of 1-83 wherein: (a) the radial seal surface has a modified oval shape.
85. An air filter cartridge according to the characterization of 84 wherein: (a) each projection section in the first wavy seal surface section extends to a location tangential to an oval shape comprising first and second, opposite, semi-circular ends with first and second, opposite, straight sides extending therebetween.

86. An air filter cartridge according to any one of the characterizations of 1-85 wherein: (a) the seal surface has a modified oval perimeter shape with: (i) the first arcuate seal surface section extending over a semi-circular arc; (ii) a second arcuate seal surface section opposite the first arcuate seal surface section; (iii) a first side seal surface section extending between the first and second arcuate seal surface sections; the first side seal surface section comprising the first wavy seal surface section; and, (iv) a second side surface section extending between the first arcuate seal surface section and the second arcuate seal surface section; the second side seal surface section being opposite the first side seal surface section.

87. An air filter cartridge according to the characterization of 86 wherein: (a) the second side surface section is a second wavy seal surface section.

88. An air filter cartridge according to any one of the characterizations of 86 and 87 wherein: (a) the second side surface section is a mirror image of first side seal surface section.

89. An air filter cartridge according to any one of the characterizations of 86-88 wherein: (a) the radial seal surface has no straight perimeter-direction seal surface section therein of greater than 15 mm.

90. An air filter cartridge according to any one of the characterizations of 85-89 wherein: (a) the seal surface has no straight perimeter-direction seal surface section therein of greater than 10 mm.

91. An air filter cartridge according to any one of the characterizations of 85-90 wherein: (a) the seal surface has no straight perimeter-direction section therein of greater than 5 mm.

92. An air filter cartridge according to any one of the characterizations of 1-85 wherein: (a) the seal surface has a modified oval perimeter shape with: (i) the first arcuate seal surface section extending over a semi-circular arc; (ii) a second arcuate seal surface section opposite the first arcuate seal surface section and comprising the first wavy seal surface section; (iii) a first side seal surface section extending between the first and second arcuate seal surface sections; and, (iv) a second side seal surface section extending between the first arcuate seal surface section and the second arcuate seal surface section; the second side seal surface section being opposite the first side seal surface section.

93. An air filter cartridge according to claim 92 the characterization of: (a) the first side seal surface section is a first non-wavy side seal surface section.

94. An air filter cartridge according to any one of the characterizations of 92 and 93 wherein: (a) the second side seal surface section is a mirror image of the first side seal surface section.

95. An air filter cartridge according to any one of the characterization of 92-94 wherein: (a) the first and second side seal surface sections are each straight and parallel to one another, in perimeter-direction.

96. An air filter cartridge according to any one of the characterizations of 1-95 including: (a) a seal support preform thereon positioned to support the seal member during sealing.

97. An air filter cartridge according to the characterization of 96 wherein: (a) the seal member includes a molded-in-place portion defining the radially directed seal member; and, (b) the seal support preform includes a seal support shape embedded in the molded-in-place portion defining the radially directed seal member.

98. An air filter cartridge according to any one of the characterizations of 96 and 97 wherein: (a) the seal support flange has a perimeter shape having a perimeter-direction shape in radial-shape alignment with the radial seal.

99. An air filter cartridge according to any one of the characterizations of 96-98 wherein: (a) the seal support preform defines an air flow passageway having a media pack grid arrangement extending thereacross.

100. An air filter cartridge according to any one of the characterizations of 96-99 wherein: (a) the seal support preform includes a handle bridge thereon.

101. An air filter cartridge according to any one of the characterizations of 96-101 wherein: (a) the seal support preform is positioned at the outlet flow end of the media pack.

102. An air filter cartridge according to any one of the characterizations of 96-101 wherein: (a) the housing seal arrangement includes a molded-in-place portion securing the seal support preform to the media pack; and, surrounding the media pack.

103. An air filter cartridge according to any one of the characterizations of 96-102 including: (a) an end preform spaced from, and separate from, the seal support preform; (i) the second preform including a portion surrounding the media pack.

104. An air filter cartridge according to the characterization of 103 wherein: (a) the second preform includes a handle member in axial alignment with a flow end of the media pack.

105. An air filter cartridges according to any one of the characterization of 1-104 wherein: (a) the media pack has an oval shape with first and second, opposite, curved ends and first and second side section extending therebetween; (i) the first and second side sections having perimeter-direction shapes that mirror one another.

106. An air filter cartridge according to the characterization of 105 wherein: (a) the first and second curved ends of the media pack are semi-circular; and, (b) the first and second side sections of the media pack are straight.

107. An air filter cartridge according to any one of the characterizations of 105 and 106 wherein: (a) the first arcuate seal surface section of the radial seal surface is positioned in perimeter alignment with the first curved end of the media pack.

108. An air filter cartridge according to the characterization of 107 wherein: (a) the first wavy seal surface section is positioned in perimeter alignment with one of the first and second side sections of the media pack.

109. An air filter cartridge according to the characterization of 108 wherein: (a) the first wavy seal surface section is positioned in perimeter alignment with the second curved end of the media pack.

110. An air filter cartridge according to the characterization of 109 including: (a) an installation handle member positioned spaced from the housing seal arrangement and including a handle projection in perimeter alignment with the second curved end of the media pack.

111. An air filter cartridge according to any one of the characterizations of 1-110 wherein: (a) the seal member comprises a molded-in-place member having a hardness, Shore A, of no greater than 24.

112. An air filter cartridge according to any one of the characterizations of 1-111 wherein: (a) the seal member comprises a molded-in-place member having a hardness, Shore A, of no greater than 20.

113. An air filter cartridge according to any one of the characterizations of 1-112 wherein: (a) the seal member comprises a molded-in-place member having an as molded density of no greater than 0.45 g/cu.cm.

114. An air filter cartridge according to any one of the characterizations of 1-113 wherein: (a) the seal member comprises a molded-in-place member having an as molded density of no greater than 0.291 g/cu.cm.

115. An air filter cartridge comprising: (a) a media pack comprising filter media and having first and second, opposite, flow ends; (i) the first one of the opposite flow ends comprising an inlet flow end; (ii) the second one of the opposite flow ends comprising an outlet flow end; and, (iii) the media pack being configured to filter air flowing into the inlet flow end prior to the air exiting the outlet flow end; and, (iv) the media pack has an oval shape with first and second, opposite, curved ends and first and second side sections extending therebetween; (A) the first and second side sections having perimeter-direction shapes that mirror one another; (b) a housing seal arrangement positioned on the media pack; (i) the housing seal arrangement defining an air flow passageway; (ii) the housing seal arrangement comprising a radially directed seal member defining a radial seal surface oriented to releasably, sealingly, engage an air cleaner in use; (iii) the radial seal surface defining a perimeter-direction in extension around the flow passageway; and, (iv) first and second, non-wavy, arcuate seal surface sections extending over a semi-circular arc; and, (v) first and second, opposite, side seal surface sections extending between the first and second, arcuate, seal surface sections; (A) at least the first side seal surface section being a wavy seal surface section comprising an alternating radial projection/recess configuration.

116. An air filter cartridge according to the characterization of 115 wherein: (a) the second side seal surface section is a mirror image of the first side seal surface section.

117. An air filter cartridge comprising: (a) a media pack comprising filter media and having first and second, opposite, flow ends; (i) the first one of the opposite flow ends comprising an inlet flow end; (ii) the second one of the opposite flow ends comprising an outlet flow end; and, (iii) the media pack being configured to filter air flowing into the inlet flow end prior to the air exiting the outlet flow end; and, (iv) the media pack has an oval shape with first and second, opposite, curved ends and first and second side sections extending therebetween; (A) the first and second side sections having perimeter-direction shapes that mirror one another; (b) a housing seal arrangement positioned on the media pack; (i) the housing seal arrangement defining an air flow passageway; (ii) the housing seal arrangement comprising a radially directed seal member defining a radial seal surface oriented to releasably, sealingly, engage an air cleaner in use; (iii) the radial seal surface defining a perimeter-direction in extension around the flow passageway; and, (iv) a first non-wavy, semi-circular arcuate seal surface section; (v) a second, wavy arcuate seal section opposite the first, non-wavy, semi-circular seal surface section; and, (vi) first and second, opposite, side seal surface sections extending between the first and second, arcuate, seal surface sections.

118. An air filter cartridge according to the characterization of 117 wherein: (a) the first side seal section is straight.

119. An air filter cartridge according to the characterization of 118 wherein: (a) the second side seal surface section is a mirror image of the first side seal surface section.

120. An air filter cartridge comprising: (a) a media pack comprising filter media and having first and second, opposite, flow ends; (i) the first one of the opposite flow ends comprising an inlet flow end; (ii) the second one of the opposite flow ends comprising an outlet flow end; and, (iii) the media pack being configured to filter air flowing into the inlet flow end prior to the air exiting the outlet flow end; and, (b) a housing seal arrangement positioned on the media pack; (i) the housing seal arrangement defining an air flow passageway; (ii) the housing seal arrangement comprising a radially directed seal member defining a radial seal surface oriented to releasably, sealingly, engage an air cleaner in use; (iii) the radial seal surface defining a perimeter-direction in extension around the flow passageway; (A) the radial seal surface having a first non-wavy arcuate seal surface section extending over an arcuate extension of at least 60°; and, (B) a first, arcuate, wavy seal surface section comprising an alternating radial projection/recess configuration and extending of an internal arc of no more than 80% of a total perimeter-direction seal surface length of the radial seal surface; (C) the first arcuate seal surface section has a radius of curvature of R1; and, (D) the first wavy section comprises a curved projection/curved recess configuration having at least three recess sections and multiple projection sections; (1) each projection section and each recess section, in the curved projection section/curved recess section configuration of the first wavy seal surface section, having a radius of curvature R2 such that a ratio of R1/R2 for each is at least 1.5.

121. An air cleaner assembly comprising: (a) a housing including a body and access cover; (i) the housing includes a structural seal surface including a wavy section for sealing there against of a cartridge seal; (b) an air filter cartridge is accord with any one of claims 1-120 positioned within the housing and releasably sealed to the structural seal surface of the housing.

122. An air cleaner assembly according to the characterization of 121 wherein: (a) the access cover is removably positioned on the housing body.

123. An air cleaner assembly according to the characterization of 121 wherein: (a) the access cover is non-removably positioned on the housing body.

VII. An Issue with Certain Seal Definitions

A. A Potential Issue with Certain Seals Having Seal Variations as Previously Described—the Appearance of Proper Installation and Sealing in an Incorrect Housing; FIGS. 62-66

A potential issue with certain radial seal arrangements having "wavy seal" or "projection/recess" sections or patterns, in accord with the examples and descriptions above, is that a result from their use could, under certain circumstances, be a cartridge that appears to be installed in a housing when proper sealing does not occur. This issue can be understood by referring to the examples of the following discussion, and FIGS. 62-66.

Figure 62:
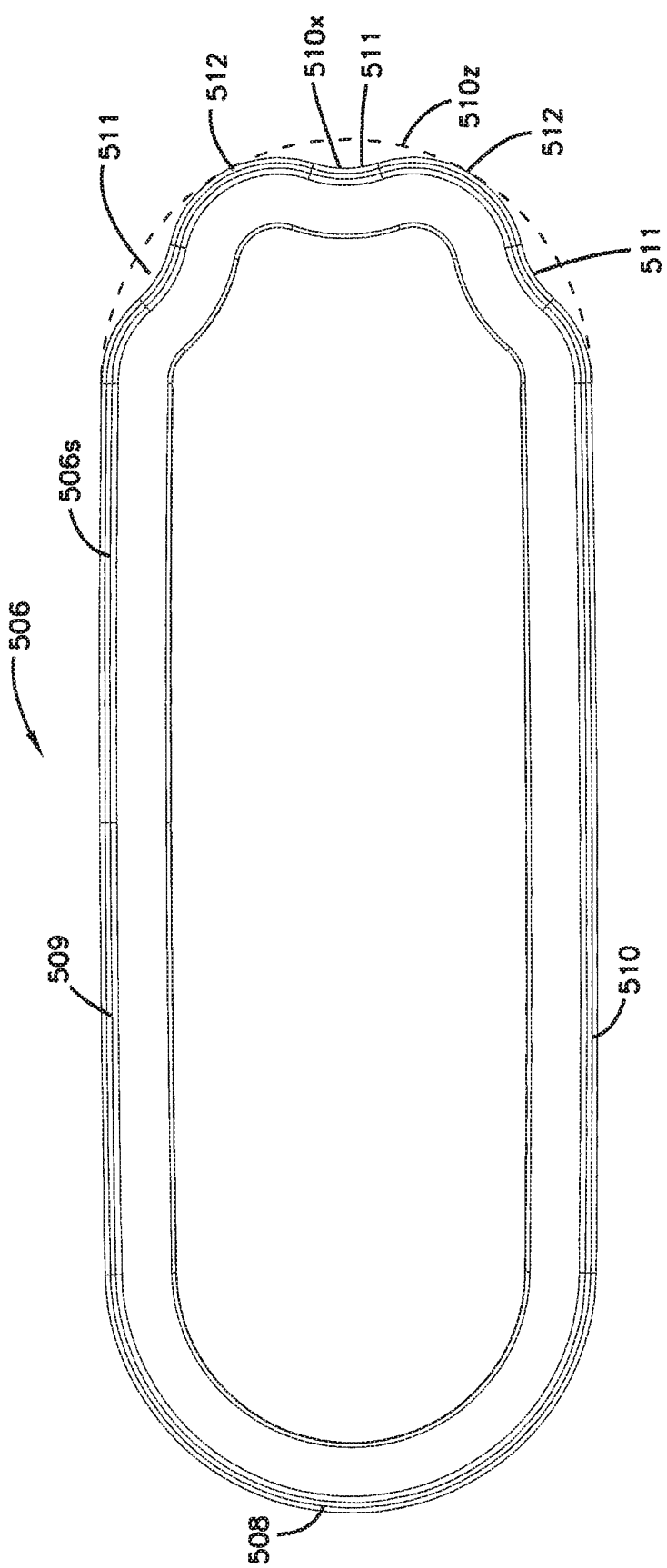
FIG. 62 is a schematic depiction of a seal surface of a cartridge in general accord with principles described herein, and depicting a portion of a hypothetical, standard-geometric shape, seal perimeter.

Attention is first directed to FIG. 62. FIG. 62 is a drawing schematically depicting the seal arrangement 506 of FIG. 36, with certain information added to the drawing to facilitate understanding of the issue. Referring to FIG. 62, seal arrangement 506, as previously indicated, includes seal surface 506s comprising a radially directed seal surface. In the example, the radially directed seal surface 506s is configured to show a radially outwardly directed radial seal in the terms described herein. (The issue at hand, it will be understood, can also be raised in the context of an inwardly directed seal).

In particular, and referring to FIG. 62, the example seal arrangement 506 depicted, as previously described, is oval (in particular, racetrack) and includes first and second straight, parallel, opposite side sections 509, 510; and, first and second (arcuate) end sections 508, 510x, as discussed above. In the example, end section 508 is semi-circular and end section 510x is not. Rather, section 510x has a "projection/recess" or "wavy" shape, in terms used herein.

In general terms, the opposite straight side sections 509, 510, can be described as being tangential with a hypothetical, standard, seal surface engagement perimeter. In the example, the hypothetical standard, seal surface engagement perimeter would be oval, and the hypothetical oval seal surface engagement definition would comprise sides co-extensive (co-linear) with the opposite straight sides 509, 510, and two opposite semi-circular ends. In the example, one such semi-circular end is defined co-extensive (co-linear) with the seal surface 506 at 508, and the other semi-circular end is hypothetical and is depicted by segment line 510z, extending as an arc co-linear (co-extensive) with sides 509, 510. Herein, such an oval shape for the hypothetical standard shape, again, will sometimes be referred to as "racetrack", since it has two opposite parallel sides, and two semi-circular ends.

It should be understood that the hypothetical, oval, seal surface engagement definition is not meant to depict the specific size of the housing component to which the sealing would occur. Indeed, typically, the seal material in the housing seal arrangement 506 will be compressed when installed to seal against a surrounding seal surface. (That is, the likely surrounding housing seal surface, being for a standard oval (racetrack) seal, would typically have the same shape, but be slightly smaller in perimeter size).

Referring to FIG. 62, it can be seen that a cartridge having the depicted seal could be installed in a housing having a housing seal surface (non-wavy or non-projection/recess) that was configured for installation of a cartridge that has an oval (racetrack) seal shape of the right size, for example, having a racetrack shape (hypothetical oval shape) corresponding to the opposite sides 509, 510, the end 508, and the hypothetical end 510z. This is facilitated, in part, by the fact the projections 512 in surface 510x terminate tangential to the hypothetical standard shape seal line section 510z.

Thus, if an air cleaner had a non-projection/recess or non-wavy housing seal surface that was configured to be fully engaged by an oval (racetrack shape) in the seal, of the right size, a cartridge having the seal of FIG. 62 would fit adequately such that it could appear to be properly installed even though, as a result of the recesses 511, it might not be properly sealed.

Herein, when it is said that a housing seal surface or housing seal surface portion of an air cleaner housing or structure, to which the cartridge is sealed, has a "non-wavy" or "non-projection/recess shape" it is meant that portion does not include any recesses or projections therein, for example over a length of extension of at least 50 mm, typically at least 100 mm. Often, there is no projection or recess in the structure or housing surface where sealing occurs, over its complete length of extension. In this context, an arcuate section of the structure in the housing, which may be an end of an oval definition, for example, should not be interpreted as a "recess" or "projection" itself. That is, what is meant to be referenced is localized projections or recesses, such as would have a length between opposite ends of no greater than about 40 mm, and usually considerably less.

Of course, this issue of an appearance of sealing would not pose a problem with a seal of the type of FIG. 62, if there were no such housing in existence. It would primarily be a problem if the cartridge were otherwise sized in accord with a cartridge having a seal perimeter corresponding to the same hypothetical standard shape but not having the proper seal shape configured to sealingly engage the housing.

Figure 63:
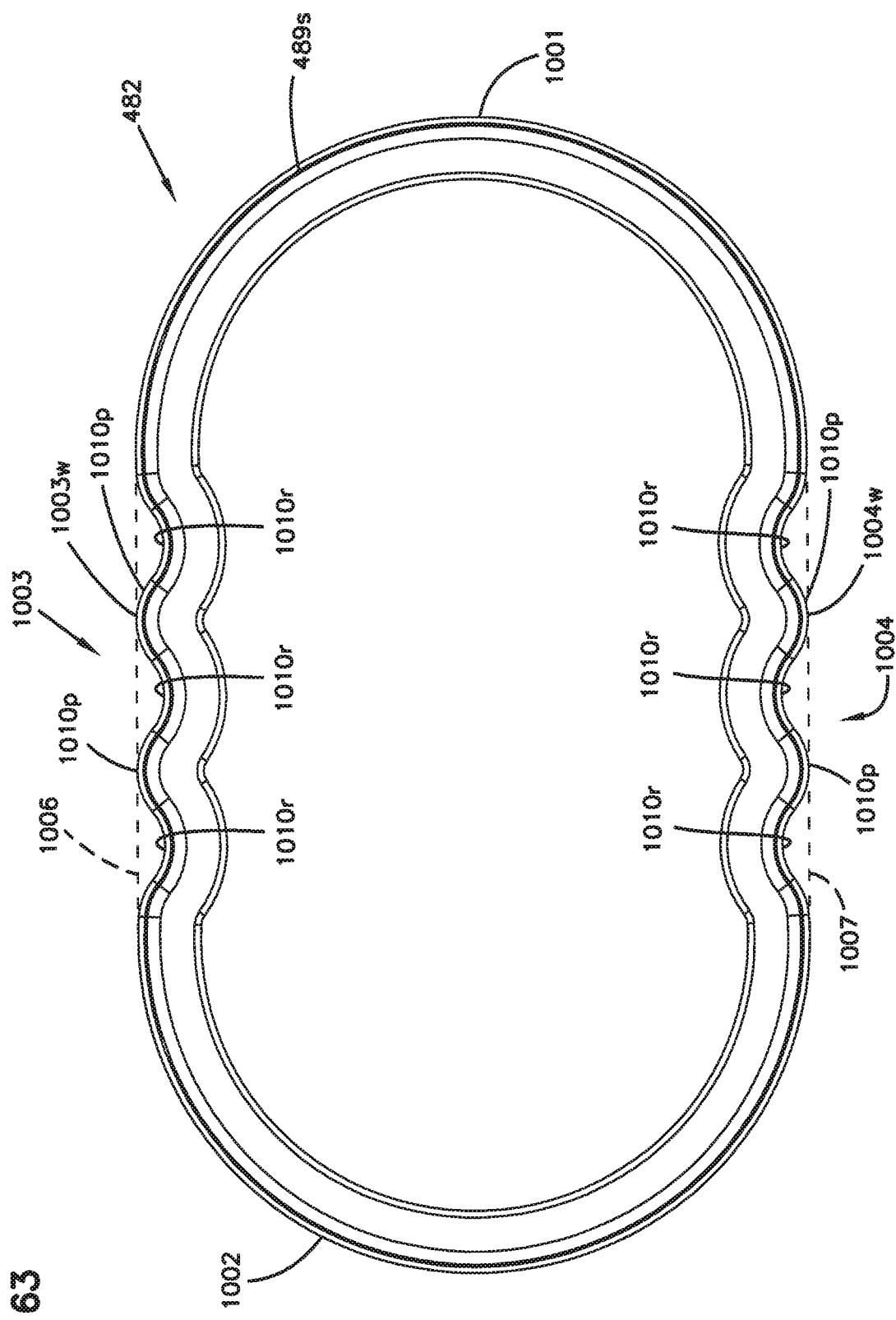
FIG. 63 is a schematic depiction of an alternate seal surface in general accord with the principles described herein, from the seal surface of FIG. 62.

In FIG. 63, an example of a similar potential problem is shown in context of a seal arrangement 482, of the type referenced above in connection with in FIG. 24. In particular, seal arrangement 482 defines a seal perimeter 489s, in this instance an outwardly directed radial seal, having two opposite, semi-circular, end sections 1001, 1002; and, two opposite, sides 1003, 1004, each having a wavy, or projection/recess seal section (1003w, 1004w) therein. Here, the hypothetical standard shape (oval, racetrack) seal surface engagement definition would comprise a racetrack shaped oval with opposite curved ends 1002, 1001; and, opposite straight sections 1006, 1007; the straight sections 1006, 1007 in the example, being tangential to the curved ends 1002, 1001. Again, if the resulting cartridge happened to be the same size as a cartridge that did not have the seal surface sections 1003, 1004, but rather had a seal surface perimeter defined in accord with hypothetical standard-geometric shape (oval) seal surface engagement perimeter (and configured to fit a housing designed for such a cartridge) the cartridge having a seal in accord with FIG. 63 could appear to be sealed even though it might not be, as a result of recesses 1010r. This is in part, because the outward projections 1010p extend tangential to the opposite straight sides 1006, 1007 of the hypothetical standard shape (oval) seal surface engagement perimeter.

Again, the appearance of sealing would primarily be an issue if there happened to exist a housing having a seal surface that was configured to properly receive, with sealing, a cartridge having such a racetrack shaped, oval, radial seal surface but with no wavy or projection/recess sections.

Thus far, the example hypothetical standard shape seal perimeters referenced in this section have been ovals, in the example racetrack shaped, see FIGS. 62 and 63. Alternatives are possible. For example, a similar problem could arise if they hypothetical standard perimeter shape were an oval shape having a first pair of narrowly curved opposite ends, and opposite outwardly curved sides extending therebetween, an example of such a shape being elliptical. Of course, still further hypothetical, standard perimeter shapes are possible, another example being circular.

Figure 64:
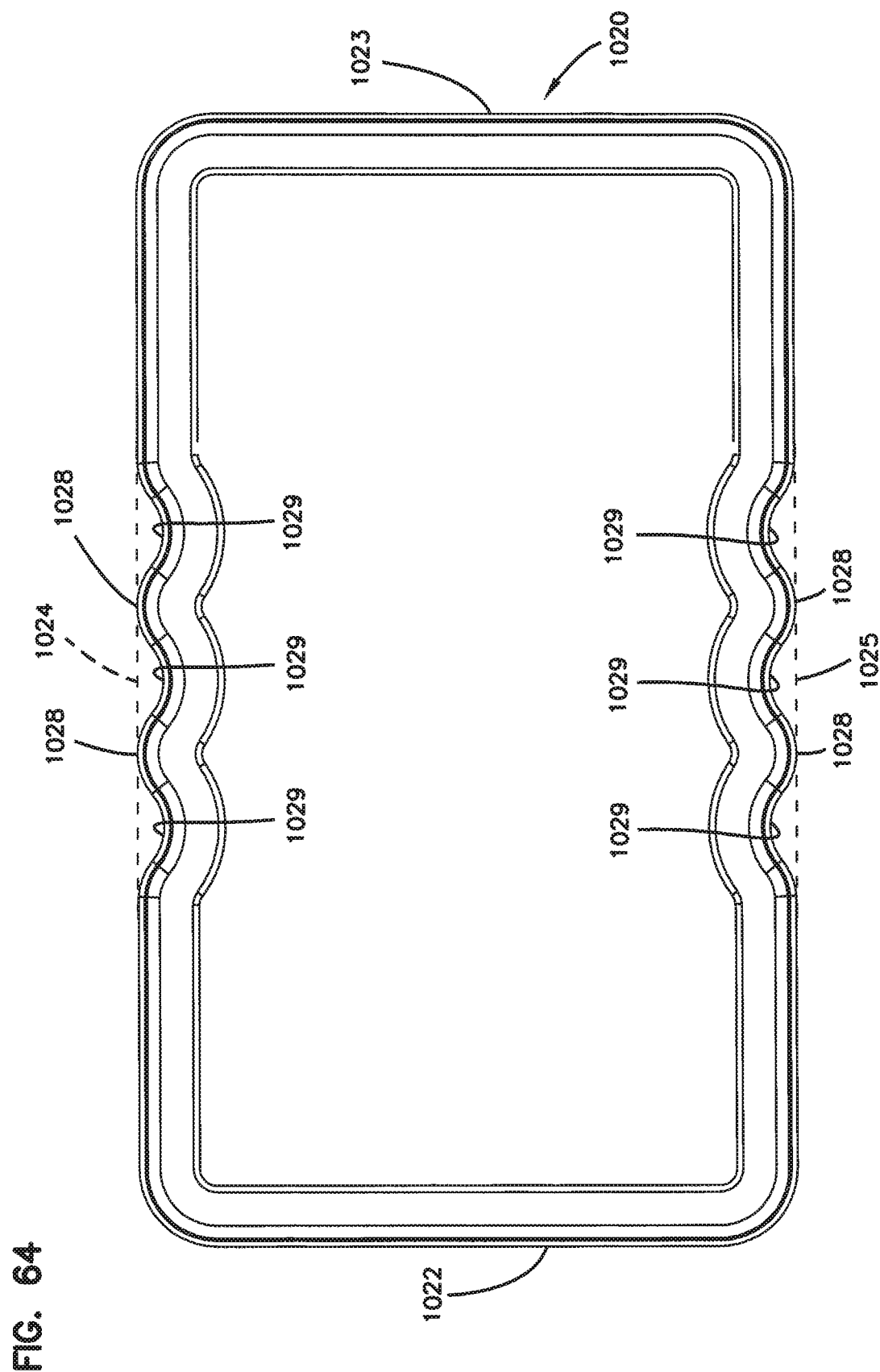
FIG. 64 is a schematic depiction of a further alternate seal surface, but otherwise in accord with the principles of FIGS. 62 and 63, while depicting a third hypothetical, standard-geometric shape, seal perimeter.

In FIG. 64, a hypothetical standard geometric shape seal perimeter having a perimeter shape that is generally a polygonal shape, for example, a rectangular shape (with rounded corners or vertices) is shown. The example seal surface 1020 is a radially outwardly directed seal surface, but similar principles can be applied with an inwardly directed seal surface. The seal surface 1020 can be said to define a hypothetical rectangular seal surface engagement defined by the radially outwardly directed seal surface sections 1022, 1023, and the opposite hypothetical side segments 1024, 1025. Again, the issue discussed in this section is exacerbated by tangential alignment between the hypothetical side sections 1024, 1025 and the projections 1028, in the presence of the recesses 1029.

Once again, a problem could arise if there were a housing in existence that was designed to be radially engaged by a seal having the hypothetical rectangular seal surface definition shown. If there was no such housing, the apparent installation without sealing issue is less likely to occur.

Figure 65:
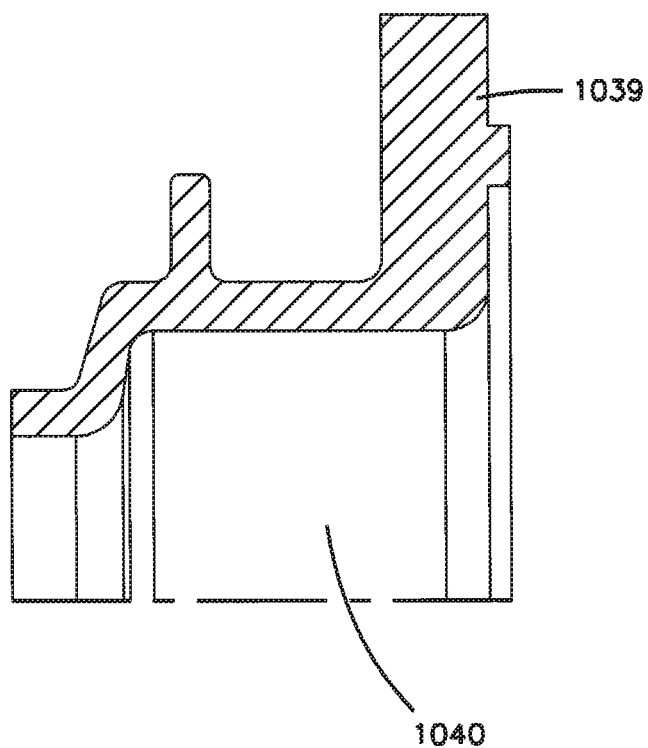
FIG. 65 is a schematic cross-sectional depiction of a portion of an air cleaner housing seal surface portion in accord with certain principles described herein.

In FIG. 65, a schematic cross-sectional view depicting a portion 1039 of a housing seal part (structure) having a seal surface for an outwardly directed radial seal is depicted. The housing seal surface is shown at 1040. Seal surface 1040 is meant to be understood to not include undulations or wavy sections (projection/recess sections) for proper radial engagement with a cartridge housing seal surface. Rather, it is mean to be a fairly standard shape surface that assumes a standard non-wavy (or non-projection/recess) seal surface of a cartridge radial seal meant to engage it. In the particular example, the seal surface 1040 is designed to surround the sealing surface of a cartridge, and thus the cartridge seal would be a radially outwardly directed seal.

Figure 66:
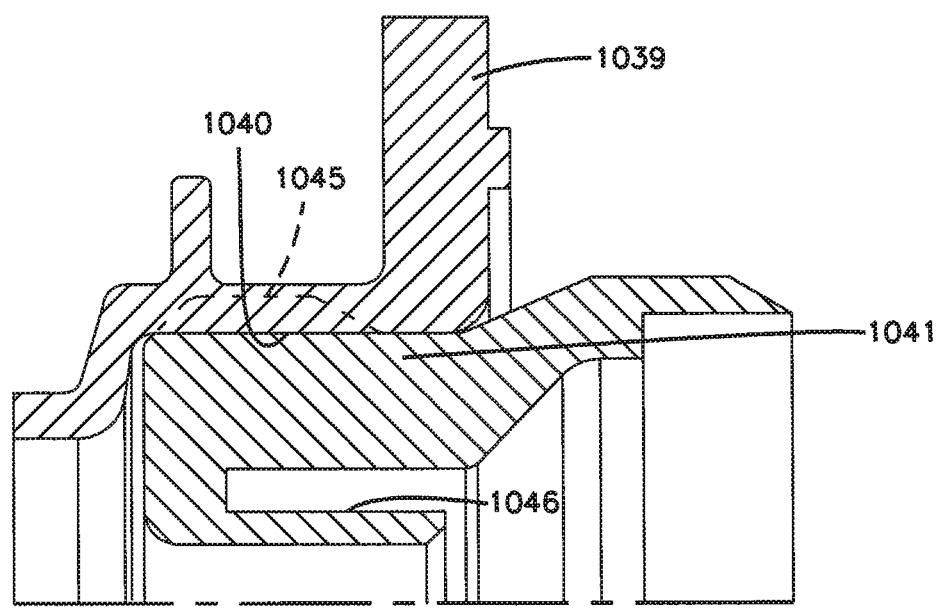
FIG. 66 is a schematic cross-sectional depiction of a selected housing seal portion engaging the housing seal surface of FIG. 65.

In FIG. 66, the same housing seal surface section 1040 is shown (schematically) engaged by a seal 1041 portion of cartridge having a seal surface 1045 with a wavy or projection/recess seal section 1045 indicated in a portion where the engagement is shown occurring. It can be seen that the cartridge might appear to be installed, yet one would understand that there could be recesses in the seal surface that could prevent actual sealing from occurring.

Still referring to FIG. 66, attention is directed to region 1046. This region indicates where seal support (for example, of the preformed plastic support) would be located on the cartridge, to radially support the seal. In FIG. 66, the seal arrangement is schematically depicted, and only molded-in-place seal portions are shown.

It is also noted that in the examples depicted in FIGS. 62-66, the seals involved were radially outwardly directed. Similar principles/issues can be applied with radially inwardly directed seals, and with a hypothetical standard shape seal perimeter defined along the radially inside or inwardly directed surface of the seal (tangential, for example with wavy or projection/recess sections).

It is noted that the issue characterized in this section is exacerbated, when the structural surface of the housing, to which seal engagement with the cartridge occurs, is positioned recessed within the housing, and out of sight of the service provider as the cartridge is installed. This is the case, however, with many air cleaner assemblies.

B. Further Regarding the Concept of a "Hypothetical, Standard, Shape Seal Perimeter"

By the term "hypothetical, standard shape, seal perimeter" and variants thereof, as used herein, reference is meant to a hypothetical shape which does not have projections, recesses or undulations in it, but rather corresponds to a perimeter shape that would be defined generally by non-undulating, (non-wavy or non-projection/recess) portions of a corresponding seal surface, in some instances with straight or arcuate lines extending therebetween, where "wavy", "undulating" or projection/recess perimeter seal portions are found in the actual seal surface. As referenced above, such "hypothetical, standard shape, seal perimeters" will often be: oval, and in some examples, racetrack; polygonal (for example rectangular) or circular. However, alternatives are possible.

It is not specifically required that the hypothetical line sections be tangential with projections of projection/recess sections within the cartridge. However, examples in which such a tangential relationship is found, in outwardly directed radial seals, were provided in FIGS. 62-64 for an understanding of the potential problem of apparent fit in a housing that was designed to take the standard seal.

It is noted that the hypothetical, standard shape, seal perimeter is typically defined by lines that are co-linear or co-extensive: with portions of a seal shape that are not projection/recess portions; and, with corresponding furthest projecting portions of the seal, (in a direction that will engage a sealing surface in use). That is, the hypothetical perimeter is typically defined by a seal shape that corresponds to non-projection/recess portion(s) of the seal surface that is/are most compressed during sealing.

There is no specific requirement that the non-projection/recess portions of the actual seal perimeter that defines the hypothetical standard seal perimeter be continuous throughout their extension. For example, in the arrangement depicted in FIG. 63, there are two such sections (semi-circular ends) spaced from another by projection/recess sections. There is also no specific requirement that the hypothetical standard shape seal section be defined by any particular amount of co-extension. However, typically the hypothetical shape will be co-linear (co-extensive) over at least 20%, often at least 30%, usually at least 40%, of an extension of the seal surface, whether in one continuous portion or several portions added together.

C. A First Solution to the Issue of Apparent Sealing: Avoid when Possible Providing Air Cleaner Housings of Appropriate Size for the Apparent Sealing to Occur Of course, as referenced above, a first solution of the type of the issue described would to avoid having any otherwise corresponding housing or other structure in existence that is of the appropriate size (but which does not have an appropriate wavy or projection/recess housing seal section) and thus cannot receive a cartridge in general accord with the issues raised in the previous section, i.e. with the appearance of installation without actual sealing.

This solution can be effective whether the radial seal is radially inwardly or outwardly directed; the examples discussed previously indicating the principles in association with an outwardly directed seal, but being applicable to inwardly directed seals as discussed.

In some instances, however, it may not be practical to use this approach to the issue. For example, an original equipment manufacturer may have previously defined the particular housing size, shape and location, which needs to be reproduced in the new housing products. Also, it may be desirable to provide new cartridges that are such that portions of them (or the housing) can be made with only minor modification to previously existing cartridge or housing manufacture.

D. A Second Approach to the Apparent Sealing Issue: Providing the Cartridge with a Second Projection/Recess Housing Radial Seal Section in Appropriate Axial Overlap with, and Adjacent to, the Projection/Recess (Wavy) Cartridge Housing Seal Surface Section; the Second Seal Section being Sized and Positioned to Seal to a Non-Projection/Recess (Non-Wavy) Housing Seal Surface Section of a Corresponding Housing A second approach, for such a situation, especially with certain prior art air cleaner housing seal surface definitions, can be understood by consideration of FIGS. 67-70A.

Referring to FIG. 67, a filter cartridge 1050 is depicted having a seal arrangement 1051 positioned on a media pack 1050m. Seal arrangement 1051 depicted, comprises a radially outwardly directed seal arrangement. The example seal arrangement 1051 is shown defining a hypothetical standard shape seal perimeter having an oval, and in the particular example racetrack, shape, although alternatives are possible. The actual seal surface 1051 has opposite straight sides 1052, 1053, with opposite curved ends 1054, 1055; each of the ends 1054, 1055 being arcuate and having an undulating, wavy or a projection/recess configuration of projections 1056 and recesses 1057. In the example, the seal surface defined by straight sections 1051, 1052, and projection/recess (wavy) sections 1054, 1055 comprises a primary or first outwardly directed radial seal (or seal section) for engagement with an appropriate shaped (surrounding) housing surface. The issue, then, is providing the cartridge with a seal arrangement that will properly seal even when the housing has a housing seal surface that is not undulating or wavy, but rather is configured to properly seal with a standard seal of the hypothetical, standard shape seal perimeter. This solution is including by providing one or more second (or secondary) radial seal surface portions or sections in axial alignment with the undulating portions 1054, 1055. An example of this can be understood by non-projection/recess secondary seal portions 1060, 1060a, FIG. 67.

The secondary seal portion 1060 is viewable in enlargement, in the schematic depiction of FIG. 67A.

It is noted that seal surface section 1060 of the example depicted is not projection/recess (wavy) but rather is of a more standard shape so as to facilitate sealing. It is an extension that engages side sections 1052, 1051 at transition (radial seal) portions, see for example, transition portion 1065, FIG. 67A.

As will be apparent from the following, it is not necessarily meant by the example of FIG. 67A that the shape of the second seal section 1060 must be completely non-projection/recess. Indeed, it could have relatively small projections and/or recesses in it. It is also not necessarily meant that the hypothetical, standard, shape seal to which it would conform, would be tangential to the various projections 1056. Indeed, in the example depicted, secondary or second seal section 1060 is specifically not tangential, but rather is recessed inwardly from projections 1056. However, in the example, section 1060 is not recessed as far as recesses 1057. What is important is that it (surface portion 1060) can radially engage standard (non-wavy) seal surface structure, for example in a housing, in spite of the portion recess portion of 1054, without leaking being an issue.

Figure 67B:
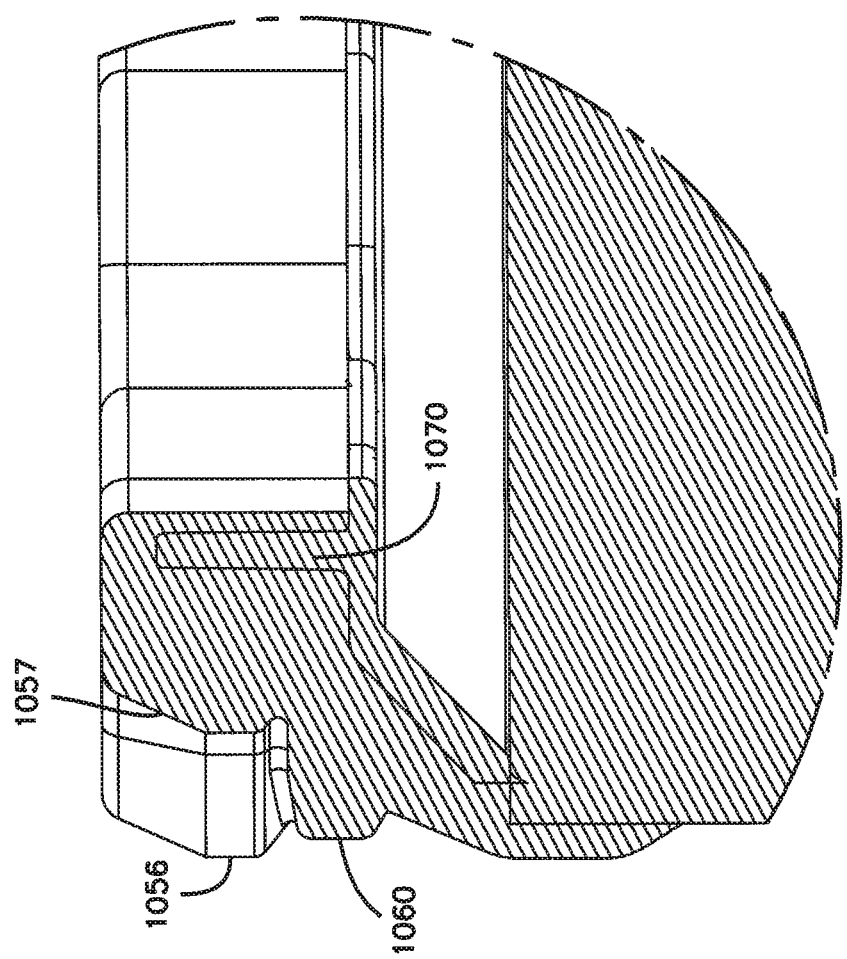
FIG. 67B is an enlarged fragmentary schematic cross-sectional view of a portion of the filter cartridge depicted in FIG. 67A; the view being taken generally along line 67B-67B.

In FIG. 67B, a fragmentary, schematic, cross-sectional view taken along lines 67B-67B, FIG. 67A and between two of the projections 1056 is depicted. A support 1070 for the seal, is depicted, the support 1070 comprising a portion of a preform. A part of the second surface section 1060 is viewable.

Figure 68:
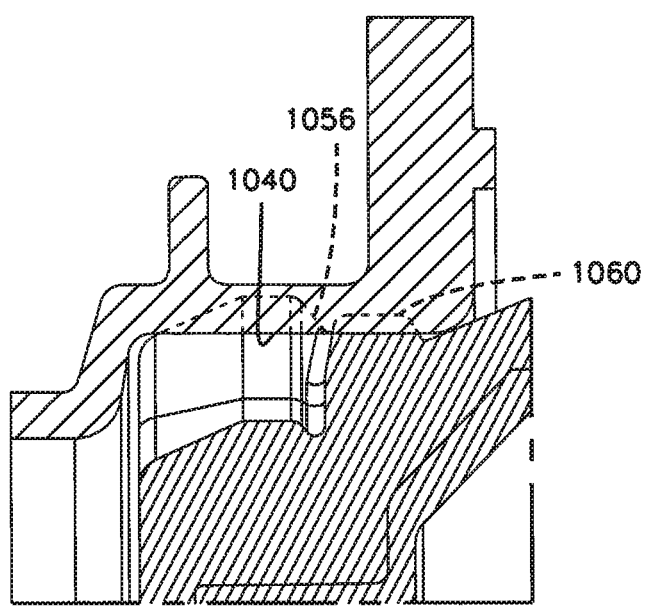
FIG. 68 is a schematic view depicting a molded seal portion of a filter seal in accord with FIG. 67B installed in sealing engagement with a housing seal surface portion.

In FIG. 68, a schematic, partially cross-sectional view, is depicted, a showing a portion of a seal arrangement having a shape in general accord with seal arrangement 1050, FIG. 67, installed in a "standard" housing that has a seal surface meant to be engaged by a standard shape seal, for example, a seal arrangement that does not have an undulating surface.

Referring to FIG. 68, the housing seal surface, in general accord with FIG. 66 is shown at 1040. A projection portion 1056 of the seal is shown in overlap, indicating where compression would occur. The secondary seal projection is shown at 1060. It can be seen that an appropriate seal, completely around the cartridge seal, will occur, since surface 1060 is positioned where it can provide, as a secondary seal section, sealing to a portion of surface 1040.

It should be understood that FIG. 68 is schematic to show the principles involved in the use of the secondary seal surface section 1060. It is not meant to suggest the parts depicted are configured exactly to the sizes they would be, if meant to be used together.

As indicated above, the secondary seal surface does not necessarily have to be provided in a completely smooth, non-undulating, (non-projection/recess or non-wavy) condition. It can include projections and/or recesses therein sufficiently small so as not to interfere with sealing to a desired (non-wavy or non-projection/recess) surface of a housing seal section. An example of this can be understood from FIGS. 69A, 69B.

Figure 69A:
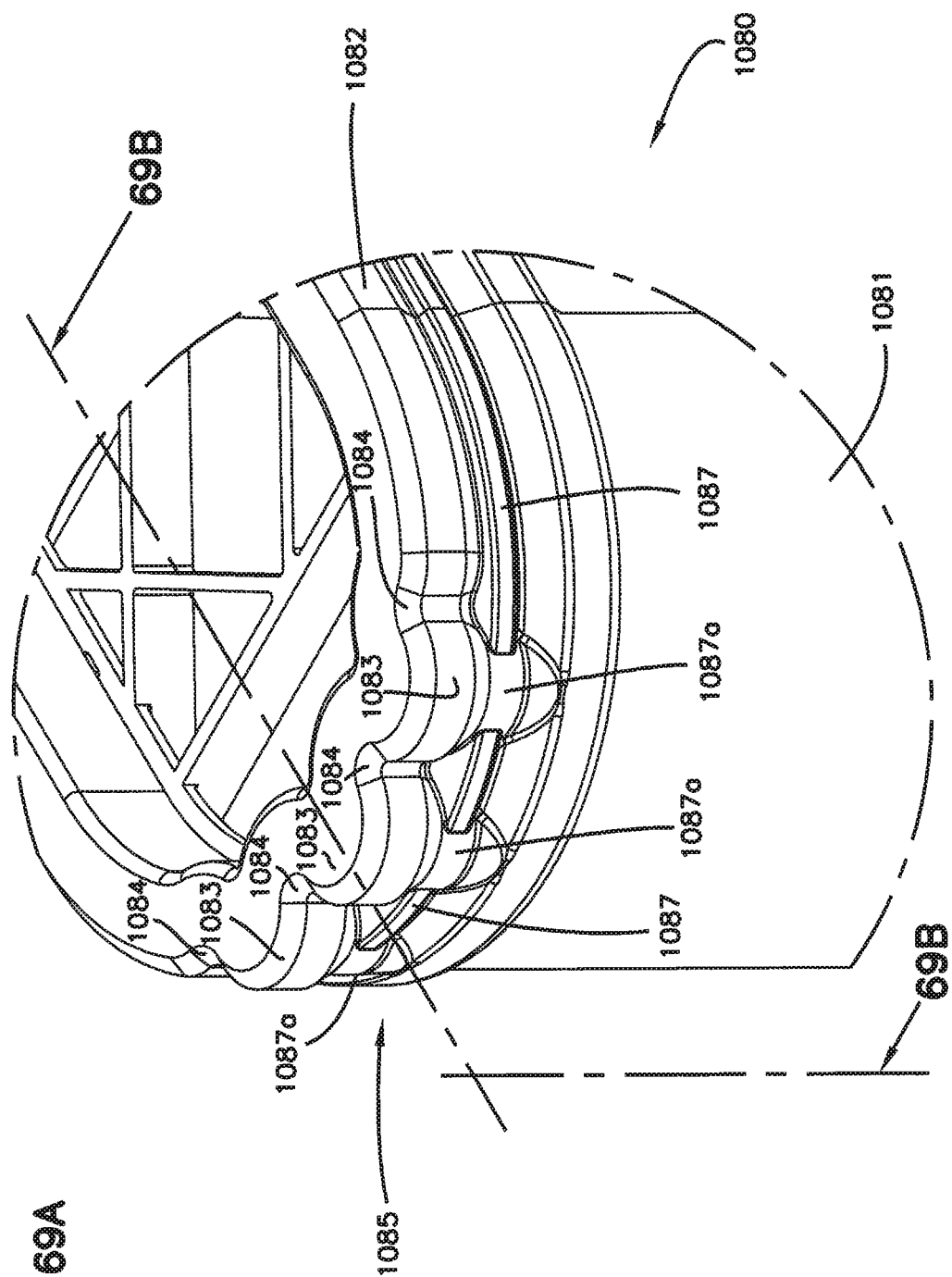
FIG. 69A is an enlarged fragmentary schematic depiction of a cartridge including a first alternate seal arrangement to that depicted in FIGS. 67-67B.

Referring to FIG. 69A, a fragmentary view of the cartridge 1080 is shown comprising the media pack 1081 with seal arrangement 1082 thereon. The portion depicted is generally analogous to the portion depicted in FIG. 67A, with a projection/recess contour provided by projections 1083 and recesses 1084, positioned on (around) a curved end 1085 of the seal arrangement 1082. At 1087, a secondary seal section is depicted. This secondary seal section is axially positioned relative to projections 1083 and recesses 1084, i.e. it extends around the same curved end 1085 with portions 1087a therein, that project slightly outwardly. Otherwise, the shape of section 1087 would correspond to a standard non-projection/recess shape. It is intended that the sections 1087a be sufficiently shallow in projection, so that they will still compress adequately and seal to housing seal surface in a housing of appropriate shape and size, but having a non-projection/recess (non-wavy) surface definition. Thus, surface section 1087 comprises a portion axially positioned relative to an undulating portion of seal surface 1082, so as to provide desirable sealing if the cartridge 1080 is installed in the wrong housing.

Figure 69B:
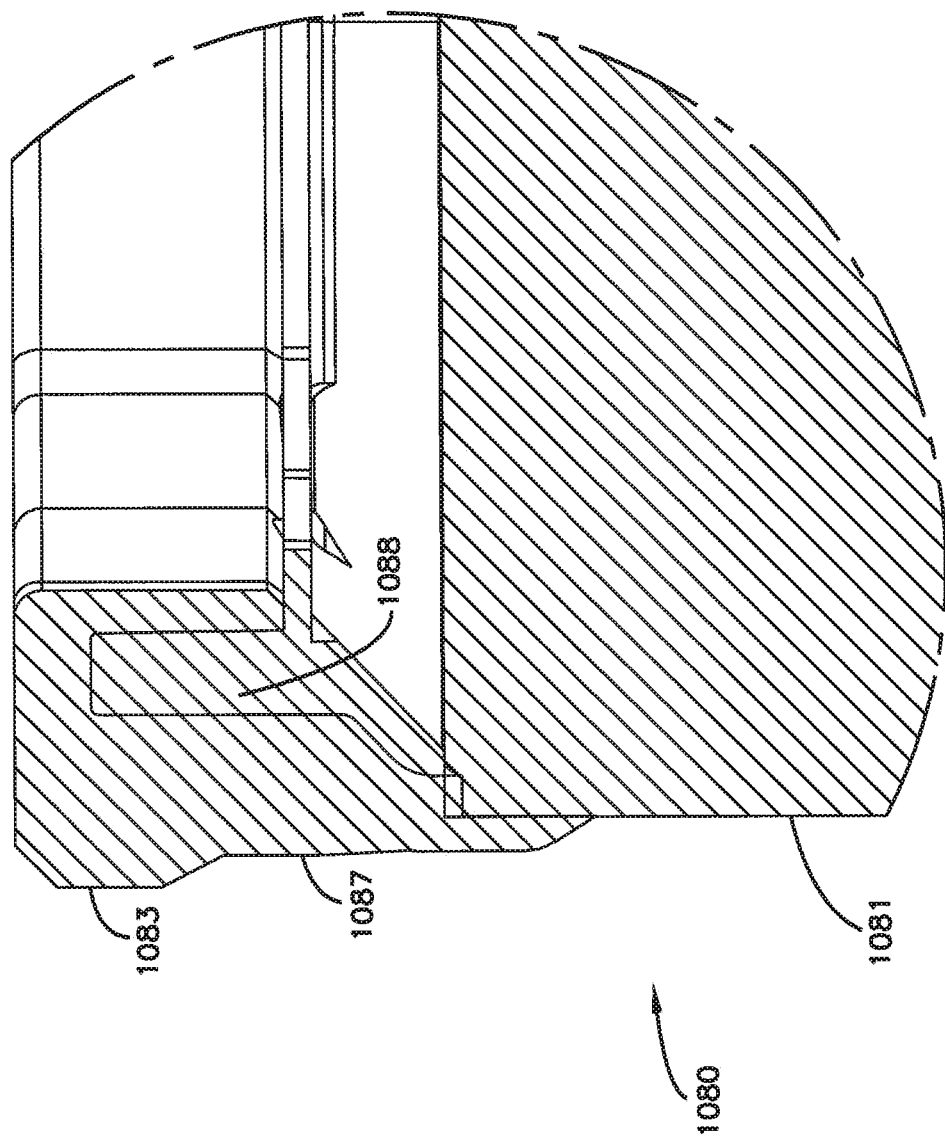
FIG. 69B is an enlarged fragmentary schematic cross-sectional view of a portion of FIG. 69A, taken along line 69B-69B thereof.

In FIG. 69B, a cross-sectional depiction taken along line 69B-69B, FIG. 69A is provided, for facilitating understanding. Note seal support 1088.

Figure 69D:
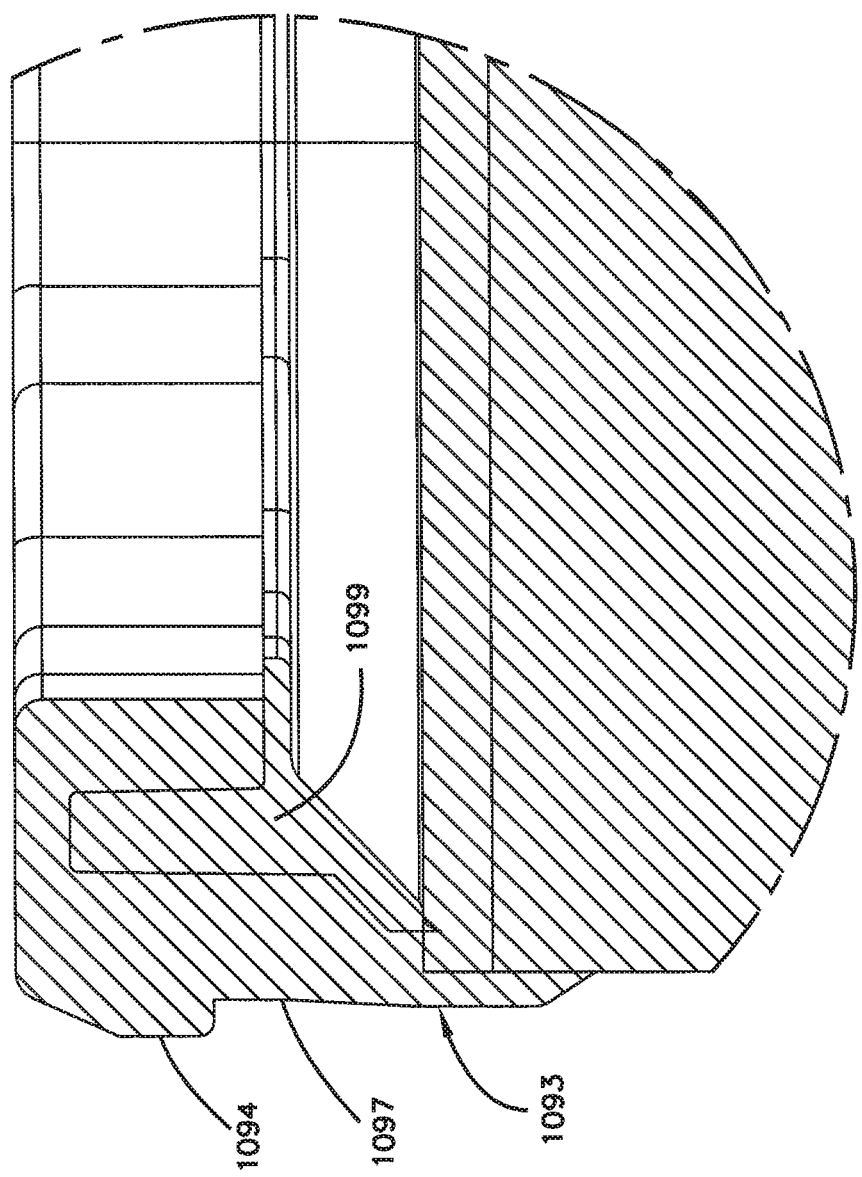
FIG. 69D is an enlarged fragmentary schematic cross-sectional view of a portion of FIG. 69C.

In FIGS. 69C and 69D, a further example of an arrangement having a secondary seal surface section for sealing to a housing seal surface that is configured for a standard shape seal is provided.

Referring to FIG. 69C, a cartridge 1090 is depicted in schematic fragmentary view comprising media 1091, with housing seal arrangement 1092 thereon. The housing seal arrangement 1092 in the example, would generally comprise a radially outwardly directed seal having a configuration generally in accord with a standard racetrack shape, oval shape, definition, except for projection/recess contour at one or both curved ends. In the example depicted, such a contour is shown at 1093, comprising projections 1094 and recesses 1095.

Here, a secondary seal surface section is shown at 1097, in the example generally not having any projection/recess or undulating definition therein. It is defined to axially overlap (adequately) with standard shaped portions of seal surface 1092, see region 1098 as an example, to help ensure sealing if the cartridge 1090 is installed in the wrong housing.

In FIG. 69D, a schematic cross-sectional view taken generally along line 69D-69D, FIG. 69 is shown. Note seal support 1099.

From the above, it can be understood that a wide variety of secondary seal sections can be provided. The primary issue is to ensure such a section is provided in axial overlap with a projection/recess seal section, at a location such that it can engage a standard housing seal surface if the cartridge is accidently installed in a housing having such a surface.

In more general terms, then, it can be understood that an approach to the issue of having a cartridge with a wavy, undulating, or projection/recess seal section in the primary seal surface, appearing to be properly installed and sealed to a housing seal surface (structure) not having a wavy, undulating or projection/recess seal surface, is to provide the cartridge with a secondary seal surface or surface section in axial overlap with the wavy or undulating (projection/recess) portion(s) of portions of the seal. By "axial overlap", in this context, it is not necessarily meant that it is only in axial alignment with the wavy or undulating (projection/recess) section(s) throughout its extension. It could extend completely around the cartridge. However, when the cartridge includes non-wavy seal section(s) it can merely transition into those (or align with those) as shown and described.

The term "axial overlap" or "axial alignment" in this context, it is meant to refer to a location along a length dimension of the seal and cartridge in a direction generally orthogonal to a perimeter direction of the seal. In a typical arrangement such as those shown, in which the media pack comprises an arrangement having opposite flow ends or media ends, the secondary seal surface section(s) would typically be located between the first seal surface section (or primary seal surface section) at undulating wavy locations; and, the media or media pack, or at least in a direction toward an opposite (remote) end of the media or media pack.

The example described in connection with FIGS. 67-69B, can be characterized as creating unique radial seal configurations, in which a first seal portion (in the example, the primary seal portion, which includes the "wavy" sections therein) has a greater "largest cross-sectional dimension" thereto, than a largest cross-sectional dimension of a seal perimeter that would be defined by the second seal surface sections (i.e. the non-wavy sections). Typically, the difference in largest cross-sectional dimension for these would be at least 1 mm, usually at least 2 mm, often at least 3 mm, and in some instances, 4 mm or more.

It is typical then, the first seal portion includes at least one portion that extends, in a sealing direction, at least 1 mm further, usually at least 2 mm further, often 3 mm or more further, in a sealing direction than does an axially adjacent section of a second radial seal portion.

It is noted that this is unusual configuration, whether the first seal portion has a wavy section or not. Typically, a radial seal would taper downwardly in size, toward a tip remote from the media, rather than tapering downwardly in size in a direction away from the seal tip, and toward the media (or toward a remote end of the media or media pack).

Herein, in this context, the reference to "first" and "second" seal sections or portions, is not meant to suggest that the entire first and second seals are separate from one another along their complete extension. As indicated in the examples, portions of the second seal can extend co-extensive with portions of the first seal, for example, in non-wavy or non-projection/recess sections. The spaced axial alignment is specifically meant to reference portions of the second seal that are associated with or adjacent wavy or projection/recess portions of the first seal.

E. Configuration of a Special Housing for a Projection/Recess Contoured Seal that would not Allow for Sealing of a Standard Seal or Standard Seal Section, FIGS. 70 and 70A In some instances, it may also be desirable to have a surface in a housing or other structure for sealing that is configured such that it cannot readily accept a standard cartridge. Principles relating to this can be understood from the above descriptions, and FIGS. 70 and 70A.

Figure 70:
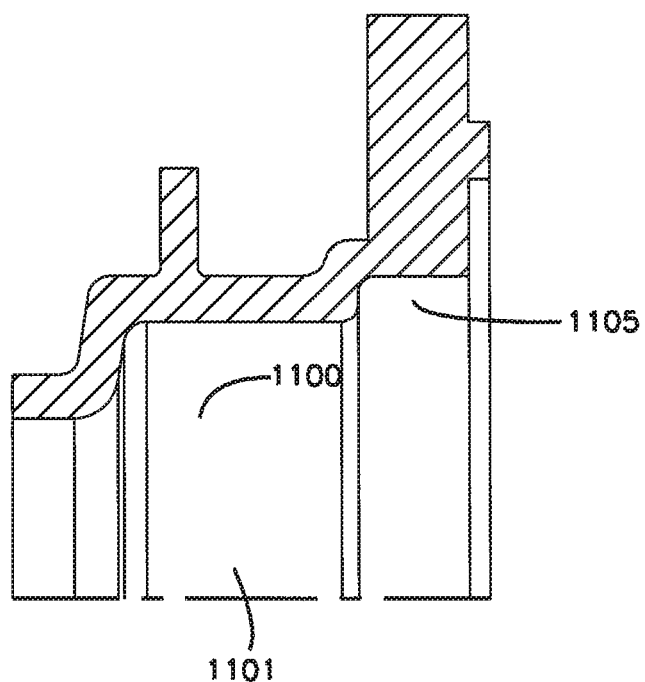
FIG. 70 is a schematic fragmentary partially cross-sectional view of a housing component including seal surface thereon for engagement by certain cartridges in accord with principles described herein.

Referring to FIG. 70, a schematic depiction is provided showing a housing section 1100. Although not shown in detail in the figure, surface section 1101, which would be a housing sealing surface section, would be configured with a (wavy) or projection/recess seal section for engagement with an appropriate (wavy) or projection/recess cartridge seal surface, such as the one discussed above in connection with FIGS. 67-67B. Unlike the arrangement of FIG. 68, the particular housing section 1101 depicted in FIG. 70, includes an outward recess at 1105, which would not be sealingly engaged any secondary seal projection that is an analog to projection 1060, FIG. 67, or which would be found on a standard shaped seal.

Figure 70A:
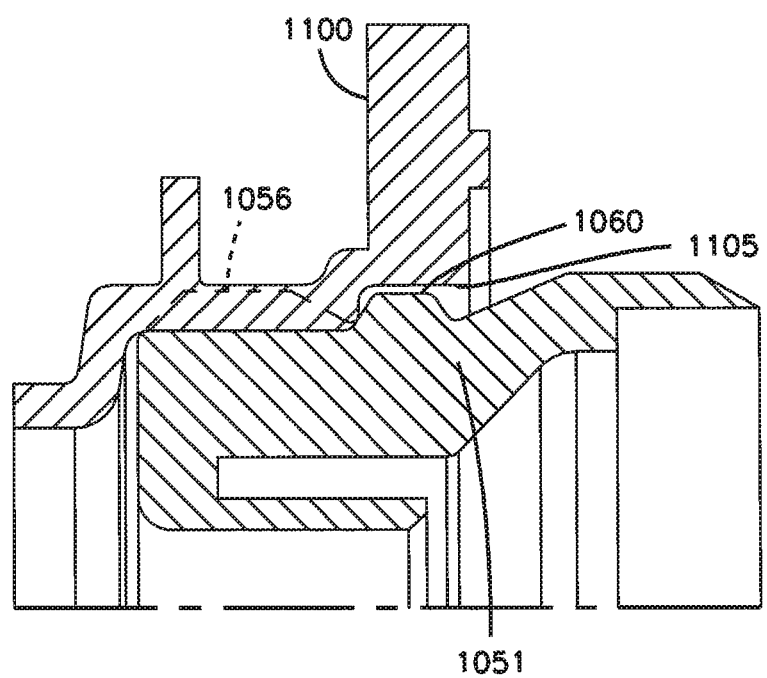
FIG. 70A is a fragmentary schematic cross-sectional view of the housing portion of FIG. 70 shown engaged by a seal surface portion in accord with certain descriptions herein.

Referring to FIG. 70A, this is exemplified by housing seal arrangement 1051, installed in housing section 1100, analogously to FIG. 68. Here, the projection 1060 is shown in the recess 1105, but not sealed. It is to be assumed that the seal projection arrangement 1056 would be engaging an associated undulating (wavy or projection/recess section of housing portion 1100.

F. A Third Solution—Providing the Seal Surface with an Interference Projection Arrangement Another approach to preventing the appearance of a properly installed cartridge, in a housing that can accept a cartridge corresponding to the hypothetical, standard-geometric, shape seal perimeter, would be to ensure that there is an interference projection arrangement in or on the seal. The term "interference projection arrangement" is meant to refer to a region of one or more projections in the seal surface that extend(s) sufficiently far so as to cause interference with an attempt at installation in the wrong housing. This could, for example, be one or more exaggerated projection(s) in a projection/recess seal portion, but it could also be one or more projections provided somewhere else in the seal surface. It can be provided in a supported portion of the seal surface, or a portion not specifically supported for the interference projection arrangement, as may be desirable.

The amount of projection beyond any standard geometric-shaped seal perimeter (outwardly if radially directed seal is involved; inwardly if a radially inwardly directed seal is involved) that is sufficient to provide interference may be varied depending on a variety of factors including the materials of the seal arrangement and the size of the cartridge, etc. In general, all that is required is enough projection to ensure that a person attempting installation will become aware that the cartridge is not a proper one for the housing, in which an effort is being made to install the cartridge. A projection amount, in some instances, of only 1 millimeter, may be adequate. In typical instances, it may be desirable to provide an interference projection amount of at least 2 mm, and often at least 4 mm.

Examples of such arrangements are discussed below.

Of course the mating seal surface in a housing, for which it is intended to install the cartridge, would preferably have an appropriate receiver recess arrangement for the interference projection arrangement, in a manner that does not interfere with sealing of the cartridge to the surface.

Herein above, it was indicated that the projection arrangement can be in a specifically locally supported portion of the seal surface. By this, it is meant that the seal support positioned within the seal material could include a projection thereon in specific alignment with, and corresponding to, the interference projection arrangement, if desired. On the other hand, the projection arrangement in the seal surface could be positioned in a portion in which the seal support underneath the seal material, is not modified from its configuration in order to otherwise support the seal arrangement. This latter will sometimes be referred to as a "not specifically locally supported for the interference projection" arrangement, but, of course, it is not meant to be suggested by this that there would not necessarily be any support to the seal at this location.

VIII. Some Selected Seal Variations and Related Principles, FIGS. 71-83

A. A First Example Type, FIGS. 71-73

As indicated generally herein, it is important that a cartridge for an air cleaner housing be configured such that it can be readily, properly, installed and sealed in an intended, proper, housing. It is also particularly important, where possible, that the air cleaner system be configured so that an inappropriate, unapproved, cartridge cannot be readily installed and appear to be sealed. In general, principles described herein above, in connection with arrangements having projection/recess contour sections therein, can be used to facilitate cartridge designs that meet these issues. Some additional variations and principles can be understood from the examples of FIG. 71-73.

Figure 71:
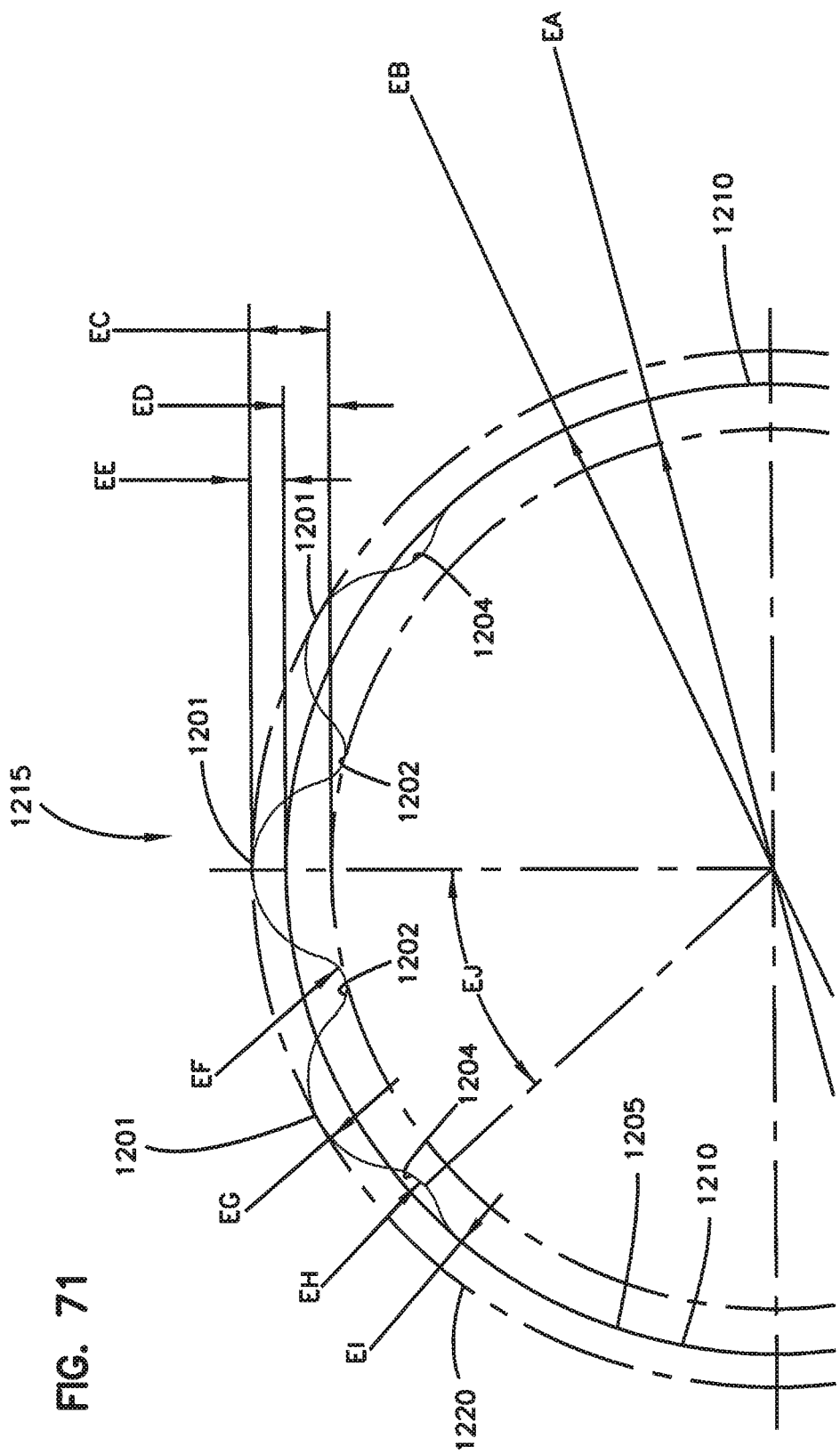
FIG. 71 is a schematic depiction of an alternate projection/recess seal surface contour in accord with the descriptions herein.

In FIG. 71, a schematic depiction is provided of a portion of a cartridge housing seal arrangement including a projection/recess contour.

The sketch of FIG. 71 is schematic and is meant to reference a projection/recess (wavy) seal section on a curved (arcuate) end of the cartridge having a radially outwardly directed seal surface. The cartridge can otherwise have a standard racetrack-shape hypothetical seal surface, but alternatives are possible.

The principles described in connection with FIG. 71 can be applied with alternate shaped seals, and alternately directed seal surfaces. This will be understood from the following.

Referring to FIG. 71, it will be understood that the arrangement depicted includes projection/recess or wavy contour comprising, in the example, projections 1201; relatively deep recesses 1202 between the projections 1201, and relatively shallow (optional) projections 1204, between end projections 1201o of the three projections 1201, and adjacent non-wavy or non-projection/recess portions 1205 of a corresponding seal perimeter.

In general terms used herein, line 1210 would comprise the hypothetical oval (racetrack) shape seal perimeter, with an undulating wavy or projection/recess portion 1215 extending around a curved (arcuate) perimeter section. Portion 1215 includes projections 1201 that do not extend to a location tangential to the perimeter 1210, but rather extend radially (outwardly) across that perimeter 1210 in a sealing direction. Further, the various recesses 1202, 1204, extend radially inwardly from that hypothetical perimeter 1210. Thus, the portion 1215 of the seal 1210 comprising the projection/recess or wavy portion, includes one or more sections that extend across (i.e. to locations on both sides of) the hypothetical standard shape (racetrack) seal perimeter line 1210.

Typically, and preferably in the direction extending (in a sealing direction) toward a housing seal surface to be engaged, at least selected portions of the seal extend to at least 1 mm, typically at least 2 mm; and often at least 2.5 mm, and in some instances at least 3 mm from (away from) the hypothetical standard-geometric shape seal perimeter line 1210.

Since the seal, FIG. 71, is configured as a radially outwardly directed seal, it comprises the tips of projections 1201, shown extending over (past) the line 1120. The dimension corresponding to this extension, for the example depicted, is dimension EE.

Typically, at least selected portions extending across the line 1210 in a direction opposite to that of projection 1201 sealing surface, would extend (opposite the sealing direction) to a location at least 1 mm, often at least 2 mm, and typically 3-8 mm from the line 1210. An example is shown by dimension ED for recesses 1202.

In the example, relatively shallow end recesses or recess sections 1204 would still typically extend inwardly (or across) the hypothetical line 1210 by a distance of at least 0.5 mm, and usually at least 1 mm.

Some example useful dimensions can be understood from the following: EA=107.4 mm diameter; EB=118.2 mm diameter; EC=at least 5 mm, for example 5-15 mm, as an example, 9.3 mm; ED=at least 2, for example, 2-8 mm, e.g. 5.4 mm; EE=3.9 mm; EF=4 mm radius; EG=11 mm radius; EH=6 mm radius; EI=10 mm radius; and, EJ=42°. Of course, these are meant to be examples only, and alternatives are possible.

It is noted that the relatively shallow end recesses 1204 can facilitate fitting the cartridge into the intended housing.

Of course, if the seal was configured to be radially inwardly directed, the seal projections 1201 would be directed radially in a sealing direction, inwardly, and the seal recesses 1202, 1204 would be directed (oppositely) radially outwardly.

An advantage provided by such an arrangement, is that if the housing is analogously configured for such a seal surface, it will be more difficult to position, in the housing, a cartridge that is not the appropriate one for that housing. Further, because of the extension of projections 1201 well beyond the hypothetical standard-geometric shape seal perimeter 1210, in the direction of sealing, the projections 1201 would tend to interfere with installation in a housing section configured to mate with such a seal. That is, projections 1201, then, comprise an interference projection arrangement of a type referenced above.

Figure 72:
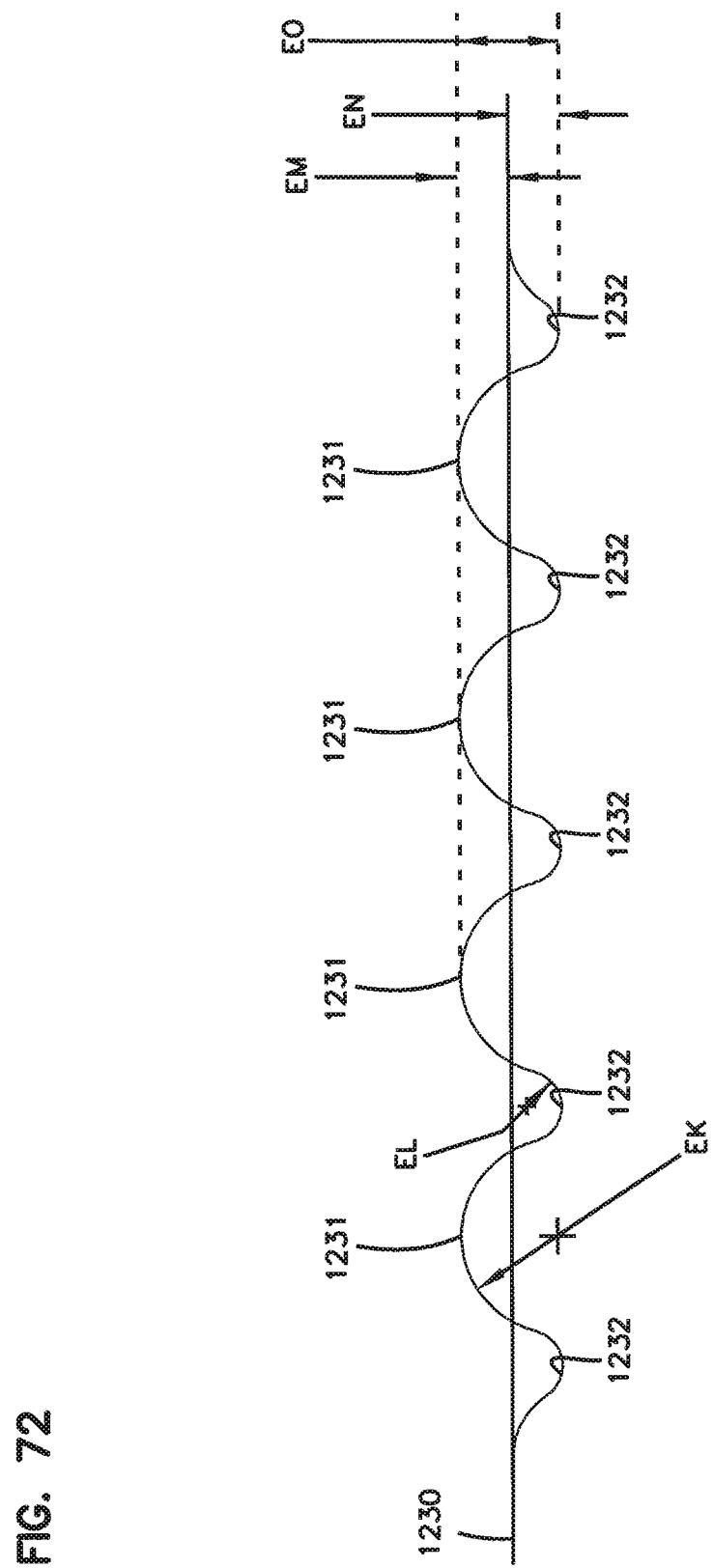
FIG. 72 is a schematic depiction of a still further alternate projection/recess contour in accord with the descriptions herein.

The principles described in connection with FIG. 71 can be applied in a variety of alternate seal arrangements. In FIG. 72, an example is shown in which the projection/recess portion does not extend around a curve, i.e. is not arcuate, but rather is an otherwise straight section of the seal, for example, analogous to section 1024, FIG. 64. Here, the hypothetical standard shape perimeter line is straight, as indicated at 1230, and it can be seen that projections 1231 extend radially outwardly or in a sealing direction past that line 1230, and recesses 1232 extend radially inwardly (or in opposite directions of the sealing) from that line. It is noted that end of recesses 1232 can be somewhat shallower by comparison to the arrangement of FIG. 71 if desired.

Similar dimensions to those discussed above in connection with FIG. 71 can be used. In the example depicted, in FIG. 72, some example dimensions are provided as follows: EO=9.3 mm; EN=6.4 mm; EM=at least 2, for example 2-7 mm.

Figure 73:
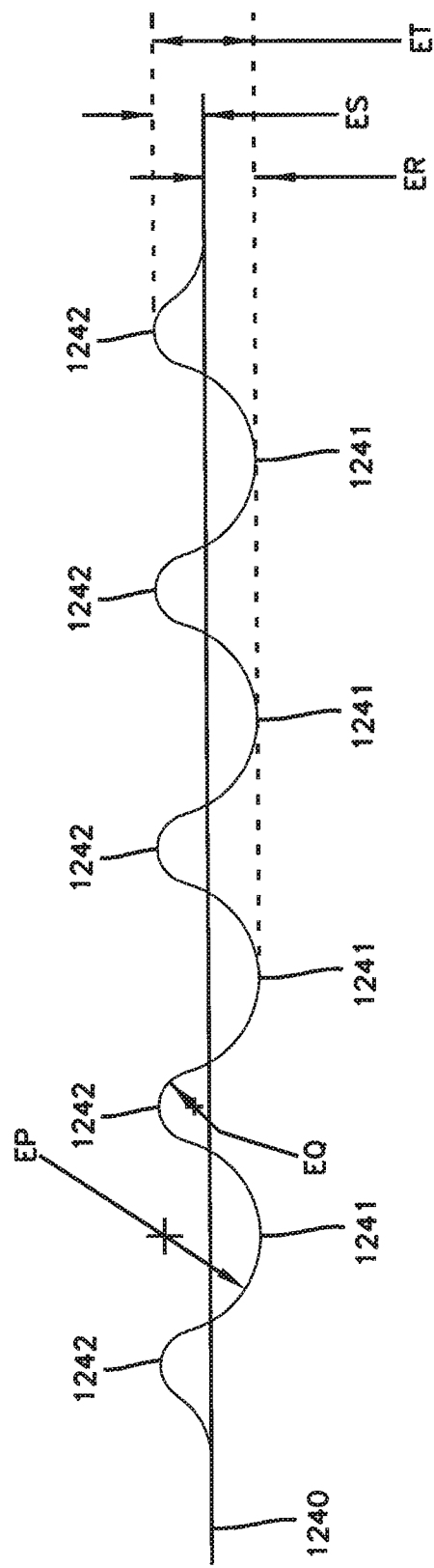
FIG. 73 is a schematic depiction of a projection/recess contour in accord with FIG. 72, but depicted in the context of an alternately directed \seal.

In FIG. 73, an analog to FIG. 72 is depicted, except that the radial seal is meant to be radially inwardly directed, with the hypothetical straight line segment indicated at 1240; projections 1241 extending across that line radially inwardly in the direction of sealing; and, recesses 1242 extending radially outwardly away from that line. Thus, the arrangement of FIG. 73 is the same as FIG. 72, except flipped in reverse for an inwardly directed seal rather than outwardly directed seal. Some example dimensions provided in the example of FIG. 72 are as follows: ET=3 mm; ES=6.4 mm; and, ER=at least 2, for example 2-7 mm.

In general terms, arrangements in accord with FIGS. 71-73 can be understood to provide a general principle that, in some instances, it may be desirable to provide a projection/recess surface that extends across (i.e. to location at both sides of) a standard hypothetical seal definition, to projections and one side or recesses on the other. Typically, when such an arrangement is used, at least one (and typically selected ones) of the projections will extend at least 1 mm and usually at least 2 mm from the hypothetical seal definition. Often, the selected projections will extend at least 3 mm, and sometimes at least 4 mm (for example 3-9 mm) beyond the hypothetical seal definition line. At least one of the recesses (for example, an end recess) will often extend at least 0.5 mm. Often at least one recess will end at least 1 mm, and typically 3-8 mm beyond the line, at least the deepest recesses used.

It can also be understood that, there will be in such instances, and if desired, and related instances, an "tip" amplitude of the largest projection with respect to a deepest recess on at least on one side (associated) thereof, of a total extension of at least 4 mm, often at least 5 mm, typically at least 6 mm, sometimes at least 8 mm. Such a minimum amplitude can be provided on both sides of the projection, if desired, but uneven amounts of extensions or amplitudes between the two sides are possible, as shown by end projections in the arrangement of FIG. 71.

B. "Custom" Seal Definitions, FIGS. 74-76

As explained generally, it is desirable to provide air cleaner arrangements, which are designed to preferably only receive a proper cartridge, authorized or approved, for the air cleaner assembly and equipment of concern. In some instances, the original equipment vehicle or equipment manufacturer will wish to have a preferred "custom" or "authorized" cartridge for an otherwise fairly standard air cleaner package. By "custom" in this context, what is meant is that the manufacturer of the vehicle or other equipment with which the air cleaner is used, may prefer a cartridge that can only be properly sealed to the installed air cleaner housing. For example, the manufacturer of the vehicle or other equipment with which the air cleaner is used, may prefer only authorized cartridges that meet certain minimum filtration performance characteristics (e.g. efficiency, pressure drop, dust loading capacity, or filter life).

The techniques described herein can be applied for such custom applications in a fairly straightforward manner. Examples can be understood from the following descriptions of FIGS. 74-77.

Figure 74:
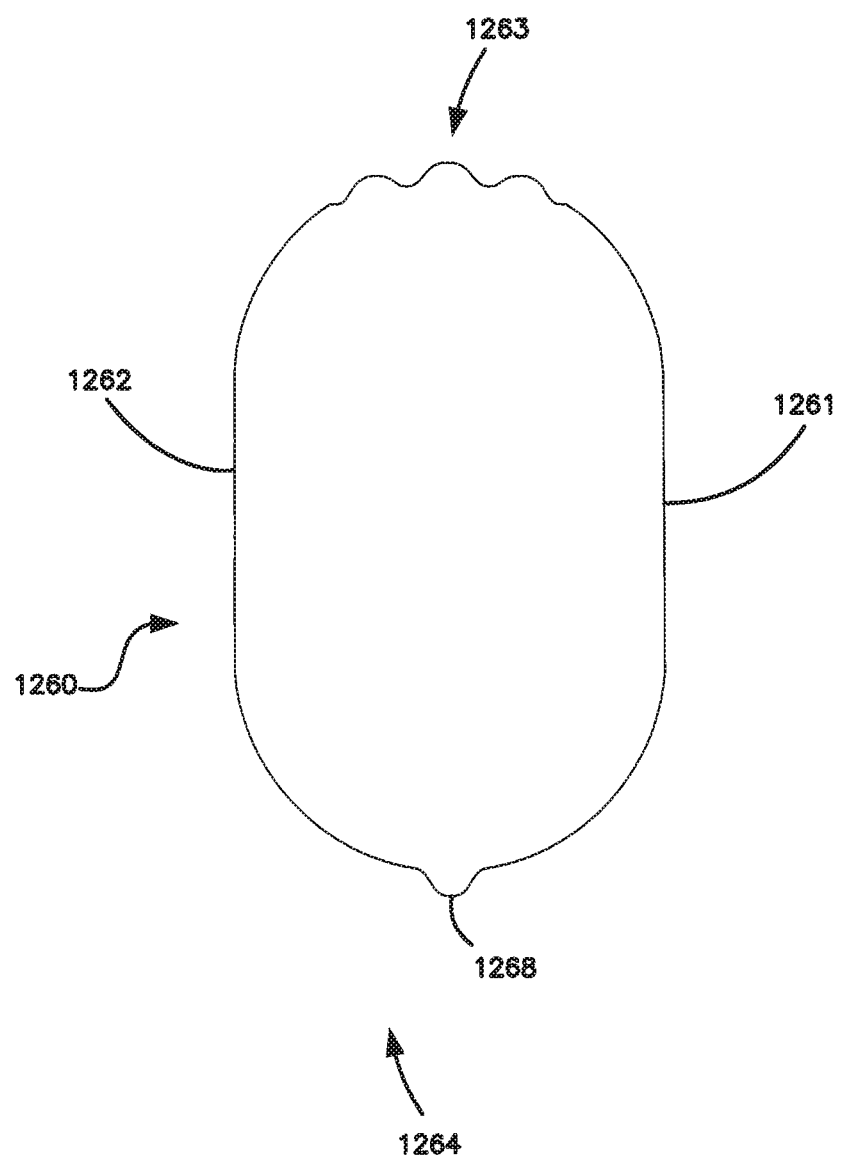
FIG. 74 is a schematic seal perimeter including a custom projection therein, in accord with descriptions herein.

Referring first to FIG. 74, a cartridge seal perimeter is schematically depicted at 1260. The seal perimeter 1260 is a modified racetrack shaped oval, with opposite straight sides or side sections 1261, 1262 and opposite curved (arcuate) ends (or end sections) 1263, 1264. End 1263, in the example depicted, is shown configured with a projection/recess or wavy contour generally analogous to that depicted schematically in FIG. 71.

End 1264, on the other hand, is configured to provide for a custom part with what could otherwise have been a more widely used standard configuration. Assume for purposes of this review, that the more widely used configuration would have comprised end 1264 having a semi-circular shape, with no projection or recess definition therein. The custom arrangement depicted in FIG. 74 includes a modification from this end at 1264, and in particular, includes projection 1168. The projection can be made sufficiently large to inhibit installation of the cartridge in a housing configured for the "standard" definition provided and thus be an interference projection arrangement. The customer can be provided with a housing configured with a recess to properly receive the seal 1260 having the definition at 1268, and thus the cartridge would properly seal to that housing alone.

The projection 1268 may include a localized corresponding seal support projecting therein, or it may be molded in overlap with a seal support having a curve generally corresponding to an end 1264, without any specific support the projection 1268. Either approach can be used.

Figure 75:
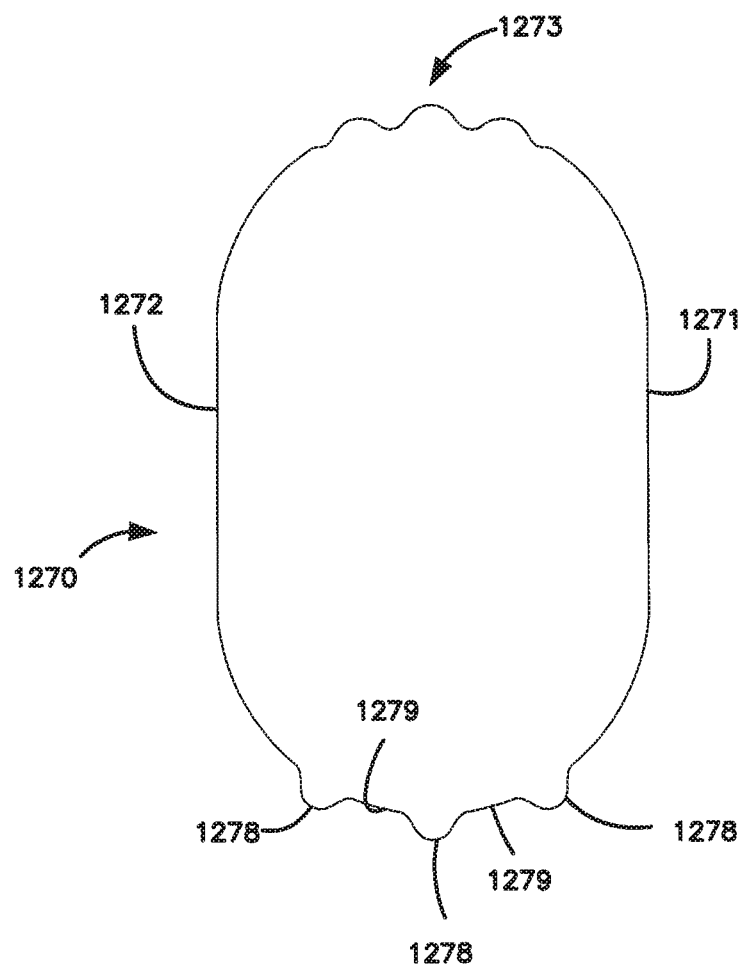
FIG. 75 is a schematic seal perimeter analogous to FIG. 74, but depicting an alternate custom perimeter definition.

A variety of alternatives can be implemented using these principles. An example is shown in FIG. 75 at 1270. Again, the example is a racetrack configuration with: opposite straight sides 1271, 1272; a first projection/recess end 1273; and, with a contour at opposite curved end 1275, in this instance comprising three projections 1278. Even if the cartridge was otherwise the same as cartridge 1260, FIG. 74, as long as the housing is shaped to engage projections 1278, and none of the projections 1278 is in alignment with projection 1268, FIG. 74, the housing would provide a custom arrangement even relative to the arrangement 1260, FIG. 74.

Still referring to the seal perimeter 1270, FIG. 75, it is noted that the end of the seal perimeter at 1275 does correspond to a curved end having a projection/recess definition comprising the projections 1278 and selected recesses 1279 therebetween. It is noted that the recesses 1279 do not curve inwardly but rather have slightly outwardly (seal directed) bowed shapes, in the example, the bowed sections aligning with the hypothetical seal perimeter.

It is also noted that in FIG. 75, the projection/recess definition at end 1273 is generally analogous to that discussed above, in connection with FIG. 71, although alternatives are possible.

Figure 76:
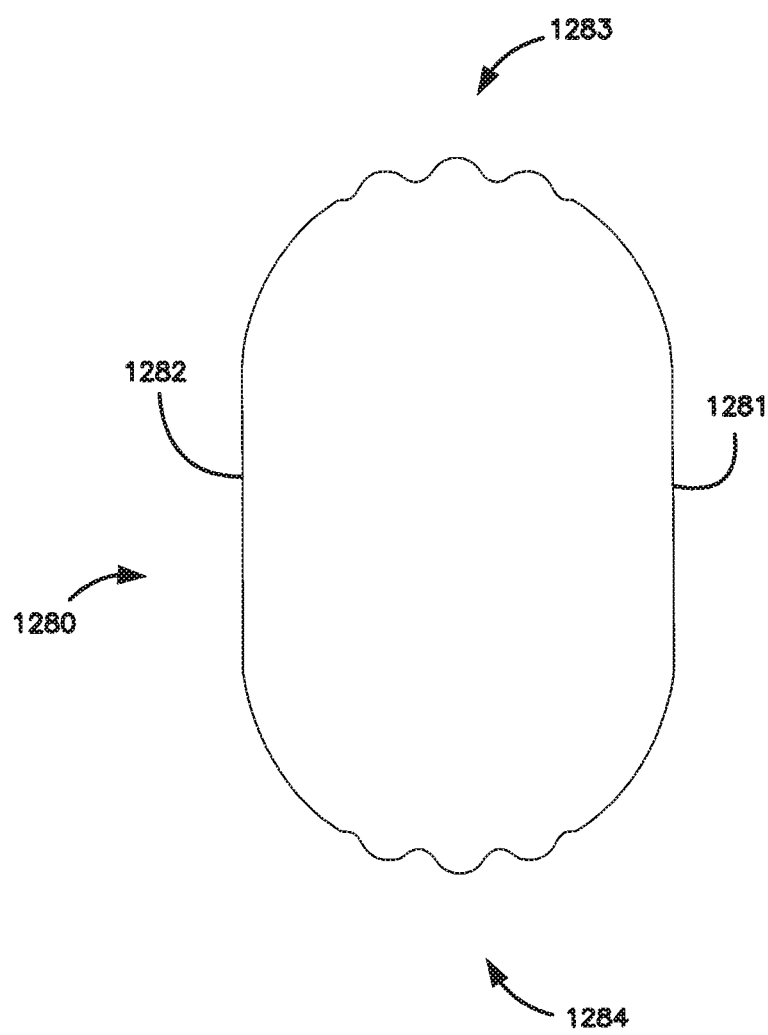
FIG. 76 is a schematic depiction of a further alternate seal perimeter to FIGS. 74 and 75.

In FIG. 76 a variation in these principles is shown at seal surface 1280. Here, again, the depiction is in connection with a racetrack shaped seal having opposite straight sides 1281, 1282 and opposite curved ends 1283, 1284. Here, the opposite ends 1183, 1184 are mirror images of one another, each comprising a projection/recess (or wavy) contour, in the example generally in accord with FIG. 76. The arrangement of FIG. 76 indicates further an additional manner in which custom designing of a seal surface can be provided.

Although the examples and principles discussed in connection with FIGS. 74-76 are shown in the context of a racetrack shaped seal, they can be applied in a variety of other contexts, including, for example, polygonal (for example, rectangular) shape seals, alternate oval shape seals, circular seals or seals in which the projection/recess contour is in otherwise straight sections, as opposed to curved sections. Also, projection/recess contours can be provided in both arcuate section(s) and otherwise straight section(s) of the same seal. The principles, of course, can be applied in an radially inwardly directed seal as well as an radially outwardly directed seal.

C. Variations in Projection and/or Recess Shape, FIG. 77-83A

In the examples depicted herein thus far, many of the "projection" and/or "recess" sections of the various seal definitions provided, are generally smooth, arcuate, curved shapes, with a single inflection point therebetween; i.e. where one arc recess switches to an arc of an adjacent projection. The term "projection/recess", "wavy" or "undulating" and variations thereof, as used herein, in reference to a cartridge seal surface, are not meant to suggest, however, that the shape referenced is necessarily a smooth curve throughout the seal section definition. Indeed, the terms are meant to include a wide variety of possible variations from smooth curves and other variations. Some examples can be understood from the descriptions in this section concerning FIGS. 77-83A.

Figure 77:
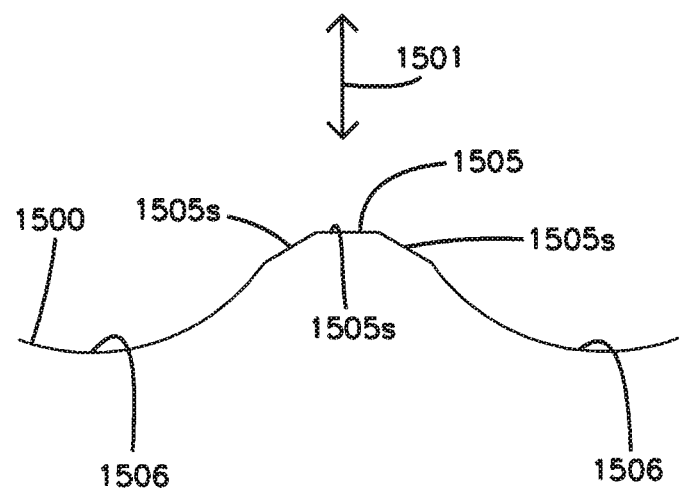
FIG. 77 is a fragmentary schematic depiction of a portion of a seal surface including a seal projection having segmented sections in accord with the description herein.

Referring first to FIG. 77, the intent is to show, schematically, a seal projection which is not defined to a smoothly curved region. Referring to FIG. 77, a fragmented section of seal surface is schematically depicted at 1500, and is meant to depict a portion of an outwardly directed seal surface with sealing forces being the direction of double-headed arrow 1501 to a surrounding housing seal. Thus in the seal surface section 1500 depicted, there is a projection at 1505, bordered on opposite sides by adjacent recesses 1506.

The projection 1505 is of a shape that is characterized herein as a "segmented" projection. That is, the projecting shape comprises a plurality of segments 1505s. In the example, the segments 1505s are each straight or nearly straight, but alternatives are possible. The segments could be bowed slightly outwardly or be bowed slightly inwardly, (or be different from one another) for example, and the end projection 1505 could still be shaped appropriately to operate as a projection in the seal surface engaging a housing seal surface of appropriate definition even including ones designed to receive a corresponding smoothly curved projection. That is, the housing seal surface section of a surrounding housing would not necessarily need to have a segmented seal engagement surface, provided the segment 1505s are sized and located, and the seal material is sufficiently compressible, so as to conform to a housing seal surface of a more smoothly curved definition.

In the example of FIG. 77, the recesses 1506 are shown not segmented. They could be segmented, however, in general accord with the principles described. Also, the principles could be applied with a projection that is a smooth arcuate curve, with only the recesses segmented.

Also, it is noted that in the example of FIG. 77, the recesses 1506 are shown symmetrical, i.e. of the same size and shape. Alternatives are possible, including ones of the types shown above in connection with FIGS. 71-73.

Further, there is no specific requirement that if a projection and/or recess has a segmented shape, that: all projection/recesses in the same seal surface would necessarily have a segmented definition; or, even if that more than segmented projection and/or recess is provided, the segmented definitions will be the same. In general, all that is required so that projection/recess shape(s) used be sufficient to engage properly in housing seal surface with which it is intended to seal.

An intent with respect to this portion of description, is to indicate that even when the housing seal surface is configured with smooth curves, the cartridge seal surface, configured to engage that seal surface section, may be defined with segments or other alternatives from a smooth curve, provided the variations are sufficiently small so as to allow compression to cause the conformity needed for good sealing. Thus, this section is meant to indicate that the terms "projection", "recess", "wavy" and variants thereof, as used herein, are not meant to suggest only smoothly curved surfaces, but rather may have a shape definition that varies therefrom.

Figure 79:
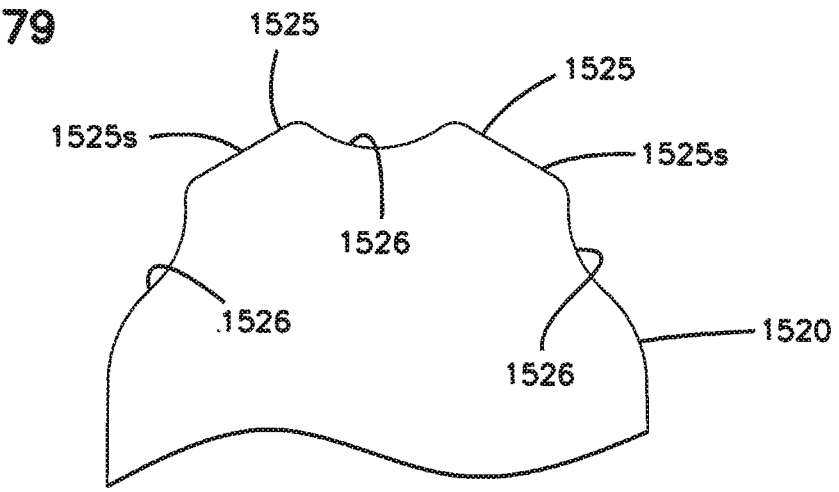
FIG. 79 is a schematic depiction of an arcuate seal perimeter section having truncated outwardly projecting sections in accord with the descriptions herein.

Referring still to FIG. 79, it is noted that the particular truncated sections 1525s depicted, creates symmetrical sides to the corresponding projections 1525. Alternatives are possible.

Figure 78:
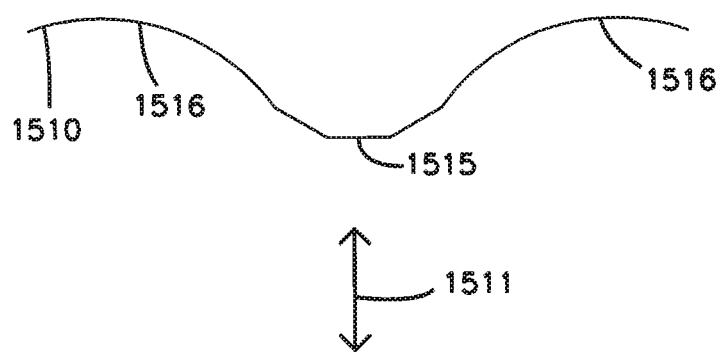
FIG. 78 is a fragmentary schematic depiction analogous to FIG. 77, but shown an alternately directed seal.

In FIG. 78, an analog to FIG. 77 is shown, the intent being to show similar understanding with respect to a radially inwardly directed seal. In part, seal surface 1510 is intended to seal in the direction of arrow 1511, to a portion of a housing that the seal surface 1510 surrounds; i.e. surface 1510 is directed for radially inwardly sealing. Here, the radially inwardly directed projection 1515 is shown with a segmented definition generally in accord with definition 1505, FIG. 77, between recesses 1516. The same types of variations in segments, segment shape, number of segment projections or recesses, etc. discussed above in connection with FIG. 77 can be applied in connection with the arrangement of FIG. 78.

Another variation in projections or recess shape can be a "single" truncated definition as opposed to having multiple segments. An example is shown in FIG. 79.

Referring to FIG. 79, the seal surface is shown at 1520. In the example, it is a portion of a surface extending over an arc, such as an end of an otherwise racetrack shape seal. It is an outwardly directed seal surface 1520, configured for sealing with a surrounding portion of a housing. Projections 1525 are shown, as well as recesses 1526. Here the projections 1525 are truncated in the example by straight segment. That is, a smooth arcuate curvature to each of the projections 1525 is curtailed or truncated by segments 1525s. In the example, the segments 1525s are straight, although they can be provided with alternate definitions such as bowed slightly outwardly or bowed slightly inwardly, etc. In general, what is required is that the truncation 1525s are sized and positioned such that they will seal even to a housing surface that is otherwise configured for a fully arcuate projection.

Still referring to FIG. 79, it is noted that the truncated sections are generally selected so as to create symmetry between the two sides of the projection on which they are located. Alternatives are possible, and are meant to be included within the meaning of "truncated" and variants thereof used herein.

Of course, analogous principles can be applied in addition, or in the alternative, to the recesses 526.

A variety of specific projection shapes can be used in the same seal surface, as can be a variety of recess shapes.

Figure 80:
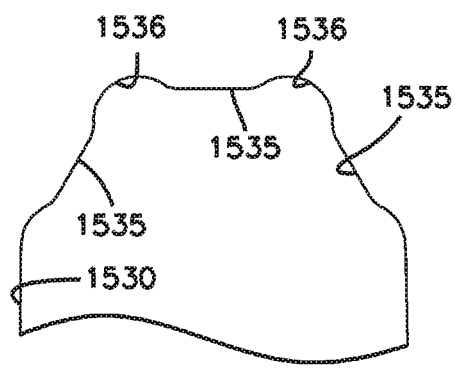
FIG. 80 is a schematic depiction of an inwardly directed seal section including inwardly directed projections having truncated shapes in accord with descriptions herein.

The principles described in connection with FIG. 79 can also be provided in an arrangement configured for radially inwardly directed sealing. An example of such an arrangement is shown at FIG. 80 at seal surface 1530, which is intended to schematically depict a seal surface of a cartridge which is configured to surround a portion of a housing during seal. Inwardly directed projections 1535 are shown truncated, with non-truncated recesses 1536 therebetween. Again, variations in principles discussed above in connection with surface 1520 can be applied.

Also, it is noted that the truncation could be in the recesses 1536, as opposed to the projections 1535, or in both.

Figure 81:
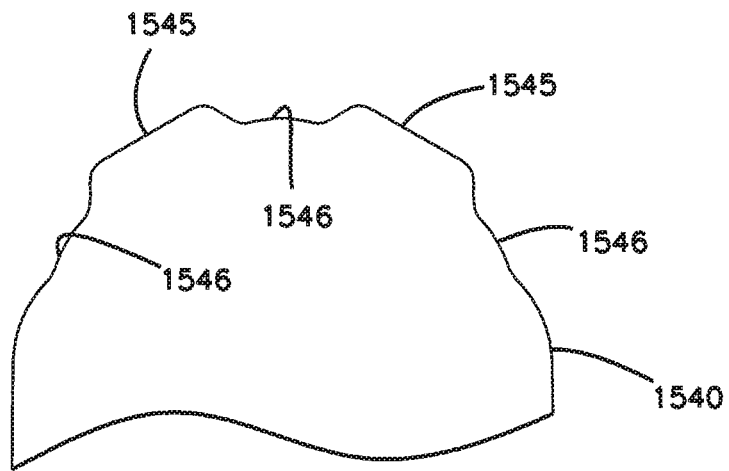
FIG. 81 is a schematic depiction of an alternate to the configuration of FIG. 79.

In FIG. 81, a variation is depicted with an outwardly directed seal surface 1540 having truncated projection 1545 with recess sections 1546; the recess sections 1546 themselves, having a slightly outwardly bowed shape. Again, such a configuration can be sealed to a housing surface that is configured to take a regular outwardly curved projection with inwardly curved recesses therebetween, provided the truncation 1545 recesses 1546 are of appropriate size and shape; and, the material of the seal is sufficiently compressible and deformable.

Figure 82:
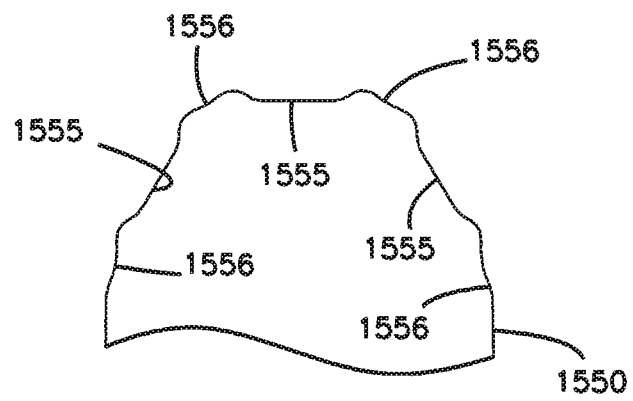
FIG. 82 is a schematic depiction of an alternate to the configuration of FIG. 80.

In FIG. 82, an analogous variation is shown for an inwardly directed seal by 1550 at inward projections 1555 and recesses 1556 having inwardly bowed shapes.

Figure 83:
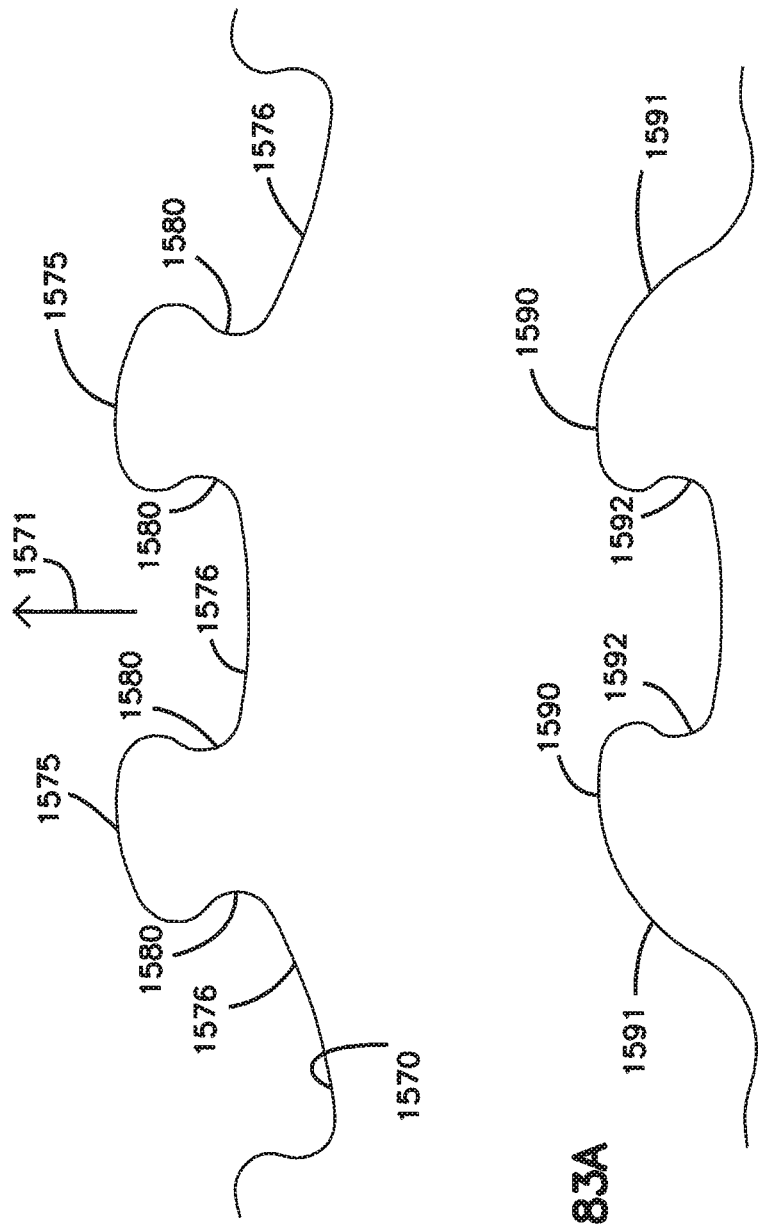
FIG. 83 is a schematic depiction of an alternate seal surface to those depicted thus far.

In FIGS. 83 and 83A, still further possible variations in a projection/recess or wavy seal contour are depicted. In FIG. 83, a seal surface 1570 is shown. The seal surface is meant to be understood to be a cartridge sealing surface facing in the general direction of arrow 1571; i.e. radially outwardly, and comprising spaced projections 1575 and recesses 1576. Here the projections 1575 are shaped with side undercuts or indentations indicated generally at 1580. In the example, each projection 1575 has a pair of opposite undercuts 1580, although alternatives are possible. Surfaces such as surface 1570 can be pushed into sealing engagement with the housing seal surface that does not have an analogous shape, but rather is configured for projections without undercuts, provided the material is sufficiently compressible, and the undercuts are appropriately sized. On the other hand, projections such as projections 1575 can be configured to push into a housing surface having mating undercuts with the projection 1575 snapping around a portion of that housing surface.

In FIG. 83A, a variation is shown in which certain projections 1590 each have one side 1591 that does not have an undercut or recess, and one side 1592 that does. The example of FIG. 83A can be otherwise analogous to the arrangement of FIG. 83.

The seal variations discussed in this section above are meant to indicate a variety of general principles. A primary one is that the term "projection/recess", variants thereof, and/or such terms as "wavy" and "undulating" are not meant to necessarily define a seal surface with smooth curves throughout, unless it is otherwise noted. The surface can comprise segments, bowed sections, undercuts, etc., and still be sized and shaped to fit an appropriate housing using principles herein. Indeed, in many instances, as long as the material is sufficiently compressible, and variations from a smooth curvature are kept relatively small, a seal surface that does not have smooth curved sections can even engage, and seal, to a housing or structural seal surface that does have smoothly curved, wavy (or projection/recess) sections.

IX. Example Principles Relating to Air Leaner Assembly Configuration and its Manufacture In FIGS. 84-86, schematic depictions are provided to assist in understanding typical air cleaner manufacture, and cartridge manufacture, using principles described herein.

Figure 84:
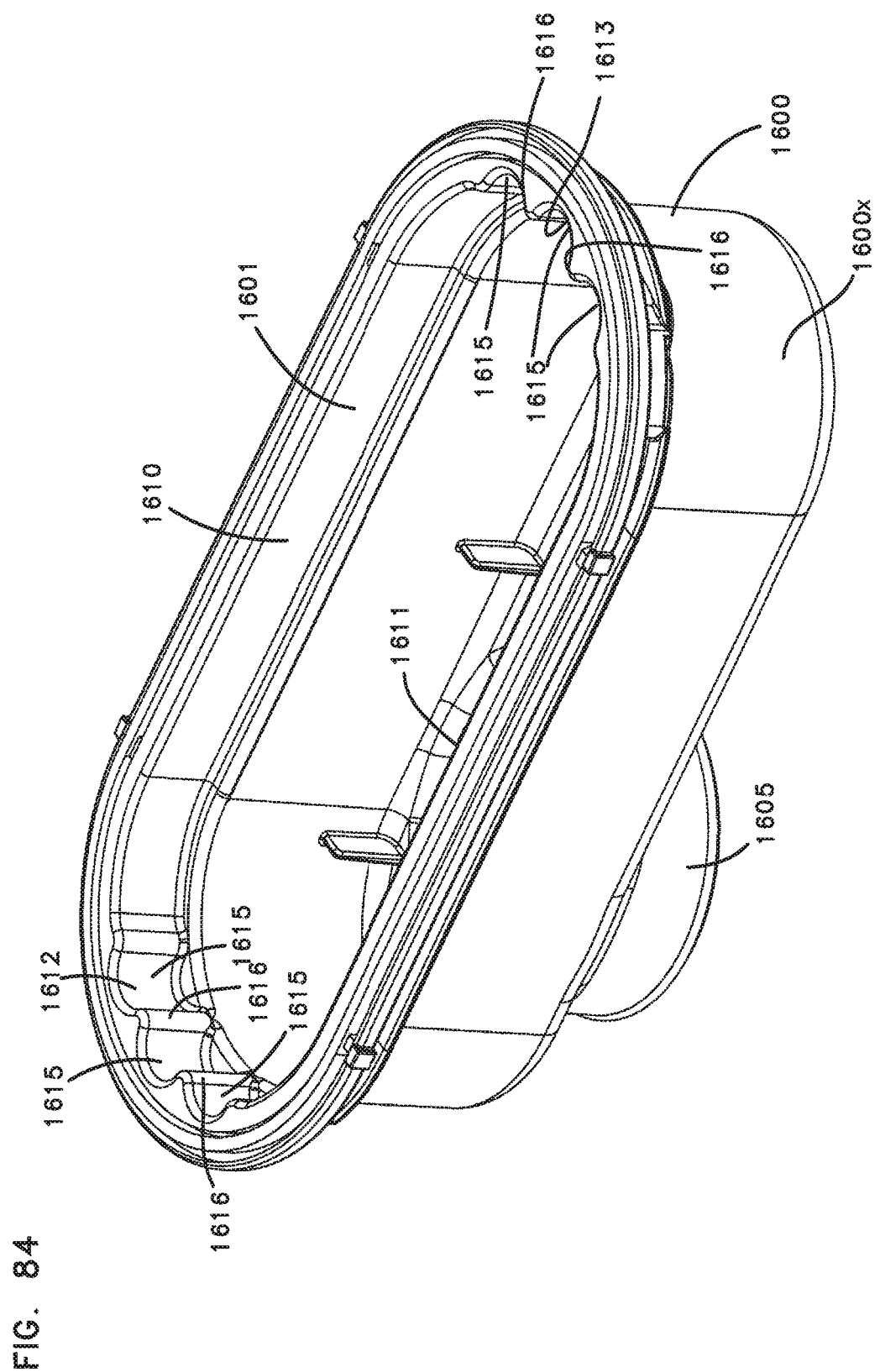
FIG. 84 is a schematic depiction of an example housing component for use in accord with a cartridge having a seal perimeter in accord with an example of the principles described herein.

Referring first to FIG. 84, a portion of an air cleaner assembly is depicted at 1600. The portion 1600 is intended to be that portion of the air cleaner assembly which includes a housing seal surface 1601 for engagement by a seal surface on a cartridge, which cartridge seal surface is in accord with selected general definitions herewith. The example depicted in one in which housing section 1600 is an outlet section 1600x, with filtered air flow leaving through outlet 1605.

The seal surface 1601 depicted is molded and generally configured to sealingly receive a cartridge outwardly directed radial seal, otherwise having a racetrack shape hypothetical seal surface with opposite straight side sections 1610, 1611, and opposite curved end sections 1612, 1613. Each of sections 1612, 1613 includes a projection/recess, wavy or undulating contour portions comprising three outward projections 1615 separated by inwardly projecting sections 1616. Of course, alternate shapes can be used.

It is noted that in the example sections 1615 are smooth and arcuate in the projection outwardly, but they can still be sealed by a seal surface that does not necessarily have a matching smooth arcuate shape, but rather includes at least one projection or recess is segmented or includes bows, truncations, etc., as described, provided they are in seal material sufficiently compressible and configured to engage the surface sections 1615 appropriately to compress or deform into sealing engagement.

Figure 85:
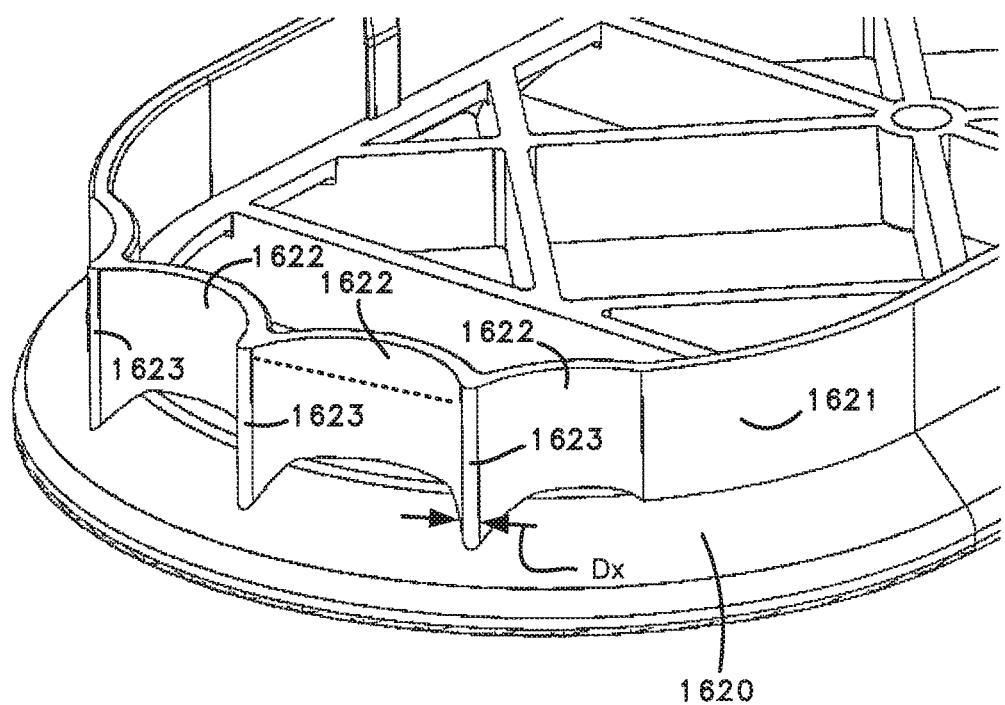
FIG. 85 is an enlarged fragmentary schematic depiction of a preform component usable in a filter cartridge in accord with FIG. 86.

In general, it will often be the case (and is typically preferred) that the housing seal arrangement comprise a "supported" seal. By this, it is meant that the seal surface compresses back against a support structure. Typically, the support structure is provided by preform part of the cartridge as indicated in certain previously described examples. In FIG. 85, a fragmented depiction of a preform housing seal support arrangement is depicted (schematically) at 1620. The portion, of the preform which backs up the seal, is indicated generally at 1621. Curved sections 1622 and projection 1623 are shown in surface 1621. When included in a cartridge having an appropriate shape, projections 1623 would extend into (and support) projections in the seal surface, and recesses 1622 would receive recesses in the seal surface. This can be understood by reference to FIG. 86, which depicts a cartridge 1650 configured with a preform 1620 of the type described and shown, which has been over molded and secured in place by molding material 1655, providing an outwardly directed seal surface 1656 sized to engage seal surface 1601, FIG. 84, in a sealing manner. Of course, variations as described above, can be provided in seal surface 1656.

It will be understood that some variations in the various projections of the seal surface 1656 can be provided, without changing the specific shape of the support 1620. For example, truncated surfaces or segmented surfaces, etc. can be used with the same preform 1620. This can be an advantage in manufacture, since it would not necessarily be required that a new preform shaped 1620 be made of every possible seal shape.

Referring to FIG. 85, it is noted that adjacent the tips, the projections 1623 can be characterized as having a maximum dimension adjacent a tip thereacross, or width $D_x$, and the various recesses 1622 can be characterized as having a largest dimension thereacross of $D_y$, with $D_y/D_x$ being at least 2, (i.e $D_y$ is at equal to at least $2 \times D_x$) typically at least 3, and often 5 or more. That is, the projections 1623 are relatively narrow, and the recesses 1612 are relatively wide. This is in spite of the fact that in the resulting seal surface, FIG. 86, the projections are relatively wide, and the recesses are relatively narrow. This, too, indicates that the support projections 1623 do not necessarily mimic the shape of the projections in the resulting seal, which would be a function of the mold. Rather, the projections 1623 need to be positioned appropriately to resist the compression of the seal surface in the projection area, a desired amount.

Figure 86:
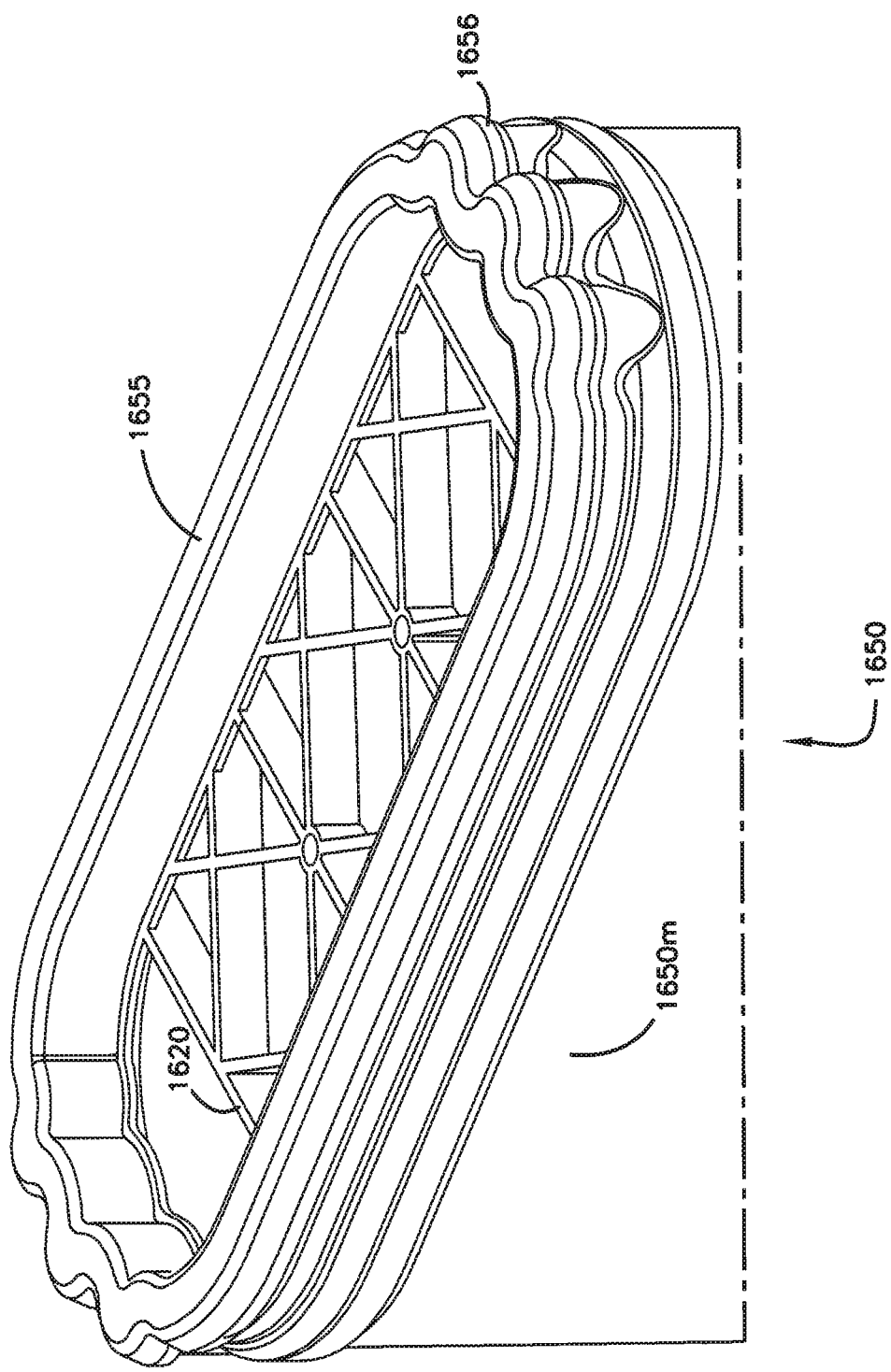
FIG. 86 is a fragmentary perspective view of a filter cartridge using a component in accord with FIG. 85 and configured for sealing engagement with a housing section, in accord with FIG. 84.

In the example cartridge of FIG. 86, a media pack 1650m is shown schematically and truncated. The media pack is configured for straight through flow, and may comprise, for example, a coiled arrangement of fluted material secured to facing materials, as previously discussed. Alternatives, of course, are possible.

X. Application of the Principles in Connection with Non-Straight Through Flow Arrangements In the examples depicted thus far herein, the media packs were generally configured for straight through flow, with opposite inlet and outlet flow surfaces; aligned with an air flow direction through a region surrounded by the seal surface (whether sealing is radially inward or outward). The principles described however, can be applied in media packs, which have media surrounding an open interior. An example of this can be understood by referenced to FIG. 87.

Figure 87:
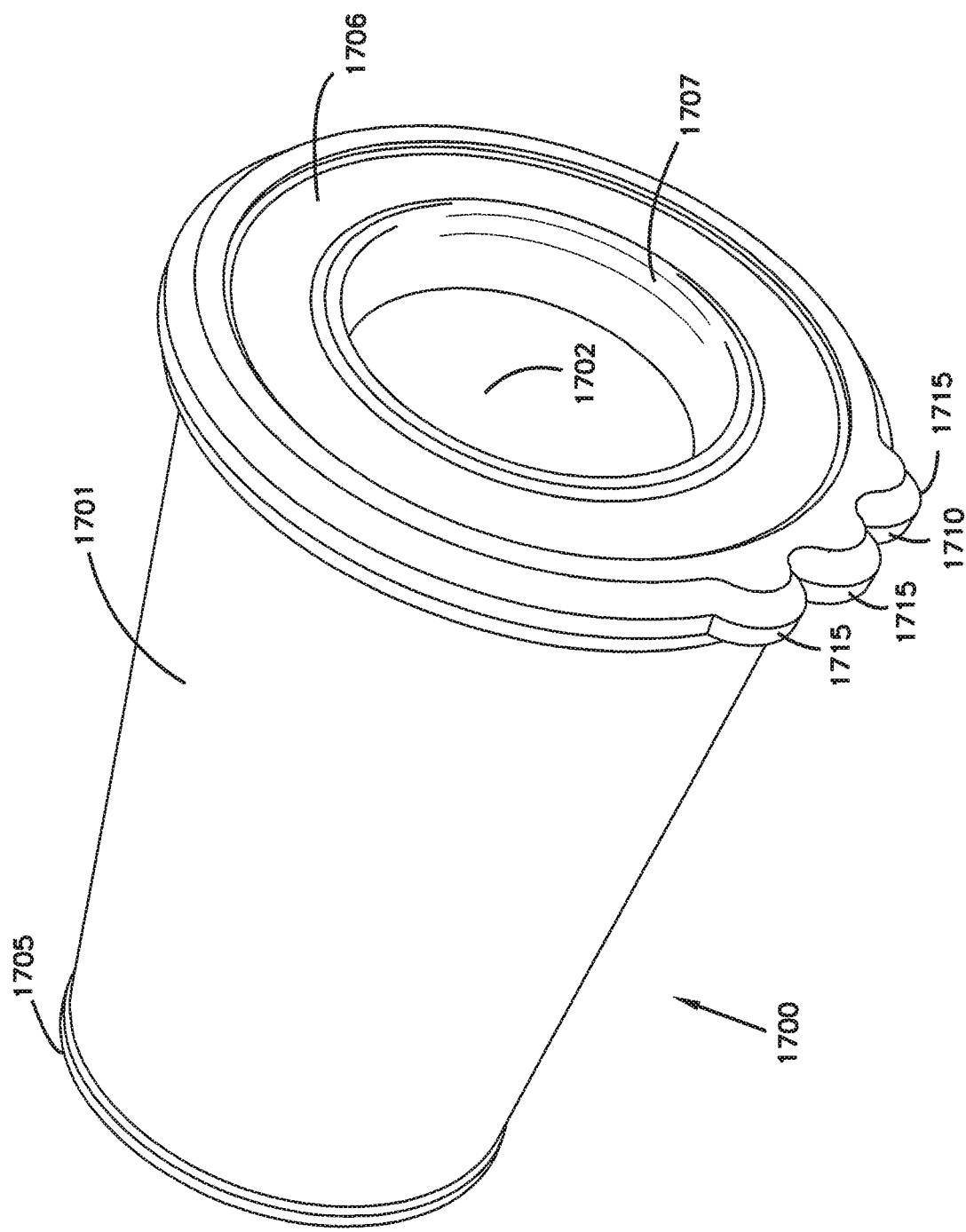
FIG. 87 is a perspective view of an alternate filter cartridge using principles described herein.

In FIG. 87, cartridge 1700 is depicted comprising media 1701 surrounding a cartridge interior 1702. The media, for example, can be pleated, but that is not specifically required. The media 1701 extends between first and second end caps 1705, 1706. The end cap 1706 is an open end cap with aperture 1707 therethrough.

The cartridge 1700 includes a seal surface 1710, which includes a projection/recess section comprising, in the example depicted, three radially outwardly directing projections 1715.

In a typical arrangement, end piece 1705 would be closed.

It is noted that the seal surface 1710 is generally circular in its shape, other than where the projection/recess section is shown. That is, surface 1710 defines a hypothetical circular shape seal surface. Alternatives are possible.

It is noted that the media pack 1708 is shown somewhat conical, increasing in cross-dimension extension from end cap 1705 and end cap 1706. Alternatives are possible, including cylindrical arrangements, or arrangements with an alternate taper.

In more general terms, the media adjacent each end can be characterized as having a "largest cross-sectional dimension", whether circular, oval or otherwise shaped. That largest cross-sectional dimension can be the same at both ends, or be larger at one end than the other (for example, larger at the open end than the closed; or, larger at the closed end than the open).

Of course, the same principles described in connection with FIG. 87 can be applied with arrangements that have radially inwardly directed seals, if desired. Further, it is noted that the seal surface 1710 depicted is in a position, which surrounds an outer perimeter of the seal, at a location projecting radially outwardly from an adjacent end of the media 1708. This variation can be used with other configurations described above.

The surface 1710 could alternately be positioned on a projecting portion of the end piece 1706 backed up by seal support extending axially from the adjacent end of the media 1701, if desired.

In general, FIG. 87 is meant to indicate that the principles described herein above can be applied in arrangements of a variety of shapes and media types. The various variations and examples described then can be applied in arrangements such as those depicted and described for FIG. 87.

XI. Some Final Thoughts and Observations

Herein, a variety of useful and advantageous features in air cleaner design and filter cartridge design are described and shown. These features can be used together, or separately, depending on the application, while still achieving some advantage according to the present disclosure. There is no specific requirement that an air cleaner assembly, filter cartridge, or component of one of these, include all of the features characterized herein.

It is also noted that FIGS. 1-61 and characterizations relating to them, were include previously filed U.S. Provisional U.S. Ser. No. 62/543,090, filed Aug. 9, 2017, the disclosure of which has been incorporated herein by reference. Many of the features of that provisional are also included in later described FIGS. 62-87, in various forms.

In this section, some general overall observations are made. In Section A, below, some selected overall general terms and/or issues are addressed. In Section B, below, selected, example, characterizations of arrangements in accord with the present disclosure are made.

A. Selected Summary of Certain Terms, Characterizations and Typical Features

Many of the features characterized herein relate to specific advantageous air filter cartridges. The air filter cartridges can be of a variety of types, for a variety of uses. In many instances, they will be of a type that comprise removable and replaceable components in an air cleaner system, such as an air cleaner arrangement for filtering engine air intake for a vehicle or other equipment. Such cartridges are generally sized and configured to be readily installed in a housing.

Herein, cartridges of particular concern are characterized as having a housing seal arrangement including a "radially directed" seal member or by similar terms. A radial seal member, is, generally, a seal member that seals to either surrounding structure of an air cleaner arrangement in use, or which surrounds structure of an air cleaner arrangement in use, sealing thereto. This is meant to distinguish radial arrangements from axial seal arrangements or pinch seal arrangements, as described. The "structure" reference is typically a portion of an air cleaner housing, but alternatives are possible. With a radially outwardly directed seal on the cartridge, the sealing is to surrounding structure. With a radially inwardly directed seal, the sealing is to structure that is surrounded by the seal.

In many instances, the radial seal is characterized in terms of a "perimeter-direction" feature or by various related terms. "Perimeter-direction" and variants thereof, in this context, is meant to refer a direction around the seal surface as opposed to an axial direction, which would correspond to a direction between the tip of the seal surface and a direction therefrom.

Herein, the term "wavy" or variants, is used in many instances to characterize one or more portions of the seal surface in the perimeter-direction. Such terms are characterized herein and are meant to be interchangeable with the term "radial projection/recess configuration" and variants thereof.

There is no specific requirement that any projection/recess or wavy section comprise smooth curves. A variety of alternatives to these are characterized.

It is noted that in some instances, reference is made to a first feature and a second feature as associated. "Associated" in this context will have the meaning indicated by the situation characterized, and generally is meant to refer to one of two conditions: either the second feature being a next adjacent feature of the first feature; or, the associated second feature being something engaged by the first feature during use.

Herein, the term "non-wavy" and 'non-projection/recess" is sometimes used to indicate a portion of a seal surface or other structure that does not include recesses or projections therein. The reference is meant to localized features. For example, a prior art "racetrack radial seal", which for example, can correspond to the hypothetical shape of FIG. 62 could be characterized as having a non-wavy or non-projection/recess configuration, even though the two semi-circular ends themselves, can be seen as projections.

Herein, a wavy or projection/recess portion of a seal surface can sometimes be characterized as having one or more "end recesses." In this context, the end recess is meant to refer to a recess in a selected wavy section that is at one of two opposite ends thereof, in the direction of extension of the wavy recess. Intermediate recesses would be recesses spaced from those ends by at least one projection.

Herein, in connection with projections sometimes reference is meant to a "tip amplitude." This meant to refer to a projected dimension of extension or projection between a deepest portion of the next adjacent or associated recesses, and a tip in the projection.

Herein, reference is sometimes made to "sealing direction." The term is meant to refer to the direction of engagement between the seal surface and a structure to which is sealed. With radial seals, by reference to the cartridge and seal surface, thus an outwardly directed seal has an outward sealing direction, and an inwardly directed seal has an inward sealing direction.

Herein, reference is sometimes made to "first and second seals" or "seal portions" axially aligned. It is not meant to be indicated that these first and second seals (that are axially aligned) do not, at least in some portion of extension completely around the perimeter, share portions of common extension. This will be understood by reference to examples of FIGS. 67-67B.

It is noted that a typical first seal surface having a projection/recess or wavy configuration in accord with the description, at least at that location, that does not correspond to or mimic a perimeter shape of a next adjacent part of a media perimeter. By not "corresponding to" or "mimicking" in this context, it is merely meant to indicate that the perimeter definition of the media and the perimeter definition of the seal in axially aligned regions are not the same general shape with respect to the seal surface, the intent is to indicate the contour definitions. With respect to the media perimeter definition, reference is meant to the overall perimeter shape adjacent the end piece having a seal thereon. This overall media definition, in the case of pleated media, is mean to refer to a definition created by the pleat tips. When the media is not pleated adjacent its perimeter, a general shape is all that is referenced. In each of the examples depicted, these type of characterizations apply.

B. Characterizations of Some Example Useful Applications of the Principles Described Herein 1. An air filter cartridge comprising: (a) a media pack comprising filter media and having first and second, opposite, flow ends; (i) the first flow end comprising an inlet flow end; (ii) the second flow end comprising an outlet flow end; and, (iii) the media pack being configured to filter air flowing into the inlet flow end prior to the air exiting the outlet flow end; and, (b) a housing seal arrangement positioned on the media pack; (i) the housing seal arrangement defining an air flow passageway; (ii) the housing seal arrangement comprising a first radially outwardly directed, seal member defining a first radial seal surface oriented to releasably, sealingly engage surrounding structure, in use; (iii) the first radial seal surface defining a perimeter-direction in extension around the flow passageway; and, (iv) the first radial seal surface including: (A) at least a first seal surface section including a radially directed portion comprising an alternating radial projection/recess configuration comprising at least two projections and three recesses in extension along a portion of the perimeter-direction; and, (B) at least 30% of extension of the radial seal surface, in the perimeter-direction, not comprising an alternating projection/recess configuration and having no recesses therein.

2. An air filter cartridge comprising: (a) a media pack comprising filter media; and, (b) a housing seal arrangement positioned on the media pack; (i) the housing seal arrangement defining an air flow passageway; (ii) the housing seal arrangement comprising a first radially directed seal member defining a first radial seal surface oriented to releasably, sealingly, engage an air cleaner in use; (iii) the first radial seal surface defining a perimeter-direction in extension around the flow passageway; and, (iv) the first radial seal surface including: (A) a first seal surface section including a radially directed portion comprising an alternating projection/recess configuration comprising at least two projections and three recess in extension along a portion of the perimeter-direction of the radial seal surface; and, (B) a second seal surface section configured to fully, radially, sealingly engage an associated portion of surrounding structure; the associated portion of surrounding structure having no projections or recesses therein over a continuous perimeter-direction length of at least 100 mm.

3. An air filter cartridge according to characterization 2 wherein: (a) the media pack comprises filter media defining first and second, opposite, flow ends.

4. An air filter cartridge according to characterization 3 wherein: (a) the first radial seal surface section comprises first and second, opposite, side seal surface sections extending between first and second, opposite, arcuate seal surface sections.

5. An air filter cartridge comprising: (a) a media pack comprising filter media and having first and second, opposite, flow ends; (i) the first one of the opposite flow ends comprising an inlet flow end; (ii) the second one of the opposite flow ends comprising an outlet flow end; and, (iii) the media pack being configured to filter air flowing into the inlet flow end prior to the air exiting the outlet flow end; and, (b) a housing seal arrangement positioned on the media pack; (i) the housing seal arrangement defining an air flow passageway; (ii) the housing seal arrangement comprising a first radially directed seal member defining a first radial seal surface oriented to releasably, sealingly, engage an air cleaner in use; (iii) the first radial seal surface defining a perimeter-direction in extension around the flow passageway; (A) the first radial seal surface having a first non-wavy arcuate seal surface section extending over an arcuate extension; and, (B) a first, arcuate, wavy seal surface section comprising an alternating radial projection/recess configuration and extending over an internal arc of no more than 80% of a total perimeter-direction seal surface length of the radial seal surface; (C) the first, arcuate, wavy seal surface section having a radius of curvature of R1; and, (D) the first, arcuate, wavy seal surface section comprises a curved projection/curved recess configuration having at least three recess sections and multiple projection sections; (1) each projection section and each recess section, in the curved projection section/curved recess section configuration of the first wavy seal surface section, having a radius of curvature R2 such that a ratio of R1/R2 for each is at least 1.5.

6. An air filter cartridge according to characterization 5 wherein: (a) the first non-wavy arcuate seal surface extends over an arcuate extension of at least 60°.

7. An air filter cartridge according to characterization 6 wherein: (a) the first non-wavy arcuate seal surface extends over a continuous arcuate extension of at least 60°.

8. An air filter cartridge according to characterization 6 wherein: (a) the first non-wavy arcuate seal surface includes multiple, spaced, arcuate sections therein together totaling an arcuate extension of at least 60°.

9. An air filter cartridge according to characterization 5 wherein: (a) the first non-wavy arcuate seal surface extends over an arcuate extension of at least 20°.

10. An air filter cartridge according to characterization 5 wherein: (a) the first non-wavy arcuate seal surface extends over an arcuate extension of at least 30°.

11. An air filter cartridge according to characterization 5 wherein: (a) the first non-wavy arcuate seal surface extends over an arcuate extension of at least 40°.

12. An air filter cartridge according to any one of characterizations 10 and 11 wherein: (a) the first arcuate seal surface section, of the radial seal surface, is configured to extend over an internal arc of at least 130°.

13. An air filter cartridge according to any one of characterizations 10-12 wherein: (a) the first arcuate seal surface section, of the radial seal surface, is configured to extend over a semi-circular internal arc.

14. An air filter cartridge according to any one of characterizations 2-13 wherein: (a) the housing seal arrangement comprises a first radially outwardly directed radial seal surface.

15. An air filter cartridge according to any one of characterizations 2-13 wherein: (a) the housing seal arrangement comprises a first radially inwardly directed radial seal surface.
16. An air filter cartridge according to any one of characterizations 1-15 wherein: (a) the first radial seal surface includes at least a first seal surface section and second seal surface section, in extension in the perimeter-direction, each including a radially directed portion comprising an alternating projection/recess configuration.
17. An air filter cartridge according to characterization 16 wherein: (a) the second seal surface section comprises at least three projections with recesses therebetween, in extension in the perimeter-direction.
18. An air filter cartridge according to any one of characterizations 1-17 wherein: (a) at least 40% of an extension of the first radial seal surface, in a perimeter-direction, not comprising an alternating projection/recess configuration and having no recesses therein.
19. An air filter cartridge according to any one of characterizations 1-18 wherein: (a) at least 50% of an extension of the first radial seal surface, in a perimeter-direction, not comprising an alternating projection/recess configuration and having no recesses therein.
20. An air filter cartridge according to any one of characterizations 1-19 wherein: (a) at least 50% of an extension of the first radial seal surface in the perimeter-direction is a continuous extension not comprising an alternating projection/recess configuration and having no recesses therein.
21. An air filter cartridge according to any one of characterizations 1-20 wherein: (a) the first radial seal surface includes at least two, spaced, sections together totaling at least 30% of a first seal surface extension, in the perimeter-direction, and not comprising an alternating projection/recess configuration and having no recesses therein.
22. An air filter cartridge according to any one of characterizations 1-21 wherein: (a) the first radial seal surface includes multiple spaced sections in the perimeter-direction, including at least two sections that each comprise at least 15% of perimeter-direction extension of the radial seal surface, and each not comprising an alternating projection/recess configuration and having no recesses therein.
23. An air filter cartridge according to any one of characterizations 1-22 wherein: (a) the media has an oval outer perimeter adjacent an end thereof.
24. An air filter cartridge according to any one of characterizations 1-23 wherein: (a) the media has an racetrack outer perimeter comprising two opposite straight side sections and two opposite semi-circular end sections, adjacent an end thereof.
25. An air filter cartridge according to any one of characterizations 1-24 wherein: (a) the first radial seal surface includes a perimeter direction shape having: two, opposite, straight seal surface sections and two, opposite, arcuate seal surface sections; (i) the straight seal surface sections extending between the arcuate seal surface sections.
26. An air filter cartridge according to characterization 25 wherein: (a) each one of the two, opposite, arcuate seal sections has an alternating projection/recess configuration having at least two projections and three recesses in extension along a portion of the perimeter-direction.
27. An air filter cartridge according to characterization 12 wherein: (a) each one of the two, opposite, arcuate seal sections comprises first and second end projections; and, first and second end recesses; (i) each end projection being spaced from an adjacent one of the two opposite straight sections by at least an adjacent one of the end recesses.
28. An air filter cartridge according to characterization 27 wherein: (a) each one of the two, opposite, arcuate seal sections includes an associated intermediate recess adjacent each end projection on an opposite side thereof from an adjacent one of the end recesses; (i) each associated intermediate recess having a greater depth of extension in a direction away from an outer most portion of the projection than does each next adjacent end recess.
29. An air filter cartridge according to characterization 28 wherein: (a) each end projection has a first recess/projection tip amplitude relative to an adjacent intermediate recess that is at least 3 mm larger than a second recess/projection tip amplitude relative to an adjacent one of the end recesses.
30. An air filter cartridge according to any one of characterizations 1-29 wherein: (a) the first radial seal surface comprises: (i) a portion defining a hypothetical standard shape seal surface engagement perimeter co-linear with at least one non-projection/recess seal section of the first radial seal surface; and, (ii) at least a first projection/recess seal surface section including a radially directed portion comprising a first surface definition with an installation interference projection arrangement that extends, in a sealing direction, from the hypothetical standard shape seal surface engagement perimeter.
31. An air filter cartridge according to characterization 30 wherein: (a) the installation interference projection arrangement comprises at least one projection that extends, in a sealing direction, from the hypothetical standard shape seal surface engagement perimeter, at least 1 mm.
32. An air filter cartridge according to any one of characterizations 30 and 31 wherein: (a) the installation interference projection arrangement comprises at least one projection that extends, in a sealing direction, from the hypothetical standard shape seal surface engagement perimeter, at least 2 mm.
33. An air filter cartridge according to any one of characterizations 30-32 wherein: (a) the installation interference projection arrangement comprises multiple projections that extend, in a sealing direction, from the hypothetical standard shape seal surface engagement perimeter.
34. An air filter cartridge according to any one of characterizations 1-33 wherein: (a) the first radial seal surface has a portion defining a hypothetical standard shape seal surface engagement perimeter co-linear with at least one non-projection/recess seal section of the first radial seal surface; and, (b) the first radial seal surface includes at least a first projection/recess seal surface section including a radially directed portion comprising a first surface definition with at least a first seal surface portion that extends in a direction across the hypothetical standard shape seal surface engagement perimeter.
35. An air filter cartridge according to characterization 34 wherein: (a) the first radial seal surface includes a portion that extends at least 1 mm in each direction of extension across the hypothetical standard shape seal surface engagement perimeter.
36. An air filter cartridge according to any one of characterizations 34 and 35 wherein: (a) the first radial seal surface definition includes a portion that extends at least 2 mm in each direction of extension across the hypothetical standard shape seal surface engagement perimeter.
37. An air filter cartridge according to any one of characterizations 34-36 wherein: (a) the first radial seal surface definition includes at least one projection that extends at least 3 mm in a selected direction from the hypothetical standard shape seal surface engagement perimeter.

38. An air filter cartridge according to any one of characterizations 34-37 wherein: (a) the hypothetical standard shape seal surface engagement perimeter is oval.

39. An air filter cartridge according to any one of characterizations 34-38 wherein: (a) the hypothetical standard shape seal surface engagement perimeter is racetrack.

40. An air filter cartridge comprising: (a) a filter media pack; and, (b) a housing seal arrangement; (i) the housing seal arrangement defining an air flow passageway; (ii) the housing seal arrangement including a first radial seal member having a first radial seal surface oriented to releasably, sealingly, engage an air cleaner in use; (iii) the first radial seal surface defining a perimeter-direction in extension around the flow passageway; (iv) the first seal surface having a portion defining a hypothetical standard shape seal surface engagement perimeter co-linear with at least one non-projection/recess seal section of the first radial seal surface; and, (v) the first radial seal surface including at least a first projection/recess seal surface section including a radially directed portion comprising a first surface definition with an installation interference projection arrangement that extends, in a sealing direction, from the hypothetical standard shape seal surface engagement perimeter.

41. An air filter cartridge according to characterization 40 wherein: (a) the interference projection arrangement comprises at least one projection that extends, in a sealing direction, from the hypothetical standard shape seal surface engagement perimeter at least 1 mm.

42. An air filter cartridge according to any one of characterizations 40 and 41 wherein: (a) the interference projection arrangement comprises at least one projection that extends, in a sealing direction, from the hypothetical standard shape seal surface engagement perimeter at least 2 mm.

43. An air filter cartridge according to any one of characterizations 40-42 wherein: (a) the interference projection arrangement comprises multiple projections that extend in a sealing direction, from the hypothetical standard shape seal surface engagement perimeter.

44. An air filter cartridge comprising: (a) a filter media pack; and, (b) a housing seal arrangement; (i) the housing seal arrangement defining an air flow passageway; (ii) the housing seal arrangement including a first radial seal member having a first radial seal surface oriented to releasably, sealingly, engage an air cleaner in use; (iii) the first radial seal surface defining a perimeter-direction in extension around the flow passageway; (iv) the first radial seal surface having a portion defining a hypothetical standard shape seal surface engagement perimeter co-linear with at least one non-projection/recess seal section of the first radial seal surface; and, (v) the first seal surface including at least a first projection/recess seal surface section including a radially directed portion comprising a first surface definition with at least a first seal surface portion that extends in a direction across the hypothetical standard shape seal surface engagement perimeter.

45. An air filter cartridge according to characterization 44 wherein: (a) the first surface definition includes at least a first seal surface portion that extends at least 1 mm in each direction of extension across the hypothetical standard shape seal surface engagement perimeter.

46. An air filter cartridge according to any one of characterizations 44 and 45 wherein: (a) the first surface definition includes at least a first seal surface portion that extends at least 2 mm in each direction of extension across the hypothetical standard shape seal surface engagement perimeter.

47. An air filter cartridge according to any one of characterizations 6 wherein: (a) the surface definition includes at least one projection that extends at least 3 mm in a selected direction from the hypothetical standard shape seal surface engagement perimeter.

48. An air filter cartridge according to any one of characterizations 43-47 wherein: (a) the hypothetical standard shape seal surface engagement perimeter is co-linear with at least 20% of the actual seal perimeter.

49. An air filter cartridge according to any one of characterizations 43-48 wherein: (a) the hypothetical standard shape seal surface engagement perimeter is co-linear with at least 30% of the actual seal perimeter.

50. An air filter cartridge according to any one of characterizations 43-49 wherein: (a) the hypothetical standard shape seal surface engagement perimeter is co-linear with at least 40% of the actual seal perimeter.

51. An air filter cartridge according to any one of characterizations 51-50 wherein: (a) the portion of the hypothetical standard shape seal surface engagement perimeter that is co-linear with the actual seal perimeter comprises a single continuous portion of the hypothetical standard shape seal surface engagement perimeter.

52. An air filter cartridge according to characterization 51 wherein: (a) the hypothetical standard shape seal surface engagement perimeter is oval.

53. An air filter cartridge according to characterization 52 wherein: (a) the hypothetical standard shape seal surface engagement perimeter is racetrack.

54. An air filter cartridge according to any one of characterizations 51-53 wherein: (a) the portion of the hypothetical standard shape seal surface engagement perimeter that is co-linear with the actual seal perimeter comprises spaced sections of the hypothetical standard shape seal surface engagement perimeter.

55. An air filter cartridge according to any one of characterizations 40-52 wherein: (a) the hypothetical standard shape seal surface engagement perimeter is selected from: polygonal, and circular.

56. An air filter cartridge according to characterization 55 wherein: (a) the hypothetical standard shape seal surface engagement perimeter is rectangular.

57. An air filter cartridge according to characterization 55 wherein: (a) the hypothetical standard shape seal surface engagement perimeter is circular.

58. An air filter cartridge comprising: (a) a filter media pack; and, (b) a housing seal arrangement; (i) the housing seal arrangement defining an air flow passageway; (ii) the housing seal arrangement including a first radial seal member having a first radial seal surface oriented to releasably, sealingly, engage an air cleaner in use; (iii) the first radial seal surface defining a perimeter direction in extension around the flow passageway; and, (iv) the first seal surface including a first projection/recess seal surface section having at least one projection/recess amplitude, on at least one side thereof, of at least 5 mm; and, (v) the first seal surface including a non-projection/recess seal surface definition of at least 30% of the perimeter direction in extension around the flow passageway.

59. An air filter cartridge according to characterization 58 wherein: (a) the first seal surface includes a portion of non-projection/recess surface definition that extends continuously along at least 30% of the perimeter direction in extension around the flow passageway.

60. An air filter cartridge according to any one of characterizations 1-59 wherein: (a) the housing seal arrangement includes a second radial seal surface portion oriented to releasably, sealingly, engage on an air cleaner in use; (i) the second radial seal surface portion being in axial alignment with the first radially directed portion; and, (ii) the second radial seal surface portion being configured to sealingly engage a non-projection/recess seal surface of a housing.

61. An air filter cartridge according to characterization 60 wherein: (a) the second seal surface portion is a non-projection/recess seal surface portion.

62. An air filter cartridge comprising: (a) a filter media pack; and, (b) a housing seal arrangement; (i) the housing seal arrangement defining an air flow passageway; (ii) the housing seal arrangement including a first radial seal member having a first radial seal surface oriented to releasably, sealingly, engage an air cleaner in use; (iii) the first radial seal surface defining a perimeter direction in extension around the flow passageway; and, (iv) the first radial seal surface including a first radially directed portion comprising a radial projection/recess configuration; and, (v) the housing seal arrangement including a second radial seal member having a second radial seal surface portion oriented to releasably, sealingly, engage an air cleaner in use; (A) the second radial seal surface portion being in axial alignment with the first radial seal surface portion; and, (B) the second seal surface portion being configured to sealingly engage a non-projection/recess seal surface of a housing.

63. An air filter cartridge according to any one of characterizations 1-62 wherein: (a) the media pack has an oval cross-sectional shape in extension between the first and second, opposite inlet and outlet, flow ends; (i) the oval cross-sectional shape defining first and second curved ends with sides extending in a therebetween; (b) the housing seal arrangement is positioned at the outlet flow end; and, (c) a handle arrangement is positioned on a preform adjacent the inlet flow end with a handle member in overlap with one of the first and second curved ends.

64. An air filter cartridge according to characterization 63 wherein: (a) the radial seal surface member defines a first projection/recess contour section in axial alignment with the first curved end of the media pack; and, (b) the handle arrangement is positioned in axial overlap with the second curved end of the media pack.

65. An air filter cartridge comprising: (a) a filter media pack having first and second, opposite, ends; and, (b) a housing seal arrangement positioned adjacent to the media pack first end; (i) the housing seal arrangement defining an air flow passageway; (ii) the housing seal arrangement including a first radial seal surface oriented to releasably, sealingly, engage an air cleaner in use; (iii) the first radial seal surface defining a perimeter direction in extension around the flow passageway; and, (iv) the first radial seal surface including a first radially directed seal portion having a first, largest, cross-sectional dimension; and, (v) the housing seal arrangement including a second radial seal surface portion oriented to releasably, sealingly, engage an air cleaner in use; (A) the second radial seal surface portion being in axial alignment with the first radially directed seal portion and spaced from the first radial seal portion in the direction of the media pack second end; and, (B) the second seal surface portion having a second, largest, cross-sectional dimension that is smaller than the first, largest, cross-sectional dimension.

66. An air filter cartridge according to characterization 65 wherein: (a) the first radial seal surface portion of the second radial seal surface portion are each outwardly directed radial seal sections.

67. An air filter cartridge according to any one of characterizations 65 and 66 wherein: (a) the second, largest, cross-sectional dimension is at least 2 mm smaller than the first, largest, cross-sectional dimension.

68. An air filter cartridge according to any one of characterizations 65-67 wherein: (a) the second, largest, cross-sectional dimension is at least 4 mm smaller than the first, largest, cross-sectional dimension.

69. An air filter cartridge according to any one of characterizations 1-68 wherein: (a) the media pack comprises fluted media secured to facing media.

70. An air filter cartridge according to characterization 69 wherein: (a) the media pack comprises a coiled media arrangement.

71. An air filter cartridge according to any one of characterizations 1-70 wherein: (a) the media pack comprises pleated media in extension around an open filter interior.

72. An air filter cartridge according to any one of characterizations 2, 40-62 and 65-69, wherein: (a) the filter media extends between first and second, opposite, end pieces; (i) the first end piece being an open end piece and having the housing seal arrangement thereon; (ii) the second end piece being closed; and, (iii) the media extends around an open filter interior.

73. An air filter cartridge according to characterization 72 wherein: (a) the media is pleated.

74. An air filter cartridge according to any one of characterizations 72 and 73 wherein: (a) the media defines a cylindrical outer perimeter.

75. An air filter cartridge according to any one of characterizations 72 and 73 wherein: (a) the media defines a conical outer perimeter.

76. An air filter cartridge according to any one of characterizations 72 and 73 wherein: (a) the media defines a larger outer cross-sectional dimension adjacent the first end piece than adjacent the second end piece.

77. An air filter cartridge according to any one of characterizations 72 and 73 wherein: (a) the media defines a smaller outer cross-sectional dimension adjacent the first end piece than adjacent the second end piece.

78. An air filter cartridge according to any one of characterizations 1-77 wherein: (a) the cartridge includes a seal support therein embedded within seal material of the housing seal arrangement.

79. An air filter cartridge according to characterization 78 wherein: (a) the seal support includes at least one wide recess on each side of a narrow projection tip.

80. An air filter cartridge according to characterization 79 wherein: (a) the narrow projection tip has a largest cross-dimension of Dx; and, (b) the wide recess has a largest cross-dimension of Dy; (i) Dy being at least 2×X2.

81. An air filter cartridge according to characterization 80 wherein: (a) the narrow projection tip has a largest cross-dimension of Dx; and, (b) the wide recess has a largest cross-dimension of Dy; (i) Dy being at least 4×Dx.

82. An air filter cartridge according to characterization 9 wherein: (a) the narrow projection tip has a largest cross-dimension of Dx; and, (b) the wide recess has a largest cross-dimension of Dy; (i) Dy being at least 5×Dx.

83. An air filter cartridge according to any one of characterizations 1-15 wherein: (a) at least one projection in the first radial seal surface is a segmented projection.

84. An air filter cartridge according to any one of characterizations 1-82 wherein: (a) at least one recess in the first radial seal surface is a segmented recess.

85. An air filter cartridge according to any one of characterizations 1-84 wherein: (a) at least one projection in the first radial seal surface is a truncated projection.

86. An air filter cartridge according to any one of characterizations 1-85 wherein: (a) at least one projection in the first radial seal surface includes at least one undercut side portion.

87. An air filter cartridge according to any one of characterizations 1-86 wherein: (a) at least one projection in the first radial seal surface includes at least two, opposite, undercut side portions.

88. An air filter cartridge according to any one of characterizations 1-87 wherein: (a) at least one recess in the first radial seal surface includes a portion bowed in a direction of a projection.

89. An air filter cartridge according to any one of characterizations 1-88 wherein: (a) at least one projection in the first radial seal surface includes a portion bowed in a direction of a recess.

90. An air filter cartridge according to any one of characterizations 1-89 wherein: (a) the first radial seal surface includes at least 30% of extension, in the perimeter-direction: not comprising an alternating projection/recess configuration, not having a recess therein; and, having a perimeter-direction shape corresponding to a circular arc definition.

91. An air filter cartridge according to any one of characterizations 1-89 wherein: (a) the housing seal arrangement includes a first seal surface portion having a section of wavy shape comprising an alternating projection/recess configuration with: (i) a contoured first perimeter-direction length L1; and, (ii) a corresponding non-contoured first perimeter-direction length L2; (A) wherein a ration of L1/L2 is at least 1.01.

92. An air filter cartridge according to characterization 91 wherein: (a) L1/L2 is at least 1.03

93. An air filter cartridge according to any one of characterizations 91 and 92 wherein: (a) L1/L2 is at least 1.1.

94. An air filter cartridge according to any one of characterizations 1-93 wherein: (a) L1/L2 is no greater than 2.5.

95. An air filter cartridge according to characterization 94 wherein: (a) L1/L2 is no greater than 2.0.

96. An air filter cartridge according to characterization 95 wherein: (a) L1/L2 is no greater than 1.6.

97. An air filter cartridge according to any one of characterizations 91-96 wherein: (a) the first seal surface includes multiple, spaced, wavy sections; and, (b) each wavy section in the seal surface, independently, has: (i) a contoured first perimeter-direction length L1; (ii) a corresponding non-contoured first perimeter-direction length L2; (A) wherein a ration of L1/L2 is at least 1.01.

98. An air filter cartridge according to characterization 97 wherein: (a) L1/L2 is at least 1.03

99. An air filter cartridge according to any one of characterizations 97 and 98 wherein: (a) L1/L2 is at least 1.1.

100. An air filter cartridge according to any one of characterizations 97-99 wherein: (a) L1/L2 is no greater than 2.5.

101. An air filter cartridge according to characterization 100 wherein: (a) L1/L2 is no greater than 2.0.

102. An air filter cartridge according to characterizations 101 wherein: (a) L1/L2 is no greater than 1.6.

103. An air filter cartridge according to any one of characterizations 1-102 wherein: (a) the first seal surface includes at least one perimeter-direction portion having a projection/recess definition that does not correspond to a perimeter shape of a next adjacent media perimeter.

104. An air cleaner assembly comprising: (a) a housing including a body and access cover; (i) the housing includes a structural seal surface including a wavy section for sealing there against of a cartridge seal; (b) an air filter cartridge is in accord with at least one of characterizations 1-103 positioned within the housing and releasably sealed to the structural seal surface of the housing.

105. An air cleaner assembly according to characterization 104 wherein: (a) the housing includes an inlet end and an outlet end; and, (b) the housing is configured for side load of the air filter cartridge at a location between the inlet and outlet ends of the housing, see for example, FIG. 47.

106. An air cleaner assembly according to characterization 105 wherein: (a) the cartridge is also in accord with at least one of characterizations 63 and 64.

107. An air cleaner assembly according to characterizations 106 wherein: (a) the cartridge is in accord with characterization 64.

108. An air cleaner assembly according to any one of characterization 104-107 wherein: (a) the housing includes a structural seal surface having at least one non-wavy section of at least 100 mm having no projection and no recess therein.

What is claimed:
1. An air filter cartridge comprising:
 (a) a media pack comprising filter media and having first and second, opposite, flow ends;
  (i) the first flow end comprising an inlet flow end;
  (ii) the second flow end comprising an outlet flow end; and,
  (iii) the media pack being configured to filter air flowing into the inlet flow end prior to the air exiting the outlet flow end; and,
 (b) a housing seal arrangement positioned on the media pack;
  (i) the housing seal arrangement defining an air flow passageway;
  (ii) the housing seal arrangement comprising a first radially outwardly directed, seal member defining a first radial seal surface oriented to releasably, sealingly engage surrounding structure, in use;
  (iii) the first radial seal surface defining a perimeter-direction in extension around the flow passageway; and,
  (iv) the first radial seal surface including:
   (A) at least a first seal surface section including a radially directed portion comprising an alternating radial projection/recess configuration comprising at least two projections and three recesses in extension along a portion of the perimeter-direction; and,
   (B) at least 30% of extension of the radial seal surface, in the perimeter-direction, not comprising an alternating projection/recess configuration and having no recesses therein.

2. An air filter cartridge according to claim 1 wherein:
 (a) the first radial seal surface includes at least a first seal surface section and second seal surface section, in extension in the perimeter-direction, each including a radially directed portion comprising an alternating projection/recess configuration.

3. An air filter cartridge according to claim 1 wherein:
 (a) at least 40% of an extension of the first radial seal surface, in a perimeter-direction, not comprising an alternating projection/recess configuration and having no recesses therein.

4. An air filter cartridge according to claim 1 wherein:
 (a) the first radial seal surface includes a perimeter direction shape having: two, opposite, straight seal surface sections and two, opposite, arcuate seal surface sections;

(i) the straight seal surface sections extending between the arcuate seal surface sections.

5. An air filter cartridge according to claim 4 wherein:
(a) each one of the two, opposite, arcuate seal sections has an alternating projection/recess configuration having at least two projections and three recesses in extension along a portion of the perimeter-direction.

6. An air filter cartridge according to claim 5 wherein:
(a) each one of the two, opposite, arcuate seal sections comprises first and second end projections; and, first and second end recesses;
   (i) each end projection being spaced from an adjacent one of the two opposite straight sections by at least an adjacent one of the end recesses.

7. An air filter cartridge according to claim 6 wherein:
(a) each one of the two, opposite, arcuate seal sections includes an associated intermediate recess adjacent each end projection on an opposite side thereof from an adjacent one of the end recesses;
   (i) each associated intermediate recess having a greater depth of extension in a direction away from an outer most portion of the projection than does each next adjacent end recess.

8. An air filter cartridge according to claim 1 wherein:
(a) the first radial seal surface comprises:
   (i) a portion defining a hypothetical standard shape seal surface engagement perimeter co-linear with at least one non-projection/recess seal section of the first radial seal surface; and,
   (ii) at least a first projection/recess seal surface section including a radially directed portion comprising a first surface definition with an installation interference projection arrangement that extends, in a sealing direction, from the hypothetical standard shape seal surface engagement perimeter.

9. An air filter cartridge according to claim 1 wherein:
(a) the first radial seal surface has a portion defining a hypothetical standard shape seal surface engagement perimeter co-linear with at least one non-projection/recess seal section of the first radial seal surface; and,
(b) the first radial seal surface includes at least a first projection/recess seal surface section including a radially directed portion comprising a first surface definition with at least a first seal surface portion that extends in a direction across the hypothetical standard shape seal surface engagement perimeter.

10. An air filter cartridge according to claim 1 wherein:
(a) the media pack has an oval cross-sectional shape in extension between the first and second, opposite inlet and outlet, flow ends;
   (i) the oval cross-sectional shape defining first and second curved ends with sides extending in a therebetween;
(b) the housing seal arrangement is positioned at the outlet flow end; and,
(c) a handle arrangement is positioned on a preform adjacent the inlet flow end with a handle member in overlap with one of the first and second curved ends.

11. An air filter cartridge according to claim 1 wherein:
(a) the cartridge includes a seal support therein embedded within seal material of the housing seal arrangement.

12. An air filter cartridge according to claim 11 wherein:
(a) the seal support includes at least one wide recess on each side of a narrow projection tip.

13. An air filter cartridge according to claim 1 wherein:
(a) at least one projection in the first radial seal surface is a segmented projection.

14. An air filter cartridge according to claim 1 wherein:
(a) at least one recess in the first radial seal surface is a segmented recess.

15. An air filter cartridge according to claim 1 wherein:
(a) at least one projection in the first radial seal surface is a truncated projection.

16. An air filter cartridge according to claim 1 wherein:
(a) at least one recess in the first radial seal surface includes a portion bowed in a direction of a projection.

17. An air filter cartridge according to claim 1 wherein:
(a) the first radial seal surface includes at least 30% of extension, in the perimeter-direction: not comprising an alternating projection/recess configuration, not having a recess therein; and, having a perimeter-direction shape corresponding to a circular arc definition.

18. An air filter cartridge according to claim 1 wherein:
(a) the housing seal arrangement includes a first seal surface portion having a section of wavy shape comprising an alternating projection/recess configuration with:
   (i) a contoured first perimeter-direction length $L_1$; and,
   (ii) a corresponding non-contoured first perimeter-direction length $L_2$;
      (A) wherein a ration of $L_1/L_2$ is at least 1.01.

19. An air filter cartridge according to claim 1 wherein:
(a) the housing seal arrangement includes a second radial seal surface portion oriented to releasably, sealingly, engage on an air cleaner in use;
   (i) the second radial seal surface portion being in axial alignment with the first radially directed portion; and,
   (ii) the second radial seal surface portion being configured to sealingly engage a non-projection/recess seal surface of a housing.

20. An air cleaner assembly comprising:
(a) a housing including a body and access cover;
   (i) the housing includes a structural seal surface including a wavy section for sealing there against of a cartridge seal;
(b) an air filter cartridge is accord with claim 1 positioned within the housing and releasably sealed to the structural seal surface of the housing.

* * * * *